PDF page

US008169537B2

(12) United States Patent
Ohki

(10) Patent No.: US 8,169,537 B2
(45) Date of Patent: May 1, 2012

(54) CONTROL METHOD, CONTROL APPARATUS AND CONTROL PROGRAM FOR PHOTOGRAPHING APPARATUS

(75) Inventor: Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 565 days.

(21) Appl. No.: 10/586,659

(22) PCT Filed: Oct. 18, 2005

(86) PCT No.: PCT/JP2005/019106
§ 371 (c)(1),
(2), (4) Date: Aug. 26, 2008

(87) PCT Pub. No.: WO2006/057122
PCT Pub. Date: Jun. 1, 2006

(65) Prior Publication Data
US 2008/0298789 A1 Dec. 4, 2008

(30) Foreign Application Priority Data
Nov. 25, 2004 (JP) ................. P2004-340913

(51) Int. Cl.
*H04N 5/238* (2006.01)
*G03B 7/00* (2006.01)
*H04N 5/235* (2006.01)
*H04N 5/228* (2006.01)

(52) U.S. Cl. ............ 348/367; 348/362; 348/208.12; 348/208.16

(58) Field of Classification Search .......... 348/362, 348/367, 208.12–208.16
See application file for complete search history.

(56) References Cited

U.S. PATENT DOCUMENTS

| 5,053,875 | A | 10/1991 | Ishii et al. |
| 6,833,864 | B1 * | 12/2004 | Ashida .............. 348/229.1 |
| 7,057,645 | B1 * | 6/2006 | Hara et al. ........... 348/208.6 |
| 7,386,228 | B2 * | 6/2008 | Okada .................. 396/238 |
| 2004/0189822 | A1 * | 9/2004 | Shimada ............. 348/229.1 |

(Continued)

FOREIGN PATENT DOCUMENTS
EP 0 388 936 B1 6/1997
(Continued)

*Primary Examiner* — Sinh Tran
*Assistant Examiner* — Christopher K Peterson
(74) *Attorney, Agent, or Firm* — Finnegan, Henderson, Farabow, Garrett & Dunner, L.L.P.

(57) ABSTRACT

The present invention relates to a control method of a photographing apparatus, the photographing apparatus and a control program, which are capable of automatically determining a photographing mode capable of generating a sharper image. If a first exposure time is equal to or shorter than a first threshold value, a control circuit 18 makes a decision to take an input image in a first mode. The first exposure time is an exposure time required for taking one input image on the assumption that a photographing operation is carried out in the first mode for generating one output image by taking one input image. If the first exposure time is neither equal to nor shorter than the first threshold value, on the other hand, the control circuit 18 makes a decision to take a plurality of input images in a second mode provided that a second exposure time is equal to or shorter than a second threshold value. The second exposure time is an exposure time required for taking each of the input images successively on the assumption that a photographing operation is carried out in the second mode for generating one output image by taking the input images successively. The present invention can be applied for example to a digital camera.

16 Claims, 47 Drawing Sheets

U.S. PATENT DOCUMENTS

| | | |
|---|---|---|
| 2004/0196376 A1 | 10/2004 | Hosoda et al. |
| 2004/0197075 A1 | 10/2004 | Aiso |
| 2007/0077055 A1* | 4/2007 | Tominaga et al. ............ 396/256 |

FOREIGN PATENT DOCUMENTS

| | | |
|---|---|---|
| JP | 05-167976 | 7/1993 |
| JP | 05-236442 | 9/1993 |
| JP | 09-261526 | 10/1997 |
| JP | 10-341367 | 12/1998 |
| JP | 2863188 | 12/1998 |
| JP | 2942359 | 6/1999 |
| JP | 2000-069352 | 3/2000 |
| JP | 2000069352 * | 3/2000 |
| JP | 2000-217032 | 8/2000 |
| JP | 2000-224460 | 8/2000 |
| JP | 2000-244797 | 9/2000 |
| JP | 2000-244803 | 9/2000 |
| JP | 2004-234623 | 8/2004 |
| WO | WO 95/31066 | 11/1995 |

* cited by examiner

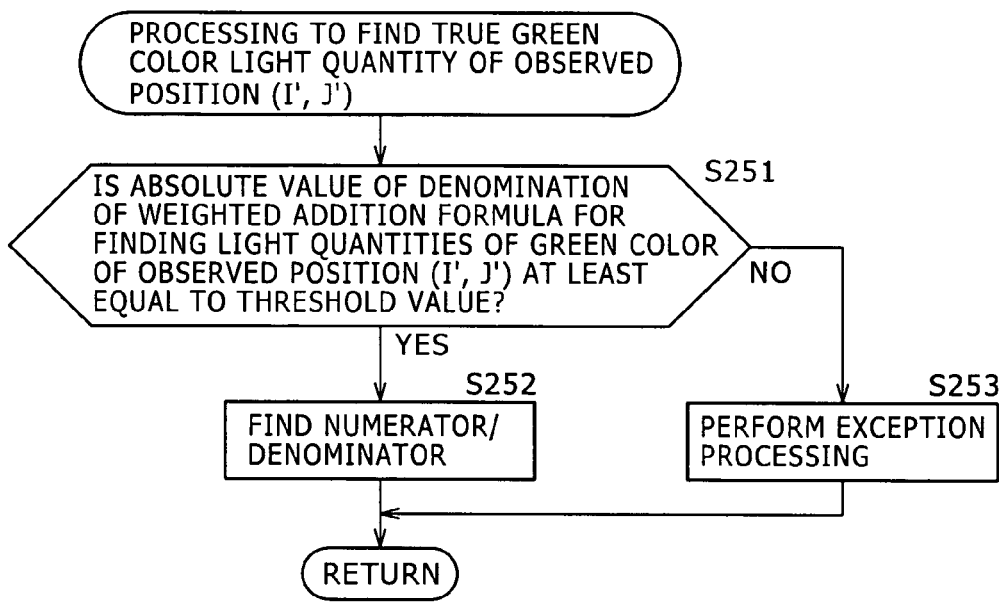
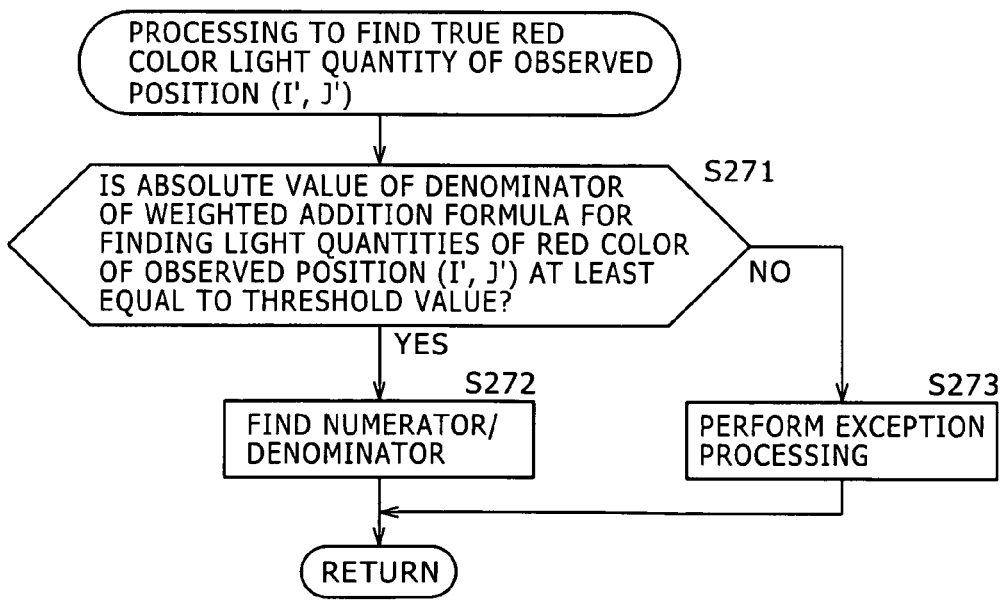

FIG. 32

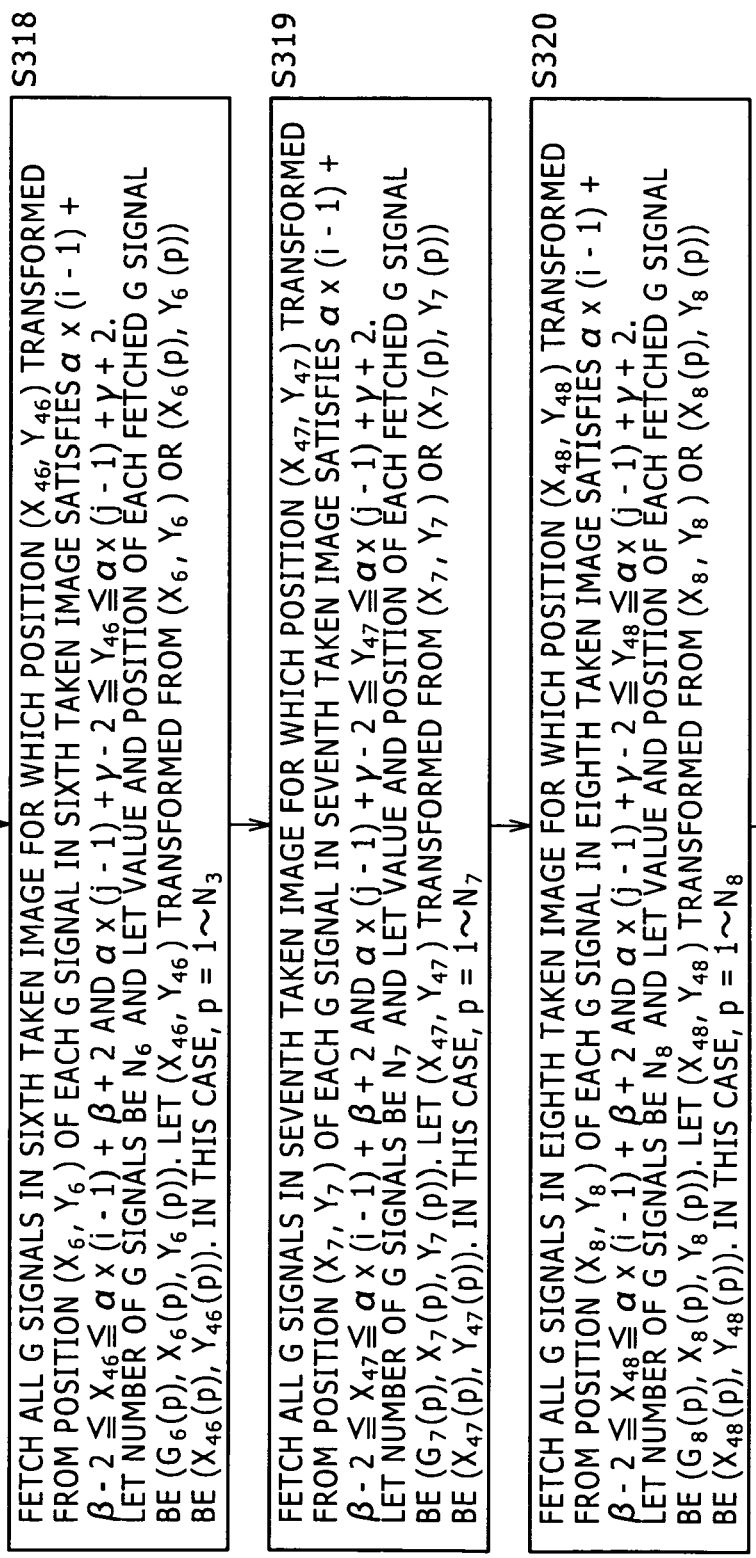

S318: FETCH ALL G SIGNALS IN SIXTH TAKEN IMAGE FOR WHICH POSITION $(X_{46}, Y_{46})$ TRANSFORMED FROM POSITION $(X_6, Y_6)$ OF EACH G SIGNAL IN SIXTH TAKEN IMAGE SATISFIES $\alpha \times (i-1) + \beta - 2 \leq X_{46} \leq \alpha \times (i-1) + \beta + 2$ AND $\alpha \times (j-1) + \gamma - 2 \leq Y_{46} \leq \alpha \times (j-1) + \gamma + 2$. LET NUMBER OF G SIGNALS BE $N_6$ AND LET VALUE AND POSITION OF EACH FETCHED G SIGNAL BE $(G_6(p), X_6(p), Y_6(p))$. LET $(X_{46}, Y_{46})$ TRANSFORMED FROM $(X_6, Y_6)$ OR $(X_6(p), Y_6(p))$ BE $(X_{46}(p), Y_{46}(p))$. IN THIS CASE, $p = 1 \sim N_3$ S319: FETCH ALL G SIGNALS IN SEVENTH TAKEN IMAGE FOR WHICH POSITION $(X_{47}, Y_{47})$ TRANSFORMED FROM POSITION $(X_7, Y_7)$ OF EACH G SIGNAL IN SEVENTH TAKEN IMAGE SATISFIES $\alpha \times (i-1) + \beta - 2 \leq X_{47} \leq \alpha \times (i-1) + \beta + 2$ AND $\alpha \times (j-1) + \gamma - 2 \leq Y_{47} \leq \alpha \times (j-1) + \gamma + 2$. LET NUMBER OF G SIGNALS BE $N_7$ AND LET VALUE AND POSITION OF EACH FETCHED G SIGNAL BE $(G_7(p), X_7(p), Y_7(p))$. LET $(X_{47}, Y_{47})$ TRANSFORMED FROM $(X_7, Y_7)$ OR $(X_7(p), Y_7(p))$ BE $(X_{47}(p), Y_{47}(p))$. IN THIS CASE, $p = 1 \sim N_7$ S320: FETCH ALL G SIGNALS IN EIGHTH TAKEN IMAGE FOR WHICH POSITION $(X_{48}, Y_{48})$ TRANSFORMED FROM POSITION $(X_8, Y_8)$ OF EACH G SIGNAL IN EIGHTH TAKEN IMAGE SATISFIES $\alpha \times (i-1) + \beta - 2 \leq X_{48} \leq \alpha \times (i-1) + \beta + 2$ AND $\alpha \times (j-1) + \gamma - 2 \leq Y_{48} \leq \alpha \times (j-1) + \gamma + 2$. LET NUMBER OF G SIGNALS BE $N_8$ AND LET VALUE AND POSITION OF EACH FETCHED G SIGNAL BE $(G_8(p), X_8(p), Y_8(p))$. LET $(X_{48}, Y_{48})$ TRANSFORMED FROM $(X_8, Y_8)$ OR $(X_8(p), Y_8(p))$ BE $(X_{48}(p), Y_{48}(p))$. IN THIS CASE, $p = 1 \sim N_8$

FIG. 33

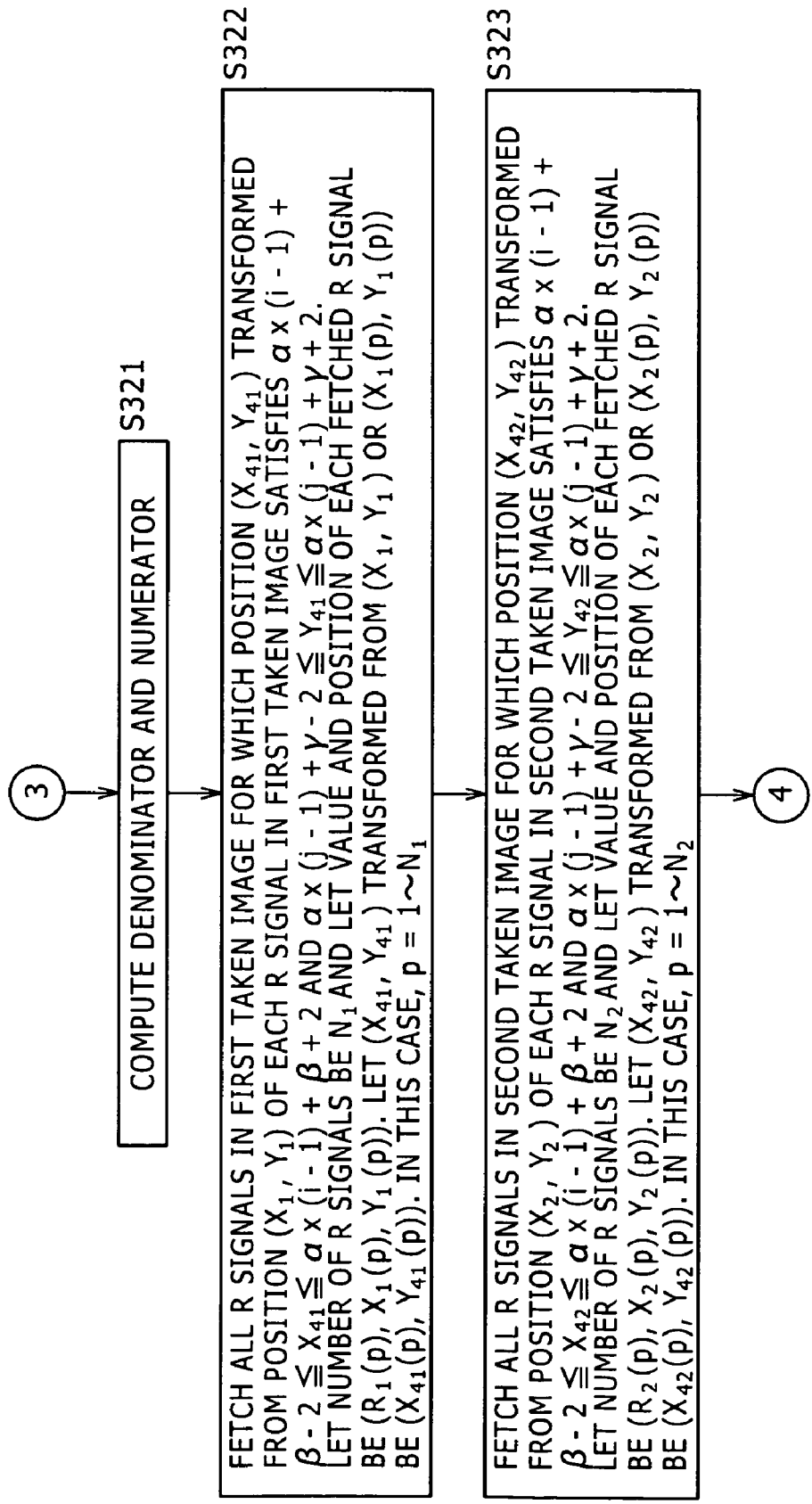

③ → COMPUTE DENOMINATOR AND NUMERATOR (S321) →

S322: FETCH ALL R SIGNALS IN FIRST TAKEN IMAGE FOR WHICH POSITION $(X_{41}, Y_{41})$ TRANSFORMED FROM POSITION $(X_1, Y_1)$ OF EACH R SIGNAL IN FIRST TAKEN IMAGE SATISFIES $\alpha \times (i-1) + \beta - 2 \leq X_{41} \leq \alpha \times (i-1) + \beta + 2$ AND $\alpha \times (j-1) + \gamma - 2 \leq Y_{41} \leq \alpha \times (j-1) + \gamma + 2$. LET NUMBER OF R SIGNALS BE $N_1$ AND LET VALUE AND POSITION OF EACH FETCHED R SIGNAL BE $(R_1(p), X_1(p), Y_1(p))$. LET $(X_{41}, Y_{41})$ TRANSFORMED FROM $(X_1, Y_1)$ OR $(X_1(p), Y_1(p))$ BE $(X_{41}(p), Y_{41}(p))$. IN THIS CASE, $p = 1 \sim N_1$

S323: FETCH ALL R SIGNALS IN SECOND TAKEN IMAGE FOR WHICH POSITION $(X_{42}, Y_{42})$ TRANSFORMED FROM POSITION $(X_2, Y_2)$ OF EACH R SIGNAL IN SECOND TAKEN IMAGE SATISFIES $\alpha \times (i-1) + \beta - 2 \leq X_{42} \leq \alpha \times (i-1) + \beta + 2$ AND $\alpha \times (j-1) + \gamma - 2 \leq Y_{42} \leq \alpha \times (j-1) + \gamma + 2$. LET NUMBER OF R SIGNALS BE $N_2$ AND LET VALUE AND POSITION OF EACH FETCHED R SIGNAL BE $(R_2(p), X_2(p), Y_2(p))$. LET $(X_{42}, Y_{42})$ TRANSFORMED FROM $(X_2, Y_2)$ OR $(X_2(p), Y_2(p))$ BE $(X_{42}(p), Y_{42}(p))$. IN THIS CASE, $p = 1 \sim N_2$

S333: FETCH ALL B SIGNALS IN THIRD TAKEN IMAGE FOR WHICH POSITION $(X_3, Y_3)$ OF EACH B SIGNAL IN THIRD TAKEN IMAGE SATISFIES $\alpha \times (i-1) + \beta - 2 \leq X_{43} \leq \alpha \times (i-1) + \beta + 2$ AND $\alpha \times (j-1) + \gamma - 2 \leq Y_{43} \leq \alpha \times (j-1) + \gamma + 2$. LET NUMBER OF B SIGNALS BE $N_3$ AND LET VALUE AND POSITION OF EACH FETCHED B SIGNAL BE $(B_3(p), X_3(p), Y_3(p))$. LET $(X_{43}, Y_{43})$ TRANSFORMED FROM $(X_3, Y_3)$ OR $(X_3(p), Y_3(p))$ BE $(X_{43}(p), Y_{43}(p))$. IN THIS CASE, $p = 1 \sim N_3$

→

S334: FETCH ALL B SIGNALS IN FOURTH TAKEN IMAGE FOR WHICH POSITION $(X_4, Y_4)$ OF EACH B SIGNAL IN FOURTH TAKEN IMAGE SATISFIES $\alpha \times (i-1) + \beta - 2 \leq X_{44} \leq \alpha \times (i-1) + \beta + 2$ AND $\alpha \times (j-1) + \gamma - 2 \leq Y_{44} \leq \alpha \times (j-1) + \gamma + 2$. LET NUMBER OF B SIGNALS BE $N_4$ AND LET VALUE AND POSITION OF EACH FETCHED B SIGNAL BE $(B_4(p), X_4(p), Y_4(p))$. LET $(X_{44}, Y_{44})$ TRANSFORMED FROM $(X_4, Y_4)$ OR $(X_4(p), Y_4(p))$ BE $(X_{44}(p), Y_{44}(p))$. IN THIS CASE, $p = 1 \sim N_4$

→

S335: FETCH ALL B SIGNALS IN FIFTH TAKEN IMAGE FOR WHICH POSITION $(X_5, Y_5)$ OF EACH B SIGNAL IN FIFTH TAKEN IMAGE SATISFIES $\alpha \times (i-1) + \beta - 2 \leq X_{45} \leq \alpha \times (i-1) + \beta + 2$ AND $\alpha \times (j-1) + \gamma - 2 \leq Y_{45} \leq \alpha \times (j-1) + \gamma + 2$. LET NUMBER OF B SIGNALS BE $N_5$ AND LET VALUE AND POSITION OF EACH FETCHED B SIGNAL BE $(B_5(p), X_5(p), Y_5(p))$. LET $(X_{45}, Y_{45})$ TRANSFORMED FROM $(X_5, Y_5)$ OR $(X_5(p), Y_5(p))$ BE $(X_{45}(p), Y_{45}(p))$. IN THIS CASE, $p = 1 \sim N_5$

S336
FETCH ALL B SIGNALS IN SIXTH TAKEN IMAGE FOR WHICH POSITION ($X_{46}$, $Y_{46}$) TRANSFORMED FROM POSITION ($X_6$, $Y_6$) OF EACH B SIGNAL IN SIXTH TAKEN IMAGE SATISFIES $\alpha \times (i-1) + \beta - 2 \leq X_{46} \leq \alpha \times (i-1) + \beta + 2$ AND $\alpha \times (j-1) + \gamma - 2 \leq Y_{46} \leq \alpha \times (j-1) + \gamma + 2$. LET NUMBER OF B SIGNALS BE $N_6$ AND LET VALUE AND POSITION OF EACH FETCHED B SIGNAL BE ($B_6(p)$, $X_6(p)$, $Y_6(p)$). LET ($X_{46}$, $Y_{46}$) TRANSFORMED FROM ($X_6$, $Y_6$) OR ($X_6(p)$, $Y_6(p)$) BE ($X_{46}(p)$, $Y_{46}(p)$). IN THIS CASE, $p = 1 \sim N_6$

↓

S337
FETCH ALL B SIGNALS IN SEVENTH TAKEN IMAGE FOR WHICH POSITION ($X_{47}$, $Y_{47}$) TRANSFORMED FROM POSITION ($X_7$, $Y_7$) OF EACH B SIGNAL IN SEVENTH TAKEN IMAGE SATISFIES $\alpha \times (i-1) + \beta - 2 \leq X_{47} \leq \alpha \times (i-1) + \beta + 2$ AND $\alpha \times (j-1) + \gamma - 2 \leq Y_{47} \leq \alpha \times (j-1) + \gamma + 2$. LET NUMBER OF B SIGNALS BE $N_7$ AND LET VALUE AND POSITION OF EACH FETCHED B SIGNAL BE ($B_7(p)$, $X_7(p)$, $Y_7(p)$). LET ($X_{47}$, $Y_{47}$) TRANSFORMED FROM ($X_7$, $Y_7$) OR ($X_7(p)$, $Y_7(p)$) BE ($X_{47}(p)$, $Y_{47}(p)$). IN THIS CASE, $p = 1 \sim N_7$

↓

S338
FETCH ALL B SIGNALS IN EIGHTH TAKEN IMAGE FOR WHICH POSITION ($X_{48}$, $Y_{48}$) TRANSFORMED FROM POSITION ($X_8$, $Y_8$) OF EACH B SIGNAL IN EIGHTH TAKEN IMAGE SATISFIES $\alpha \times (i-1) + \beta - 2 \leq X_{48} \leq \alpha \times (i-1) + \beta + 2$ AND $\alpha \times (j-1) + \gamma - 2 \leq Y_{48} \leq \alpha \times (j-1) + \gamma + 2$. LET NUMBER OF B SIGNALS BE $N_8$ AND LET VALUE AND POSITION OF EACH FETCHED B SIGNAL BE ($B_8(p)$, $X_8(p)$, $Y_8(p)$). LET ($X_{48}$, $Y_{48}$) TRANSFORMED FROM ($X_8$, $Y_8$) OR ($X_8(p)$, $Y_8(p)$) BE ($X_{48}(p)$, $Y_{48}(p)$). IN THIS CASE, $p = 1 \sim N_8$

↓
⑨

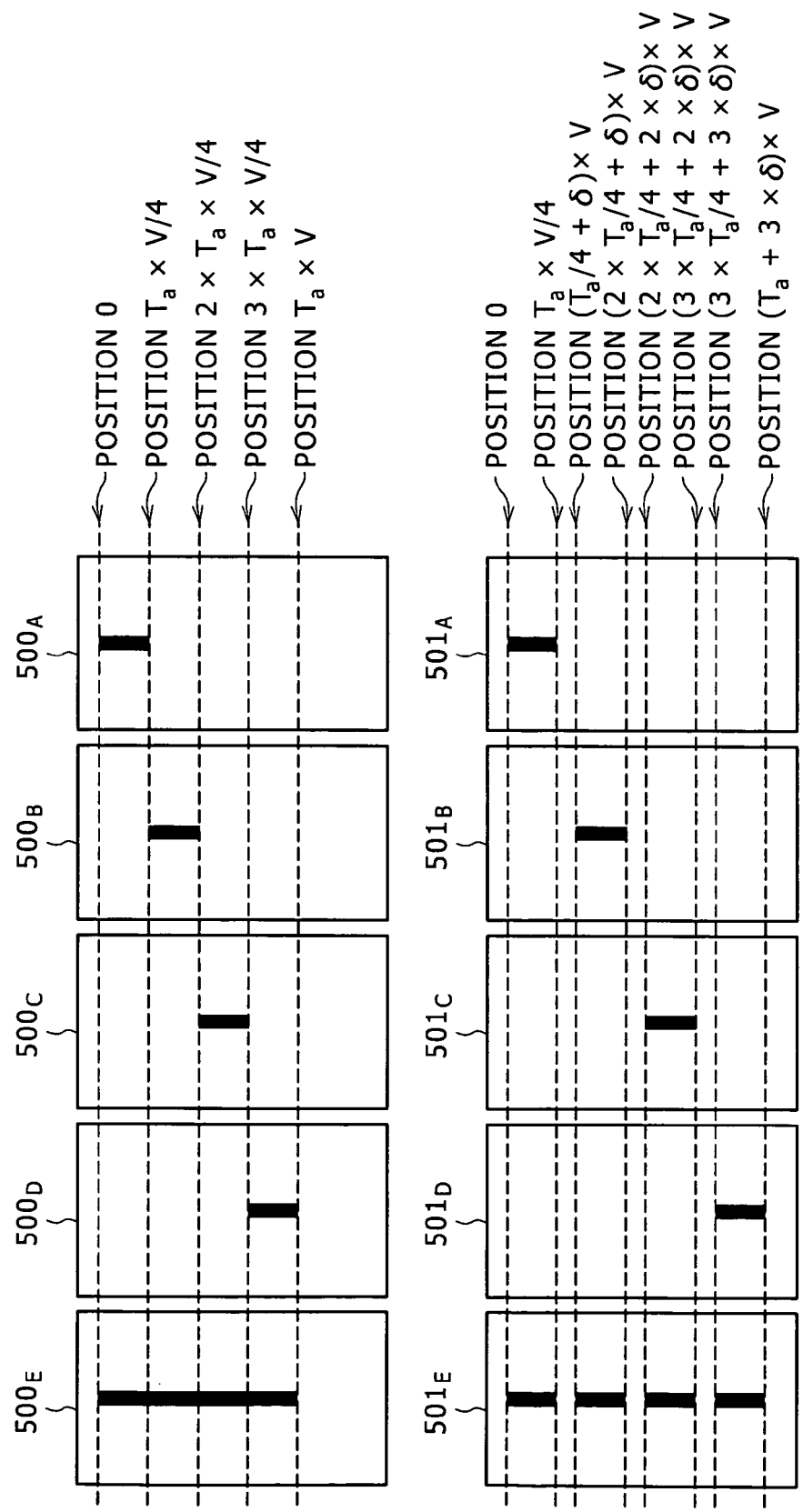

CONTROL METHOD, CONTROL APPARATUS AND CONTROL PROGRAM FOR PHOTOGRAPHING APPARATUS

TECHNICAL FIELD

The present invention relates to a control method, a control apparatus and a control program, which are provided for a photographing apparatus. More particularly, the present invention relates to a control method, a control apparatus and a control program, which are each designed with a capability of determining a photographing mode for obtaining a sharper image, to serve respectively as a control method, control apparatus and control program provided for a photographing apparatus such as a camera.

BACKGROUND ART

In recent years, digital cameras have been becoming a main stream of cameras. In a digital camera including an image-pickup device such as a CCD (Charge Coupled Device) or a CMOS (Complementary Mental Oxide Semiconductor), an image (hereinafter, referred to as taken image) produced by the image pickup device is displayed on a monitor such as an LCD (Liquid Crystal Display) device employed in the digital camera so as to allow the user to confirm the image. Then, an image signal of the taken image is digitalized before being transferred to typically an image processing section employed in a personal computer (PC) through a recording medium such as a flash memory. As an alternative, the taken image is transmitted to a PC by a wired communication using a cable or a radio communication using an infrared ray or the like. In the personal computer serving as a destination of the transmission of the taken image, the image taken by the digital camera is displayed on a monitor such as a CRT (Cathode Ray Tube) or LCD (Liquid Crystal Display) display section of the personal computer so as to allow the user to verify or edit the taken image.

If a digital camera is used to take a picture of a photographing object, which is not sufficiently clear, for example in a shadow area, at a place with no enough sunlight, in a slightly dark room or at a similar location, it is necessary to decrease the speed of a shutter employed in the digital camera or lengthen the exposure time of the photographing object in order to provide enough exposure of the photographing object to the digital camera.

In an image-pickup operation with such a long exposure time, the digital camera is typically fixed on a tripod or the like so as to prevent the digital camera from shaking or trembling. Thus, it is possible to obtain a taken image free of blurring and with proper exposure according to the brightness of the photographing object. When the digital camera is used to take an image of a photographing object by for example holding the camera by a hand, however, the camera shakes due to trembling of the hand. Then, if the digital camera trembles while the shutter of the camera is in an opened state or while the photographing object is being exposed to the camera, the resulting taken image is inadvertently a blurring image caused by the trembling of the digital camera. Such a blurring image is referred to as a hand-shaken image or known as an image resulting from camera trembling.

In addition to the technique to decrease the shutter speed or increase the exposure time, as a method to obtain sufficient exposure, there has been proposed a method to give exposure, which is equivalent to exposure provided by the technique to increase the exposure time, by merely summing up a plurality of taken images cumulatively. For more information on this proposed method, refer to documents such as Patent Document 1.

With the method disclosed in Patent Document 1, however, a plurality of taken images is merely summed up cumulatively. Thus, if a hand holding the digital camera trembles as described above, the camera will produce a blurring image as is the case with the technique to increase the exposure time.

As a method for preventing a taken image from blurring or a hand-shaken image from being produced even if a hand holding the digital camera trembles, there has been introduced a method adopted by a digital camera made by for example Canon Corporation. This method is referred to as an IS (Image Stabilizer).

With the Image Stabilizer, a pre-sensor is provided in an optical-system lens as a sensor for detecting trembling or vibration of the digital camera. Then, in accordance with a digital signal representing the detected trembling or vibration of the digital camera, a portion of a lens group serving as a correction optical system is moved in a direction perpendicular to the optical axis so as to refract the ray of light in a direction canceling the trembling of the taken image.

In accordance with the Image Stabilizer, it is possible to suppress image trembling due to shaking of a hand holding the digital camera or due to infinitesimal vibration shaking caused by a blowing wind as shaking of the base of the photographing apparatus. As a result, the user can be provided with a sharp taken image.

With the Image Stabilizer, however, it is necessary to provide a dedicated sensor for detecting trembling and a mechanism for moving a portion of a lens group serving as a correction optical system at a high speed. Thus, the Image Stabilizer raises a problem of a complicated structure of the digital camera and a problem of a high cost to manufacture the camera.

As another method for avoiding a hand-shaken image, there is known a method by which shift quantities of the second and all subsequent ones among a plurality of taken images are each detected as the quantity of a shift from the first taken image, the positions of the second and all subsequent taken images are then corrected by their respective quantities of the shifts and, finally, the shifted second and all subsequent taken images are sequentially added to the first taken image. For more information on this method, the reader is suggested to refer to documents such as Patent Documents 2, 3, 4, 5, 6, 7 and 8. In accordance with the method disclosed in Patent Documents 2, 3, 4, 5, 6, 7 and 8, an interpolated image having a data array identical with the first taken image is created by interpolation based on each of the second and all subsequent taken images completing a process to correct the positions of the images and the interpolated image is then simply added to the first taken image in pixel units.

In accordance with the method disclosed in Patent Documents 2, 3, 4, 5, 6, 7 and 8, since images are taken consecutively at a high speed and, hence, at a short exposure time, the amount of blurring is small even though a dark picture is resulted in. In order to solve the problem of a dark picture, an image created by interpolation based on the second and all subsequent taken images is added to the first taken image to result in a finally obtained image having brightness similar to an image taken with a proper exposure time.

In the process to create an image created by interpolation based on the second and all subsequent taken images in accordance with the method described in Patent Documents 2 to 8, chrominance signals (or color data) are subjected to an interpolation process adopting an interpolation method using a variety of interpolation functions such as the linear interpolation and the Bi-Cubic interpolation. The chrominance signals include an R (Red) signal (representing red-color data), a G (Green) signal (representing green-color data) and a B (Blue) signal (representing blue-color data), which pertain to one pixel.

[Patent Document 1]
Japanese Patent Laid-open No. Hei 05-236442
[Patent Document 2]
Japanese Patent Laid-open No. 2000-217032
[Patent Document 3]
Japanese Patent Laid-open No. 2000-224460
[Patent Document 4]
Japanese Patent Laid-open No. 2000-244803
[Patent Document 5]
Japanese Patent Laid-open No. 2000-244797
[Patent Document 6]
Japanese Patent Laid-open No. 2000-069352
[Patent Document 7]
Japanese Patent Laid-open No. Hei 10-341367
[Patent Document 8]
Japanese Patent Laid-open No. Hei 09-261526

DISCLOSURE OF THE INVENTION

Problems to be Solved by the Invention

By the way, photographing modes adopted in a digital camera as a mode for carrying out a photographing operation may include an ordinary photographing mode and a hand-trembling correction mode. The ordinary photographing mode is a mode for taking an ordinary image and outputting the taken image as it is as a result of the photographing operation. On the other hand, the hand-trembling correction mode is a mode, in accordance with which, a plurality of images is taken consecutively at a high speed by using a high-speed shutter and the taken images are then summed up to produce an image with a proper exposure or an exposure desired by the photographer and with hand trembling corrected. Nevertheless, a method to determine whether the ordinary photographing mode or the hand-trembling correction mode is to be adopted in the photographing operation is not disclosed.

Therefore, a decision to select either the ordinary photographing mode or the hand-trembling correction mode for an existing scene (or an existing condition) is left entirely to a judgment formed by the photographer. As a result, it is quite within the bounds of possibility that the photographer makes a wrong decision unless the photographer is a well experienced one. For this reason, the digital camera is required to include an embedded automatic processing mechanism for determining which photographing mode is to be selected as a mode more suitable for an existing scene (or an existing condition).

In order to solve the problems described above, the present invention provides a capability of automatically determining a photographing mode that is capable of producing a sharper image.

Means for Solving the Problems

A control method provided by the present invention for a photographing apparatus is characterized in that, in accordance with the control method, at least one of a first exposure time, which is a computed exposure time of a photographing operation to take an input image on the assumption that the photographing operation is to be carried out in the first mode, and a second exposure time, which is a computed exposure time of a photographing operation to take a plurality of input images on the assumption that the photographing operation is to be carried out in the second mode, is compared with a predetermined threshold value in order to produce a result of determination as to whether to carry out a photographing operation in a first mode selected as a photographing mode or carry out a photographing operation in a second mode selected as the photographing mode.

The control method may include: a first determination step of producing a result of determination as to whether or not the first exposure time is equal to or shorter than a first threshold value; a first decision step of making a decision to take an image in the first mode if the determination result produced at the first determination step indicates that the first exposure time is equal to or shorter than the first threshold value; and a second decision step of making a decision to take an image in the second mode if the determination result produced at the first determination step indicates that the first exposure time is neither equal to nor shorter than the first threshold value.

The control method may: further include a second determination step of producing a result of determination as to whether or not the second exposure time is equal to or shorter than a second threshold value if the determination result produced at the first determination step indicates that the first exposure time is neither equal to nor shorter than the first threshold value; and at the second decision step, make a decision to take an image in the second mode if the determination result produced at the second determination step indicates that the second exposure time is equal to or shorter than the second threshold value.

The second determination step may further include a step of producing a result of determination as to whether or not the second exposure time is equal to or longer than the larger one of a threshold value based on a proper exposure time found from the brightness of a photographing object and a threshold value based on an image-pickup interval of successive image-pickup operations carried out by the photographing apparatus at a highest speed, and the second decision step may be a step of making a decision to take an image in the second mode if the determination result produced at the second determination step indicates that the second exposure time is equal to or shorter than the second threshold value and that the second exposure time is equal to or longer than the larger one of the threshold value based on a proper exposure time found from the brightness of a photographing object and the threshold value based on an image-pickup interval of successive image-pickup operations carried out by the photographing apparatus at a highest speed.

The control method may include: a determination step of producing a result of determination as to whether or not the second exposure time is equal to or longer than a threshold value based on a proper exposure time found from the brightness of a photographing object; a first decision step of making a decision to take an image in the second mode if the determination result produced at the determination step indicates that the second exposure time is equal to or longer than the threshold value; and a second decision step of making a decision to take an image in the first mode if the determination result produced at the determination step indicates that the second exposure time is neither equal to nor longer than the threshold value.

The control method may include: a determination step of producing a result of determination as to whether or not the second exposure time is equal to or longer than a threshold value based on an image-pickup interval of successive image-pickup operations carried out by the photographing apparatus at a highest speed; a first decision step of making a decision to take an image in the second mode if the determination result produced at the determination step indicates that the second exposure time is equal to or longer than the threshold value; and a second decision step of making a decision to take an image in the first mode if the determination result produced at the determination step indicates that the second exposure time is neither equal to nor longer than the threshold value.

A control apparatus provided by the present invention is characterized in that, in the control apparatus, at least one of a first exposure time, which is a computed exposure time of a photographing operation to take an input image on the assumption that the photographing operation is to be carried out in the first mode, and a second exposure time, which is a computed exposure time of a photographing operation to take a plurality of input images on the assumption that the photographing operation is to be carried out in the second mode, is compared with a predetermined threshold value in order to produce a result of determination as to whether to carry out a photographing operation in a first mode selected as a photographing mode or carry out a photographing operation in a second mode selected as the photographing mode.

A control program provided by the present invention as a program to be executed by a computer is characterized in that, in accordance with the control program, at least one of a first exposure time, which is a computed exposure time of a photographing operation to take an input image on the assumption that the photographing operation is to be carried out in the first mode, and a second exposure time, which is a computed exposure time of a photographing operation to take a plurality of input images on the assumption that the photographing operation, is to be carried out in the second mode is compared with a predetermined threshold value in order to produce a result of determination as to whether to carry out a photographing operation in a first mode selected as a photographing mode or carry out a photographing operation in a second mode selected as the photographing mode.

In accordance with the control method, the control apparatus and the control program, which are provided by the present invention, at least one of a first exposure time and a second exposure time is compared with a predetermined threshold value in order to produce a result of determination as to whether to carry out a photographing operation in a first mode selected as a photographing mode or carry out a photographing operation in a second mode selected as the photographing mode, wherein: the first exposure time is a computed exposure time of a photographing operation to take an input image on the assumption that the photographing operation is to be carried out in the first mode; and the second exposure time is a computed exposure time of a photographing operation to take a plurality of input images on the assumption that the photographing operation is to be carried out in the second mode.

Effects of the Invention

In accordance with the present invention, it is possible to dynamically determine a photographing mode capable of obtaining a sharper image.

BRIEF DESCRIPTION OF THE DRAWINGS

FIG. 22 shows a flowchart referred to in explanation of processing to find a light quantity Lg (I', J') of the green color.

FIG. 23 shows a flowchart referred to in explanation of processing to find a light quantity Lr (I', J') of the red color.

FIG. 32 shows a flowchart referred to in explanation of processing to generate an image.

FIG. 33 shows a flowchart referred to in explanation of processing to generate an image.

FIG. 37 shows a flowchart referred to in explanation of processing to generate an image.

FIG. 38 shows a flowchart referred to in explanation of processing to generate an image.

FIG. 50 is a diagram referred to in explanation of effects of a blanking period on an output image.

DESCRIPTION OF REFERENCE CHARACTERS

1: digital camera, 2: lens, 3: diaphragm, 4: image-pickup device, 5: correlation double sampling circuit, 6: A/D converter, 7: signal processing circuit, 8: timing generator, 9: D/A converter, 10: video encoder, 11: monitor, 12: codec, 13: memory, 14: bus, 15: CPU, 16: input device, 17: image processing circuit, 18: control circuit, 19: exposure meter, 21: shift circuit, $22_1$ to $22_N$: frame memory, $23_1$ to $23_{N-1}$: motion-vector detection circuit, 24: processing circuit, 25: controller.

BEST MODE FOR CARRYING OUT THE INVENTION

Embodiments of the present invention are explained by referring to diagrams as follows.

Figure 1:
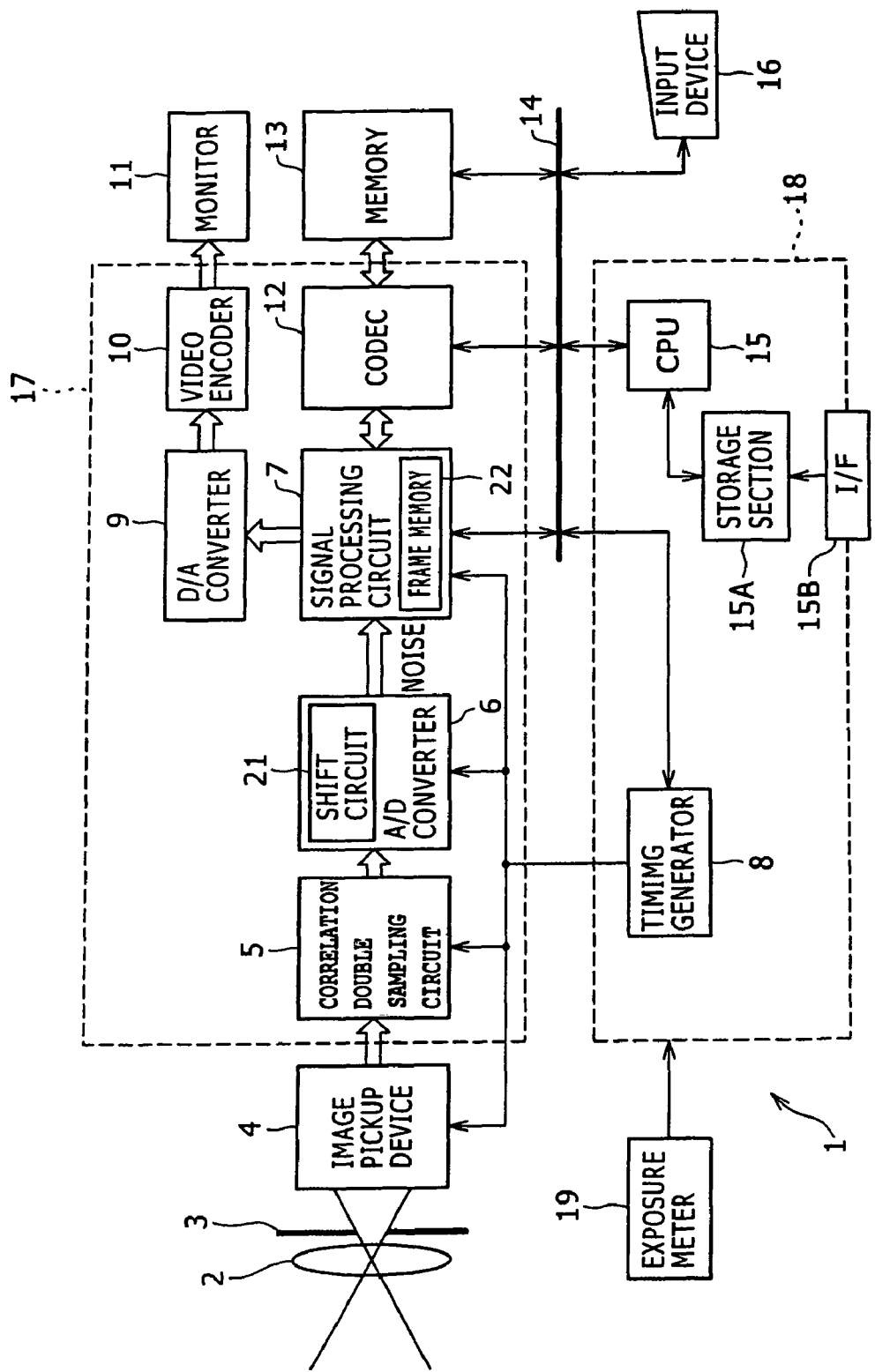
FIG. 1 is a block diagram showing a typical configuration of an embodiment implementing a digital camera 1 to which the present invention is applied.

FIG. 1 is a block diagram showing a typical configuration of an embodiment implementing a digital (still) camera 1 to which the present invention is applied.

The digital camera 1 shown in FIG. 1 includes a lens 2, a diaphragm 3, an image-pickup device 4, a correlation double sampling circuit 5, an A/D (Analog/Digital) converter 6, a signal processing circuit 7, a timing generator 8, a D/A (Digital/Analog) converter 9, a video encoder 10, a monitor 11, a codec 12, a memory 13, a bus 14, a CPU (Central Processing Unit) 15, a storage section 15A, an interface (I/F) 15B, an input device 16 and an exposure meter 19.

The correlation double sampling circuit 5, the A/D converter 6, the signal processing circuit 7, the D/A converter 9, the video encoder 10 and the codec 12 form the image processing circuit 17 whereas the timing generator 8, the CPU 15, the storage section 15A and the interface 15B form the control circuit 18. The A/D converter 6 includes a shift circuit 21 while the signal processing circuit 7 includes a frame memory 22.

A light beam coming from a photographing object not shown in the figure hits the image-pickup device 4 after passing through an optical system including the lens 2 and the diaphragm 3. The lens 2 is a near-focus lens having a fixed focal distance or a zoom lens having a variable focal distance. If a zoom lens is used as the lens 2, the lens 2 is normally designed as a lens group including a plurality of lenses. By varying positional relations oriented in the direction of an optical axis as relations among the lenses composing the lens group, the focal distance of the lens 2 can be changed. Control to change the focal distance in this way is executed by a control signal output by the control circuit 18 to a driving circuit for driving the lens 2. It is to be noted that the driving circuit itself is not shown in the figure. It is also worth noting that the lens 2 is shown in FIG. 1 as a single lens in order to simplify the drawing.

The diaphragm 3 is a component for adjusting the quantity of light hitting the image-pickup device 4 by shielding some of the light passing through the lens 2. The control of the diaphragm 3 to adjust the quantity of light is executed by a control signal output by the control circuit 18.

The image-pickup device 4 is typically a single-board sensor made of a material such as a CCD or a CMOS. The image-pickup device 4 has a predetermined number of pixels each serving as a light receiving element. In accordance with an exposure timing signal output by the timing generator 8, the image-pickup device 4 receives incoming light from the photographing object only during a predetermined exposure time and at predetermined intervals. Then, the image-pickup device 4 carries out an opto-electrical conversion process to convert the quantity of light arriving at the light receiving elements provided on an image-pickup face of the image-pickup device 4 into an electrical signal. Subsequently, the image-pickup device 4 supplies the electrical signal obtained as a result of the opto-electrical conversion process to the correlation double sampling circuit 5. Since the image-pickup device 4 is a single-plate sensor, the electrical signal supplied to the correlation double sampling circuit 5 is a chrominance signal (or color data) selected among R, G and B signals for every pixel.

As an alternative, the image-pickup device 4 can also be an image-pickup device referred to as a binning image-pickup device having a function known as a binning function. The binning function is a function to sum up pixel values of a plurality pixels adjacent to each other inside the image-pickup device 4, which is a sensor for receiving light, and use the sum obtained as a result of the summing-up operation as the pixel value of one pixel. When the binning function is executed, the image-pickup device 4 sums up pixel values of a plurality of pixels adjacent to each other and outputs the sum obtained as a result of the summing-up operation as the pixel value of one pixel. Thus, the number of pixels each represented by such an output pixel value is smaller than the number of pixels actually composing the image-pickup device 4. To be more specific, the number of pixels each represented by an such output pixel value is a fraction of the number of pixels actually composing the image-pickup device 4.

To put it concretely, let us assume for example that the image-pickup device 4 sums up pixel values of a plurality of (or 2×2) pixels adjacent to each other (that is, two pixels arranged in the vertical direction and two pixels arranged in the horizontal direction) and outputs the sum by execution of a function referred to hereafter as the 2×2 binning function. In this case, the number of pixels represented each by such a sum is one-fourth of the number of pixels actually composing the image-pickup device 4. This is because the number of pixels arranged in the vertical direction is reduced to a half and the number of pixels arranged in the horizontal direction is also reduced to a half. As another example, the image-pickup device 4 sums up pixel values of a plurality of (or 3×3) pixels adjacent to each other (that is, three pixels arranged in the vertical direction and three pixels arranged in the horizontal direction) and outputs the sum by execution of a function referred to hereafter as the 3×3 binning function. In this case, the number of pixels each represented by such a sum is one-ninth of the number of pixels actually composing the image-pickup device 4. This is because the number of pixels arranged in the vertical direction is reduced to one-third and the number of pixels arranged in the horizontal direction is also reduced to one-third.

When the binning function is executed as described above, the number of pixels each represented by a sum output by the image-pickup device 4 decreases, reducing the amount of data to be processed by the digital camera 1. In comparison with a case in which the binning function is not executed, that is, a case in which the number of pixels processed by the image-pickup device 4 is equal to the number of pixels actually composing the image-pickup device 4, the continuous image-pickup speed can be increased. In comparison with the continuous image-pickup speed of a case in which the binning function is not executed, for example, the continuous image-pickup speed of the 2×2 binning function is four times faster. This is because the number of pixel values output by the image-pickup device 4 is reduced to one-fourth. By the same token, the continuous image-pickup speed of the 3×3 binning function is nine times faster because the number of pixel values output by the image-pickup device 4 is reduced to one-ninth.

That is to say, let us assume that the lower limit of the continuous image-pickup interval of the image-pickup device 4 carrying out a high-speed image-pickup process is to or the continuous image-pickup speed is $1/t_0$. In this case, the image-pickup device 4 is capable of carrying out an image-pickup process at intervals of to seconds or intervals longer than to seconds without execution of the binning function. By execution of the 2×2 binning function, however, the image-pickup device 4 is capable of carrying out an image-pickup process at intervals of $t_0/4$ seconds or intervals longer than $t_0/4$ seconds. By execution of the 3×3 binning function, however, the image-pickup device 4 is capable of carrying out an image-pickup process at intervals of $t_0/9$ seconds or intervals longer than $t_0/9$ seconds.

It is to be noted that a binning control signal output by the control circuit 18 to the image-pickup device 4 controls a process to determine whether or not the binning function is to be executed and, if the binning function is to be executed, the control signal indicates whether to execute the 2×2 binning function or the 3×3 binning function.

In one photographing operation or in one operation carried out on a release button, the image-pickup device 4 produces one taken image at a shutter speed for a proper exposure or for an exposure desired by the photographer, that is, during an exposure time, or the image-pickup device 4 produces a plurality of taken images at a speed higher than the shutter speed for a proper exposure or for an exposure desired by the photographer, that is, during a shorter exposure time. In the following description, the number of taken images produced at the higher speed is N.

In the following description, the photographing mode of a photographing operation carried out to generate an output image from a taken image (or an input image) produced by the image-pickup device 4 or the photographing mode of a photographing operation carried out to output a taken image (or an input image) produced by the image-pickup device 4 as it is referred to as an ordinary photographing mode or a first photographing mode. On the other hand, the photographing mode of a photographing operation carried out to generate an output image from N taken images (or N input images) produced by the image-pickup device 4 at the higher speed cited above is referred to as a hand-trembling correction photographing mode or a second photographing mode.

In the ordinary photographing mode, a taken image produced by the image-pickup device 4 is taken at a proper exposure or an exposure desired by the photographer. In the hand-trembling correction mode, on the other hand, each of the N taken images is taken in an exposure time shorter than the exposure time for the proper exposure or the exposure desired by the photographer. Thus, each of the N taken images produced by the image-pickup device 4 is darker than an image taken at the proper exposure or has a brightness equal to the one-$M_k$th of the brightness of the image taken at the proper exposure, that is, has a brightness equal to the $1/M_k$ of the brightness of the image taken at the proper exposure where k is an integer in the range 1 to N.

For too large values of $M_k$, the taken image is extremely dark so that each of the N taken images is inevitably buried among noises. In addition, an output image generated from N taken images buried among noises as such is also unavoidably an image containing a large number of noises. In order to solve this problem, an upper limit $M_{max}$ is determined as the maximum of the values of $M_k$. That is to say, $M_{max}$ is an $M_k$ maximum value that still results in brightness not causing an image to be buried among noises. It is thus possible to generate a proper output image with few noises from N taken images each having a brightness at least equal to the $1/M_{max}$ of the brightness of the image taken at the proper exposure. The brightness at least equal to the $1/M_{max}$ of the brightness of the image taken at the proper exposure is thus an upper limit of the darkness of the N taken images.

Let us assume for example that $M_{max}$ is 8. In this case, it is not possible to generate a proper output image from N consecutively taken images each having a darkness greater than ⅛ of the darkness of the image taken at the proper exposure, that is, it is not possible to generate a proper output image from N consecutively taken images each taken in an exposure time shorter than the exposure time of the proper exposure. This is because the N taken images are each extremely dark. Conversely, it is possible to generate a sharp output image from N consecutively taken images each having a brightness greater than ⅛ of the brightness of the image taken at the proper exposure, that is, it is possible to generate a proper output image from N consecutively taken images each taken in an exposure time longer than the exposure time of the proper exposure. It is to be noted that the values of $M_k$ and $M_{max}$ are each a value determined by the performance of the digital camera 1.

In the image processing circuit 17, the correlation double sampling circuit 5 is a circuit for eliminating noise components from an image signal, which is generated by the image-pickup device 4 as an electrical signal, by adoption of a correlation double sampling technique. The correlation double sampling circuit 5 then supplies the image signal with noises eliminated from it to the A/D converter 6. The A/D converter 6 is a component for carrying out an A/D conversion process to convert the image signal received from the correlation double sampling circuit 5 as an image signal with noises eliminated from it into a digital signal. That is to say, the A/D converter 6 is a component for quantizing the image signal by adoption of a sampling technique.

In the ordinary photographing mode, the A/D converter 6 supplies a taken image represented by the digital signal obtained as a result of the A/D conversion process typically as it is to the D/A converter 9 or the codec 12 by way of the signal processing circuit 7. In the hand-trembling correction photographing method, on the other hand, the shift circuit 21 embedded in the A/D converter 6 shifts a taken image, which is represented by the digital signal obtained as a result of the A/D conversion process as a dark image, by typically n' bits to multiply the image by $M_k$ in order to convert the image into a taken image represented by an image signal as an image having a brightness (or a value) similar to a taken image of the normal exposure. The process to convert the taken image represented by a digital signal into an image having a brightness (or a value) similar to a taken image of the normal exposure is referred to as a gain-up process. The A/D converter 6 then supplies the image obtained as a result of the gain-up process to the signal processing circuit 7.

In the correlation double sampling circuit 5, noise components of the image signal are eliminated but not all the noise components are eliminated completely. Thus, the image signal still includes noise components that cannot be removed by the correlation double sampling circuit 5. If the image signal still includes noise components that cannot be removed by the correlation double sampling circuit 5, the noise components become an error of the signal. In this case, in the shift circuit 21, the error is multiplied by $M_k$ as the image signal is. Thus, the error included in the image signal supplied to the signal processing circuit 7 depends on the gain-up quantity used in the shift circuit 21. Let us assume that the quantity of noise components not eliminated by the correlation double sampling circuit 5 is E. In this case, the image signal supplied from the shift circuit 21 employed in the A/D converter 6 to the signal processing circuit 7 includes noise components having a quantity of about $E \times M_k$. It is possible to set an assumed maximum value dependent on the characteristics of the image-pickup device 4 as the maximum value of the noise quantity E. For $M_k=8$, for example, the bit count n' by which the image signal is shifted by the shift circuit 21 is 3. By shifting the image signal by n' bits, it is possible to generate an output image having a brightness equal to the brightness for the proper exposure.

By multiplying the image signal by $M_k$ in the shift circuit 21 employed in the A/D converter 6, the image signal of N taken images each completing the gain-up process to give the same brightness as the proper exposure is temporarily stored (or recorded) in the frame memory 22 employed in the signal processing circuit 7.

In the ordinary photographing mode, the signal processing circuit 7 carries out the same image processing as an ordinary digital camera on a taken picture received from the A/D converter 6 and supplies the taken picture completing the image processing to the D/A converter 9 or the codec 12 as an output image.

In the hand-trembling correction photographing mode, on the other hand, the signal processing circuit 7 stores N taken images received from the A/D converter 6 in the frame memory 22 and carries out predetermined image processing on image signals representing the N taken images.

To put it in detail, the signal processing circuit 7 takes for example the first one of the N taken images as a reference image and each of the second to Nth ones as target images. Then, the signal processing circuit 7 determines how much each of the target images has been shifted from the reference image. That is to say, the signal processing circuit 7 detects the quantity of a shift between the reference image and each of the target images in order to determine a positional relation between the reference image and each of the target images. Subsequently, on the basis of the shift quantities, the signal processing circuit 7 finds an output image having all G, R and B signals for every pixel as a sharp output image completing a process to correct hand trembling. Finally, the signal processing circuit 7 supplies an image signal representing the sharp output image to the D/A converter 9 or the codec 12. The signal processing circuit 7 can be implemented typically by a DSP (Digital Signal Processor).

When the ordinary photographing mode is adopted as the photographing mode, the timing generator 8 supplies an exposure timing signal to the image-pickup device 4, the correlation double sampling circuit 5, the A/D converter 6 and the signal processing circuit 7 in order to drive the image-pickup device 4, the correlation double sampling circuit 5, the A/D converter 6 and the signal processing circuit 7 to produce a taken image in one photographing operation. When the hand-trembling photographing mode is adopted as the photographing mode, on the other hand, the timing generator 8 supplies an exposure timing signal to the image-pickup device 4, the correlation double sampling circuit 5, the A/D converter 6 and the signal processing circuit 7 in order to drive the image-pickup device 4, the correlation double sampling circuit 5, the A/D converter 6 and the signal processing circuit 7 to produce N taken images at a high speed at predetermined intervals in one photographing operation.

The D/A converter 9 is a component for carrying out a D/A conversion process to convert an image signal received from the signal processing circuit 7 as an image signal representing an output picture into an analog signal and supplying the analog signal to the video encoder 10. The video encoder 10 is a component for converting the analog signal received from the D/A converter 9 as an analog signal, which has resulted from the D/A conversion process to convert an image signal, into a video signal that can be displayed on the monitor 11 and supplying the video signal to the monitor 11. The monitor 11 is a component for typically playing the role of the finder of the digital camera 1. The monitor 11 is typically an LCD device for displaying a video signal received from the video encoder 10. Thus, the monitor 11 displays the output image.

The codec 12 is a component for coding an image signal from the signal processing circuit 7 as an image signal of an output picture in accordance with a predetermined coding method such as a JPEG (Joint Photographic Experts Group) method, an MPEG (Moving Picture Experts Group) method or a DV (Digital Video) method, and supplying a signal obtained as a result of the coding process to the memory 13.

The memory 13 is a storage device used for storing (or recording) an image signal, which is received from the codec 12 as a result of the coding process, temporarily or permanently. It is to be noted that, as a substitute for the memory 13, a recording medium such as a magnetic disk or an optical disk can be used. The memory 13 and the substitute for the memory 13 can be mounted onto and removed from the digital camera 1. It is also worth noting that the digital camera 1 may be provided with both a recording medium embedded in the digital camera 1 and a recording medium that can be mounted onto and removed from the digital camera 1.

In accordance with typically a control signal supplied by the input device 16 by way of the bus 14, for example, the CPU 15 employed in the control circuit 18 outputs signals to a variety of components of the digital camera 1 by way of the bus 14 in order to request the components to carry out various kinds of processing. Examples of the control signal supplied to the CPU 15 include a photographing-mode control signal, a binning control signal and an exposure timing signal. The photographing-mode control signal is a signal indicating whether the ordinary photographing mode or the hand-trembling correction photographing mode is to be adopted as the photographing mode in which a photographing operation is to be carried out. The binning control signal is a signal for controlling the binning function, that is, a signal for specifying that an image-pickup process is to be carried out without execution of the binning function or an image-pickup process is to be carried out by execution of the 2×2 binning function or the 3×3 binning function for example. The exposure timing signal is a signal for controlling the timing of receiving lights by the image-pickup device 4 at a photographing, that is, the timing of a light receiving start time and end time, further in the hand-trembling correction mode, the timing of a light receiving start time and end time for each Nth taken images.

The storage section 15A is typically a non-volatile memory such as a flash memory or an EEPROM. As an alternative, the storage section 15A is a combination of a non-volatile memory and a volatile memory. The storage section 15A is used for storing a program to be executed by the CPU 15 and temporarily storing data required by the CPU 15 in carrying out processing. The interface 15B is typically a USB (Universal Serial Bus) or an IEEE 1394 interface. By connecting the interface 15B to an external computer, the digital camera 1 is capable of updating a program stored in the storage section 15A with a program received from the external computer and exchanging various kinds of data including output pixels with the external computer.

The input device 16 has operation buttons such as the release button cited earlier, an exposure correction dial and a zoom button (or a zoom lever). The release button is a button for providing a photographing trigger. The exposure correction dial is a dial for correcting the exposure of a photographing operation. The zoom button is a button to be operated to set a focal distance of the zoom lens in order to adjust the zoom. A variety of signals, which are generated when the user operates the operation buttons, is supplied by the input device 16 to the CPU 15 by way of the bus 14. The CPU 15 controls the other components to carry out processing according to the signals supplied by the input device 16 to the CPU 15 by way of the bus 14. It is to be noted that one or more operation buttons employed in the input device 16 can be displayed on the monitor 11. An operation button is displayed on the monitor 11 typically as a transparent tablet and can be operated by detecting the tablet.

The exposure meter 19 is a component for measuring the brightness of the photographing object (or the image-pickup object) and supplying a value obtained as a result of the measurement to the control circuit 18. On the basis of the measured value of the brightness, the CPU 15 employed in the control circuit 18 determines the value of the diaphragm (or the value of the iris) and the exposure time, which are used in automatic exposure control and other applications.

By the way, when the photographer desires the so-called under or over photographing operation to be carried out by using the digital camera 1, the photographer operates the exposure correction dial of the input device 16 in order to set an exposure correction value. In this way, the exposure for an actual photographing operation can be corrected to the proper exposure. That is to say, by operating the exposure correction dial, the photographer is capable of setting an exposure for a photographing operation of the proper exposure, deliberately setting the exposure at a value on the under side so as to result in an intentionally darkened output image or deliberately setting the exposure at a value on the over side so as to result in an intentionally brightened output image. Information generated in the setting operation as an exposure correction value is supplied by the input device 16 to the CPU 15 employed in the control circuit 18 to be used as the basis of processing carried out by the CPU 15.

With the lens 2 used as a zoom lens, the photographer is capable of setting a focal distance by operating the zoom button employed in the input device 16 of the digital camera 1. That is to say, information generated as a result of an operation carried out on the zoom button is supplied by the input device 16 to the control circuit 18. In accordance with the information supplied by the input device 16, the control circuit 18 then controls lenses composing the lens 2 to set the focal distance set by the photographer. In addition, the control circuit 18 also uses the information supplied by the input device 16, that is, the information on focal distance at photographing, in processing to determine a photographing mode of a photographing operation to be described later.

The control circuit 18 is a circuit for determining a proper diaphragm value F and a proper exposure time $T_p$ from a value measured by the exposure meter 19 as the value of the brightness of a photographing object in the same way as an ordinary digital camera. The control circuit 18 also determines an actual exposure time $T_a$ also referred to as a shutter speed from a corrected exposure value output by the exposure correction dial, which is operated to set the corrected exposure value.

That is to say, with the exposure correction dial set at 0, the control circuit 18 takes the proper exposure time $T_p$ as it is as the exposure time $T_a$. In this case, when the image-pickup device 4 produces a taken image at a diaphragm value F and the exposure time $T_a$, the taken image produced by the image-pickup process is an image having a proper brightness.

With the exposure correction dial set at a value representing a 1-stage under brightness, the control circuit 18 sets the exposure time $T_a$ at $T_p/2$. In this case, when the image-pickup device 4 produces a taken image at a diaphragm value F and the exposure time $T_a$, the taken image produced by the image-pickup process is an image with the 1-stage under brightness. It is to be noted that, if the actual exposure time in this case is set at $2 \times T_a$, a taken image produced in an image-pickup process carried out by the image-pickup device 4 to produce the taken image will be an image having a proper brightness.

With the exposure correction dial set at a value representing a two-stage under brightness, the control circuit 18 sets the exposure time $T_a$ at $T_p/4$. In this case, when the image-pickup device 4 produces a taken image at a diaphragm value F and the exposure time $T_a$, the taken image produced by the image-pickup process is an image with the two-stage under brightness. It is to be noted that, if the actual exposure time in this case is set at $4 \times T_a$, a taken image produced in an image-pickup process carried out by the image-pickup device 4 to produce the taken image will be an image having a proper brightness.

With the exposure correction dial set at a value representing a three-stage under brightness, the control circuit 18 sets the exposure time $T_a$ at $T_p/8$. In this case, when the image-pickup device 4 produces a taken image at a diaphragm value F and the exposure time $T_a$, the taken image produced by the image-pickup process is an image at the three-stage under brightness. It is to be noted that, if the actual exposure time in this case is set at $8 \times T_a$, a taken image produced in an image-pickup process carried out by the image-pickup device 4 to produce the taken image will be an image having a proper brightness.

With the exposure correction dial set at a value representing a one-stage over brightness, the control circuit 18 sets the exposure time $T_a$ at $T_p \times 2$. In this case, when the image-pickup device 4 produces a taken image at a diaphragm value F and the exposure time $T_a$, the taken image produced by the image-pickup process is an image with the one-stage over brightness. It is to be noted that, if the actual exposure time in this case is set at $T_d/2$, a taken image produced in an image-pickup process carried out by the image-pickup device 4 to produce the taken image will be an image having a proper brightness.

With the exposure correction dial set at a value representing a two-stage over brightness, the control circuit 18 sets the exposure time $T_a$ at $T_p \times 4$. In this case, when the image-pickup device 4 produces a taken image at a diaphragm value F and the exposure time Ta, the taken image produced by the image-pickup process is an image with the two-stage over brightness. It is to be noted that, if the actual exposure time in this case is set at $T_d/4$, a taken image produced in an image-pickup process carried out by the image-pickup device 4 to produce the taken image will be an image having a proper brightness.

With the exposure correction dial set at a value representing a three-stage over brightness, the control circuit 18 sets the exposure time $T_a$ at $T_p \times 8$. In this case, when the image-pickup device 4 produces a taken image at a diaphragm value F and the exposure time $T_a$, the taken image produced by the image-pickup process is an image at the three-stage over brightness. It is to be noted that, if the actual exposure time in this case is set at $T_d/8$, a taken image produced in an image-pickup process carried out by the image-pickup device 4 to produce the taken image will be an image having a proper brightness.

Figure 2:
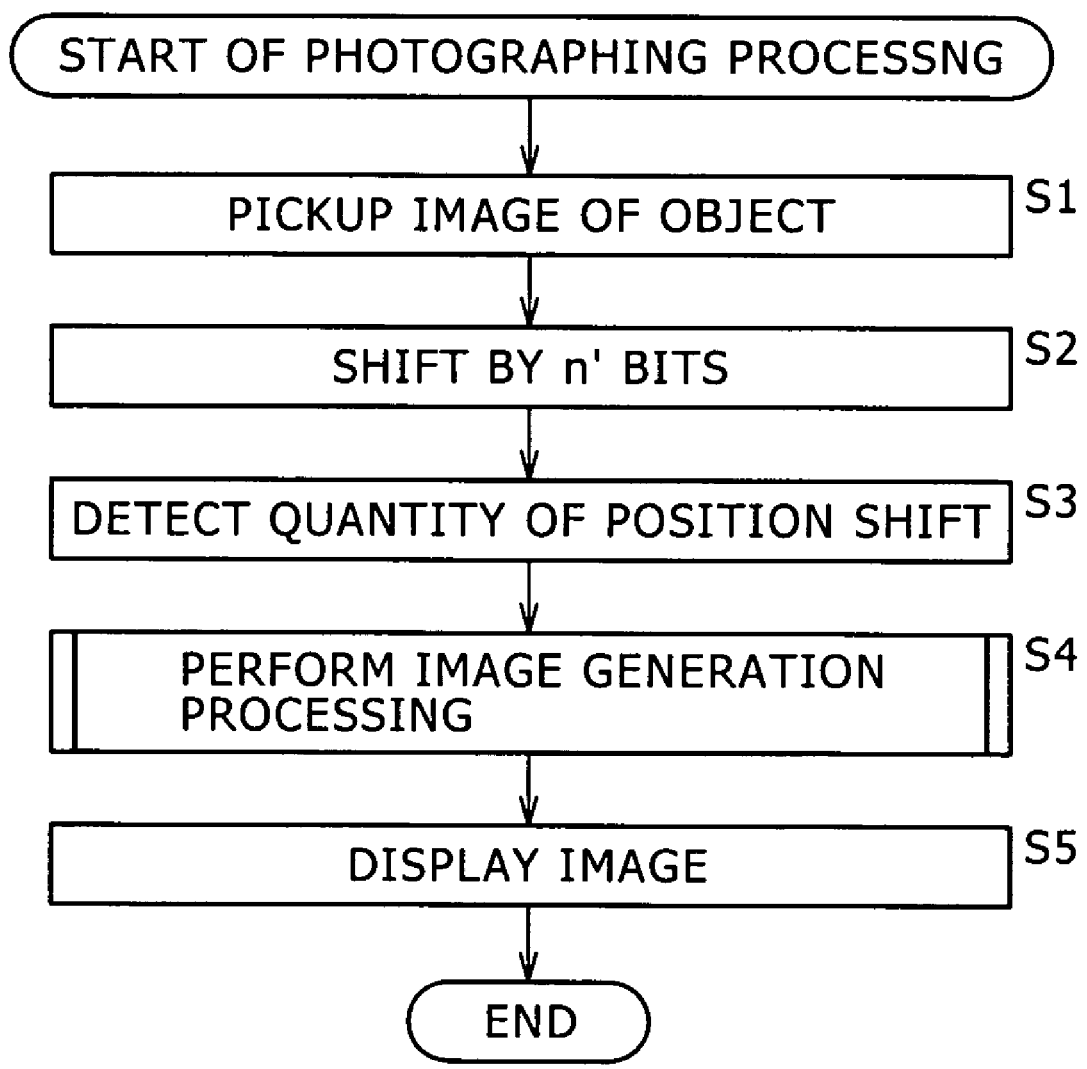
FIG. 2 shows a flowchart referred to in explanation of photographing processing carried out by the digital camera 1 shown in FIG. 1.

Next, by referring to a flowchart shown in FIG. 2, the following description explains photographing processing carried out by the digital camera 1 when the digital camera 1 adopts the hand-trembling correction photographing mode as the photographing mode. This photographing processing corresponds to a process carried out at a step S507 of a flowchart shown in FIG. 44 to be described later.

The flowchart shown in FIG. 2 starts with a step S1 at which the image-pickup device 4 takes an image of a photographing object. To put it in detail, in a photographing operation triggered by an operation carried out by the user to press the release button (or the shutter button) once, the image-pickup device 4 carries out N high-speed image-pickup processes by receiving incoming light of the photographing object consecutively N times at predetermined intervals in accordance with an exposure timing signal supplied by the timing generator 8 and converting the light into electrical signals in an opto-electrical conversion process. Thus, by carrying out an operation to press the release button only once, N taken images are each obtained as a dark image of an exposure equal to or smaller than (not satisfying the condition for) the proper exposure. Image signals each produced as the electrical signal resulting from the opto-electrical conversion process carried out by the image-pickup device 4 are supplied to the correlation double sampling circuit 5 for removing noise components from the signals. Then, the correlation double sampling circuit 5 supplies the image signals with noise components removed from the signals to the A/D converter 6. Subsequently, the flow of the photographing processing goes on to the next step S2.

At the step S2, the A/D converter 6 converts each of the image signals received from the correlation double sampling circuit 5 as the image signals each representing one of the taken images into a digital signal. Then, the shift circuit 21 shifts the dark taken image of an exposure equal to or smaller than the proper exposure by n' bits in order to convert the taken image into an image signal having a brightness (or a value) equivalent to the brightness resulting from the proper exposure in a gain-up process and supplies the image signal obtained as a result of the gain-up process to the signal processing circuit 7. Then, the flow of the photographing processing goes on to the next step S3.

At the step S3, the signal processing circuit 7 takes for example the first one of the N taken images received from the shift circuit 21 employed in the A/D converter 6 as a reference image and each of the second to Nth ones as target images. Then, the signal processing circuit 7 determines how much each of the target images (that is, the second and all subsequent taken images) has been shifted from the reference image. That is to say, the signal processing circuit 7 detects the quantity of a shift between the reference image and each of the target images, which are the second to Nth taken images, in order to determine a positional relation between the reference image and each of the target images. Information on the quantity of a shift is treated as a transformation parameter to be described later. Then, the flow of the photographing processing goes on to the next step S4.

At the step S4, on the basis of the N taken images as well as the shift quantities detected at the step S3 as the quantities of shifts between the position of the reference image and the positions of the target images, the signal processing circuit 7 carries out processing to generate an image. Then, the flow of the photographing processing goes on to the next step S5. As is obvious from details described later as details of the processing to generate an image, by carrying out the processing to generate an image, the signal processing circuit 7 is capable of generating an output image having all G, R and B signals for every pixel as a sharp output image of the proper exposure and a sharp output image with (all but) no hand trembling. Finally, the signal processing circuit 7 supplies an image signal representing the sharp output image produced by the processing to generate an image to the D/A converter 9 or the codec 12.

At the step S5, the monitor 11 displays the output image, which is also stored in the memory 13 implemented typically as a flash memory. Finally, the photographing processing is ended. To put it in detail, at the step S5, the D/A converter 9 carries out a D/A conversion process to convert a digital image signal received from the signal processing circuit 7 at the step S4 as an image signal representing an output picture into an analog signal and supplies the analog signal to the video encoder 10. Then, at the same step S5, the video encoder 10 converts the analog signal received from the D/A converter 9 as an analog signal, which has resulted from the D/A conversion process to convert a digital image signal, into a video signal that can be displayed on the monitor 11, and supplies the video signal to the monitor 11. Subsequently, also at the same step S5, the monitor 11 displays an output image based on the video signal received from the video encoder 10. Finally, the photographing processing is ended. In the mean time, also at the same step S5, the codec 12 codes the image signal which has been received at the step S4 from the signal processing circuit 7 as an image signal of an output picture, in accordance with a predetermined coding method such as the JPEG method or the MPEG method, and supplies a signal obtained as a result of the coding process to the memory 13, which is typically a flash memory. Finally, the photographing processing is ended.

Figure 3:
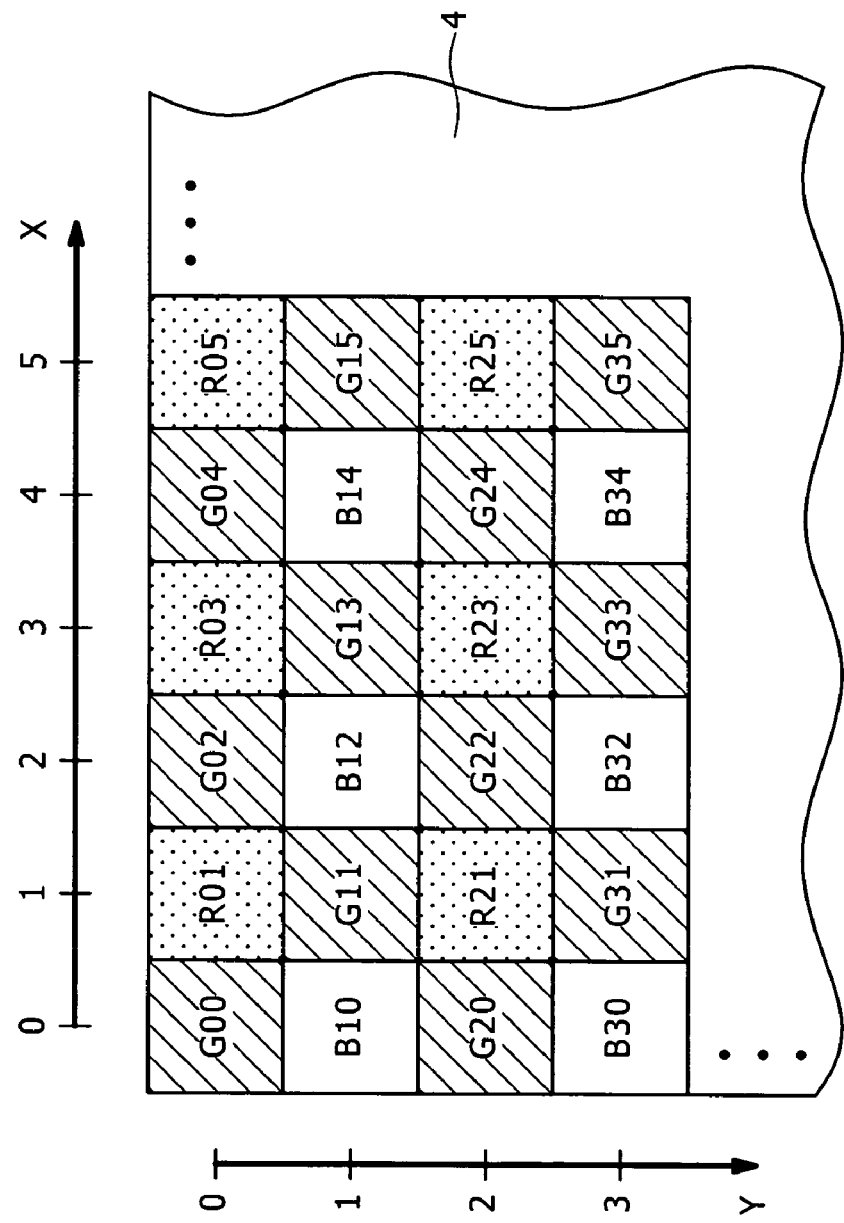
FIG. 3 is a diagram showing a two-dimensional layout of pixels of an image-pickup device 4 employed in the digital camera 1 shown in FIG. 1.

FIG. 3 is a diagram showing a two-dimensional layout of pixels on the image-pickup device 4 employed in the digital camera 1 shown in FIG. 1. It is to be noted that FIG. 3 shows only a two-dimensional layout of pixels at the let upper portion of the image-pickup device 4. To be more specific, FIG. 3 shows only a two-dimensional layout of 24 pixels on the uppermost four horizontal rows and leftmost six vertical columns in the image-pickup device 4. The two-dimensional layouts of pixels on other portions are each assumed to be the same as the two-dimensional layout shown in this figure.

In the pixel two-dimensional layout shown in FIG. 3, an XY coordinate system is set as a coordinate system having an origin located at the center (or the gravitational center) of the pixel at the left upper corner of the image-pickup device 4, the horizontal (right) direction taken as the X direction and the vertical (downward) direction taken as the Y direction. The vertical-direction length (or the height) and horizontal-direction length (or the width) of every pixel are assumed to be 1. In this case, notation (i−1, j−1) denotes the position of a pixel located at the intersection of the ith column from the left end of the pixel two-dimensional layout and the jth row from the top of the layout. To be more specific, the position (i−1, j−1) is the center position of such a pixel.

The pixel two-dimensional layout shown in FIG. 3 as the two-dimensional layout of pixels on the image-pickup device 4 is the so-called Bayer two-dimensional array. It is to be noted, however, that the pixel two-dimensional layout shown in FIG. 3 does not have to be the so-called Bayer two-dimensional array. Another matrix can also be adopted.

An image having pixel values according to pixel positions as pixel values of colors is output from the image-pickup device 4 having the Bayer two-dimensional array.

In the case of the Bayer two-dimensional array, pixels each allowing a G signal to be fetched are pixels G00, G02, G04, G11, G13, G15, G20, G22, G24, G31, G33 and G35. The pixel G00 is a pixel located at the intersection of the first one of the columns arranged in the X direction from the origin and the first one of the rows arranged in the Y direction from the origin. The pixel G02 is a pixel located at the intersection of the third one of the columns arranged in the X direction from the origin and the first one of the rows arranged in the Y direction from the origin. The pixel G04 is a pixel located at the intersection of the fifth one of the columns arranged in the X direction from the origin and the first one of the rows arranged in the Y direction from the origin. The pixel G11 is a pixel located at the intersection of the second one of the columns arranged in the X direction from the origin and the second one of the rows arranged in the Y direction from the origin. By the same token, the positions of the pixels G13, G15, G20, G22, G24, G31, G33 and G35 can be identified from their suffixes in the same way as the pixels G00, G02, G04 and G11.

Pixels each allowing an R signal to be fetched are pixels R01, R03, R05, R21, R23 and R25. The pixel R01 is a pixel located at the intersection of the second one of the columns arranged in the X direction from the origin and the first one of the rows arranged in the Y direction from the origin. The pixel R03 is a pixel located at the intersection of the fourth one of the columns arranged in the X direction from the origin and the first one of the rows arranged in the Y direction from the origin. The pixel R05 is a pixel located on the sixth column at a position shifted in the X direction from the origin and on the first row at a position shifted in the Y direction from the origin. The pixel R21 is a pixel located at the intersection of the second one of the columns arranged in the X direction from the origin and the third one of the rows arranged in the Y direction from the origin. By the same token, the positions of the pixels R23 and R25 can be identified from their suffixes in the same way as the pixels R01, R03, R05 and R21.

Pixels each allowing a B signal to be fetched are pixels B10, B12, B14, B30, B32 and B34. The pixel B10 is a pixel located at the intersection of the first one of the columns arranged in the X direction from the origin and the second one of the rows arranged in the Y direction from the origin. The pixel B12 is a pixel located at the intersection of the third one of the columns arranged in the X direction from the origin and the second one of the rows arranged in the Y direction from the origin. The pixel B14 is a pixel located at the intersection of the fifth one of the columns arranged in the X direction from the origin and the second one of the rows arranged in the Y direction from the origin. The pixel B30 is a pixel located at the intersection of the first one of the columns arranged in the X direction from the origin and the fourth one of the rows arranged in the Y direction from the origin. By the same token, the positions of the pixels B32 and B34 can be identified from their suffixes in the same way as the pixels B10, B12, B14 and B30.

Let notation Lg (x, y) denote the G signal (or the quantity of the G light) of a photographing object (or an image) projected at a position (x, y) included in the surface of the image-pickup device 4 as a position (x, y) in the XY coordinate system taking the image-pickup device 4 as a reference where x and y are each a real number. By the same token, let notation Lr (x, y) denote the R signal (or the quantity of the R light) of the same image projected at the same position (x, y). In the same way, let notation Lb (x, y) denote the B signal (or the quantity of the B light) of the same image projected at the same position (x, y). In this case, notation Lg (i, j) can be used to represent the G signal of a pixel at the intersection of the ith column from the left end of an output image generated as a sharp image having no hand-trembling effect and the jth row from the top of the same image. By the same token, notation Lr (i, j) can be used to represent the R signal of the same pixel. In the same way, notation Lb (i, j) can be used to represent the B signal of the same pixel. In this case, x, y, i and j satisfy the following equations: x=i−1 and y=j−1.

It is to be noted that, since Lg (x, y) and Lg (i−1, j−1) each denote the light quantity (or the pixel value) of the green color originated by the photographing object at the position (x, y) or a pixel located at the intersection of the ith column from the left end and the jth row from the top, in the following description, Lg (x, y) is also referred to as the green-color light quantity Lg (x, y). By the same token, since Lr (x, y) and Lr (i−1, j−1) each denote the light quantity (or the pixel value) of the red color originated by the photographing object at the position (x, y) or a pixel located at the intersection of the ith column from the left end and the jth row from the top, Lr (x, y) is also referred to as the red-color light quantity Lr (x, y). In the same way, since Lb (x, y) and Lb (i−1, j−1) each denote the light quantity (or the pixel value) of the blue color originated by the photographing object at the position (x, y) or a pixel located at the intersection of the ith column from the left end and the jth row from the top, Lb (x, y) is also referred to as the blue-color light quantity Lb (x, y).

The following description defines variables ig and jg used for the G signal, variables ir and jr used for the R signal as well as variables ib and jb used for the B signal.

The variables ig and jg represent respectively the column and row numbers of a pixel allowing a G signal to be fetched. That is to say, the combination of the variables ig and jg is equivalent to the combination of the variables i and j. In the Bayer two-dimensional array, from the property of the Bayer two-dimensional array, the variables ig and jg respectively correspond to the variables i and j, which satisfy a condition requiring that their difference (i−j) be an even number. It is worth noting that, of course, the difference (ig−jg) is also an even number as well. Thus, a pixel located at the intersection of the igth column and the jgth row is a pixel allowing a G signal to be fetched. It is to be noted that, in a two-dimensional layout other than the Bayer two-dimensional array, the condition for the variables i and j representing the variables ig and jg is different from the condition for the Bayer two-dimensional array.

By the same token, the variables ir and jr represent respectively the column and row numbers of a pixel allowing an R signal to be fetched. That is to say, the combination of the variables ir and jr is equivalent to the combination of the variables i and j. In the Bayer two-dimensional array, from the property of the Bayer two-dimensional array, the variables ir and jr respectively correspond to the variables i and j, which satisfy conditions requiring that the variable i be an even number and that their difference (i, j) be an odd number. It is worth noting that, of course, the difference (ir−jr) is also an even number as well. Thus, a pixel located at the intersection of the irth column and the jrth row is a pixel allowing an R signal to be fetched. It is to be noted that, in a two-dimensional layout other than the Bayer two-dimensional array, the condition for the variables i and j representing the variables ir and jr is different from the condition for the Bayer two-dimensional array.

In the same way, the variables ib and jb represent respectively the column and row numbers of a pixel allowing a B signal to be fetched. That is to say, the combination of the variables ib and jb is equivalent to the combination of the variables i and j. In the Bayer two-dimensional array, from the property of the Bayer two-dimensional array, the variables ib and jb respectively correspond to the variables i and j, which satisfy conditions requiring that the variable I be an odd number and their difference (i, j) be an odd number. It is worth noting that, of course, the difference (ib−jb) is also an odd number as well. Thus, a pixel located at the intersection of the ibth column and the jbth row is a pixel allowing a B signal to be fetched. It is to be noted that, in a two-dimensional layout other than the Bayer two-dimensional array, the condition for the variables i and j representing the variables ib and jb is different from the condition for the Bayer two-dimensional array.

Figure 4:
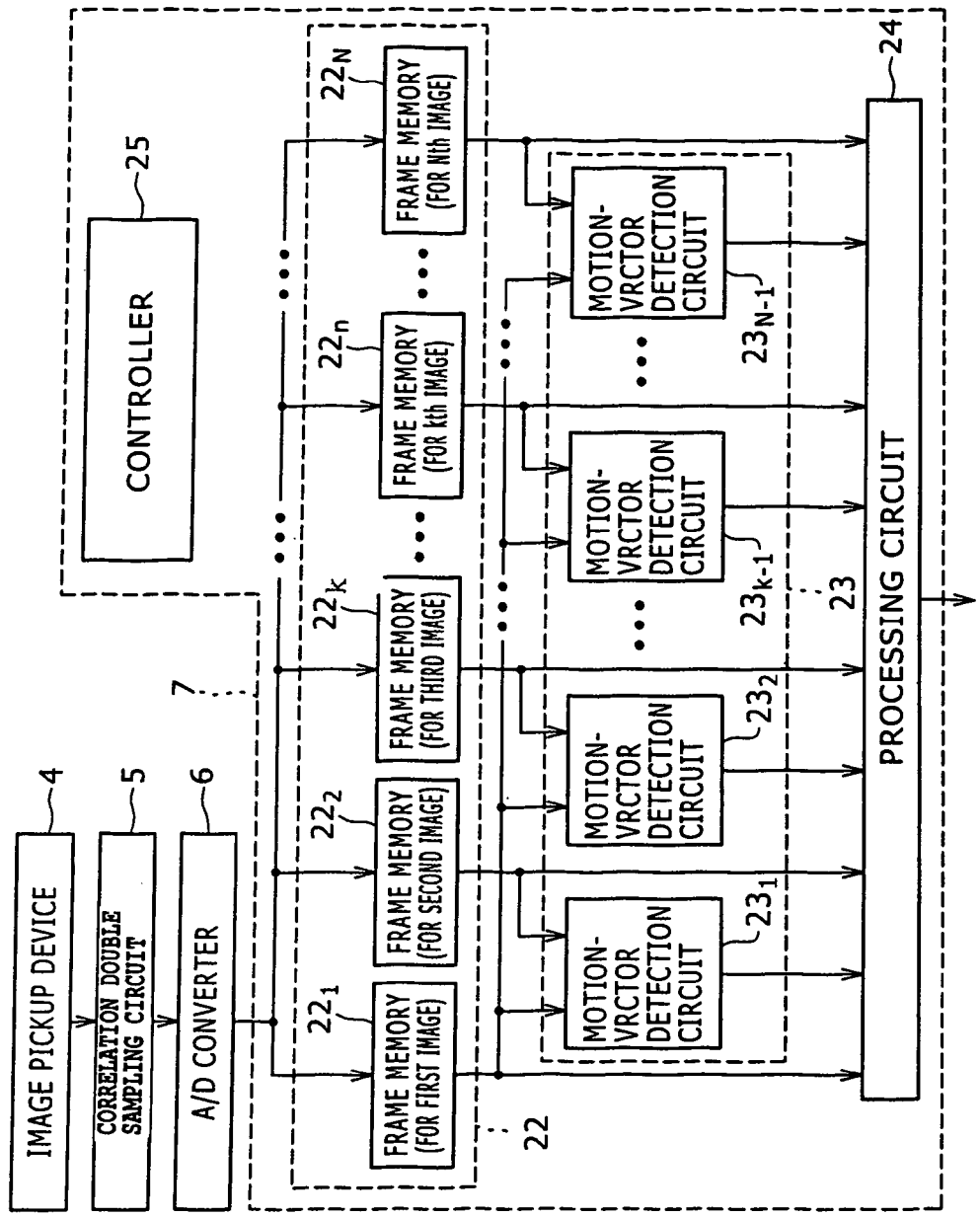
FIG. 4 is a block diagram showing a detailed typical configuration of a signal processing circuit 7 employed in the digital camera 1 shown in FIG. 1.

Next, the following description defines values (strictly speaking, pixel values) of chrominance signals (to be more specific, G, R and B signals) obtained as a result of light reception by pixels on the image-pickup device 4 shown in FIG. 4.

As described above, in the image-pickup device 4, N taken images are produced. Thus, in every pixel of the image-pickup device 4, N pixel values are obtained. Let notation Gobs (k, ig, jg) denote a pixel value obtained at a pixel located at the intersection of the igth column and the jgth row in an image-pickup process to get the kth taken image where notation k denotes an integer in the range 1 to N. By the same token, let notation Robs (k, ir, jr) denote a pixel value obtained at a pixel located at the intersection of the irth column and the jrth row in an image-pickup process to get the kth taken image. In the same way, let notation Bobs (k, ib, jb) denote a pixel value obtained at a pixel located at the intersection of the ibth column and the jbth row in an image-pickup process to get the kth taken image. Thus, for example, notation Gobs (1, 1, 1) denotes a pixel value obtained at a pixel G00 located at the intersection of the first column and the first row in an image-pickup process to get the first taken image. On the other hand, notation Gobs (2, 5, 1) denotes a pixel value obtained at a pixel G04 located at the intersection of the fifth column and the first row in an image-pickup process to get the first taken image. It is to be noted that, in the following description, notation k denotes an integer in the range 1 to N unless otherwise specified.

In accordance with the definition described above as the definition of the pixel value, pixels which produce pixel values Gobs (k, ig, jg), Robs (k, ir, jr) and Bobs (k, ib, jb) are pixels G(jg−1)(ig−1), G(jr−1)(ir−1) and G(jb−1)(ib−1) respectively.

The pixel value Gobs (k, ig, jg) is also the pixel value of a pixel located at the intersection of the igth column and the jgth row on the kth taken image. By the same token, the pixel value Robs (k, ir, jr) is also the pixel value of a pixel located at the intersection of the irth column and the jrth row on the kth taken image. In the same way, pixel value Bobs (k, ib, jb) is also the pixel value of a pixel located at the intersection of the ibth column and the jbth row on the kth taken image.

FIG. 4 is a block diagram showing a detailed typical configuration of a portion of the signal processing circuit 7 employed in the digital camera 1 shown in FIG. 1.

As shown in FIG. 4, the signal processing circuit 7 includes frame memories 22, motion-vector detection circuits 23, a processing circuit 24 and a controller 25. The signal processing circuit 7 employs N frame memories 22, i.e., frame memories $22_1$ to $22_N$, and (N−1) motion-vector detection circuits 23, i.e., motion-vector detection circuits $23_1$ to $23_{N-1}$.

N taken images produced by the A/D converter 6 as described above are supplied to the N frame memories 22 respectively. To be more specific, the frame memory $22_1$ is used for storing (or recording) the first taken image received from the A/D converter 6. By the same token, the frame memory $22_2$ is used for storing (or recording) the 2nd taken image received from the A/D converter 6. In the same way, the frame memory $22_k$ is used for storing (or recording) the kth taken image received from the A/D converter 6 where k=3 to N.

With a predetermined timing, the frame memory $22_1$ supplies the first taken image stored therein to the processing circuit 24 and the motion-vector detection circuits $23_1$ to $23_{N-1}$. With a predetermined timing, the frame memory $22_2$ supplies the 2nd taken image stored therein to the processing circuit 24 and the motion-vector detection circuit $23_1$. In the same way, with a predetermined timing, the frame memory $22_k$ supplies the kth taken image stored therein to the processing circuit 24 and the motion-vector detection circuit $23_{k-1}$.

Each motion-vector detection circuit 23 recognizes a relation between the positions of two taken images. To put it in detail, the motion-vector detection circuit 23 takes the first taken image as a reference image for recognition of such a positional relation and one of the second and all subsequent taken images as a target image. The taken image adopted by the motion-vector detection circuit 23 as the target image is a taken image supplied to the motion-vector detection circuit 23. The motion-vector detection circuit 23 detects the shift quantity (or the movement quantity) of a positional shift made by a target image supplied to the motion-vector detection circuit 23 from the reference image in order to recognize how far the target image has been shifted from the reference image. As described above, the target image is a taken image selected from the second to Nth taken images as a taken image supplied to the motion-vector detection circuit 23. It is to be noted that the shift is typically caused by hand trembling.

To be more specific, the motion-vector detection circuit $23_1$ receives the first taken image used as the reference image from the frame memory $22_1$ and the second taken image serving as a target image from the frame memory $22_2$.

Then, for every selected pixel of the second taken image, the motion-vector detection circuit $23_1$ detects which position in the first taken image corresponds to a selected pixel of the second taken image. As an alternative, the entire image is divided into a plurality of blocks and, for every selected block of the second taken image, the motion-vector detection circuit $23_1$ detects which position in the first taken image corresponds to a selected block of the second taken image. In either case, a pixel or a block is a portion of the photographing object and the portion is projected on projection positions in the first and second taken images. For every selected portion of the photographing object, the motion-vector detection circuit $23_1$ detects which projection position in the first taken image corresponds to a projection position included in the second taken image as the projection position of the selected portion. Then, on the basis of the detection result, the motion-vector detection circuit $23_1$ finds transformation parameters ($a_2$, $b_2$, $c_2$, $d_2$, $s_2$ and $t_2$) defining Eq. (1) expressing a positional relation (or the quantity of a shift) between the first taken image and the second taken image and supplies the parameters to the processing circuit 24.

[Eq. (1)]

$$\begin{pmatrix} X_{1(2)} \\ Y_{1(2)} \end{pmatrix} = \begin{pmatrix} a_2 & b_2 \\ c_2 & d_2 \end{pmatrix} \begin{pmatrix} X_2 \\ Y_2 \end{pmatrix} + \begin{pmatrix} s_2 \\ t_2 \end{pmatrix} \quad (1)$$

Eq. (1) is the so-called affine transformation equation. In the same way as the coordinate system for the image-pickup device 4 shown in FIG. 3, an XY coordinate system is defined as a coordinate system taking the center point of a pixel at the left upper corner of the image as the origin, the horizontal direction (or the right direction) as the X direction and the vertical direction (or the downward direction) as the Y direction. In this case, in Eq. (1), coordinates ($X_2$, $Y_2$) represent a position included in a second coordinate system on the second taken image as the position of a specific pixel on the second taken image. On the other hand, coordinates ($X_{1(2)}$, $Y_{1(2)}$) of a position included in a first coordinate system on the first taken image as the position of the same portion of the photographing object as the portion corresponding to the specific pixel are coordinates, which are obtained as a result of a process to transform the coordinates ($X_2$, $Y_2$) of the position of the specific pixel on the second taken image when the position of the specific pixel is mapped onto the position in the first coordinate system on the first taken image. The inferior figures (2) attached to the coordinates ($X_{1(2)}$, $Y_{1(2)}$) of the position ($X_{1(2)}$, $Y_{1(2)}$) in the first coordinate system on the first taken image indicate that the coordinates ($X_{1(2)}$, $Y_{1(2)}$) are coordinates obtained as a result of transforming the coordinates ($X_2$, $Y_2$) of the position ($X_2$, $Y_2$) in the second coordinate system on the second taken image in a process of mapping the position ($X_2$, $Y_2$) onto the position ($X_{1(2)}$, $Y_{1(2)}$). In the mapping process, (ideally,) the photographing-object portion projected at the position ($X_{1(2)}$, $Y_{1(2)}$) in the first coordinate system on the first taken image is the same one as the photographing-object portion projected at the position ($X_2$, $Y_2$) in the second coordinate system on the second taken image.

Define the parameters $a_2$, $b_2$, $c_2$ and $d_2$ of the transformation parameters ($a_2$, $b_2$, $c_2$, $d_2$, $s_2$ and $t_2$) as follows:

$a_2 = d_2 = L_2 \cos\theta_2$, and $-b_2 = c_2 = L_2 \sin\theta_2$.

In this case, the affine transformation process expressed by Eq. (1) can be said to be a process defined by a rotation angle $\theta_2$, a scale $L_2$ and a parallel shift quantity ($s_2$, $t_2$). In addition, Eq. (1) expresses the fact that the photographing-object portion projected at the position ($X_{1(2)}$, $Y_{1(2)}$) in the first coordinate system on the first taken image is a photographing-object portion obtained as a result a process to rotate the photographing-object portion projected at the position ($X_2$, $Y_2$) in the second coordinate system on the second taken image by a rotation angle $\theta_2$, a process to change the size of the photo-graphing-object portion projected at the position ($X_2$, $Y_2$) by a magnification $L_2$ and a process to parallel-shift the photographing-object portion projected at the position ($X_2$, $Y_2$) by a distance ($s_2$, $t_2$). Thus, the photographing-object portion projected at the position ($X_{1(2)}$, $Y_{1(2)}$) in the first coordinate system on the first taken image is actually the same photographing-object portion as the photographing-object portion projected at the position ($X_2$, $Y_2$) in the second coordinate system on the second taken image. For $L_2 > 1$, the process to change the size of the photographing-object portion projected at the position ($X_2$, $Y_2$) by a magnification $L_2$ is referred to as an enlargement process. For $L_2 < 1$, on the other hand, the process to change the size of the photographing-object portion projected at the position ($X_2$, $Y_2$) by a magnification $L_2$ is referred to as a shrinking process.

It is to be noted that, in most cases of hand trembling, the hand trembles (or is shaken) in a direction parallel to the light reception face of the image-pickup device 4 and, only in few cases of hand trembling, does the hand tremble (or is the hand shaken) in a direction perpendicular to the light reception face of the image-pickup device 4. Thus, it is possible to assume that there is no hand trembling in a direction perpendicular to the light reception face of the image-pickup device 4. In this case, $L_2 = 1$.

By the same token, the motion-vector detection circuit $23_2$ receives the first taken image used as the reference image from the frame memory $22_1$ and the third taken image serving as a target image from the frame memory $22_3$.

Then, for every selected pixel of the third taken image, the motion-vector detection circuit $23_2$ detects which position in the first taken image corresponds to a selected pixel of the third taken image. Then, on the basis of the detection result, the motion-vector detection circuit $23_2$ finds transformation parameters ($a_3$, $b_3$, $c_3$, $d_3$, $s_3$ and $t_3$) defining affine transformation of Eq. (2) expressing a positional relation between the first taken image and the third taken image and supplies the parameters to the processing circuit 24.

[Eq. (2)]

$$\begin{pmatrix} X_{1(3)} \\ Y_{1(3)} \end{pmatrix} = \begin{pmatrix} a_3 & b_3 \\ c_3 & d_3 \end{pmatrix} \begin{pmatrix} X_3 \\ Y_3 \end{pmatrix} + \begin{pmatrix} s_3 \\ t_3 \end{pmatrix} \quad (2)$$

In Eq. (2), coordinates ($X_3$, $Y_3$) represent a position included in a third coordinate system on the third taken image as the position of a specific pixel of the third taken image. On the other hand, coordinates ($X_{1(3)}$, $Y_{1(3)}$) of a position included in the first coordinate system on the first taken image as the position of the same portion of the photographing object as the portion corresponding to the specific pixel are coordinates, which are obtained as a result of a process to transform the coordinates ($X_3$, $Y_3$) of the position of the specific pixel on the third taken image when the position of the specific pixel is mapped onto the position in the first coordinate system on the first taken image. The inferior figures (3) attached to the coordinates ($X_{1(3)}$, $Y_{1(3)}$) of the position ($X_{1(3)}$, $Y_{1(3)}$) in the first coordinate system on the first taken image indicate that the coordinates ($X_{1(3)}$, $Y_{1(3)}$) are coordinates obtained as a result of transforming the coordinates ($X_3$, $Y_3$) of the position ($X_3$, $Y_3$) in the third coordinate system on the third taken image in a process of mapping the position ($X_3$, $Y_3$) onto the position ($X_{1(3)}$, $Y_{1(3)}$). Define the parameters $a_3$, $b_3$, $c_3$ and $d_3$ of the transformation parameters ($a_3$, $b_3$, $c_3$, $d_3$, $s_3$ and $t_3$) as follows:

$a_3 = d_3 = L_3 \cos\theta_3$, and $-b_3 = c_3 = L_3 \sin\theta_3$.

In this case, the affine transformation process expressed by Eq. (2) can be said to be a process defined by a rotation angle $\theta_3$, a scale $L_3$ and a parallel shift quantity $(s_3, t_3)$ in the same way as Eq. (1) is defined as described above.

Thereafter, by the same token, the motion-vector detection circuit $23_{k-1}$ receives the first taken image used as the reference image from the frame memory $22_1$ and the kth taken image serving as a target image from the frame memory $22_k$.

For every selected pixel of the kth taken image, the motion-vector detection circuit $23_{k-1}$ detects which position on the first taken image corresponds to the pixel and, on the basis of the result of the detection, finds transformation parameters $(a_k, b_k, c_k, d_k, s_k$ and $t_k)$ defining affine transformation of Eq. (3) expressing a positional relation between the first taken image and the kth taken image and supplies the parameters to the processing circuit 24.

[Eq. (3)]

$$\begin{pmatrix} X_{1(k)} \\ Y_{1(k)} \end{pmatrix} = \begin{pmatrix} a_k & b_k \\ c_k & d_k \end{pmatrix} \begin{pmatrix} X_k \\ Y_k \end{pmatrix} + \begin{pmatrix} s_k \\ t_k \end{pmatrix} \quad (3)$$

In Eq. (3), coordinates $(X_k, Y_k)$ represent a position included in a kth coordinate system on the kth taken image as the position of a specific pixel of the kth taken image. On the other hand, coordinates $(X_{1(k)}, Y_{1(k)})$ of a position included in the first coordinate system on the first taken image as the position of the same portion of the photographing object as the portion corresponding to the specific pixel are coordinates, which are obtained as a result of a process to transform the coordinates $(X_k, Y_k)$ of the position of the specific pixel on the kth taken image when the position of the specific pixel is mapped onto the position in the first coordinate system on the first taken image. The inferior figures (k) attached to the coordinates $(X_{1(k)}, Y_{1(k)})$ of the position $(X_{1(k)}, Y_{1(k)})$ in the first coordinate system on the first taken image indicate that the coordinates $(X_{1(k)}, Y_{1(k)})$ are coordinates obtained as a result of transforming the coordinates $(X_3, Y_3)$ of the position $(X_k, Y_k)$ in the kth coordinate system on the kth taken image in a process of mapping the position $(X_k, Y_k)$ onto the position $(X_{1(k)}, Y_{1(k)})$. Let us define the parameters $a_k, b_k, c_k$ and $d_k$ of the transformation parameters $(a_k, b_k, c_k, d_k, s_k$ and $t_k)$ as follows:

$a_k = d_k = L_k \cos\theta_k$, and $-b_k = c_k = L_k \sin\theta_k$.

In this case, the affine transformation process expressed by Eq. (3) can be said to be a process defined by a rotation angle $\theta_k$, a scale $L_k$ and a parallel shift quantity $(s_k, t_k)$ in the same way as Eq. (1) is defined as described above.

As described above, the transformation parameters $(a_k, b_k, c_k, d_k, s_k$ and $t_k)$ are found from a result of detecting a position included in the first coordinate system on the first taken image as the position of the same photographing-object portion as the photographing-object portion projected at a pixel position in the kth coordinate system on the kth taken image for every position on the kth taken image. As an alternative, the transformation parameters $(a_k, b_k, c_k, d_k, s_k$ and $t_k)$ can also be found in the so-called mechanical way from signals output by sensors provided on the digital camera 1. Examples of the sensors are an acceleration sensor and an angular-speed sensor.

The processing circuit 24 is a circuit for receiving N taken images from the frame memories $22_1$ to $22_N$. The processing circuit 24 also receives the transformation parameters $(a_k, b_k, c_k, d_k, s_k$ and $t_k)$ representing a relation between the position of the first taken image and the position of the kth taken image from the motion-vector detection circuits $23_1$ to $23_{N-1}$.

On the basis of the transformation parameters $(a_k, b_k, c_k, d_k, s_k$ and $t_k)$ received from the motion-vector detection circuits $23_1$ to $23_{N-1}$ as parameters representing a relation between the position of the first taken image and the position of each of the second to Nth taken images, the processing circuit 24 identifies pixels of the first to Nth taken images as pixels to be used in inference of pixel values of pixels on an output image in a process to generate the output image as will be described later. Then, on the basis of the pixel values of the identified pixels, the processing circuit 24 infers pixel values (that is, the R, G and B signals) of a sharp output image with its hand trembling corrected in the process to generate the output image. Subsequently, the processing circuit 24 supplies the output image obtained as a result of the image generation process to the D/A converter 9 or the codec 12.

Each of the N taken images supplied by the A/D converter 6 to the signal processing circuit 7 is an image, every pixel of which has a pixel value, which is either one of the R, G and B signals. On the other hand, the output image generated by the processing circuit 24 is an image with every pixel thereof having three pixel values, i.e., the R, G and B signals, which are each a chrominance signal.

In accordance with control executed by the CPU 15, the controller 25 controls components such as the frame memories $22_1$ to $22_N$, the motion-vector detection circuits $23_1$ to $23_{N-1}$ and the processing circuit 24, which are employed in the signal processing circuit 7. It is to be noted that, as a substitute for the controller 25, the CPU 15 employed in the digital camera 1 shown in FIG. 1 may also control the components such as the frame memories $22_1$ to $22_N$, the motion-vector detection circuits $23_1$ to $23_{N-1}$ and the processing circuit 24, which are employed in the signal processing circuit 7. In this case, the controller 25 can be eliminated.

It is to be noted that, in the case of a single-plate sensor adopting the Bayer two-dimensional array, the number of pixels each generating an R signal and the number of pixels each generating a B signal are small in comparison with the number of pixels each generating a G signal. Thus, the number of errors (or noises) for the R signal in the output image generated by the signal processing circuit 7 and the number of errors (or noises) for the B signal in the same output image are greater than the number errors (or noises) for the G signal in some cases. In such a case, the noises can be eliminated or the number of noises can be reduced by providing a low-pass filter at a stage following the processing circuit 24 as a filter for limiting the bandwidth of high-frequency components of only the chrominance signal with the luminance signal passed as it is.

The following description explains the processing circuit 24 employed in the signal processing circuit 7, which is shown in FIG. 4 as a component of the digital camera 1 shown in FIG. 1.

It is to be noted that the pixel value of every pixel on the image-pickup device 4 (that is, the pixel value of a taken image) is a signal representing the light quantity of a light beam radiated to a point on the pixel from the object of photographing. An example of the point on the pixel is the gravitational center (or the geometrical center) of the pixel. That is to say, the pixel value of every pixel is used as data obtained as a result of a point sampling process carried out at the gravitational-center position of the pixel.

In the following description, a kth taken image is also referred to simply as a kth image. In addition, an XY coordinate system taking the kth image as a reference is referred to as the coordinate system of the kth image. Strictly speaking, an XY coordinate system taking the kth image as a reference is an XY coordinate system taking the center of the pixel at the left upper corner of the kth image as an origin, the horizontal (or right) direction as the X direction and the vertical (or downward) direction as the Y direction.

When the pixel value obtained at every pixel of the image-pickup device 4 is used as data obtained as a result of a point sampling process carried out at the gravitational-center position of the pixel as described above, the pixel value obtained from a pixel located at the intersection of the ith column from the left end and the jth row from the top as one of pixels of the two-dimensional layout shown in FIG. 3 as the layout of the image-pickup device 4 corresponds to the light quantity of a light beam radiated by a photographing-object portion projected at a position expressed by coordinates (i−1, j−1) as typically the position of the gravitational center of the pixel located at the intersection of the ith column and the jth row.

Let us assume for example that the pixel value obtained from a pixel located at the intersection of the ith column from the left end and the jth row from the top as one of pixels of the two-dimensional layout shown in FIG. 3 as the layout of the image-pickup device 4 is equal to the light quantity of a light beam radiated by a photographing-object portion projected at a position expressed by coordinates (i−1, j−1) as the position of the gravitational center of the pixel located at the intersection of the ith column and the jth row. In this case, for example, the pixel value Gobs (1, ig, jg) of a pixel located at the intersection of the ith column from the left end and the jth row from the top of the first taken image is the light quantity Lg (ig−1, jg−1) of the green color at the position (ig−1, jg−1) in the coordinate system of the first taken image, that is, the coordinate system taking the first taken image as the reference. By the same token, the pixel value Robs (1, ir, jr) of a pixel located at the intersection of the ith column from the left end and the jth row from the top of the first taken image is the light quantity Lr (ir−1, jr−1) of the red color at the position (ir−1, jr−1) in the coordinate system of the first taken image. In the same way, the pixel value Bobs (1, ib, jb) of a pixel located at the intersection of the ith column from the left end and the jth row from the top of the first taken image is the light quantity Lb (ib−1, jb−1) of the blue color at the position (ib−1, jb−1) in the coordinate system of the first taken image.

Figure 5:
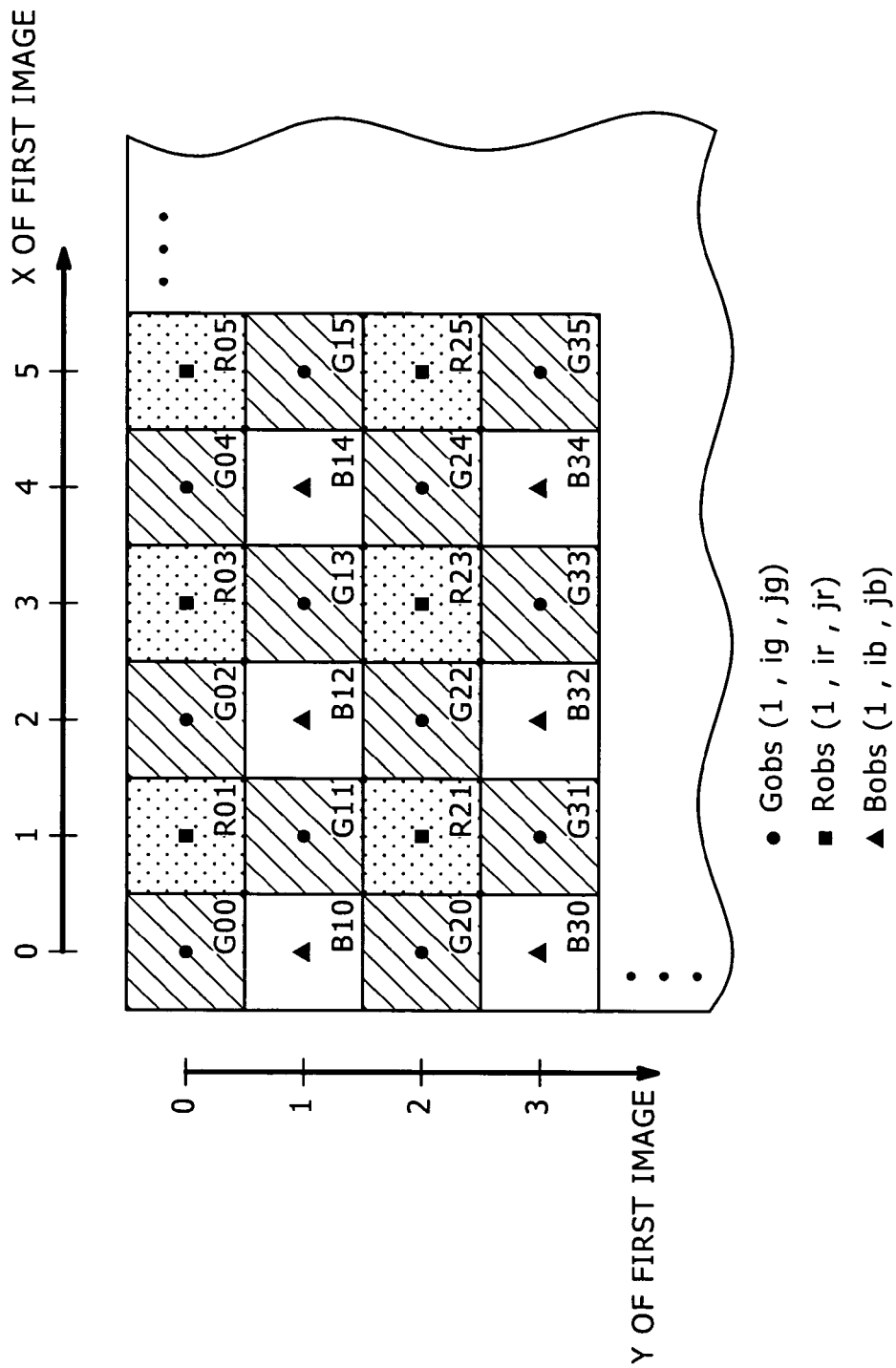
FIG. 5 is a diagram showing a first taken image.

FIG. 5 is a diagram showing the first taken image.

Pixels shown in FIG. 5 as pixels of a taken image are denoted by using the same notations as those used in FIG. 3 showing the two-dimensional array of pixels on the image-pickup device 4. For a pixel G(jg−1) (ig−1) on the first taken image, a pixel value Gobs (1, ig, jg) of the G signal is observed at the gravitational center of the pixel G(jg−1)(ig−1) as shown in the figure as a black circle. By the same token, for a pixel R(jr−1) (ir−1) on the first taken image, a pixel value Robs (1, ir, jr) of the R signal is observed at the gravitational center of the pixel R(jr−1)(ir−1) as shown in the figure as a black square. In the same way, for a pixel B(jb−1) (ib−1) on the first taken image, a pixel value Bobs (1, ib, jb) of the B signal is observed at the gravitational center of the pixel B(jb−1)(ib−1) as shown in the figure as a black triangle.

As described above, the pixel value of every pixel on the first taken image is observed at the gravitational position of the pixel in the coordinate system of the first taken image. To be more specific, the pixel value of a pixel located at the intersection of the ith column and the jth row is observed at the position (i−1, j−1).

Figure 6:
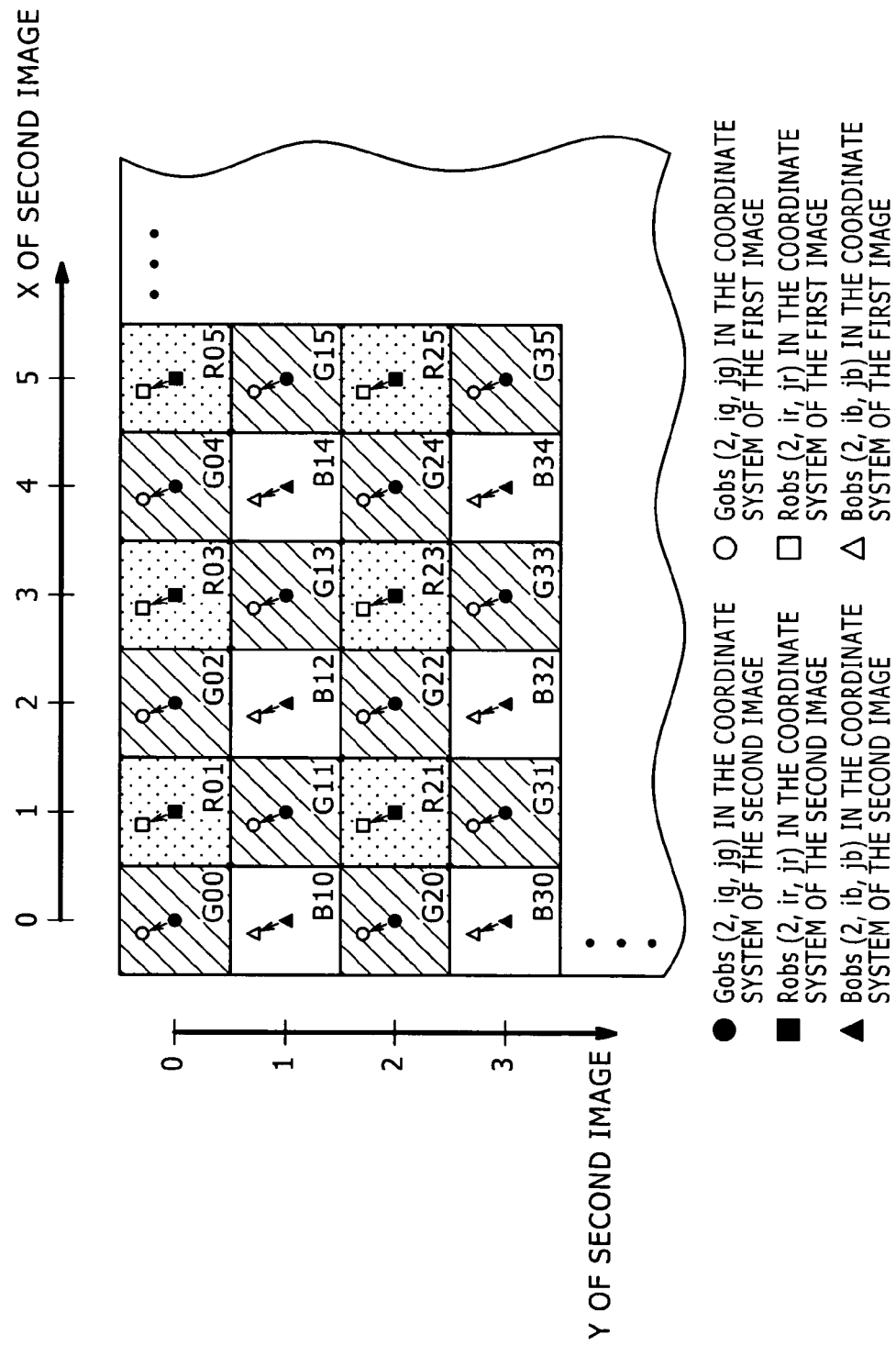
FIG. 6 is a diagram showing a second taken image.

FIG. 6 is a diagram showing the second taken image.

For a pixel G(jg−1)(ig−1) on the second taken image shown in FIG. 6, a pixel value Gobs (2, ig, jg) of the G signal is observed at the gravitational center of the pixel G(jg−1) (ig−1) as shown in the figure as a black circle. By the same token, for a pixel R(jr−1) (ir−1) on the second taken image, a pixel value Robs (2, ir, jr) of the R signal is observed at the gravitational center of the pixel R(jr−1)(ir−1) as shown in the figure as a black square. In the same way, for a pixel B(jb−1) (ib−1) on the second taken image, a pixel value Bobs (2, ib, jb) of the B signal is observed at the gravitational center of the pixel B(jb−1)(ib−1) as shown in the figure as a black triangle.

As described above, the pixel value of every pixel on the second taken image is observed at the gravitational position of the pixel in the coordinate system of the second taken image as is the case with the first taken image. To be more specific, the pixel value of a pixel located at the intersection of the ith column and the jth row is observed at the position (i−1, j−1).

As an output image, the processing circuit 24 employed in the signal processing circuit 7 shown in FIG. 4 generates an output image from the N taken images in an image generation process. To be more specific, the processing circuit 24 generates an output image in a range projected on a reference image as a range of the photographing object. The reference image is a reference image used in a process to detect relations between the positions of the N taken images. In this embodiment, the first taken image is taken as the reference image. That is to say, in order to generate the output image, for the position of each pixel on the output image, the processing circuit 24 identifies pixels of the N taken images to be used in inference of the pixel value at the position of the pixel on the output image on the basis of the relations between the positions of the N taken images. Then, the image-pickup device 4 finds the pixel values of the identified pixels on the N taken images. Finally, on the basis of the pixel values of the identified pixels on the N taken images, the image-pickup device 4 infers the pixel value at the position of each pixel on the output image.

In order to identify pixels of the N taken images to be used in inference of the pixel value at the position of a pixel on the output image for every pixel (or the position of every pixel) on the output image as described above, the processing circuit 24 maps the source position of each pixel on each of the N taken images onto the destination position on the first taken image serving as the reference image, transforming the coordinates of the source position into the coordinates of the destination position so as to make photographing-object portions projected on each of the N taken images coincide with their respective photographing-object portions projected on the reference image.

The coordinates are transformed by carrying out an affine transformation process based on an affine transformation equation using transformation parameters (a, b, c, d, s and t) found by the motion-vector detection circuit $23_{k-1}$ employed in the signal processing circuit 7 shown in FIG. 4. Examples of the affine transformation equation are Eqs. (1) to (3) each representing a relation between two of N taken images. In the following description, each of the transformation parameters may be properly expressed as a variable without a suffix appended thereto.

For example, the coordinates of a pixel (or a point) on the second taken image can be transformed into the coordinates of a pixel (or a point) on the first taken image in an affine transformation process expressed by Eq. (1) using the transformation parameters ($a_2$, $b_2$, $c_2$, $d_2$, $s_2$ and $t_2$) found by the motion-vector detection circuit $23_1$.

FIG. 6 also shows the gravitational positions on the first taken image as a result of the process to transform the coordinates of the gravitational positions included in the second taken image as described above as the gravitational positions of pixels having pixel values Gobs (2, ig, jg), Robs (2, ir, jr) and Bobs (2, ib, jb).

To put it in detail, the pixel value Gobs (2, ig, jg) of the G signal for the pixel G(jg−1)(ig−1) in the coordinate system of the second taken image is also the light quantity Lg (x, y) (that should be) observed at the position (jg−1)(ig−1) transformed into the position ((ig−1)$_{(2)}$, (jg−1)$_{(2)}$) in the coordinate system of the first taken image as the light quantity of the green color. That is to say, the coordinates ((ig−1)$_{(2)}$, (jg−1)$_{(2)}$) are coordinates obtained as a result of an affine transformation process to transform the coordinates of a position (ig−1, jg−1) in the coordinate system of the second taken image by using the transformation parameters ($a_2$, $b_2$, $c_2$, $d_2$, $s_2$ and $t_2$) found by the motion-vector detection circuit $23_1$. In the two-dimensional layout shown in FIG. 6, the position ((ig−1)$_{(2)}$, (jg−1)$_{(2)}$) included in the coordinate system of the first taken image as a position with its coordinates resulting from the affine transformation process to transform the coordinates of the position producing the pixel value Gobs (2, ig, jg) of the G signal is shown as a white circle.

By the same token, the pixel value Robs (2, ir, jr) of the R signal for the pixel R(jr−1)(ir−1) in the coordinate system of the second taken image is also the light quantity Lr (x, y) (that should be) observed at the position (jr−1)(ir−1) transformed into the position ((ir−1)$_{(2)}$, (jr−1)$_{(2)}$) in the coordinate system of the first taken image as the light quantity of the red color. That is to say, the coordinates ((ir−1)$_{(2)}$, (jr−1)$_{(2)}$) are coordinates obtained as a result of an affine transformation process to transform the coordinates of a position (ir−1, jr−1) in the coordinate system of the second taken image by using the transformation parameters ($a_2$, $b_2$, $c_2$, $d_2$, $s_2$ and $t_2$) found by the motion-vector detection circuit $23_1$. In the two-dimensional layout shown in FIG. 6, the position ((ir−1)$_{(2)}$, (jr−1)$_{(2)}$) included in the coordinate system of the first taken image as a position with its coordinates resulting from the affine transformation process to transform the coordinates of the position producing the pixel value Bobs (2, ir, jr) of the R signal is shown as a white square.

In the same way, the pixel value Bobs (2, ib, jb) of the B signal for the pixel B(jb−1)(ib−1) in the coordinate system of the second taken image is also the light quantity Lb (x, y) (that should be) observed at the position (jb−1)(ib−1) transformed into the position ((ib−1)$_{(2)}$, (jb−1)$_{(2)}$) in the coordinate system of the first taken image as the light quantity of the blue color. That is to say, the coordinates ((ib−1)$_{(2)}$, (jb−1)$_{(2)}$) are coordinates obtained as a result of an affine transformation process to transform the coordinates of a position (ib−1, jb−1) in the coordinate system of the second taken image by using the transformation parameters ($a_2$, $b_2$, $c_2$, $d_2$, $s_2$ and $t_2$) found by the motion-vector detection circuit $23_1$. In the two-dimensional layout shown in FIG. 6, the position ((ib−1)$_{(2)}$, (jb−1)$_{(2)}$) included in the coordinate system of the first taken image as a position with its coordinates resulting from the affine transformation process to transform the coordinates of the position producing the pixel value Bobs (2, ib, jb) of the B signal is shown as a white triangle.

Figure 7:
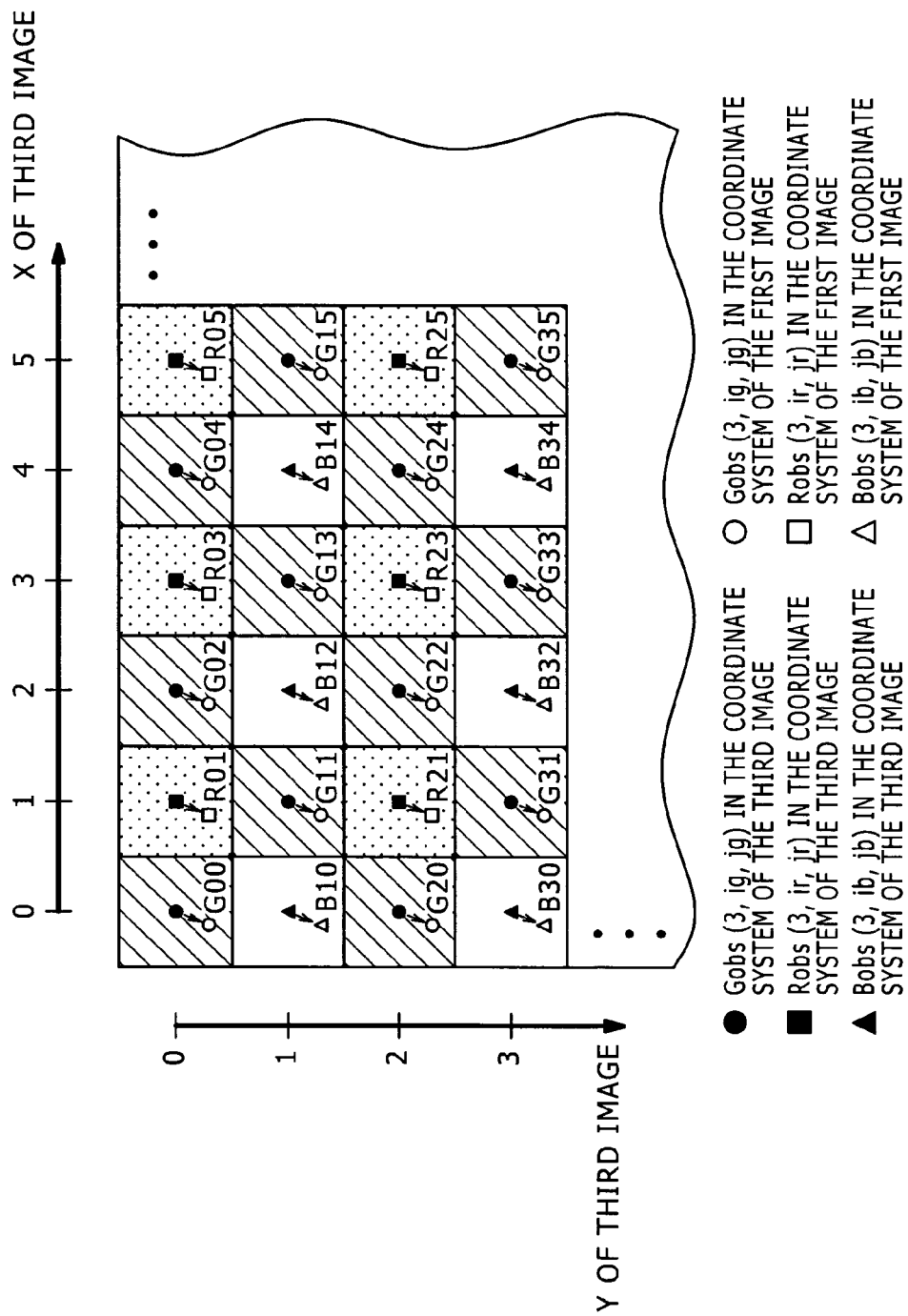
FIG. 7 is a diagram showing a third taken image.

FIG. 7 is a diagram showing the third taken image.

For a pixel G(jg−1)(ig−1) on the third taken image shown in FIG. 7, a pixel value Gobs (3, ig, jg) of the G signal is observed at the gravitational center of the pixel G(jg−1)(ig−1) as shown in the figure as a black circle. By the same token, for a pixel R(jr−1) (ir−1) on the third taken image, a pixel value Robs (3, ir, jr) of the R signal is observed at the gravitational center of the pixel R(jr−1)(ir−1) as shown in the figure as a black square. In the same way, for a pixel B(jb−1) (ib−1) on the third taken image, a pixel value Bobs (3, ib, jb) of the B signal is observed at the gravitational center of the pixel B(jb−1)(ib−1) as shown in the figure as a black triangle.

As described above, the pixel value of every pixel on the third taken image is observed at the gravitational position of the pixel in the coordinate system of the third taken image as is the case with the first taken image. To be more specific, the pixel value of a pixel located at the intersection of the ith column and the jth row is observed at the position (i−1, j−1).

The coordinates of a pixel (or a point) on the third taken image can also be transformed into the coordinates of a pixel (or a point) on the first taken image in an affine transformation process expressed by Eq. (2) using the transformation parameters ($a_3$, $b_3$, $c_3$, $d_3$, $s_3$ and $t_3$) found by the motion-vector detection circuit $23_2$ in the same way as the second taken image.

FIG. 7 also shows the gravitational positions on the first taken image as a result of the process to transform the coordinates of the gravitational positions included in the third taken image as described above as the gravitational positions of pixels having pixel values Gobs (3, ig, jg), Robs (3, ir, jr) and Bobs (3, ib, jb).

To put it in detail, the pixel value Gobs (3, ig, jg) of the G signal for the pixel G(jg−1)(ig−1) in the coordinate system of the third taken image is also the light quantity Lg (x, y) (that should be) observed at the position (ig−1, jg−1) transformed into the position ((ig−1)$_{(3)}$, (jg−1)$_{(3)}$) in the coordinate system of the first taken image as the light quantity of the green color. That is to say, the coordinates ((ig−1)$_{(3)}$, (jg−1)$_{(3)}$) are coordinates obtained as a result of an affine transformation process to transform the coordinates of a position (ig−1, jg−1) in the coordinate system of the third taken image by using the transformation parameters ($a_3$, $b_3$, $c_3$, $d_3$, $s_3$ and $t_3$) found by the motion-vector detection circuit $23_2$. In the two-dimensional layout shown in FIG. 7, the position ((ig−1)$_{(3)}$, (jg−1)$_{(3)}$) included in the coordinate system of the first taken image as a position with its coordinates resulting from the affine transformation process to transform the coordinates of the position producing the pixel value Gobs (3, ig, jg) of the G signal is shown as a white circle.

By the same token, the pixel value Robs (3, ir, jr) of the R signal for the pixel R(jr−1)(ir−1) in the coordinate system of the third taken image is also the light quantity Lr (x, y) (that should be) observed at the position (ir−1, jr−1) transformed into the position ((ir−1)$_{(3)}$, (jr−1)$_{(3)}$) in the coordinate system of the first taken image as the light quantity of the red color. That is to say, the coordinates ((ir−1)$_{(3)}$, (jr−1)$_{(3)}$) are coordinates obtained as a result of an affine transformation process to transform the coordinates of a position (ir−1, jr−1) in the coordinate system of the third taken image by using the transformation parameters ($a_3$, $b_3$, $c_3$, $d_3$, $s_3$ and $t_3$) found by the motion-vector detection circuit $23_2$. In the two-dimensional layout shown in FIG. 7, the position ((ir−1)$_{(3)}$, (jr−1)$_{(3)}$) included in the coordinate system of the first taken image as a position with its coordinates resulting from the affine transformation process to transform the coordinates of the position producing the pixel value Robs (3, ir, jr) of the R signal is shown as a white square.

In the same way, the pixel value Bobs (3, ib, jb) of the B signal for the pixel B(jb−1)(ib−1) in the coordinate system of the third taken image is also the light quantity Lb (x, y) (that should be) observed at the position (ib−1, jb−1) transformed into the position ((ib−1)$_{(3)}$, (jb−1)$_{(3)}$) in the coordinate system of the first taken image as the light quantity of the blue color. That is to say, the coordinates ((ib−1)$_{(3)}$, (jb−1)$_{(3)}$) are coordinates obtained as a result of an affine transformation process to transform the coordinates of a position (ib−1, jb−1) in the coordinate system of the third taken image by using the transformation parameters ($a_3$, $b_3$, $c_3$, $d_3$, $s_3$ and $t_3$) found by the motion-vector detection circuit $23_2$. In the two-dimensional layout shown in FIG. 7, the position (($ib-1$)$_{(3)}$, ($jb-1$)$_{(3)}$) included in the coordinate system of the first taken image as a position with its coordinates resulting from the affine transformation process to transform the coordinates of the position producing the pixel value Bobs (3, ib, jb) of the B signal is shown as a white triangle.

Figure 8:
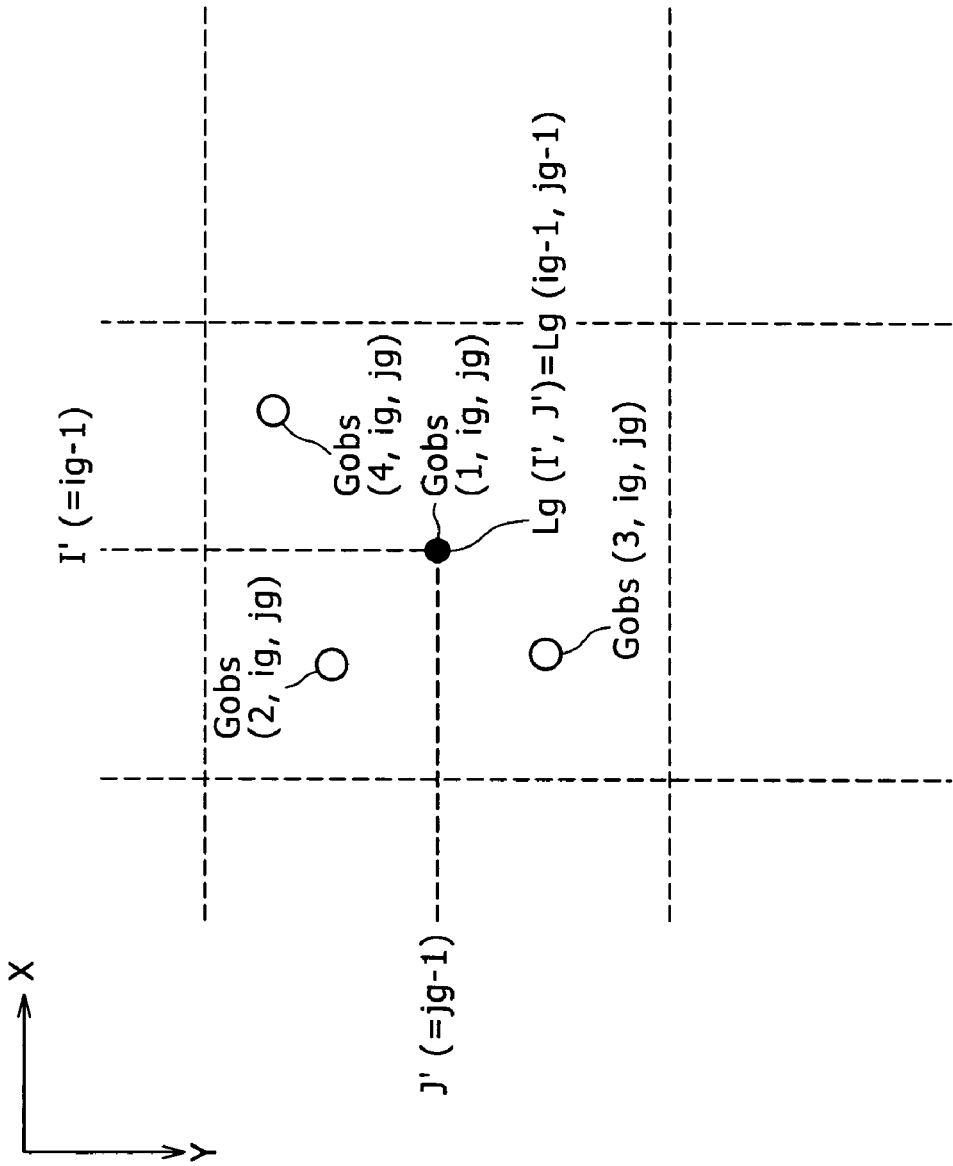
FIG. 8 is an explanatory diagram showing pixel values related to the first taken image in a coordinate system.

FIG. 8 is an explanatory diagram showing positions included in the coordinate system of the first taken image as destination positions with coordinates resulting from an affine transformation process to transform the coordinates of source positions, at which pixel values Gobs (1, ig, jg) to Gobs (N, ig, jg) of pixels G(jg−1)(ig−1) located on the first to Nth taken images respectively as pixels of the green color (or pixels each receiving a light beam of the green color) are observed, in a process to map the source position of each pixel on each of the N taken images onto the destination position on the first taken image serving as the reference image by carrying out the affine transformation process to transform the coordinates of the source position into the coordinates of the destination position so as to make photographing-object portions projected on each of the N taken images coincide with the photographing-object portion projected on the reference image.

Let us pay attention to coordinates (I', J') in the coordinate system of the first taken image shown in FIG. 8. Typical pixels on the first to Nth taken images are located at positions with their coordinates transformed into the coordinates of the position represented by the coordinates (I', J') and the coordinates of positions around the position represented by the coordinates (I', J') as pixels of the green color (or pixels each receiving a light beam of the green color). The pixel value Gobs (1, ig, jg) of the first taken image is a pixel value observed at the gravitational position (or the center) of a typical pixel G(jg−1)(ig−1) located at the intersection of the ith column and the jth row on the first taken image. In this case, the coordinates (I', J') satisfy the following equations: I'=ig−1, J'=jg−1. At a position on the upper/left side of the center of the pixel G(jg−1)(ig−1), a pixel value Gobs (2, ig, jg) of a pixel on the second taken image is observed as a pixel value of a typical pixel, the coordinates of the position of which are transformed in an affine transformation process into the coordinates of a position close to the position represented by the coordinates (I', J') in the coordinate system of the first taken image. In addition, at a position on the lower/left side of the center of the pixel G(jg−1)(ig−1), a pixel value Gobs (3, ig, jg) of a pixel on the third taken image is observed as a pixel value of a typical pixel, the coordinates of the position of which are transformed in an affine transformation process into the coordinates of a position close to the position represented by the coordinates (I', J') in the coordinate system of the first taken image. Furthermore, at a position on the upper/right side of the center of the pixel G(jg−1)(ig−1), a pixel value Gobs (4, ig, jg) of a pixel on the fourth taken image is observed as a pixel value of a typical pixel, the coordinates of the position of which are transformed in an affine transformation process into the coordinates of a position close to the position represented by the coordinates (I', J') in the coordinate system of the first taken image. It is to be noted that a pixel value Gobs (k, ig, jg) of a pixel on the kth taken image where k=5 to N is not shown in the figure.

The processing circuit 24 carries out an affine transformation process to transform the coordinates of the positions of pixels on the first to Nth taken images to the coordinates of the positions of pixels on the first taken image. Then, on the basis of pixel values Gobs (k, ig, jg) of the pixels, the coordinates of the positions of which have each been subjected to the affine transformation process, the processing circuit 24 infers the green-color light quantity Lg (i−1, j−1) of a pixel at coordinates in the coordinate system of the first taken image as the pixel value of the G signal at the position (i−1, j−1) on the output image where k=1 to N.

In this case, let notation (I', J') in the coordinate system of the first taken image serving as the reference image denote the coordinates of the center position (i−1, j−1) of a pixel located at the intersection of the ith column and the jth row. That is to say, the coordinates (I', J') satisfy the following equations: I'=i−1, J'=j−1. It is to be noted that notations I' and J' are each an integer at least equal to 0.

Figure 9:
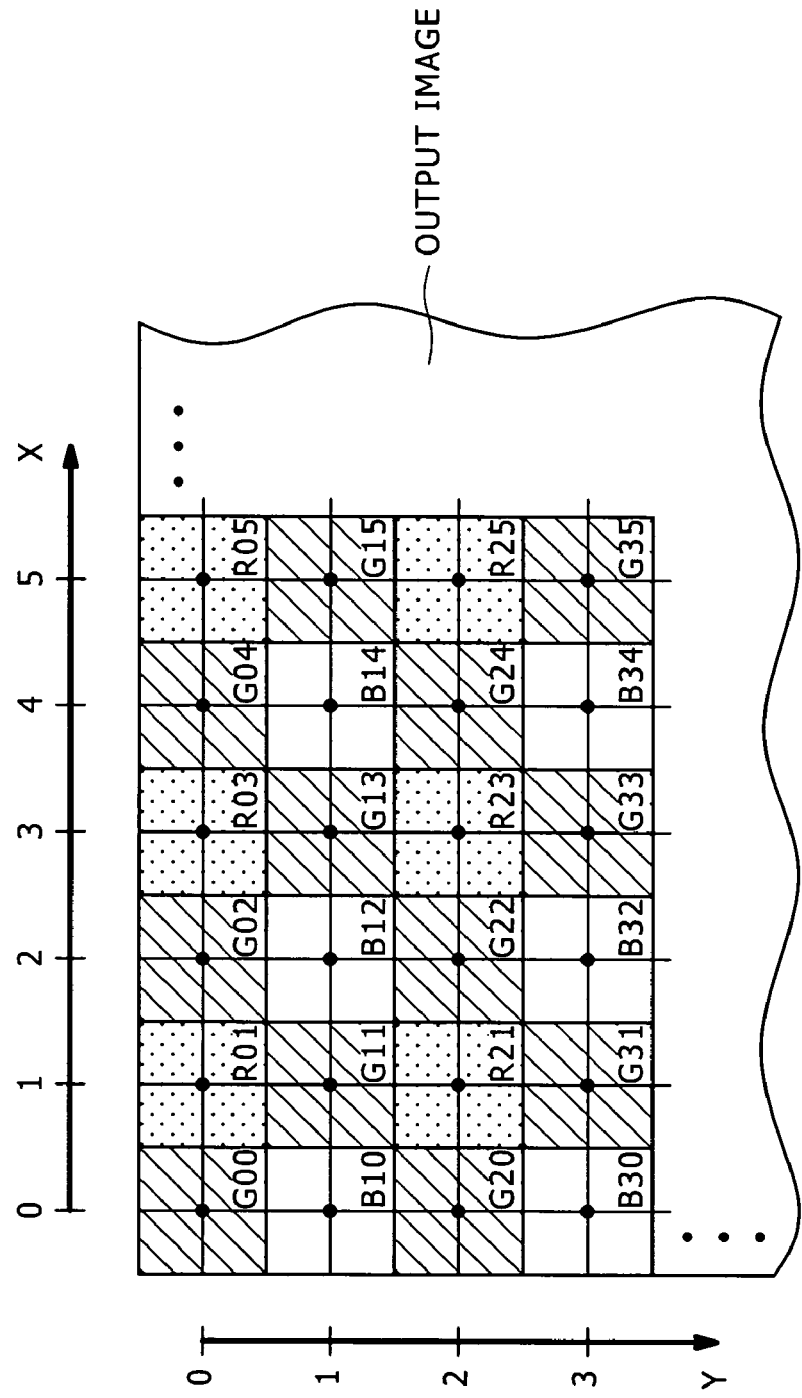
FIG. 9 is a diagram showing an output image.

FIG. 9 is a diagram showing positions in the coordinate system of the first taken image as positions at which the processing circuit 24 should infer the true green-color light quantity Lg (I', J'), the true red-color light quantity Lr (I', J') and the true blue-color light quantity Lb (I', J') as pixel values of pixels on the output image.

In the two-dimensional array shown in FIG. 9, the center position (I', J') of each pixel on the output image (that is, the center position (I', J') included in the coordinate system of the first taken image as the center position (I', J') of each pixel on the image-pickup device 4), is shown as a black circle representing a position at which the light quantity Lg (I', J') of the green color, the light quantity Lr (I', J') of the red color or the light quantity Lb (I', J') of the blue color should be inferred. That is to say, at the center positions (I', J') each shown by a black circle as the center position (I', J') of each pixel, the light quantity Lg (I', J') of the green color, the light quantity Lr (I', J') of the red color and the light quantity Lb (I', J') of the blue color can be inferred.

In the following description, the coordinate system of the reference image is referred to as a reference coordinate system. Since the first taken image is adopted as the reference image, the coordinate system of the first taken image is referred to as the reference coordinate system.

As described above, the processing circuit 24 carries out an affine transformation process to transform the coordinates of the positions of pixels on the first to Nth taken images to the coordinates of the positions of pixels on the first taken image. Then, on the basis of pixel values Gobs (k, ig, jg) of the pixels, the coordinates of the positions of which have each been subjected to the affine transformation process, the processing circuit 24 infers the green-color light quantity Lg (I', J') of a pixel at the position (I', J') in the reference coordinate system as the pixel value of the G signal at the position (I', J') on the output image where k=1 to N.

If the processing circuit 24 infers the green-color light quantity Lg (I', J') of a pixel at the position (I', J') in the reference coordinate system as the pixel value of the G signal at the position (I', J') on the output image on the basis of all pixel values Gobs (k, ig, jg) of the pixels located on the first to Nth taken images as pixels, the coordinates of the positions of which have each been subjected to the affine transformation process, however, the precision of the inference will deteriorate.

In order to solve this problem, the processing circuit 24 identifies only pixels located on the first to Nth taken images as pixels, the coordinates of which are transformed into coordinates of pixels in close proximity to the position (I', J'). The processing circuit 24 then takes the identified pixels as pixels to be used for inference of a pixel value of the output image, that is, for inference of the light quantity Lg (I', J') of the green color. The identified pixels located on the first to Nth taken images are pixels, the positions of which correspond to locations in close proximity to the position (I', J') as indicated by a result of the affine transformation process to transform coordinates in the coordinate systems of the first to Nth taken images into coordinates in the reference coordinate system. The position (I', J') is a position at which an attempt is made to infer the light quantity Lg (I', J') of the green color by using the pixel values Gobs (k, ig, jg) of the G signals of the identified pixels located on the first to Nth taken images.

Figure 10:
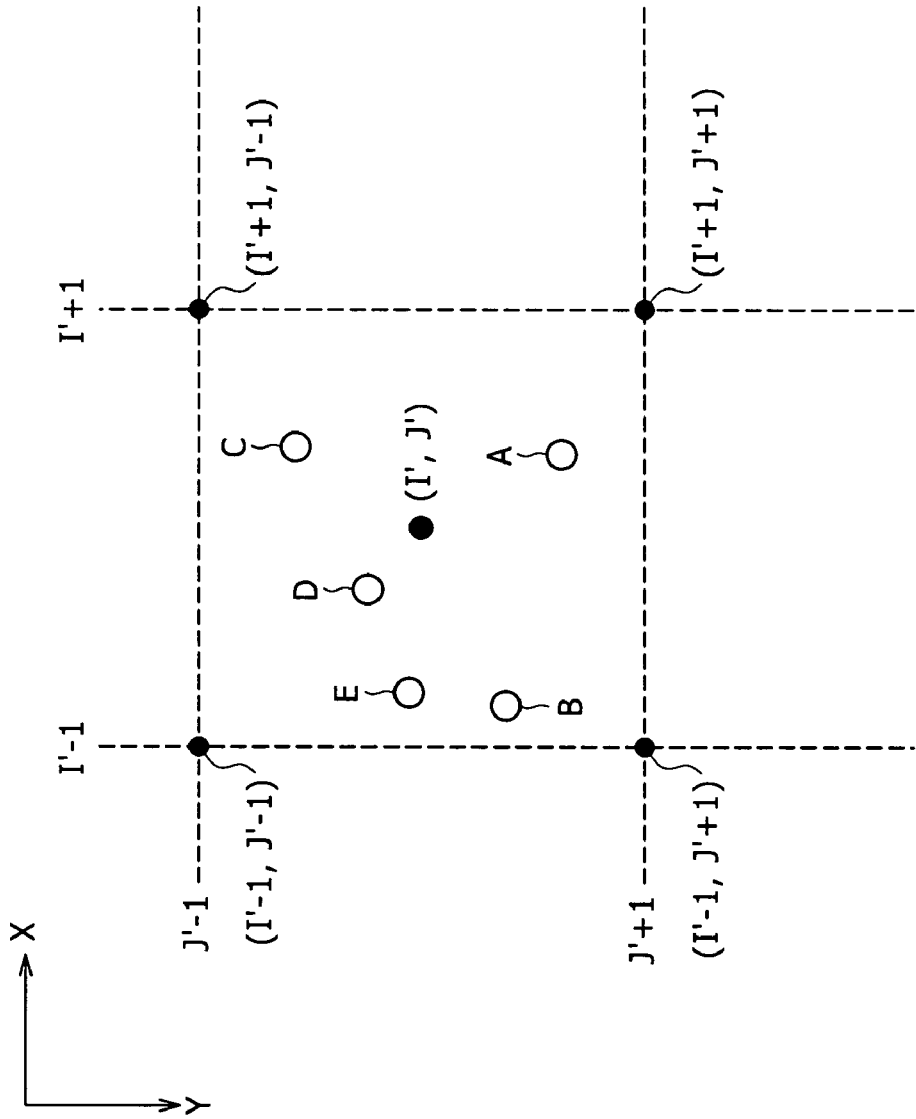
FIG. 10 is a diagram showing a reference coordinate system including plotted positions of pixels.

FIG. 10 is a diagram showing the reference coordinate system including plotted positions of pixels located on the first to Nth taken images as pixels to be used by the processing circuit 24 to infer the light quantity Lg (I', J') of the green color.

The processing circuit 24 sets a range surrounding a position (I', J') in the reference coordinate system as a range of values of x and y, which satisfy the relations I'−1≦x<I'+1 and J'−1≦y<J'+1. This range is referred to as a range close to the position (I', J') or a vicinity range of the position (I', J'). Then, the processing circuit 24 identifies pixels located on the first to Nth taken images as pixels having their positions mapped onto positions in the vicinity range of the position (I', J'). The processing circuit 24 takes the identified pixels as pixels to be used for inference of the light quantity Lg (I', J') of the green color. The pixels located on the first to Nth taken images as pixels having their positions mapped onto positions in the vicinity range of the position (I', J') are pixels, the positions of which correspond to locations in the vicinity range of the position (I', J') as indicated by a result of the affine transformation process to transform coordinates in the coordinate systems of the first to Nth taken images into coordinates in the reference coordinate system. That is to say, for the position (I', J'), the processing circuit 24 finds all sets of integers (k, ig and jg) in which the integer k is a sequence number assigned to a taken image associated with transformation parameters ($a_k$, $b_k$, $c_k$, $d_k$, $s_k$ and $t_k$) used in an affine transformation process to transform a position (ig−1, jg−1) in the coordinate system of the kth taken image into the position (x, y) located in the reference coordinate system as a post-transformation position with the coordinates (x, y) thereof satisfying the relations I'−1≦x<I'+1 and J'−1≦y<J'+1 expressing relations with the coordinates (I', J').

In the coordinate system shown in FIG. 10, as positions with their coordinates subjected to an affine transformation process to transform the coordinates into the aforementioned coordinates (x, y) in the reference coordinate system, there are five points A, B, C, D and E on the first to Nth taken images. Thus, the processing circuit 24 identifies pixels located at the points A, B, C, D and E on the first to Nth taken images as pixels with their positional coordinates subjected to an affine transformation process, being transformed into the coordinates (x, y) satisfying the relations described above. The processing circuit 24 then uses the pixels in a process to infer the light quantity Lg (I', J') of the green color.

To be more specific, the processing circuit 24 uses pixel values Gobs (k, ig, jg) observed at the points A, B, C, D and E on the first to Nth taken images to infer the light quantity Lg (I', J') of the green color at the point (I', J'). To put it in detail, the processing circuit 24 uses G-signal pixel values Gobs (k, ig, jg) of pixels located at the points A, B, C, D and E on the first to Nth taken images as pixels with their positional coordinates subjected to an affine transformation process, being transformed into the coordinates (x, y), in order to infer the light quantity Lg (I', J') of the green color at the point (I', J').

Figure 11:
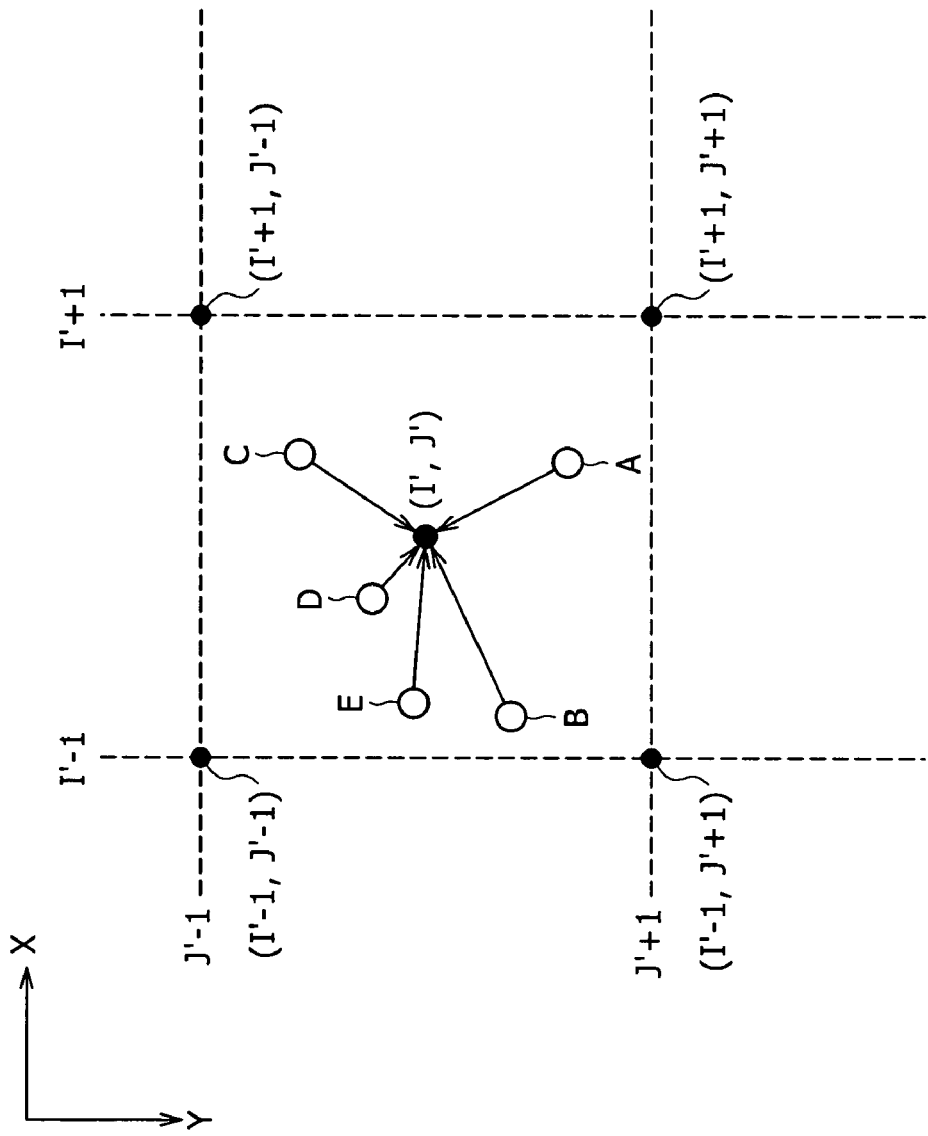
FIG. 11 is an explanatory diagram referred to in explanation of a process to infer the light quantity Lg (I', J') of the green color at a position (I', J').

FIG. 11 is an explanatory diagram showing a model of a process to infer the light quantity Lg (I', J') of the green color at a position (I', J') by using the pixel values Gobs (k, ig, jg) observed at the points A to E.

Typically, the processing circuit 24 infers the light quantity Lg (I', J') by using the following equation:

[Eq. (4)]

$$Lg(I', J') = \frac{\Sigma\{w((x, y), (I', J')) \times Gobs(k, ig, jg)\}}{\Sigma w((x, y), (I', J'))} \quad (4)$$

Notation Σ in Eq. (4) for the green color denotes a sum computed for a position (I', J') with respect to all sets of integers (k, ig and jg) in which the integer k is a sequence number assigned to a taken image associated with transformation parameters ($a_k$, $b_k$, $c_k$, $d_k$, $s_k$ and $t_k$) used in an affine transformation process to transform a position (ig−1, jg−1) in the coordinate system of the kth taken image into the position (x, y) located in the reference coordinate system as a post-transformation position with the coordinates (x, y) thereof satisfying the relations I'−1≦x<I'+1 and J'−1≦y<J'+1 expressing relations with the coordinates (I', J'). In the typical cases shown in FIGS. 10 and 11, for example, the sum is computed with respect to five sets of integers (k, ig and jg) corresponding to the five points A to E.

In addition, the term w ((x, y), (I', J')) in Eq. (4) is a weight having the position (x, y) and the pixel position (I', J') as arguments. The position (x, y) is a position included in the reference coordinate system as a position with its coordinates resulting from an affine transformation process to transform the coordinates of a position (ig−1, jg−1) by using the transformation parameters ($a_k$, $b_k$, $c_k$, $d_k$, $s_k$ and $t_k$). On the other hand, the pixel position (I', J') is a position, the quantity light Lg (I', J') of the green color at which is to be inferred.

Thus, in accordance with Eq. (4), the light quantity Lg (I', Y') of the green color is inferred as a quotient obtained by dividing the sum of weighted pixel values by the sum of weights, where each of the weighted pixel values is a product obtained by multiplying an actually observed pixel value Gobs (k, jg, ig) by one of the weights. In the following description, Eq. (4) is referred to as a weighed addition equation for the light quantity of the green color.

The weight w ((x, y), (I', J')) can be typically a value monotonously decreasing in proportion to the distance between the position (x, y) and the position (I', J'). The distance between the position (x, y) and the position (I', J') can be expressed as a function of coordinates (x, y) and (I', J') as follows:

$$F((x,y),(I',J')) = \sqrt{\{(x-I')^2 + (y-J')^2\}}$$

In this case, as a value monotonously decreasing in proportion to the distance between the position (x, y) and the position (I', J'), for example, the value of the following expression can be used:

$$\sqrt{2} - F((x,y),(I',J'))$$

The term √2 of the expression √2−F ((x, y), (I', J')) is a maximum distance between the position (x, y) and the position (I', J'), which is the center of a range defined by boundaries (I'±1) and (J'±1) as a range including positions (x, y), the coordinates of which are obtained as a result of transforming coordinates (ig−1, jg−1) of a pixel with its pixel values Gobs (k, ig, jg) used for inferring the green-color light quantity Lg (I', J') at the center (I', J') as shown in FIGS. 10 and 11. Thus, the expression √2−F ((x, y), (I', J')) is a non-negative function monotonously decreasing in proportion to the distance between the position (x, y) and the position (I', J').

If the expression √2−F ((x, y), (I', J')) is used as the weight w ((x, y), (I', J')), the pixel value Gobs (k, ig, jg) of a pixel in close proximity to the position (I', J') has a great effect on the inferred green-color light quantity Lg (I', J') at the position (I', J') in such a way that, the closer the pixel to the position (I', J'), the greater the effect of the pixel value Gobs (k, ig, jg) of the pixel on the inferred green-color light quantity Lg (I', J') at the position (I', J').

It is to be noted that, as described earlier by referring to FIG. 1, the shift circuit 21 carries out a gain-up process with a magnification of $M_k$ on the image signal output by the correlation double sampling circuit 5 by shifting the image signal by n' bits. Thus, noise components included in the image signal are also multiplied by $M_k$. As a result, the resulting pixel value Gobs (k, ig, jg) includes noise components with a magnitude of $E \times M_k$ where notation E denotes the magnitude of the noise components included in the image signal output by the correlation double sampling circuit 5.

In the process to infer the light quantity Lg (I', J') of the green color, the effect of the noise components included in the pixel value Gobs (k, ig, jg) should be eliminated. From this noise-elimination point of view, it is thus desirable to use a weight w ((x, y), (I', J')) that reduces magnitude $E \times M_k$ of the noise components included in the pixel value Gobs (k, ig, jg). Accordingly, it is desirable to use a weight w ((x, y), (I', J')) that decreases in proportion to the distance between the position (x, y) and the position (I', J') and decreases in proportion to the magnitude $E \times Mk$ of the noise components included in the pixel value Gobs (k, ig, jg). An example of such a weight w ((x, y), (I', J')) is a weight represented by the expression $\{\sqrt{2} - F((x, y), (I', J'))\}/(E \times M_k)$.

In addition, as another example of the weight w ((x, y), (I', J')), it is possible to use a function having the characteristics of a low-pass filter for the distance between the position (x, y) and the position (I', J') as will be described later.

The processing circuit 24 infers a light quantity Lr (I', J') of the red color at the point (I', J') and a light quantity Lb (I', J') of the blue color at the point (I', J') in the same way as the process to infer a light quantity Lg (I', J') of the green color at the point (I', J'). That is to say, the processing circuit 24 infers a light quantity Lr (I', J') of the red color at the point (I', J') and a light quantity Lb (I', J') of the blue color at the point (I', J') in accordance with Eqs. (5) and (6) given below in the same way as with Eq. (4).

[Eq. (5)]
$$Lr(I', J') = \frac{\Sigma\{w((x, y), (I', J')) \times Robs(k, ir, jr)\}}{\Sigma w((x, y), (I', J'))} \quad (5)$$

[Eq. (6)]
$$Lb(I', J') = \frac{\Sigma\{w((x, y), (I', J')) \times Bobs(k, ib, jb)\}}{\Sigma w((x, y), (I', J'))} \quad (6)$$

Notation Σ in Eq. (5) denotes a sum computed for a position (I', J') with respect to all sets of integers (k, ir and jr) in which the integer k is a sequence number assigned to a taken image associated with transformation parameters ($a_k$, $b_k$, $c_k$, $d_k$, $s_k$ and $t_k$) used in a transformation process to transform a position (ir−1, jr−1) in the coordinate system of the kth taken image into the position (x, y) located in the reference coordinate system as a post-transformation position with the coordinates (x, y) thereof satisfying the relations I'−1≦x<I'+1 and J'−1≦y<J'+1 expressing relations with the coordinates (I', J'). By the same token, notation Σ in Eq. (6) denotes a sum computed for a position (I', J') with respect to all sets of integers (k, ib and jb) in which the integer k is a sequence number assigned to a taken image associated with transformation parameters ($a_k$, $b_k$, $c_k$, $d_k$, $s_k$ and $t_k$) used in a transformation process to transform a position (ib−1, jb−1) in the coordinate system of the kth taken image into the position (x, y) located in the reference coordinate system as a post-transformation position with the coordinates (x, y) thereof satisfying the relations I'−1≦x<I'+1 and J'−1≦y<J'+1 expressing relations with the coordinates (I', J').

In the following description, Eq. (5) is properly referred to as the weighted addition equation of the light quantity of the red color whereas Eq. (6) is properly referred to as the weighted addition equation of the light quantity of the blue color.

As described above, for the position (I', J'), the processing circuit 24 identifies pixels each expressed by a set of integers (k, i and j) in which the integer k is a sequence number assigned to a taken image associated with transformation parameters ($a_k$, $b_k$, $c_k$, $d_k$, $s_k$ and $t_k$) used in an affine transformation process to transform a position (i−1, j−1) in the coordinate system of the kth taken image into the position (x, y) located in the reference coordinate system as a post-transformation position with the coordinates (x, y) thereof satisfying the relations I'−1≦x<I'+1 and J'−1≦y<J'+1 expressing relations with the coordinates (I', J'). In the following description, the identified pixels are properly referred to as identified pixels. Then, the processing circuit 24 finds (or infers) the light quantity Lg (I', J') of the green color, the light quantity Lr (I', J') of the red color and the light quantity Lb (I', J') of the blue color on the basis of pixel values of the identified pixels.

Figure 12:
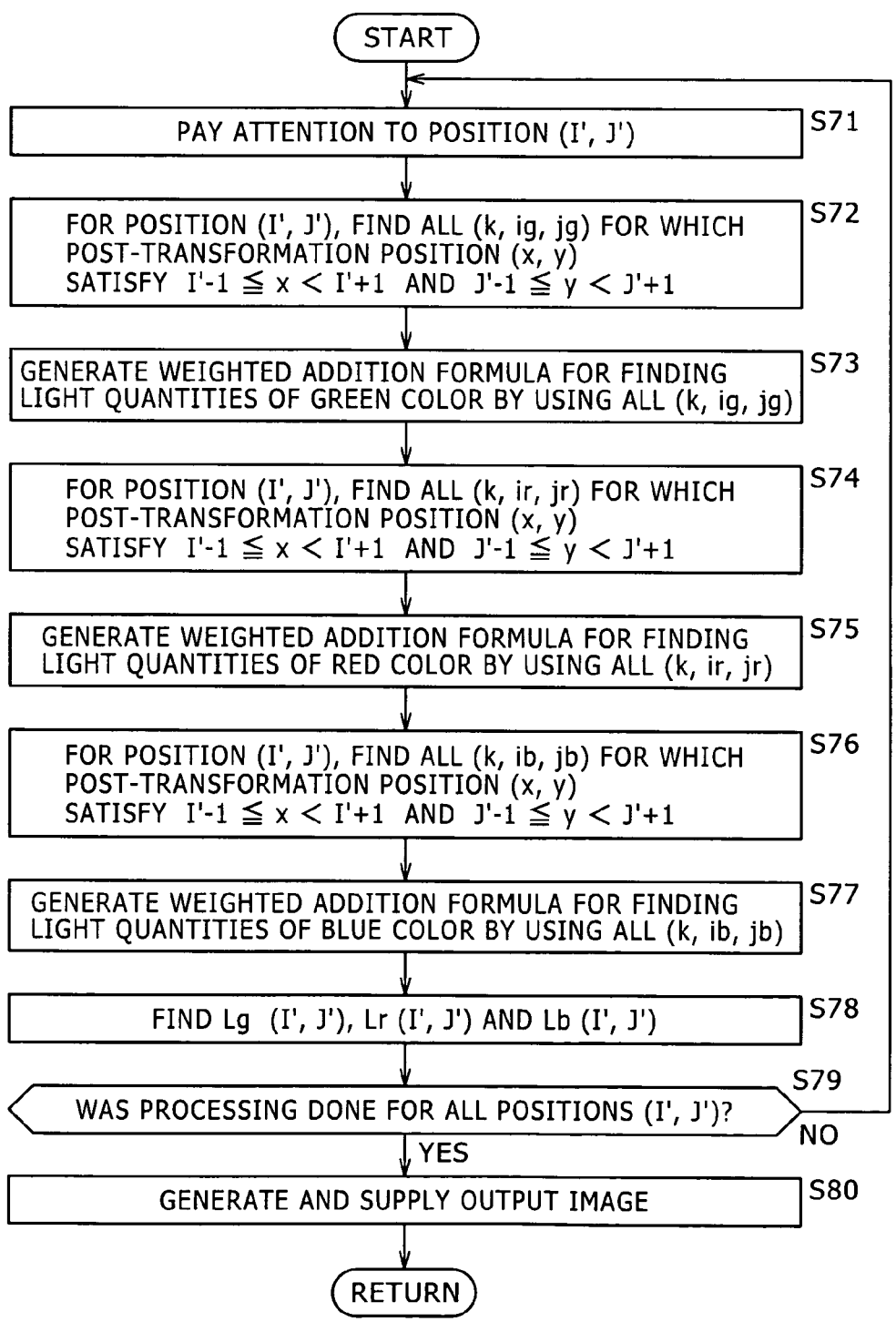
FIG. 12 shows a flowchart referred to in explanation of processing to generate an image.

By referring to a flowchart shown in FIG. 12, the following description explains the image generation processing carried out at the step S4 of the flowchart of FIG. 2 to generate an output image by inferring pixel values (that is, the light quantity of the green color, the red color and the blue color) as described above.

The flowchart begins with a step S71 at which the processing circuit 24 pays attention to a position (I', J') in the reference coordinate system. In the following description, the position (I', J') to which attention is paid is referred to an observed position (I', J'). The observed position (I', J') represents the center of a pixel (i−1, j−1) at the intersection of the ith column and the jth row of the first taken image, which is the reference image.

Then, the flow of the image generation processing goes on from the step S71 to a step S72. At this step, for the position (I', J'), the processing circuit 24 finds a set of integers (k, ig and jg) for each of the first to Nth taken images as a set of integers (k, ig and jg) in which the integer k is a sequence number assigned to a taken image associated with transformation parameters ($a_k$, $b_k$, $c_k$, $d_k$, $s_k$ and $t_k$) used in an affine transformation process to transform a position (ig−1, jg−1) in the coordinate system of the kth taken image into the position (x, y) located in the reference coordinate system as a post-transformation position with the coordinates (x, y) thereof satisfying the relations I'−1≦x<I'+1 and J'−1≦y<J'+1 expressing relations with the coordinates (I', J'). Then, the processing circuit 24 identifies a pixel located at the position (ig−1, jg−1) on the kth taken image as a pixel associated with the set of integers (k, ig and jg). Subsequently, the flow of the image generation processing goes on to the next step S73.

It is to be noted that the motion-vector detection circuit $23_{k-1}$ provides the processing circuit 24 with the transformation parameters ($a_k$, $b_k$, $c_k$, $d_k$, $s_k$ and $t_k$) used in an affine transformation process to transform the position (ig−1, jg−1) of the identified pixel in the coordinate system of the kth taken image into the position (x, y) in the reference coordinate system. For k=1, the set of integers (k, ig and jg) is associated with the first taken image, which is associated with transformation parameters ($a_1$, $b_1$, $c_1$, $d_1$, $s_1$ and $t_1$) having values of (1, 0, 0, 1, 0, 0). Thus, the position in the reference coordinate system is virtually not subjected to an affine transformation process.

In the following description, the position (x, y) obtained as a result of an affine transformation process to transform the position of a pixel on a kth taken image is properly referred to as a post-transformation position (x, y).

At the step S73, the processing circuit 24 creates a weighted addition equation expressed by Eq. (4) as a weighted addition equation for finding the light quantity of the green color by using all integer sets (k, ig and jg) found at the step S72. Then, the flow of the image generation processing goes on to the next step S74. To put in detail, by using the pixel values Gobs (k, ig, jg) of the identified pixels represented by all the integer sets (k, ig and jg) found at the step S72, the processing circuit 24 finds the value of the denominator $\Sigma w((x, y), (I', J'))$ of the expression on the right side of Eq. (4) representing a weighted addition equation for finding the light quantity of the green color and the value of the numerator $\Sigma\{w((x,y), (I', J'))\times\text{Gobs}(k, ig, jg)\}$ of the expression.

At the step S74, for the position (I', J'), the processing circuit 24 finds a set of integers (k, ir and jr) for each of the first to Nth taken images as a set of integers (k, ir and jr) in which the integer k is a sequence number assigned to a taken image associated with transformation parameters ($a_k$, $b_k$, $c_k$, $d_k$, $s_k$ and $t_k$) used in an affine transformation process to transform a position (ir−1, jr−1) in the coordinate system of the kth taken image into the position (x, y) located in the reference coordinate system as a post-transformation position with the coordinates (x, y) thereof satisfying the relations I'−1≦x<I'+1 and J'−1≦y<J'+1 expressing relations with the coordinates (I', J'). Then, the processing circuit 24 identifies a pixel located at the position (ir−1, jr−1) on the kth taken image as a pixel associated with the set of integers (k, ir and jr). Subsequently, the flow of the image generation processing goes on to the next step S75.

At the step S75, the processing circuit 24 creates a weighted addition equation expressed by Eq. (5) as a weighted addition equation for finding the light quantity of the red color by using all integer sets (k, ir and jr) found at the step S74. Then, the flow of the image generation processing goes on to the next step S76. To put in detail, by using the pixel values Robs (k, ir, jr) of the identified pixels represented by all the integer sets (k, ir and jr) found at the step S74 and the post-transformation position (x, y), the processing circuit 24 finds the value of the denominator $\Sigma w((x, y), (I', J'))$ of the expression on the right side of Eq. (5) representing a weighted addition equation for finding the light quantity of the red color and the value of the numerator $\Sigma\{w((x, y), (I', J'))\times\text{Robs}(k, ir, jr)\}$ of the expression.

At the step S76, for the position (I', J'), the processing circuit 24 finds a set of integers (k, ib and jb) for each of the first to Nth taken images as a set of integers (k, ib and jb) in which the integer k is a sequence number assigned to a taken image associated with transformation parameters ($a_k$, $b_k$, $c_k$, $d_k$, $s_k$ and $t_k$) used in an affine transformation process to transform a position (ib−1, jb−1) in the coordinate system of the kth taken image into the position (x, y) located in the reference coordinate system as a post-transformation position with the coordinates (x, y) thereof satisfying the relations I'−1≦x<I'+1 and J'−1≦y<J'+1 expressing relations with the coordinates (I', J'). Then, the processing circuit 24 identifies a pixel located at the position (ib−1, jb−1) on the kth taken image as a pixel associated with the set of integers (k, ib and jb). Subsequently, the flow of the image generation processing goes on to the next step S77.

At the step S77, the processing circuit 24 creates a weighted addition equation expressed by Eq. (6) as a weighted addition equation for finding the light quantity of the blue color by using all integer sets (k, ib and jb) found at the step S76. Then, the flow of the image generation processing goes on to the next step S78. To put in detail, by using the pixel values Bobs (k, ib, jb) of the identified pixels represented by all the integer sets (k, ib and jb) found at the step S76 and the post-transformation position (x, y), the processing circuit 24 finds the value of the denominator $\Sigma w((x, y), (I', J'))$ of the expression on the right side of Eq. (6) representing a weighted addition equation for finding the light quantity of the blue color and the value of the numerator $\Sigma\{w((x, y), (I', J'))\times\text{Bobs}(k, ib, jb)\}$ of the expression.

At the step S78, the processing circuit 24 finds (or infers) the light quantity Lg (I', J') of the green color at the observed position (I', J') by dividing the value of the numerator $\Sigma\{w((x, y), (I', J'))\times\text{Gobs}(k, ig, jg)\}$ of the expression on the right side of Eq. (4) by the value of the denominator $\Sigma w((x, y), (I', J'))$ of the expression. The values of the numerator and the denominator have been found at the step S73. In addition, the processing circuit 24 finds (or infers) the light quantity Lr (I', J') of the red color at the observed position (I', J') by dividing the value of the numerator $\Sigma\{w((x, y), (I', J'))\times\text{Robs}(k, ir, jr)\}$ of the expression on the right side of Eq. (5) by the value of the denominator $\Sigma w((x, y), (I', J'))$ of the expression. The values of the numerator and the denominator have been found at the step S75. On top of that, the processing circuit 24 finds (or infers) the light quantity Lb (I', J') of the blue color at the observed position (I', J') by dividing the value of the numerator $\Sigma\{w((x, y), (I', J'))\times\text{Bobs}(k, ib, jb)\}$ of the expression on the right side of Eq. (6) by the value of the denominator $\Sigma w((x, y), (I', J'))$ of the expression. The values of the numerator and the denominator have been found at the step S77. Subsequently, the flow of the image generation processing goes on to the next step S79.

Thus, at the step S78, three pixel values of the G, R and B signals respectively at the position (I', J') on the output image are found.

At the step S79, the processing circuit 24 produces a result of determination as to whether or not all positions (I', J') have been observed, that is, whether or not the light quantity Lg (I', J') of the green color, the light quantity Lr (I', J') of the red color and the light quantity Lb (I', J') of the blue color have been found for the center points of all pixels on the output image or all pixels of the first taken image used as the reference image.

If the determination result produced at the step S79 indicates that not all positions (I', J') have been taken as an observed position, the flow of the image generation processing goes back to the step S71 to repeat the execution of the processes of the steps S71 to S79. That is to say, the processing circuit 24 takes a position (I', J'), which has not been observed yet, as a new observed position (I', J') and finds the light quantity Lg (I', J') of the green color, the light quantity Lr (I', J') of the red color and the light quantity Lb (I', J') of the blue color at the new observed position (I', J').

If the determination result produced at the step S79 indicates that all positions (I', J') have been taken as an observed position, on the other hand, the flow of the image generation processing goes on to the step S80. At the step S80, the processing circuit 24 generates (or obtains) an output image that has the light quantity Lg (I', J'), the light quantity Lr (I', J') and the light quantity Lb (I', J'), which have been found at the step S78 for the green color, the red color and the blue color respectively at every observed position (I', J'), as pixel values of the G, R and B signals respectively. The processing circuit 24 then supplies the output image to the D/A converter 9 or the codec 12 before returning control of the execution.

As described above, relations between the positions of a plurality of taken images obtained as a result of a high-speed image-pickup process are detected and, on the basis of the positional relations, a pixel on each of a plurality of taken images is identified for the position of each pixel on the output image as an identified pixel to be used for inference of the pixel value of the pixel on the output image. Then, on the basis of the pixel value of every identified pixel, the pixel value of the pixel on the output image is inferred. The processes to identify pixels and infer a pixel value of a pixel on the output image on the basis of the pixel values of the identified pixels are carried out for every pixel on the output image to generate the output image. Thus, it is possible to obtain a sharp output image with no effects of hand trembling.

In the above description, a weight w ((x, y), (I', J')) that decreases in proportion to the distance between the position (x, y) and the position (I', J') is taken as a weight in Eqs. (4) to (6) used for inferring the light quantity Lg (I', J') of the green color, the light quantity Lr (I', J') of the red color and the light quantity Lb (I', J') of the blue color respectively. An example of such a weight w ((x, y), (I', J')) is a weight represented by the expression $\{\sqrt{2}-F((x, y), (I', J'))\}$. As the weight w ((x, y), (I', J')), however, it is also possible to use a function provided with the characteristic of a low-pass filter as a characteristic with respect to the distance between the position (x, y) and the position (I', J').

An example of the function provided with the characteristic of a low-pass filter as a characteristic with respect to the distance between the position (x, y) and the position (I', J') is the expression Cubic (I'−x)×Cubic (J'−y) expressed in terms of the Cubic function.

Cubic (z) expressed by Eq. (7) below is a Cubic function.

[Eq. (7)]

$$\text{Cubic}(z) = \begin{cases} (a+2)|z|^3 - (a+3)|z|^2 + 1 & (|z| < 1) \\ a|z|^3 - 5a|z|^2 + 8a|z| - 4a & (1 \leq |z| < 2) \\ 0 & (2 \leq |z|) \end{cases} \quad (7)$$

It is to be noted that notation 'a' used in Eq. (7) is a constant determined in advance. An example of such a constant is −1.

Figure 13:
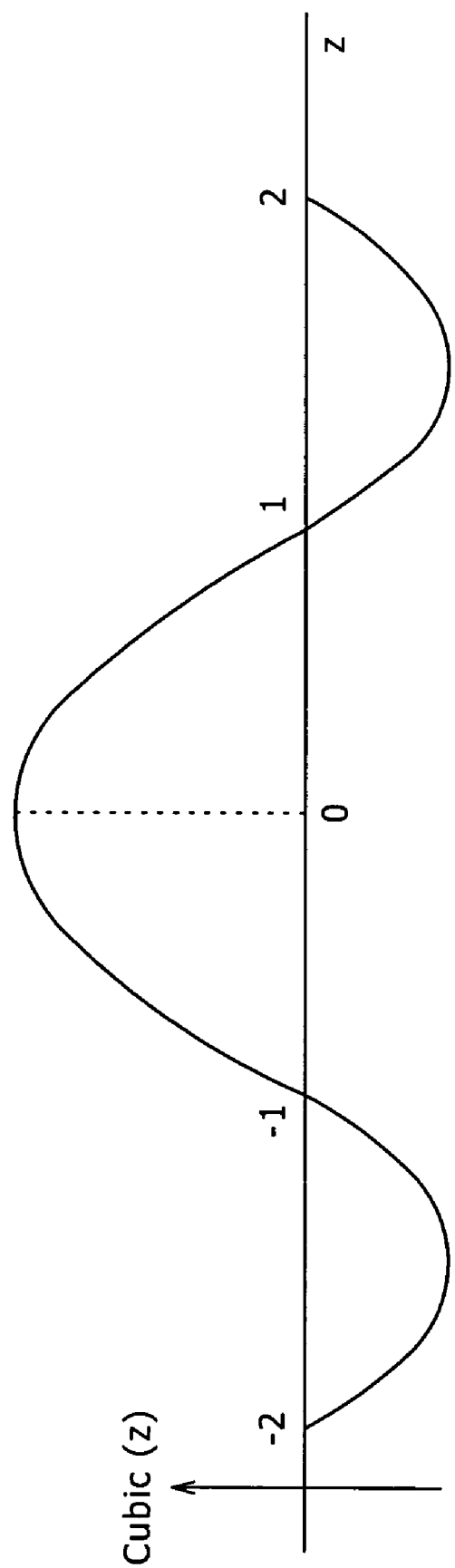
FIG. 13 is a diagram showing the waveform of a Cubic function.

FIG. 13 is a diagram showing the waveform of the Cubic function referred to as Cubic (z).

The value of the Cubic function referred to as Cubic (z) is 0 for the variable z satisfying the equations $2 \leq |z|$ and $|z|=1$. The value of the Cubic function referred to as Cubic (z) is negative for $1<|z|<2$ but the value of the Cubic function referred to as Cubic (z) is positive for $|z|<1$. In addition, as the value of |z| increases, the value of the Cubic function referred to as Cubic (z) decreases. In other words, the Cubic function referred to as Cubic (z) is a function having the characteristic of a low-pass filter if the axis representing the variable z serves as the frequency axis of a Fourier transformation process.

If the value of the Cubic function referred to as Cubic (z) is used as the weight w ((x, y), (I', J')), the processing circuit 24 employed in the signal processing circuit 7 shown in FIG. 4 infers the light quantity Lg (I', J') of the green color, the light quantity Lr (I', J') of the red color and the light quantity Lb (I', J') of the blue color as the pixel values of a pixel on the output image as follows.

Figure 14:
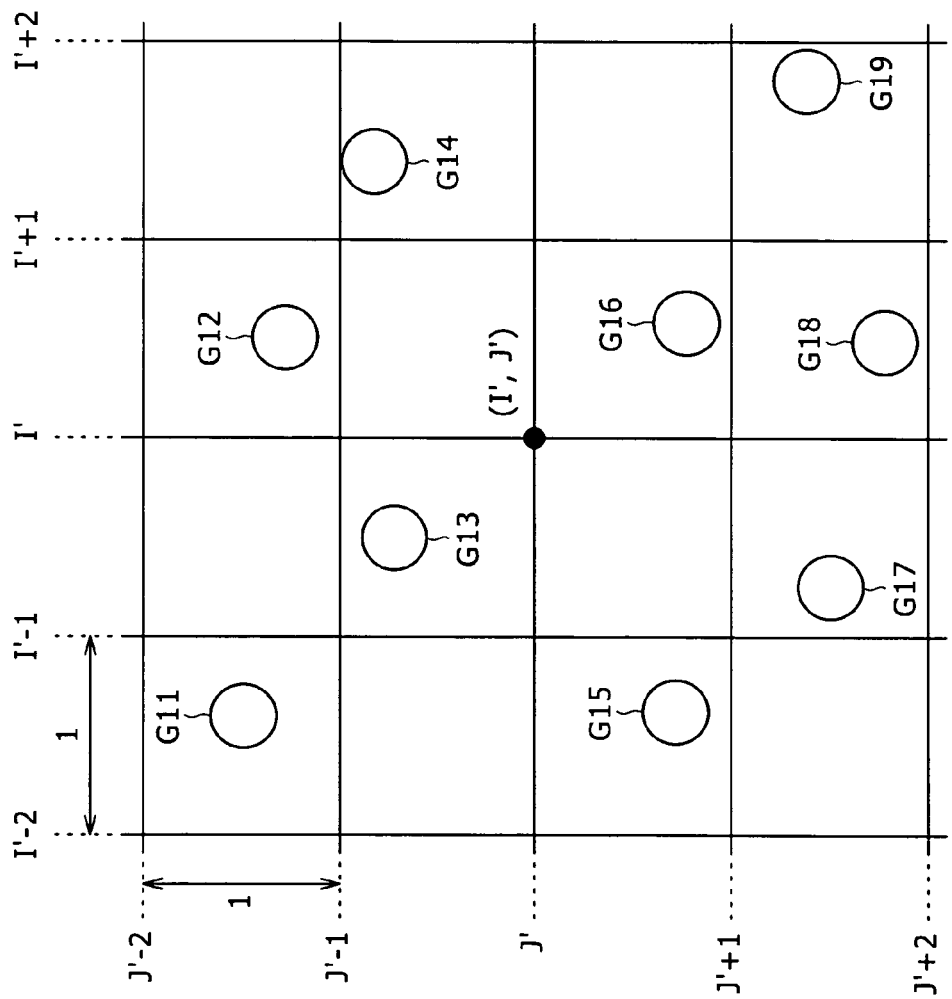
FIG. 14 is an explanatory diagram showing pixel values at positions in a reference coordinate system.

FIG. 14 is a diagram showing points G11 to G19 located on the reference coordinate system (or the coordinate system of the first taken image) as post-transformation positions (x, y) with the coordinates (x, y) obtained as a result of an affine transformation process to transform coordinates (ig−1, jg−1) of positions on the N taken images with respect to a position (I', J').

The points G11 to G19 coincide with the post-transformation positions (x, y) shown in FIG. 14 as positions with the coordinates (x, y) thereof satisfying conditions of I'−2≦x<I'+2 and J'−2≦y<J'+2. The processing circuit 24 identifies pixels on the first to Nth taken images as identified pixels located at positions transformed into the post-transformation positions (x, y) in the range I'−2≦x<I'+2 and J'−2≦y<J'+2, which is the vicinity range of the position I', J'.

That is to say, if the expression $\{\sqrt{2}-F((x, y), (I', J'))\}$ decreasing in proportion to the distance between the position (x, y) and the position (I', J') is taken as the weight w ((x, y), (I', J')), the range I'−1≦x<I'+1 and J'−1≦y<J'+1 is used as the vicinity range of the position (I', J') as shown in FIGS. 10 and 11. If the expression Cubic (I'−x)×Cubic (J'−y) expressed in terms of the Cubic function is taken as the weight w ((x, y), (I', J')), on the other hand, the range I'−2≦x<I'+2 and J'−2≦y<J'+2 is used as the vicinity range of the position (I', J') as shown in FIG. 14.

As described earlier, Cubic (z) shown in FIG. 7 as a Cubic function has a value according to the argument z for −2≦z≦+2 (even though Cubic (z) shown in FIG. 7 as a Cubic function has a value of 0 independently of the argument z for |z|>2). Thus, pixel values of pixels located at positions transformed into post-transformation positions (x, y) in the range I'−2≦x<I'+2 and J'−2≦y<J'+2 corresponding to the range −2≦−z≦+2 are used for inferring the pixel value at the position (I', J') on the output image.

On top of that, as the weight w ((x, y), (I', J')), it is also possible to adopt a function that has the characteristic of a low-pass filter with respect to the distance between the position (x, y) and the position (I', J') and decreases in proportion to the magnitude $E \times M_k$ of the noise components as explained earlier in the description of Eq. (4). In this case, the weight w ((x, y), (I', J')) is represented by the expression Cubic (I'−x)×Cubic (J'−y)/(E×$M_k$).

It is to be noted that, in the shift circuit 21 employed in the digital camera 1 shown in FIG. 1, if all the N taken images are subjected to a uniform gain-up process with a magnification M, the weight w ((x, y), (I', J')) is represented by the expression Cubic (I'−x)×Cubic (J'−y)/(E×M). In this case, the term 1/(E×M) of the weight w ((x, y), (I', J')) in the numerator and denominator of each of Eqs. (4) to (6) cancel each other. Thus, the use of the expression Cubic (I'−x)×Cubic (J'−y)/(E×M) as the weight w ((x, y), (I', J')) in computation of the expression on the right side of each of Eqs. 4 to 6 is equivalent to the use of the expression Cubic (I'−x)×Cubic (J'−y) as the weight w ((x, y), (I', J')).

Substituting the term Cubic (I'−x)×Cubic (J'−y) for the weight w ((x, y), (I', J')) in Eq. (4) results in Eq. (8) below:

[Eq. (8)]

$$Lg(I', J') = \frac{\sum \text{Cubic}(I' - x) \times \text{Cubic}(J' - y) \times Gobs(k, ig, jg)}{\sum \text{Cubic}(I' - x) \times \text{Cubic}(J' - y)} \quad (8)$$

Notation Σ in Eq. (8) denotes a sum computed for a position (I', J') with respect to all sets of integers (k, ig and jg) in which the integer k is a sequence number assigned to a taken image associated with transformation parameters ($a_k$, $b_k$, $c_k$, $d_k$, $s_k$ and $t_k$) used in an affine transformation process to transform a position (ig−1, jg−1) in the coordinate system of the kth taken image into the position (x, y) located in the reference coordinate system as a post-transformation position with the coordinates (x, y) thereof satisfying the relations I'−2≦x<I'+2 and J'−2≦y<J'+2 expressing relations with the coordinates (I', J'). In the typical case shown in FIG. 14, for example, the sum is computed with respect to sets of integers (k, ig and jg) corresponding to the 9 points G11 to G19.

It is to be noted that, much like Eq. (4), Eq. (8) is also referred to as a weighed addition equation for the light quantity of the green color. The numerator and denominator of Eq. 8 expressing the light quantity of the green color are rewritten as expressions (9) and (10) respectively as follows.

[(Eq. (9)]

$$\Sigma \text{Cubic}(I'-x) \times \text{Cubic}(J'-y) \times \text{Gobs}(k, ig, jg) \quad (9)$$

[Eq. (10)]

$$\text{Cubic}(I'-x) \times \text{Cubic}(J'-y) \quad (10)$$

By the same token, substituting the term Cubic (I'−x)× Cubic (J'−y) for the weight w ((x, y), (I', J')) in Eqs. (5) and (6) results in respectively Eq. (11) and (12) below.

[Eq. (11)]

$$Lr(I', J') = \frac{\sum \text{Cubic}(I'-x) \times \text{Cubic}(J'-y) \times \text{Robs}(k, ir, jr)}{\sum \text{Cubic}(I'-x) \times \text{Cubic}(J'-y)} \quad (11)$$

[Eq. (12)]

$$Lb(I', J') = \frac{\sum \text{Cubic}(I'-x) \times \text{Cubic}(J'-y) \times \text{Bobs}(k, ib, jb)}{\sum \text{Cubic}(I'-x) \times \text{Cubic}(J'-y)} \quad (12)$$

It is to be noted that, much like notation Σ in Eq. (5), notation Σ in Eq. (11) denotes a sum computed for a position (I', J') with respect to all sets of integers (k, ir and jr) in which the integer k is a sequence number assigned to a taken image associated with transformation parameters ($a_k$, $b_k$, $c_k$, $d_k$, $s_k$ and $t_k$) used in an affine transformation process to transform a position (ir−1, jr−1) in the coordinate system of the kth taken image into the position (x, y) located in the reference coordinate system as a post-transformation position with the coordinates (x, y) thereof satisfying the relations I'−2≦x<I'+2 and J'−2≦y<J'+2 expressing relations with the coordinates (I', J'). By the same token, much like notation Σ in Eq. (6), notation Σ in Eq. (12) denotes a sum computed for a position (I', J') with respect to all sets of integers (k, ib and jb) in which the integer k is a sequence number assigned to a taken image associated with transformation parameters ($a_k$, $b_k$, $c_k$, $d_k$, $s_k$ and $t_k$) used in an affine transformation process to transform a position (ib−1, jb−1) in the coordinate system of the kth taken image into the position (x, y) located in the reference coordinate system as a post-transformation position with the coordinates (x, y) thereof satisfying the relations I'−2≦x<I'+2 and J'−2≦y<J'+2 expressing relations with the coordinates (I', J').

It is to be noted that, much like Eq. (5), Eq. (11) is also referred to as a weighed addition equation for the light quantity of the red color. By the same token, much like Eq. (6), Eq. (12) is also referred to as a weighed addition equation for the light quantity of the blue color.

The numerator and denominator of Eq. 11 expressing the light quantity of the red color are rewritten as expressions (13) and (14) respectively.

[Expression (13)]

$$\Sigma \text{Cubic}(I'-x) \times \text{Cubic}(J'-y) \times \text{Robs}(k, ir, jr) \quad (13)$$

[Expression (14)]

$$\Sigma \text{Cubic}(I'-x) \times \text{Cubic}(J'-y) \quad (14)$$

By the same token, the numerator and denominator of Eq. 12 expressing the light quantity of the blue color are rewritten as expressions (15) and (16) respectively.

[Expression (15)]

$$\Sigma \text{Cubic}(I'-x) \times \text{Cubic}(J'-y) \times \text{Bobs}(k, ib, jb) \quad (15)$$

[Expression (16)]

$$\Sigma \text{Cubic}(I'-x) \times \text{Cubic}(J'-y) \quad (16)$$

By using Eq. (8) described above as the weighed addition equation for the light quantity of the green color, Eq. (11) described above as the weighed addition equation for the light quantity of the red color and Eq. (12) described above as the weighed addition equation for the light quantity of the blue color, the processing circuit 24 is capable of finding respectively the light quantity Lg (I', J') of the green color, the light quantity Lr (I', J') of the red color and the light quantity Lb (I', J') of the blue color as picture values at a position (I', J') on the output image.

By the way, when the processing circuit 24 finds the light quantity Lg (I', J') of the green color, the light quantity Lr (I', J') of the red color and the light quantity Lb (I', J') of the blue color as picture values at a position (I', J') on the output image by using Eqs. (8), (11) and (12) respectively, the reliability of the pixel values may be low in some cases.

That is to say, in accordance with Eq. (8) described above as the weighed addition equation for the light quantity of the green color, the light quantity Lg (I', J') of the green color at a position (I', J') on the output image is found by dividing the numerator expressed by expression (9) by a denominator expressed by expression (10). As is obvious from expression (9), the numerator is a sum of products each obtained by multiplying a pixel value Gobs (k, ig, jg) at a position (ig−1, jg−1) transformed into a post-transformation position (x, y) by a weight Cubic (I'−x)×Cubic (J'−y). As is obvious from expression (10), on the other hand, the denominator is a sum of weights Cubic (I'−x)×Cubic (J'−Y).

Thus, if the value of expression (10) expressing the denominator of Eq. (8) is 0 (or close to 0), the light quantity Lg (I', J') found by using Eq. (8) as a light quantity of the green color at a position (I', J') has a value exhibiting instable (or indeterminate) and unreliable characteristics. In other words, at a position (I', J') for which the value of expression (10) expressing the denominator of Eq. (8) is 0, a small noise (or error) contained in the pixel value Gobs (k, ig, jg) included in the numerator of Eq. (8) is divided by the denominator of 0 and amplified to a large value. As a result, the light quantity Lg (I', J') found by using Eq. (8) as a light quantity of the green color at a position (I', J') has an unreliable value including a large noise.

The value of expression (10) expressing the denominator of Eq. (8) is 0, for example, because at least either of the Cubic function referred to as Cubic (I'−x) or Cubic (J'−y) is 0 throughout all the summation range of Eq. (10). As is obvious from the characteristics shown in FIG. 13 as the characteristics of the Cubic function, the Cubic function referred to as Cubic (I'−x) or Cubic (J'−y) is 0 in the range I'−x=±1 or J'−y=±1, that is, in the range x=I'±1 or y=J'±1.

Thus, because the denominator of Eq. (8) is 0 (or almost 0) due to the fact that the coordinates (I', J') of the observed position in the reference coordinate system and the coordinates (x, y) of a post-transformation position also in the reference coordinate system satisfy the relations x=I'±1 or y=J'±1 as described above, the value of the light quantity Lg (I', J') of the green color is found to be a value exhibiting instable (or indeterminate) and unreliable characteristics in a process to compute the light quantity Lg (I', J') at the position (I', J') in accordance with Eq. (8) by summing up pixel values Gobs (k, ig, jg) for all sets of integers (k, ig and jg) in which the integer k is a sequence number assigned to a taken image associated with transformation parameters ($a_k$, $b_k$, $c_k$, $d_k$, $s_k$ and $t_k$) used in an affine transformation process to transform a position (ig−1, jg−1) in the coordinate system of the kth taken image into the position (x, y) with the coordinates (x, y) thereof satisfying the relations I'−2≦x<I'+2 and J'−2≦y<J'+2 expressing relations with the coordinates (I', J'). However, only in a very special or exceptional case do the coordinates (x, y) of all the positions (x, y) located in the range I'−2≦x<I'+2 and J'−2≦y<J'+2 as the positions of the pixel values Gobs (k, ig, jg) satisfy the relations x=I'±1 or y=J'±1. In the following description, the very special or exceptional case is referred to simply as an exception state.

Figure 15:
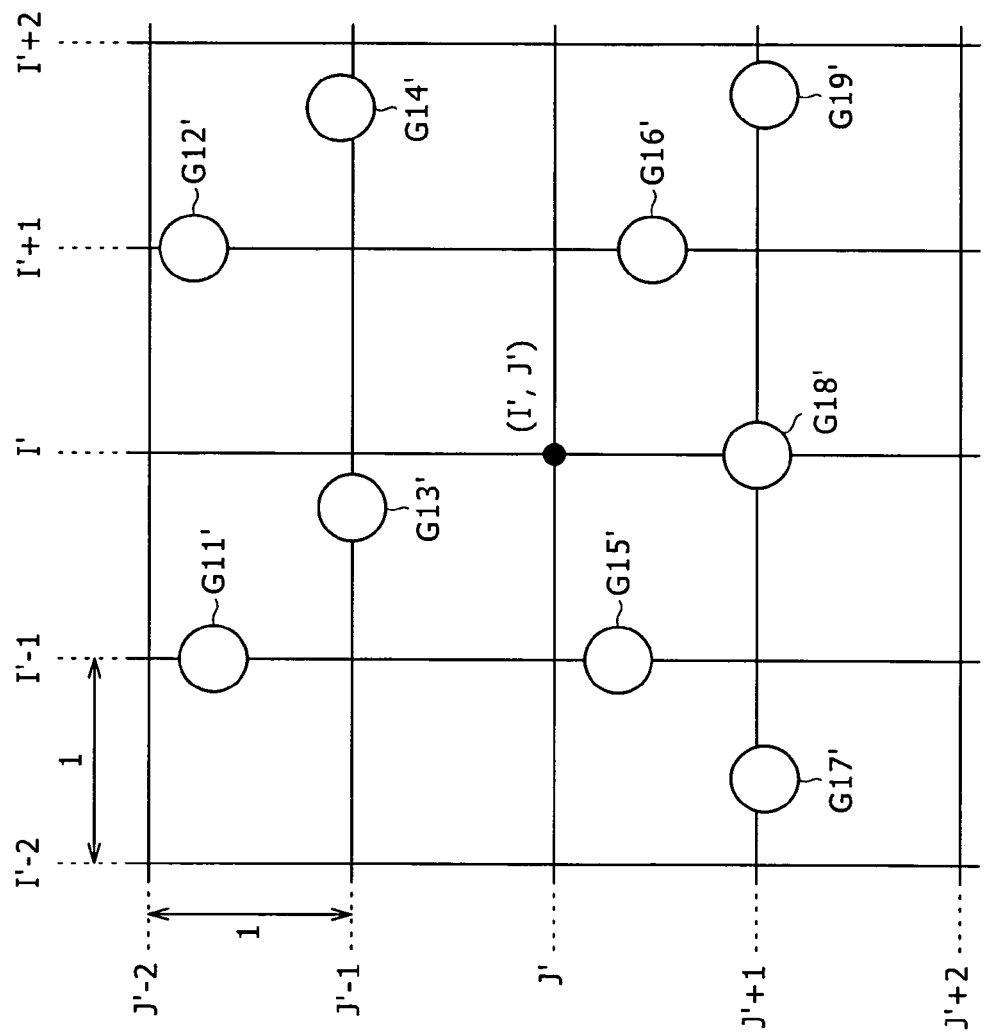
FIG. 15 is an explanatory diagram showing an exception state.

FIG. 15 is an explanatory diagram showing a position (I', J') in an exception state.

In the exception state shown in FIG. 15, the coordinates x of post-transformation positions G11' and G15' each obtained as a result of an affine transformation process to transform a position (ig−1, jg−1) by using the transformation parameters ($a_k$, $b_k$, $c_k$, $d_k$, $s_k$ and $t_k$) satisfy the relation x=I'−1. On the other hand, the coordinates x of post-transformation positions G12' and G16' each obtained as a result of an affine transformation process to transform a position (ig−1, jg−1) by using the transformation parameters (($a_k$, $b_k$, $c_k$, $d_k$, $s_k$ and $t_k$) satisfy the relation x=I'+1.

By the same token, the coordinates y of post-transformation positions G13' and G14' each obtained as a result of an affine transformation process to transform a position (ig−1, jg−1) by using the transformation parameters ($a_k$, $b_k$, $c_k$, $d_k$, $s_k$ and $t_k$) satisfy the relation y=J'−1. On the other hand, the coordinates y of post-transformation positions G17', G18' and G19' each obtained as a result of an affine transformation process to transform a position (ig−1, jg−1) by using the transformation parameters ($a_k$, $b_k$, $c_k$, $d_k$, $s_k$ and $t_k$) satisfy the relation y=J'+1.

As described above, in the exception state shown in FIG. 15, in the processing to infer the light quantity Lg (I', J') for the observed position (I', J') of the observed pixel by using pixel values Gobs (k, ig, jg) for all sets of integers (k, ig and jg) in which the integer k is a sequence number assigned to a taken image associated with transformation parameters ($a_k$, $b_k$, $c_k$, $d_k$, $s_k$ and $t_k$) used in an affine transformation process to transform a position (ig−1, jg−1) in the coordinate system of the kth taken image into the position (x, y) with the coordinates (x, y) thereof satisfying the relations I'−2≦x<I'+2 and J'−2≦y<J'+2 expressing relations with the coordinates (I', J'), the relation x=I'±1 or y=J'±1 between the coordinates of the observed position (I', J') and the coordinates of the post-transformation position (x, y) may hold true in some cases. In this exception state, for the G signal, there is not even one piece of G data (that is, not even one pixel value Gobs (k, ig, jg)) associated with a non-zero weight w ((x, y), (I', J')) in the range centered at the observed position (I', J') as the range of coordinates (x, y) approximately within the boundaries I'±1 and J'±1. The range centered at the observed position (I', J') as the range of coordinates (x, y) approximately within the boundaries I'±1 and J'±1 is a square area having dimensions of 2×2.

A process to find a light quantity Lg (I', J') of the green color at the position (I', J') in such an exception state in accordance with Eq. (8) will result in a light-quantity value exhibiting instable (or indeterminate) and unreliable characteristics as described above.

If the pixel located at the position (I', J') is in such an exception state, the processing circuit 24 does not carry out a process to find a light quantity Lg (I', J') of the green color at the position (I', J') in accordance with Eq. (8). Instead, the processing circuit 24 carries out an exception process described below as a process to find a light quantity Lg (I', J') of the green color at the position (I', J'). In contrast with the exception process, the processes to find a light quantity Lg (I', J') of the green color, a light quantity Lr (I', J') of the red color and a light quantity Lb (I', J') of the blue color at the position (I', J') in accordance with Eqs. (8), (11) and (12) respectively are each referred to as a normal process.

That is to say, let us assume for example that the position (I', J') is an observed position and the light quantity Lg (I', J') of the green color of the pixel at the observed position (I', J') on the output image is inferred. In the following description, the pixel at the observed position (I', J') on the output image is referred to as an observed pixel. If the observed pixel at the observed position (I', J') is in an exception state, the processing circuit 24 infers the light quantity Lg (I', J') of the green color of the observed pixel at the observed position (I', J') in the exception state by using not only the pixel value Gobs (k, ig, jg) of a pixel located on each kth taken image as a pixel at a position with its coordinates (ik−1, jk−1) transformed into the coordinates (x, y) of a post-transformation position (x, y) in close proximity to the observed position (I', J') but also the pixel value Gobs (k, ig, jg) of a pixel located on each kth taken image as a pixel at a position with its coordinates (ik−1, jk−1) transformed into the coordinates (x, y) of a post-transformation position (x, y) in close proximity to the position of a pixel located on the output image as a pixel in the vicinity of the observed position (I', J').

Figure 16:
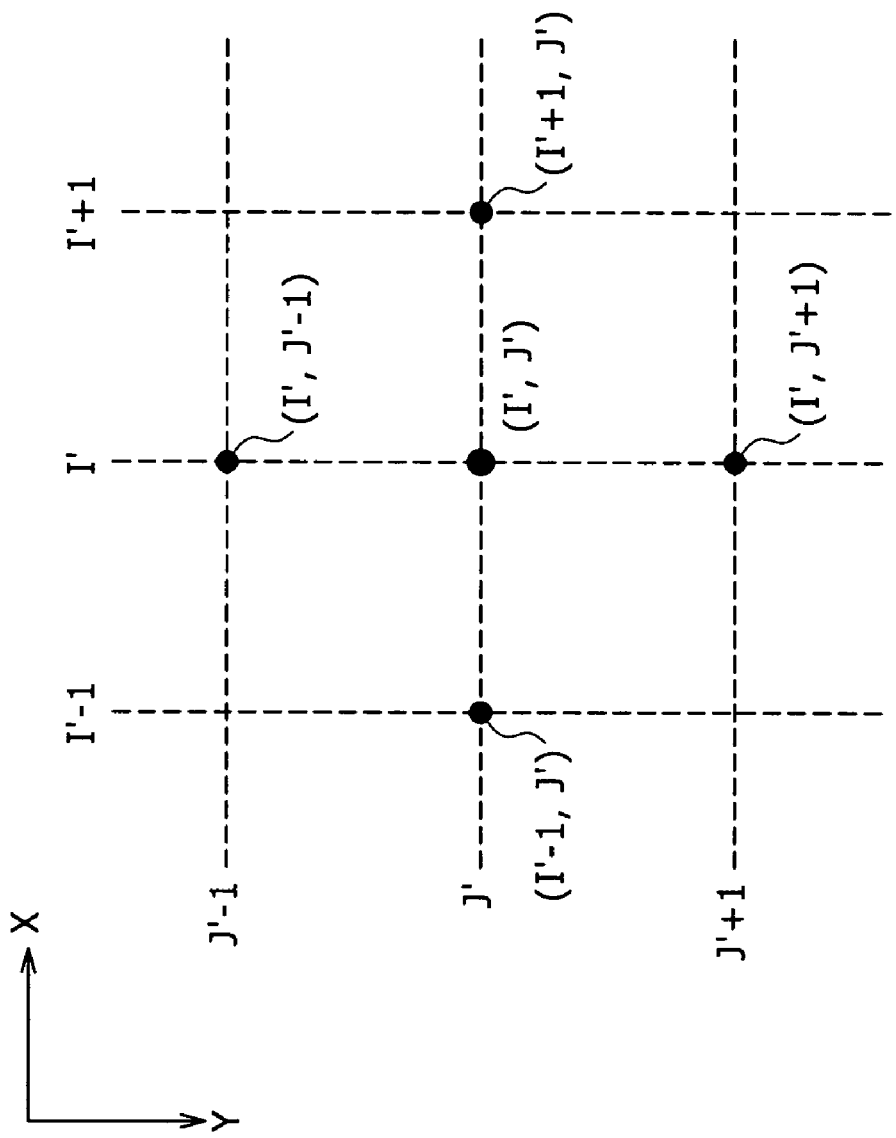
FIG. 16 is a diagram referred to in explanation of exception processing of a G signal.

A pixel in the vicinity of the observed position (I', J') in the exception process to infer the light quantity Lg (I', J') of the green color of the pixel at the observed position (I', J') on the output image is referred properly to as a vicinity pixel of the observed pixel. In an example shown in FIG. 16, pixels at positions (I'−1, J'), (I'+1, J'), (I', J'−1) and (I', J'+1) can each be taken as a vicinity pixel.

That is to say, the image-pickup device 4 employed in the digital camera 1 has the form of the Bayer two-dimensional array as explained earlier by referring to FIG. 3. In the Bayer two-dimensional array, pixels receiving green-color components of light are arranged every other pixel in the X and Y directions.

If the coordinates of none of pixels each having a pixel value Gobs (k, ig, jg) of the G signal on the N taken images obtained by the image-pickup device 4 having the Bayer two-dimensional array are transformed into the coordinates of a position in close proximity to the observed position (I', J') in an affine transformation process to transform the coordinates of a position on any of the N taken images into the coordinates of a position in the reference coordinate system, the pixel located at the observed position (I', J') on the reference image can be regarded as a pixel of a color other than the green color.

Figure 17:
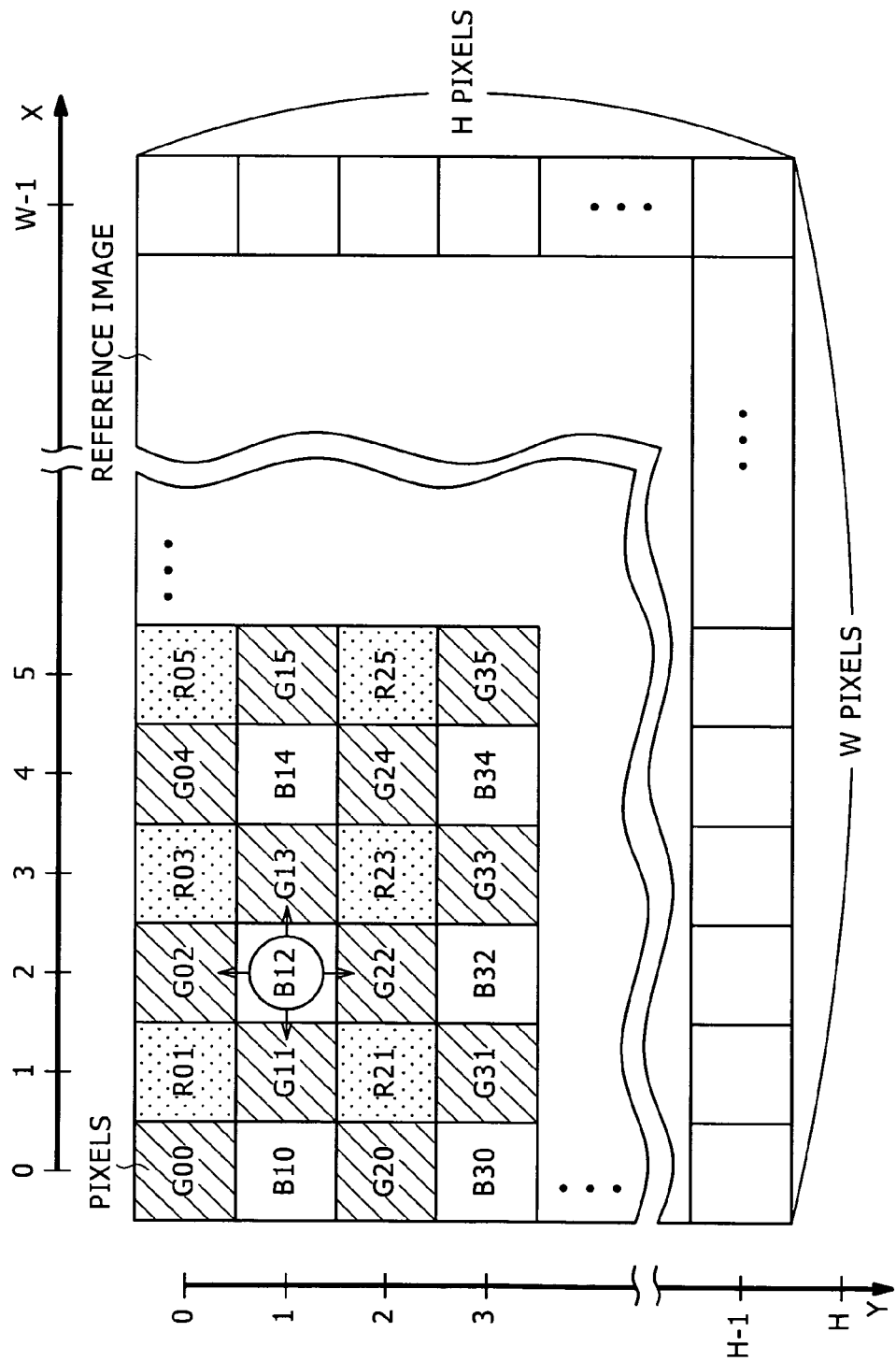
FIG. 17 is a diagram referred to in explanation of exception processing of a G signal.

FIG. 17 is a diagram showing a reference image obtained by the image-pickup device 4 having the Bayer two-dimensional array. The Bayer two-dimensional array shown in FIG. 17 is an array of W columns arranged in the horizontal direction (or the X direction) and H rows arranged in the vertical direction (or the Y direction). That is to say, the reference image consists of W×H pixels. Thus, the image-pickup device 4 also consists of W×H pixels.

Let us assume for example that a pixel B12 enclosed by a circle is a non-green pixel located at the observed position (I', J') on the reference image as a pixel of the blue color as shown in FIG. 17. The blue-color pixel B12 located at the observed position (I', J') on the reference image is a pixel included in the image-pickup device 4 as a pixel receiving the blue-color component. In this case, a pixel of the green color exists on either of the upper, lower, right and left sides of the pixel B12. As a matter of fact, a pixel of the green color exists on either of the upper, lower, right and left sides of any blue-color pixel other than the pixel B12. By the same token, a pixel of the green color exists on either of the upper, lower, right and left sides of any red-color pixel.

Thus, if the coordinates of none of pixels each having a pixel value Gobs (k, ig, jg) of the G signal are transformed into the coordinates of a position in close proximity to the observed position (I', J'), the pixel located at the observed position (I', J') on the reference image can be regarded as a pixel of a color other than the green color, but the coordinates of a certain pixel having a pixel value Gobs (k, ig, jg) of the G signal must be transformed into the coordinates of a position in close proximity to a vicinity pixel of the non-green color pixel at the observed position (I', J'). The position of a vicinity pixel of the non-green color pixel at the observed position (I', J') is any of the positions (I'−1, J'), (I'+1, J'), (I', J'−1) and (I', J'+1) on the left, right, upper and lower sides of the observed position (I', J'). Since the coordinates of a certain pixel having a pixel value Gobs (k, ig, jg) of the G signal are transformed into the coordinates of a position in close proximity to any of the vicinity positions (I'−1, J'), (I'+1, J'), (I', J'−1) and (I', J'+1), an exception state does not result. That is to say, a reliable light quantity Lg (I', J') of the green color can be found by applying Eq. (8) to a vicinity pixel at any of the positions (I'−1, J'), (I'+1, J'), (I', J'−1) and (I', J'+1).

As described above, in the case of an observed pixel in an exception state, the processing circuit 24 carries out an exception process to infer the light quantity Lg (I', J') of the green color of the observed pixel at the observed position (I', J') by using not only pixel values Gobs (k, ig, jg) of pixels at positions with their coordinates transformed into the coordinates of positions (x, y) in close proximity to the observed position (I', J'), but also pixel values Gobs (k, ig, jg) of pixels at positions with their coordinates transformed into the coordinates of positions (x, y) in close proximity to the position (I'−1, J'), (I'+1, J'), (I', J'−1) or (I', J'+1) in the vicinity of the observed position (I', J').

To put it concretely, the processing circuit 24 carries out an exception process to infer the light quantity Lg (I', J') of the green color for the observed pixel at the observed position (I', J') in accordance to Eq. (17) given as follows:

[Eq. (17)]

$$Lg(I',J') = \frac{\begin{pmatrix} \text{Numerator value of } G \text{ signal at}(I',J') + \\ \text{Numerator value of } G \text{ signal at}(I'-1,J') + \\ \text{Numerator value of } G \text{ signal at}(I'+1,J') + \\ \text{Numerator value of } G \text{ signal at}(I',J'-1) + \\ \text{Numerator value of } G \text{ signal at}(I',J'+1)\end{pmatrix}}{\begin{pmatrix} \text{Denominator value of } G \text{ signal at}(I',J') + \\ \text{Denominator value of } G \text{ signal at}(I'-1,J') + \\ \text{Denominator value of } G \text{ signal at}(I'+1,J') + \\ \text{Denominator value of } G \text{ signal at}(I',J'-1) + \\ \text{Denominator value of } G \text{ signal at}(I',J'+1)\end{pmatrix}} \quad (17)$$

The numerator of Eq. (17) is a sum of numerators associated with five points coinciding with the observed position (I', J') of the observed pixel as well as the positions (I'−1, J'), (I'+1, J'), (I', J'−1) and (I', J'+1) of the vicinity pixels in close proximity to the observed position (I', J'). In this case, the numerator associated with a point coinciding with the observed position (I', J') or the position (I'−1, J'), (I'+1, J'), (I', J'−1) or (I', J'+1) is the numerator of Eq. (8) applied to a normal process carried out on the point. As described earlier, the numerator of Eq. (8) is expressed by expression (9). On the other hand, the denominator of Eq. (17) is a sum of denominators associated with the five points described above. The denominator associated with a point is the denominator of Eq. (8) applied to a normal process carried out on the point. As described earlier, the denominator of Eq. (8) is expressed by expression (10). In accordance with Eq. (17), the light quantity Lg (I', J') of the green color can be found by dividing the sum of numerators by the sum of denominators. At least one of the positions (I'−1, J'), (I'+1, J'), (I', J'−1) and (I', J'+1) of the vicinity pixels, an exception state does not result. Thus, the denominator of Eq. (17) has a large value to a certain degree or the value of the denominator is not a value close to 0. As a result, a reliable light quantity Lg (I', J') of the green color can be found.

Much like the light quantity Lg (I', J') found for the green color in accordance with the weighted addition equation expressed by Eq. (8) as an equation for finding the quantity of light for the green color, the light quantity Lr (I', J') found for the red color in accordance with the weighted addition equation expressed by Eq. (11) as an equation for finding the quantity of light for the red color may have an unstable value due to the fact that the observed position (I', J') is in an exception state in some cases.

To put it concretely, in the processing to infer the light quantity Lr (I', J') for the observed position (I', J') of the observed pixel by using pixel values Robs (k, ir, jr) for all sets of integers (k, ir and jr) in which the integer k is a sequence number assigned to a taken image associated with transformation parameters ($a_{4k}$, $b_{4k}$, $c_{4k}$, $d_{4k}$, $s_{4k}$ and $t_{4k}$) used in an affine transformation process to transform a position (ir−1, jr−1) in the coordinate system of the kth taken image into the position (x, y) with the coordinates (x, y) thereof satisfying the relations I'−2≦x<I'+2 and J'−2≦y<J'+2, the relation x=I'±1 or y=J'±1 between the coordinates of the observed position (I', J') and the coordinates of the post-transformation position (x, y) may hold true in some cases much like the case described earlier by referring to FIG. 15. In this exception state, for the R signal, there is not even one piece of R data (that is, not even one pixel value Robs (k, ir, jr)) associated with a non-zero weight w ((x, y), (I', J')) in the range centered at the observed position (I', J') as the range of coordinates (x, y) approximately within the boundaries I'±1 and J'±1. The range centered at the observed position (I', J') as the range of coordinates (x, y) approximately within the boundaries I'±1 and J'±1 is a square area having dimensions of 2×2.

In this case, the processing circuit 24 carries out the following exception process.

That is to say, the processing circuit 24 infers the light quantity Lr (I', J') of the red color for the observed pixel at the observed position (I', J') in the exception state by using not only the pixel value Robs (k, ir, jr) of a pixel located on each kth taken image as a pixel at a position with its coordinates (ir−1, jr−1) transformed into the coordinates (x, y) of a post-transformation position in close proximity to the observed position (I', J'), but also the pixel value Robs (k, ir, jr) of a pixel located on each kth taken image as a pixel at a position with its coordinates (ir−1, jr−1) transformed into the coordinates (x, y) of a post-transformation position (x, y) in close proximity to the position of a pixel located on the output image as a pixel in the vicinity of the observed position (I', J').

Figure 18:
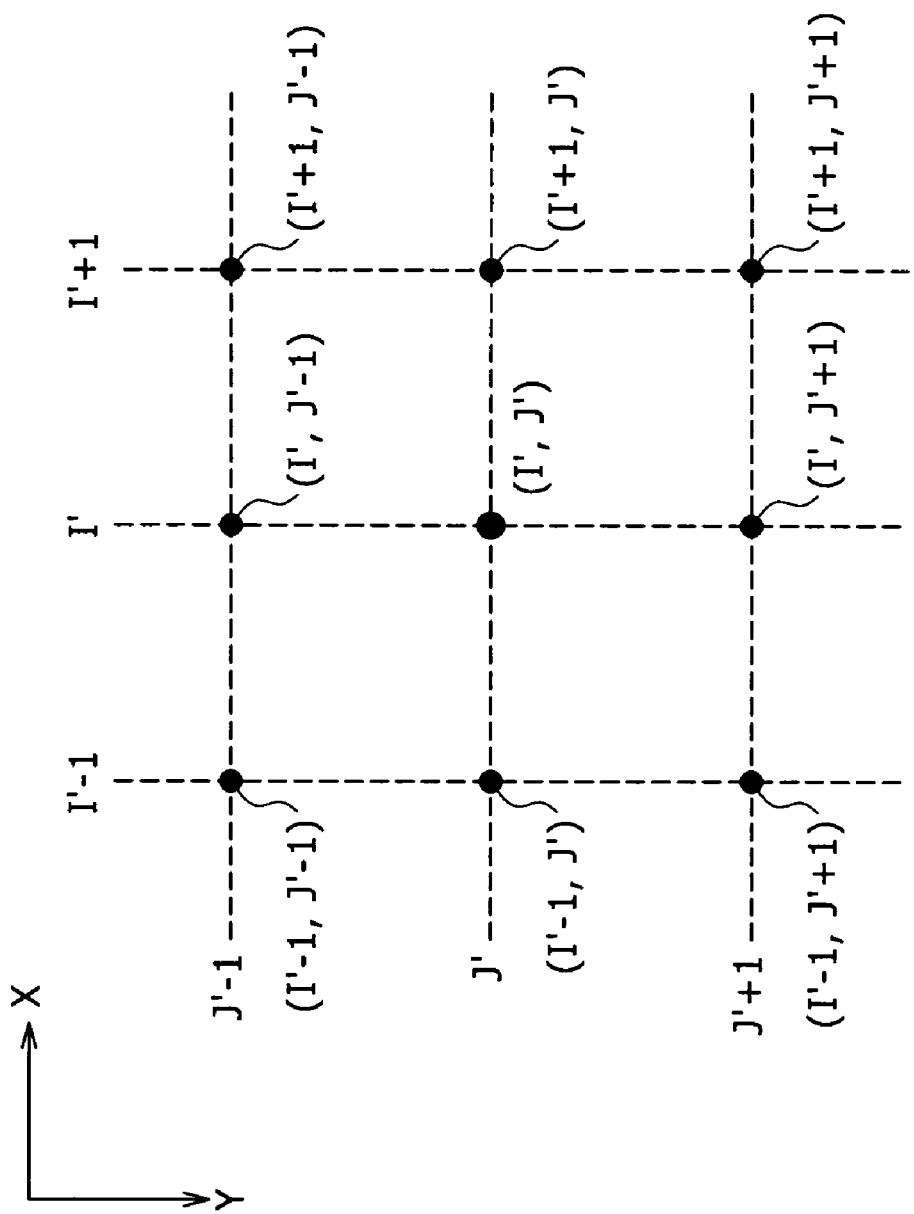
FIG. 18 is a diagram referred to in explanation of exception processing of an R signal.

As described above, a pixel in the vicinity of the observed position (I', J') in the exception process to infer the light quantity Lr (I', J') of the red color of the pixel at the observed position (I', J') on the output image is referred properly to as a vicinity pixel of the observed pixel. In an example shown in FIG. 18, pixels at positions (I'−1, J'−1), (I', J'−1), (I'+1, J'−1), (I'−1, J), (I'+1, J'), (I'−1, J'+1), (I', J'+1) and (I'+1, J'+1) can each be taken as a vicinity pixel.

If the coordinates of none of pixels each having a pixel value Robs (k, ir, jr) of the R signal having the Bayer two-dimensional array are transformed into the coordinates of a position in close proximity to the observed position (I', J'), the pixel located at the observed position (I', J') on the reference image can be regarded as a pixel of a color other than the red color.

Figure 19:
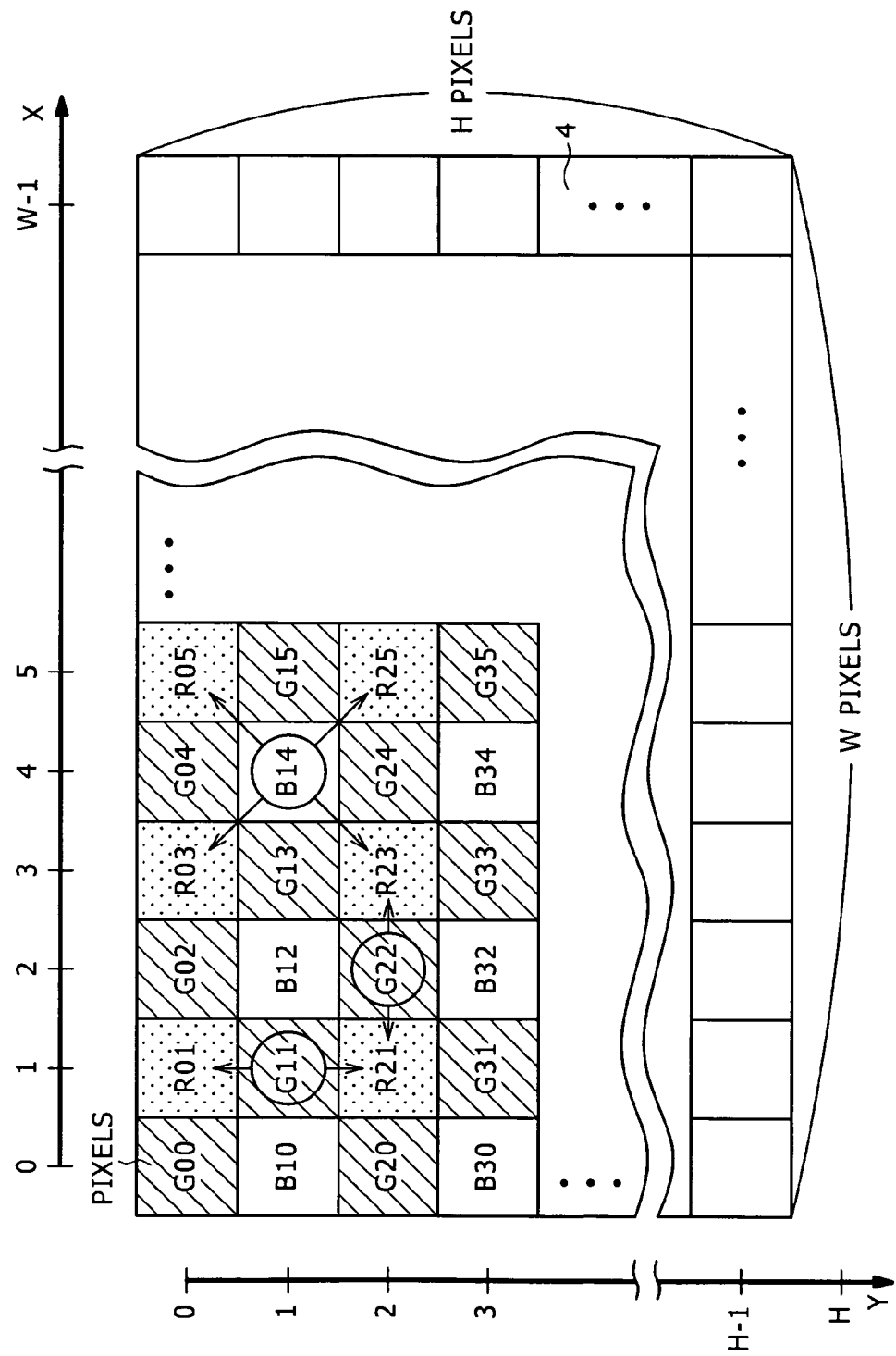
FIG. 19 is a diagram referred to in explanation of exception processing of an R signal.

Let us assume for example that a pixel G11 enclosed by a circle is a non-red pixel located at an observed position (I', J') on the reference image as a pixel of the green color as shown in FIG. 19. The green-color pixel G11 located at the observed position (I', J') on the reference image is a pixel receiving the green-color component. In this case, a pixel of the red color exists on either of the upper and lower sides of the pixel G11.

Let us assume as another example that a pixel G22 enclosed by a circle is also a non-red pixel located at another observed position (I', J') on the reference image as a pixel of the green color as shown in FIG. 19. The green-color pixel G22 located at the observed position (I', J') on the reference image is a pixel receiving the green-color component. In this case, a pixel of the red color exists on either of the left and right sides of the pixel G22.

Let us assume as another example that a pixel B14 enclosed by a circle is also a non-red pixel located at a further observed position (I', J') on the reference image as a pixel of the blue color as shown in FIG. 19. The blue-color pixel B14 located at the observed position (I', J') on the reference image is a pixel receiving the blue-color component. In this case, a pixel of the red color exists on either of the left-upper, right-upper, left-lower and right-lower sides of the pixel B14.

In general, on either of the upper, lower, left, right, left-upper, right-upper, left-lower and right-lower sides of a pixel included in the reference image as a pixel of a color other than the red color, a red-color pixel exists.

If the coordinates of none of pixels each having a pixel value Robs (k, ir, jr) of the R signal are transformed into the coordinates of a position in close proximity to the observed position (I', J'), the pixel located at the observed position (I', J') on the reference image can be regarded as a pixel of a color other than the red color, but the coordinates of a certain pixel having a pixel value Robs (k, ir, jr) of the R signal must be transformed into the coordinates of a position in close proximity to a vicinity pixel of the non-red color pixel located at the observed position (I', J'). The position of a vicinity pixel of the non-green color pixel at the observed position (I', J') is any of the positions (I'−1, J'−1), (I', J'−1), (I'+1, J'−1), (I'−1, J), (I'+1, J'), (I'−1, J'+1), (I', J'+1) and (I'+1, J'+1) on upper, lower, left, right, left-upper, right-upper, left-lower and right-lower sides of the observed position (I', J'). Since the coordinates of a certain pixel having a pixel value Robs (k, ir, jr) of the R signal are transformed into the coordinates of a position in close proximity to any of the positions (I'−1, J'−1), (I', J'−1), (I'+1, J'−1), (I'−1, J), (I'+1, J'), (I'−1, J'+1), (I', J'+1) and (I'+1, J'+1), an exception state does not result. That is to say, a reliable light quantity Lr (I', J') of the red color can be found by applying Eq. (11) to a vicinity pixel at any of the positions (I'−1, J'−1), (I', J'−1), (I'+1, J'−1), (I'−1, J), (I'+1, J'), (I'−1, J'+1), (I', J'+1) and (I'+1, J'+1).

As described above, in the case of an observed pixel in an exception state, the processing circuit 24 carries out an exception process to infer the light quantity Lr (I', J') of the red color of the observed pixel at the observed position (I', J') by using not only pixel values Robs (k, ir, jr) of pixels at positions with their coordinates transformed into the coordinates of positions (x, y) in close proximity to the observed position (I', J'), but also pixel values Robs (k, ir, jr) of pixels at positions with their coordinates transformed into the coordinates of positions (x, y) in close proximity to the position (I'−1, J'−1), (I', J'−1), (I'+1, J'−1), (I'−1, J), (I'+1, J'−1), (I'−1, J'+1), (I', J'+1) or (I'+1, J'+1) in the vicinity of the observed position (I', J').

To put it concretely, the processing circuit 24 carries out an exception process to infer the light quantity Lr (I', J') of the red color for the observed pixel at the observed position (I', J') in accordance to Eq. (18) given as follows:

[Eq. (18)]

$$Lg\ (I', J') = \frac{\begin{pmatrix} \text{Numerator value of } R \text{ signal at}(I', J') + \\ \text{Numerator value of } R \text{ signal at}(I'-1, J'-1) + \\ \text{Numerator value of } R \text{ signal at}(I', J'-1) + \\ \text{Numerator value of } R \text{ signal at}(I'+1, J'-1) + \\ \text{Numerator value of } R \text{ signal at}(I'-1, J') \\ \text{Numerator value of } R \text{ signal at}(I'+1, J') + \\ \text{Numerator value of } R \text{ signal at}(I'-1, J'+1) + \\ \text{Numerator value of } R \text{ signal at}(I', J'+1) + \\ \text{Numerator value of } R \text{ signal at}(I'+1, J'+1) \end{pmatrix}}{\begin{pmatrix} \text{Denominator value of } R \text{ signal at}(I', J') + \\ \text{Denominator value of } R \text{ signal at}(I'-1, J'-1) + \\ \text{Denominator value of } R \text{ signal at}(I', J'-1) + \\ \text{Denominator value of } R \text{ signal at}(I'+1, J'-1) + \\ \text{Denominator value of } R \text{ signal at}(I'-1, J') \\ \text{Denominator value of } R \text{ signal at}(I'+1, J') + \\ \text{Denominator value of } R \text{ signal at}(I'-1, J'+1) + \\ \text{Denominator value of } R \text{ signal at}(I', J'+1) + \\ \text{Denominator value of } R \text{ signal at}(I'+1, J'+1) \end{pmatrix}} \quad (18)$$

The numerator of Eq. (18) is a sum of numerators associated with nine points coinciding with the observed position (I', J') of the observed pixel as well as the positions (I'−1, J'−1), (I', J'−1), (I'+1, J'−1), (I'−1, J'), (I'+1, J'), (I'−1, J'+1), (I', J'+1) and (I'+1, J'+1) of the vicinity pixels in close proximity to the observed position (I', J'). In this case, the numerator associated with a point coinciding with the observed position (I', J') or the position (I'−1, J'−1), (I', J'−1), (I'+1, J'−1), (I'−1, J'), (I'+1, J'−1), (I'−1, J'+1), (I', J'+1) or (I'+1, J'+1) is the numerator of Eq. (11) applied to a normal process carried out on the point. As described earlier, the numerator of Eq. (11) is expressed by expression (13). On the other hand, the denominator of Eq. (18) is a sum of denominators associated with the nine points described above. The denominator associated with a point is the denominator of Eq. (11) applied to a normal process carried out on the point. As described earlier, the denominator of Eq. (11) is expressed by expression (14). In accordance with Eq. (18), the light quantity Lr (I', J') of the red color can be found by dividing the sum of numerators by the sum of denominators. At least one of the positions (I'−1, J'−1), (I', J'−1), (I'+1, J'−1), (I'−1, J), (I'+1, J'), (I'−1, J'+1), (I', J'+1) and (I'+1, J'+1) of the vicinity pixels, an exception state does not result. Thus, the denominator of Eq. (18) has a large value to a certain degree or the value of the denominator is not a value close to 0. As a result, a reliable light quantity Lr (I', J') of the red color can be found.

Much like the light quantity Lg (I', J') found for the green color in accordance with the weighted addition equation expressed by Eq. (8) as an equation for finding the quantity of light for the green color and much like the light quantity Lr (I', J') found for the red color in accordance with the weighted addition equation expressed by Eq. (11) as an equation for finding the quantity of light for the red color, the light quantity Lb (I', J') found for the blue color in accordance with the weighted addition equation expressed by Eq. (12) as an equation for finding the quantity of light for the blue color may have an unstable value due to the fact that the observed position (I', J') is in an exception state in some cases.

In this case, the processing circuit 24 carries out the following exception process.

That is to say, in the Bayer two-dimensional array, pixels of the blue color are laid out in the same positional relations as the relations described above as relations among pixels of the red color. Thus, the processing circuit 24 carries out an exception process to infer the light quantity Lb (I', J') of the blue color for the observed pixel at the observed position (I', J') in accordance to Eq. (19) given below as the processing circuit 24 carries out an exception process to infer the light quantity Lr (I', J') of the red color of the observed pixel at the observed position (I', J') in accordance to Eq. (18).

[Eq. (19)]

$$Lb(I', J') = \frac{\begin{pmatrix} \text{Numerator value of } B \text{ signal at}(I', J') + \\ \text{Numerator value of } B \text{ signal at}(I'-1, J'-1) + \\ \text{Numerator value of } B \text{ signal at}(I', J'-1) + \\ \text{Numerator value of } B \text{ signal at}(I'+1, J'-1) + \\ \text{Numerator value of } B \text{ signal at}(I'-1, J') + \\ \text{Numerator value of } B \text{ signal at}(I'+1, J') + \\ \text{Numerator value of } B \text{ signal at}(I'-1, J'+1) + \\ \text{Numerator value of } B \text{ signal at}(I', J'+1) + \\ \text{Numerator value of } B \text{ signal at}(I'+1, J'+1) \end{pmatrix}}{\begin{pmatrix} \text{Denominator value of } B \text{ signal at}(I', J') + \\ \text{Denominator value of } B \text{ signal at}(I'-1, J'-1) + \\ \text{Denominator value of } B \text{ signal at}(I', J'-1) + \\ \text{Denominator value of } B \text{ signal at}(I'+1, J'-1) + \\ \text{Denominator value of } B \text{ signal at}(I'-1, J') + \\ \text{Denominator value of } B \text{ signal at}(I'+1, J') + \\ \text{Denominator value of } B \text{ signal at}(I'-1, J'+1) + \\ \text{Denominator value of } B \text{ signal at}(I', J'+1) + \\ \text{Denominator value of } B \text{ signal at}(I'+1, J'+1) \end{pmatrix}} \quad (19)$$

The numerator of Eq. (19) is a sum of numerators associated with nine points coinciding with the observed position (I', J') of the observed pixel as well as the positions (I'−1, J'−1), (I', J'−1), (I'+1, J'−1), (I'−1, J'), (I'+1, J'), (I'−1, J'+1), (I', J'+1) and (I'+1, J'+1) of the vicinity pixels in the vicinity of the observed position (I', J'). In this case, the numerator associated with a point coinciding with the observed position (I', J') or the above nine positions is the numerator of Eq. (12) applied to a normal process carried out on the point. As described earlier, the numerator of Eq. (12) is expressed by expression (15). On the other hand, the denominator of Eq. (19) is a sum of denominators associated with the nine points described above. The denominator associated with a point is the denominator of Eq. (12) applied to a normal process carried out on the point. As described earlier, the denominator of Eq. (12) is expressed by expression (16). In accordance with Eq. (19), the light quantity Lb (I', J') of the blue color can be found by dividing the sum of numerators by the sum of denominators. At least one of the positions (I'−1, J'−1), (I', J'−1), (I'+1, J'−1), (I'−1, J'), (I'+1, J'), (I'−1, J'+1), (I', J'+1) and (I'+1, J'+1) of the vicinity pixels, an exception state does not result. Thus, much like Eqs. (18) and (19), the denominator of Eq. (19) has a large value to a certain degree or the value of the denominator is not a value close to 0. As a result, a reliable light quantity Lb (I', J') of the blue color can be found.

Figure 20:
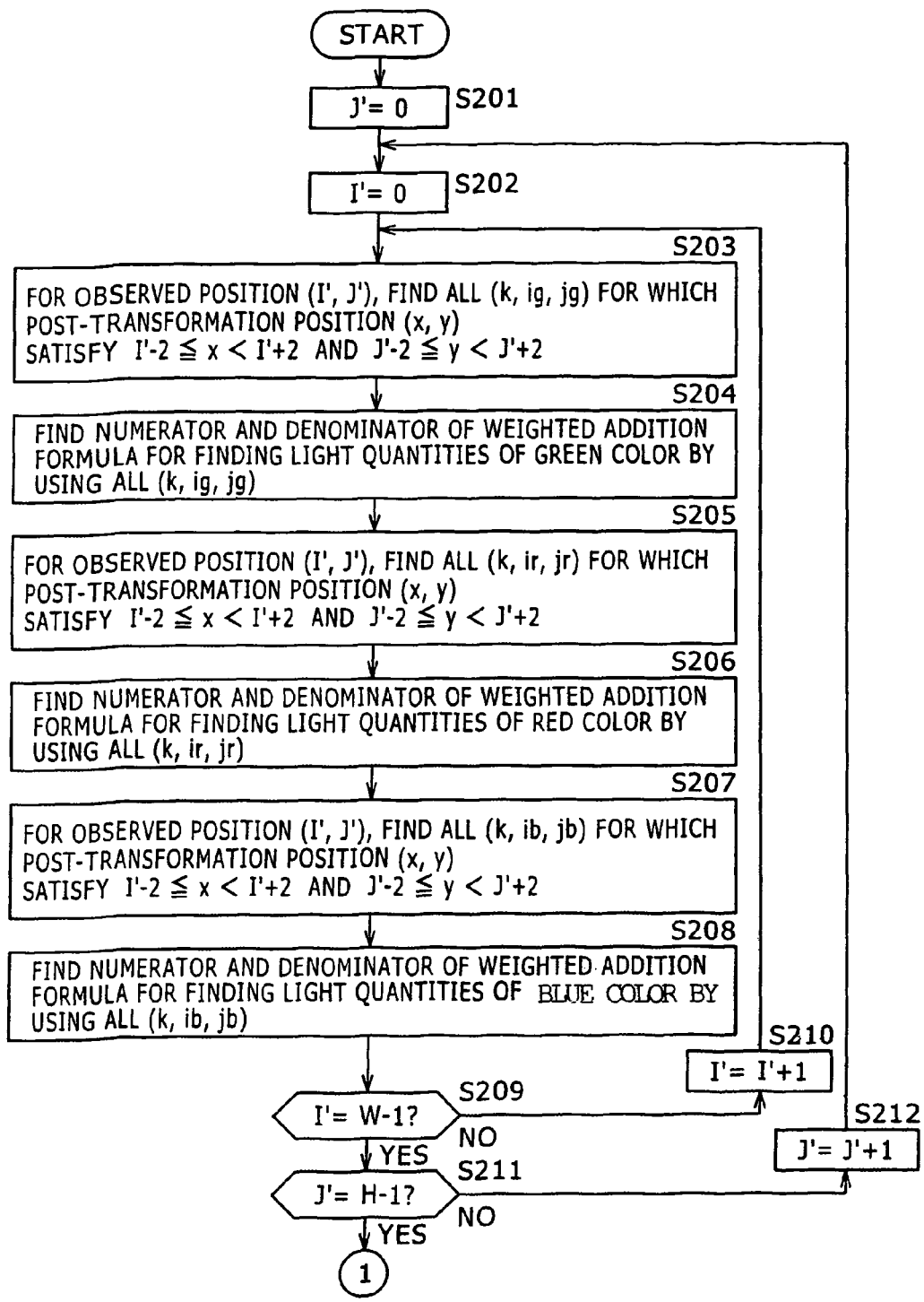
FIG. 20 shows a flowchart referred to in explanation of processing to generate an image.
Figure 21:
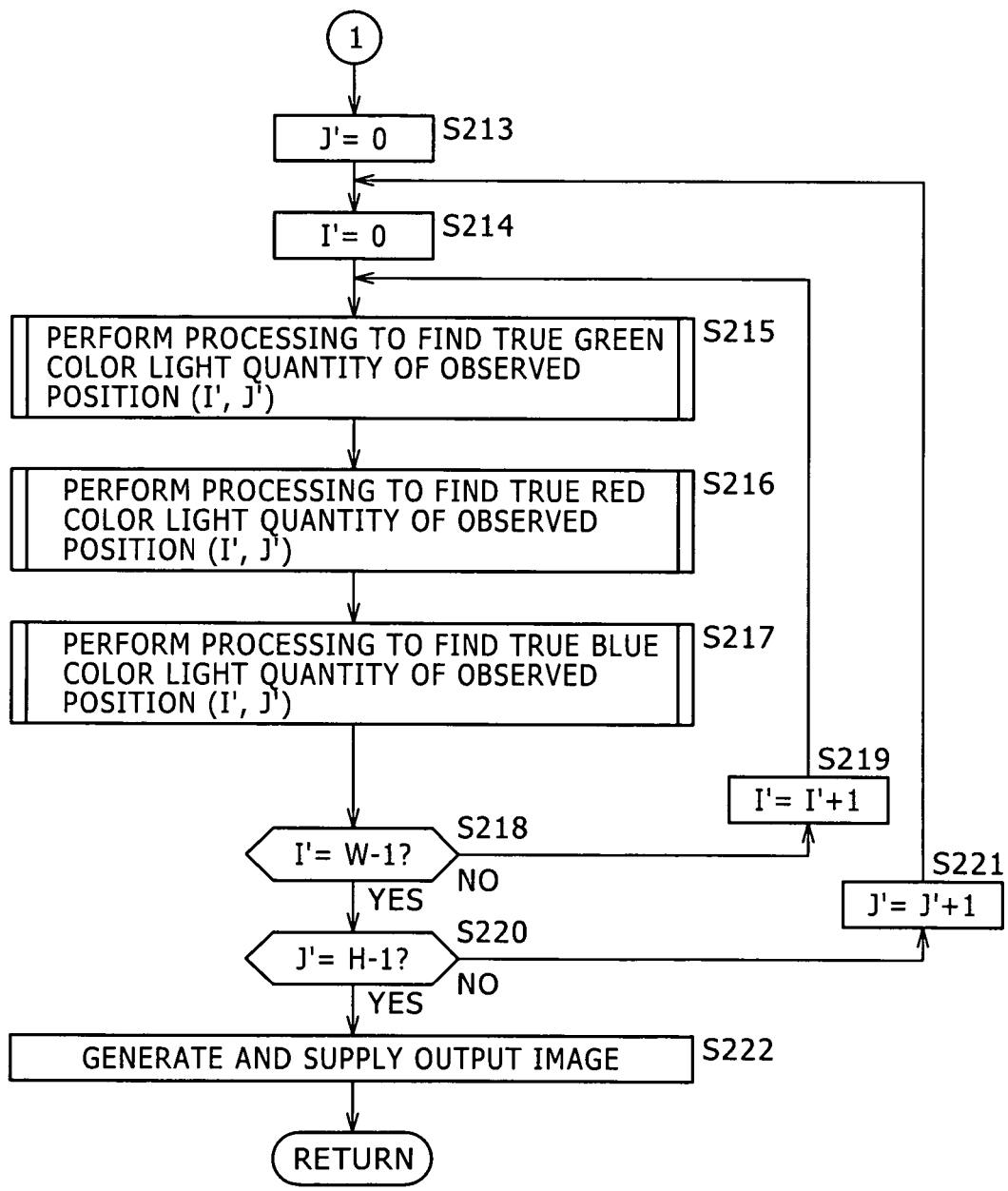
FIG. 21 shows a flowchart referred to in explanation of processing to generate an image.

By referring to a flowchart shown in FIGS. 20 and 21, the following description explains the processing carried out at the step S4 of the flowchart shown in FIG. 2 for a case in which a Cubic function expressed in terms of Cubic (I'−x)× Cubic (J'−y) is used as the weight w ((x, y), (I', J')).

It is to be noted that, in the following description, the taken image is assumed to have W×H pixels as explained earlier by referring to FIG. 17. It is also assumed that the image-pickup device 4 has W×H pixels.

The flowchart begins with a step S201 at which the processing circuit 24 sets a variable J' representing the Y-direction coordinate of the position (I', J') of a pixel in the reference coordinate system at 0. Then, the flow of the image generation processing goes on to the next step S202.

At the step S202, the processing circuit 24 sets a variable I' representing the X-direction coordinate of the position (I', J') of a pixel in the reference coordinate system at 0. Then, the flow of the image generation processing goes on to the next step S203. The variable I' is also a variable representing the X-direction coordinate of the position of a pixel on the output image. By the same token, the variable J' is also a variable representing the Y-direction coordinate of the position of a pixel on the output image.

At the step S203, the processing circuit 24 takes the position (I', J') as an observed position and, for the first to Nth taken images, the processing circuit 24 finds all sets of integers (k, ig and jg) in which the integer k is a sequence number assigned to a taken image associated with transformation parameters ($a_k$, $b_k$, $c_k$, $d_k$, $s_k$ and $t_k$) used in an affine transformation process to transform a position (ig−1, jg−1) in the coordinate system of the kth taken image into the position (x, y) located in the reference coordinate system as a post-transformation position with the coordinates (x, y) thereof satisfying the relations I'−2≦x<I'+2 and J'−2≦y<J'+2 expressing relations with the coordinates (I', J'). That is to say, for k=1 to N, the processing circuit 24 identifies a pixel located on the kth taken image as a pixel at a position with its coordinates (ig−1, jg−1) transformable into the coordinates (x, y) satisfying the above relations to be used in inference of the light quantity Lg (I', J') of the green color. Then, the flow of the image generation processing goes on to the next step S204.

At the step S204, by using all the sets of integers (k, ig and jg) found at the step S203, the processing circuit 24 finds the value of expression (10) representing the denominator of the weighted addition equation for the light quantity of the green color and the value of expression (9) representing the numerator of the same weighted addition equation. Then, the processing circuit 24 stores the values of the numerator and the denominator in a memory not shown in any figure. Subsequently, the flow of the image generation processing goes on to the next step S205.

At the step S205, the processing circuit 24 takes the position (I', J') as an observed position and, for the first to Nth taken images, the processing circuit 24 finds all sets of integers (k, ir and jr) in which the integer k is a sequence number assigned to a taken image associated with transformation parameters ($a_k$, $b_k$, $c_k$, $d_k$, $s_k$ and $t_k$) used in an affine transformation process to transform a position (ir−1, jr−1) in the coordinate system of the kth taken image into the position (x, y) located in the reference coordinate system as a post-transformation position with the coordinates (x, y) thereof satisfying the relations I'−2≦x<I'+2 and J'−2≦y<J'+2 expressing relations with the coordinates (I', J'). That is to say, for k=1 to N, the processing circuit 24 identifies a pixel located on the kth taken image as a pixel at a position with its coordinates (ir−1, jr−1) transformable into the coordinates (x, y) satisfying the above relations to be used in inference of the light quantity Lr (I', J') of the red color. Then, the flow of the image generation processing goes on to the next step S206.

At the step S206, by using all the sets of integers (k, ir and jr) found at the step S205, the processing circuit 24 finds the value of expression (14) representing the denominator of the weighted addition equation for the light quantity of the red color and the value of expression (13) representing the numerator of the same weighted addition equation. Then, the processing circuit 24 stores the values of the numerator and the denominator in the memory. Subsequently, the flow of the image generation processing goes on to the next step S207.

At the step S207, the processing circuit 24 takes the position (I', J') as an observed position and, for the first to Nth taken images, the processing circuit 24 finds all sets of integers (k, ib and jb) in which the integer k is a sequence number assigned to a taken image associated with transformation parameters ($a_k$, $b_k$, $c_k$, $d_k$, $s_k$ and $t_k$) used in an affine transformation process to transform a position (ib−1, jb−1) in the coordinate system of the kth taken image into the position (x, y) located in the reference coordinate system as a post-transformation position with the coordinates (x, y) thereof satisfying the relations I'−2≦x<I'+2 and J'−2≦y<J'+2 expressing relations with the coordinates (I', J'). That is to say, for k=1 to N, the processing circuit 24 identifies a pixel located on the kth taken image as a pixel at a position with its coordinates (ib−1, jb−1) transformable into the coordinates (x, y) satisfying the above relations to be used in inference of the light quantity Lb (I', J') of the blue color. Then, the flow of the image generation processing goes on to the next step S208.

At the step S208, by using all the sets of integers (k, ib and jb) found at the step S207, the processing circuit 24 finds the value of expression (16) representing the denominator of the weighted addition equation for the light quantity of the blue color and the value of expression (15) representing the numerator of the same weighted addition equation. Then, the processing circuit 24 stores the values of the numerator and the denominator in the memory. Subsequently, the flow of the image generation processing goes on to the next step S209.

At the step S209, the processing circuit 24 produces a result of determination as to whether or not the value of the variable I' is equal to a pixel count (W−1) where notation W denotes the number of pixels on each row oriented in the X direction as a row of the taken image on the image-pickup device 4. If the determination result produced at the step S209 indicates that the value of the variable I' is not equal to the pixel count (W−1), that is, if a pixel located at the intersection of the present row represented by the value of the variable J' serving as the Y-direction coordinate (Y=J') and a column represented by the value of the variable I' serving as the X-direction coordinate has not been subjected to the processes of the steps S203 to S208, the flow of the image generation processing goes on to a step S210 at which the value of the variable I' is incremented by 1. Then, the flow of the image generation processing goes back to the step S203.

If the determination result produced at the step S209 indicates that the value of the variable I' is equal to the pixel count (W−1), that is, if every pixel located at the intersection of the present row represented by the value of the variable J' serving as the Y-direction coordinate (Y=J') and a column represented by the value of the variable I' serving as the X-direction coordinate has been subjected to the processes of the steps S203 to S208, on the other hand, the flow of the image generation processing goes on to a step S211.

At the step S211, the processing circuit 24 produces a result of determination as to whether or not the value of the variable J' is equal to a pixel count (H−1) where notation H denotes the number of pixels on each column oriented in the Y direction as a column of the taken image on the image-pickup device 4. If the determination result produced at the step S211 indicates that the value of the variable J' is not equal to the pixel count (H−1), that is, if not all rows arranged in the Y direction as rows of the image-pickup device 4 have been subjected to the processes of the steps S203 to S208, the flow of the image generation processing goes on to a step S212 at which the value of the variable J' is incremented by 1. Then, the flow of the image generation processing goes back to the step S202.

If the determination result produced at the step S211 indicates that the value of the variable J' is equal to the pixel count (H−1), that is, if all rows arranged in the Y direction as rows of the image-pickup device 4 have been subjected to the processes of the steps S203 to S208, on the other hand, the flow of the image generation processing goes on to a step S213 of a flowchart portion shown in FIG. 21.

Much like the step S201, at the step S213, the processing circuit 24 sets the variable J' at 0. Then, the flow of the image generation processing goes on to a step S214.

Much like the step S202, at the step S214, the processing circuit 24 sets the variable I' at 0. Then, the flow of the image generation processing goes on to a step S215.

At the step S215, the processing circuit 24 takes the position (I', J') as an observed position (I', J') and carries out a process to find the light quantity Lg (I', J') of the green color for the observed position (I', J'). To be more specific, at the step S215, the processing circuit 24 carries out a normal process to find the light quantity Lg (I', J') of the green color for the observed position (I', J') on the basis of the weighted addition equation expressed by Eq. (8) or an exception process to find the light quantity Lg (I', J') of the green color for the observed position (I', J') on the basis of the weighted addition equation expressed by Eq. (17) as will be described later. Then, the flow of the image generation processing goes on to a step S216.

At the step S216, the processing circuit 24 takes the position (I', J') as an observed position (I', J') and carries out a process to find the light quantity Lr (I', J') of the red color for the observed position (I', J'). To be more specific, at the step S216, the processing circuit 24 carries out a normal process to find the light quantity Lr (I', J') of the red color for the observed position (I', J') on the basis of the weighted addition equation expressed by Eq. (11) or an exception process to find the light quantity Lr (I', J') of the red color for the observed position (I', J') on the basis of the weighted addition equation expressed by Eq. (18) as will be described later. Then, the flow of the image generation processing goes on to a step S217.

At the step S217, the processing circuit 24 takes the position (I', J') as an observed position (I', J') and carries out a process to find the light quantity Lb (I', J') of the blue color for the observed position (I', J'). To be more specific, at the step S217, the processing circuit 24 carries out a normal process to find the light quantity Lb (I', J') of the blue color for the observed position (I', J') on the basis of the weighted addition equation expressed by Eq. (12) or an exception process to find the light quantity Lb (I', J') of the blue color for the observed position (I', J') on the basis of the weighted addition equation expressed by Eq. (19) as will be described later. Then, the flow of the image generation processing goes on to a step S218.

At the step S218, the processing circuit 24 produces a result of determination as to whether or not the value of the variable I' is equal to the pixel count (W−1). If the determination result produced at the step S218 indicates that the value of the variable I' is not equal to the pixel count (W−1), that is, if a pixel located at the intersection of the present row represented by the value of the variable J' serving as the Y-direction coordinate (Y=J') and a column represented by the value of the variable I' serving as the X-direction coordinate has not been subjected to the processes of the steps S215 to S217, the flow of the image generation processing goes on to a step S219 at which the value of the variable I' is incremented by 1. Then, the flow of the image generation processing goes back to the step S215.

If the determination result produced at the step S218 indicates that the value of the variable I' is equal to the pixel count (W−1), that is, if every pixel located at the intersection of the present row represented by the value of the variable J' serving as the Y-direction coordinate (Y=J') and a column represented by the value of the variable I' serving as the X-direction coordinate has been subjected to the processes of the steps S215 to S217, on the other hand, the flow of the image generation processing goes on to a step S220.

At the step S220, the processing circuit 24 produces a result of determination as to whether or not the value of the variable J' is equal to the pixel count (H−1). If the determination result produced at the step S220 indicates that the value of the variable J' is not equal to the pixel count (H−1), that is, if not all rows arranged in the Y direction as rows of the image-pickup device 4 have been subjected to the processes of the steps S215 to S217, the flow of the image generation processing goes on to a step S221 at which the value of the variable J' is incremented by 1. Then, the flow of the image generation processing goes back to the step S214.

If the determination result produced at the step S220 indicates that the value of the variable I' is equal to the pixel count (H−1), that is, if all rows arranged in the Y direction as rows of the image-pickup device 4 have been subjected to the processes of the steps S215 to S217, on the other hand, the flow of the image generation processing goes on to a step S222.

At the step S222, the processing circuit 24 generates an output image and supplies the output image to the D/A converter 9 or the codec 12. The output image has the light quantity Lg (I', J') found at the step S215 for the green color as the pixel value at the observed position (I', J'), the light quantity Lr (I', J') found at the step S216 for the red color as the pixel value at the observed position (I', J') and the light quantity Lb (I', J') found at the step S217 for the blue color as the pixel value at the observed position (I', J') where I'=0 to (W−1) and J'=0 to (H−1). Finally, the control of processing execution is returned to the calling program.

Next, by referring a flowchart shown in FIG. 22, the following description explains the processing carried out at the step S215 of the flowchart shown in FIG. 21 to find the light quantity Lg (I', J') at an observed position (I', J') for the green color.

The flowchart shown in FIG. 22 begins with a step S251 at which the processing circuit 24 produces a result of determination as to whether or not the value found at the step S204 of the flowchart shown in FIG. 20 as the absolute value of the denominator of the weighted addition equation expressed by Eq. (8) as a weighted addition equation for the green color at an observed position (I', J') is equal to or greater than a predetermined threshold value, that is, whether or not the value found at the step S204 as the absolute value of expression (10) is at least equal to the predetermined threshold value. The predetermined threshold value is the value of a criterion as to whether or not an exception process is to be carried out due to the fact that the absolute value of expression (10) is regarded as a value equivalent to 0. Typically, the predetermined threshold value is a value set in advance in the processing circuit 24. However, the predetermined threshold value can also be set by the user by carrying out an operation.

If the determination result produced at the step S251 indicates that the absolute value of expression (10) for the observed position (I', J') is equal to or greater than the predetermined threshold value or the absolute value of expression (10) for the observed position (I', J') is not such small that the value can be regarded as a value equivalent to 0, the flow of the image generation processing goes on to a step S252 at which the processing circuit 24 carries out a normal process to compute the light quantity Lg (I', J') of the green color in accordance with the weighted addition equation expressed by Eq. (8). In the normal process, for the observed position (I', J'), the processing circuit 24 divides the value found at the step S204 as the numerator of the weighted addition equation expressed by Eq. (8) for the green color by the value found at the step S204 as the denominator of the weighted addition equation. As described earlier, the numerator of the weighted addition equation expressed by Eq. (8) for the green color is the value of expression (9) and the denominator of the weighted addition equation is the value of expression (10). Thus, at the step S252, the processing circuit 24 computes the light quantity Lg (I', J') of the green color at the observed position (I', J').

If the determination result produced at the step S251 indicates that the absolute value of expression (10) for the observed position (I', J') is smaller than the predetermined threshold value or the absolute value of expression (10) for the observed position (I', J') is 0 or close to 0, on the other hand, the flow of the image generation processing goes on to a step S253 at which the processing circuit 24 carries out an exception process to compute the light quantity Lg (I', J') of the green color in accordance with the weighted addition equation expressed by Eq. (17). In the exception process, the processing circuit 24 computes the light quantity Lg (I', J') of the green color at the observed position (I', J') by dividing a sum of values found for the observed position (I', J') and positions in the vicinity of the observed position (I', J') as the numerators of Eq. (8) by a sum of values found for the observed position (I', J') and the vicinity positions as the denominators of Eq. (8).

Next, by referring to a flowchart shown in FIG. 23, the following description explains the processing carried out at the step S216 of the flowchart shown in FIG. 21 to find the light quantity Lr (I', J') at an observed position (I', J') for the red color.

The flowchart shown in FIG. 23 begins with a step S271 at which the processing circuit 24 produces a result of determination as to whether or not the value found at the step S206 of the flowchart shown in FIG. 20 as the absolute value of the denominator of the weighted addition equation expressed by Eq. (11) as a weighted addition equation for the red color at an observed position (I', J') is equal to or greater than a predetermined threshold value, that is, whether or not the value found at the step S206 as the absolute value of expression (14) is at least equal to the predetermined threshold value. The predetermined threshold value is the value of a criterion as to whether or not an exception process is to be carried out due to the fact that the absolute value of expression (14) is regarded as a value equivalent to 0. Typically, the predetermined threshold value is a value set in advance in the processing circuit 24. However, the predetermined threshold value can also be set by the user by carrying out an operation. This threshold value can be the same as the threshold value used at the step S251 of the flowchart shown in FIG. 22 or different from the threshold value used at the step S251.

If the determination result produced at the step S271 indicates that the absolute value of expression (14) for the observed position (I', J') is equal to or greater than the predetermined threshold value or the absolute value of expression (14) for the observed position (I', J') is not such small that the value can be regarded as a value equivalent to 0, the flow of the image generation processing goes on to a step S272 at which the processing circuit 24 carries out a normal process to compute the light quantity Lr (I', J') of the red color in accordance with the weighted addition equation expressed by Eq. (11). In the normal process, for the observed position (I', J'), the processing circuit 24 divides the value found at the step S206 as the numerator of the weighted addition equation expressed by Eq. (11) for the red color by the value found at the step S206 as the denominator of the weighted addition equation. As described earlier, the numerator of the weighted addition equation expressed by Eq. (11) for the red color is the value of expression (13) and the denominator of the weighted addition equation is the value of expression (14). Thus, at the step S272, the processing circuit 24 computes the light quantity Lr (I', J') of the red color at the observed position (I', J').

If the determination result produced at the step S271 indicates that the absolute value of expression (14) for the observed position (I', J') is smaller than the predetermined threshold value or the absolute value of expression (14) for the observed position (I', J') is 0 or close to 0, on the other hand, the flow of the image generation processing goes on to a step S273 at which the processing circuit 24 carries out an exception process to compute the light quantity Lr (I', J') of the red color in accordance with the weighted addition equation expressed by Eq. (18). In the exception process, the processing circuit 24 computes the light quantity Lr (I', J') of the red color at the observed position (I', J') by dividing a sum of values found for the observed position (I', J') and positions in the vicinity of the observed position (I', J') as the numerators of Eq. (11) by a sum of values found for the observed position (I', J') and the vicinity positions as the denominators of Eq. (11).

Figure 24:
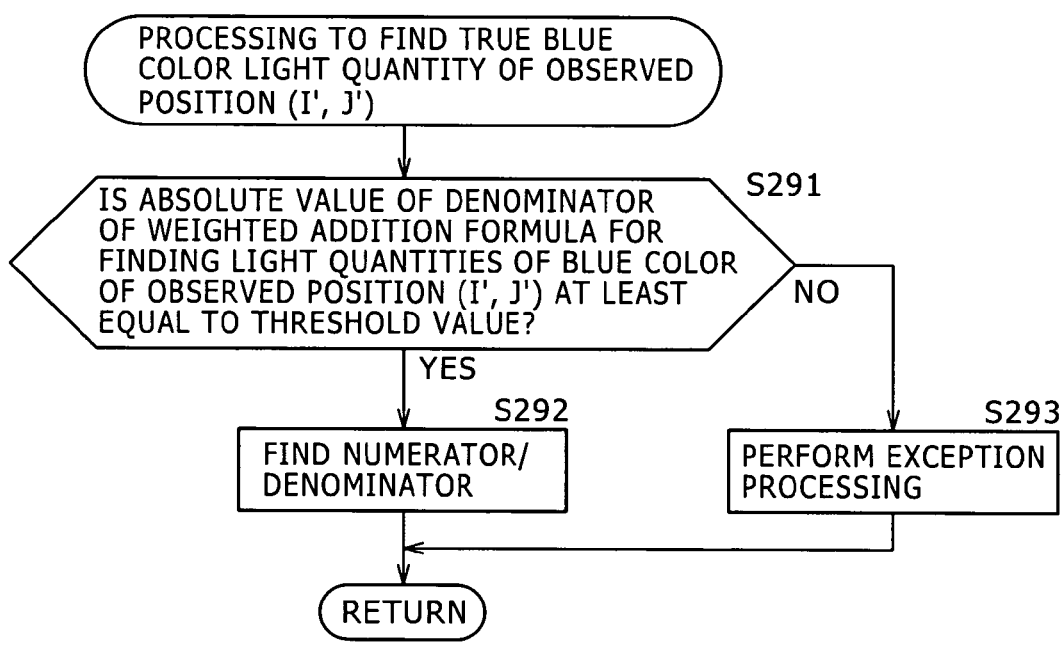
FIG. 24 shows a flowchart referred to in explanation of processing to find a light quantity Lb (I', J') of the blue color.

Next, by referring to a flowchart shown in FIG. 24, the following description explains the processing carried out at the step S217 of the flowchart shown in FIG. 21 to find the light quantity Lb (I', J') at an observed position (I', J') for the blue color.

The flowchart shown in FIG. 24 begins with a step S291 at which the processing circuit 24 produces a result of determination as to whether or not the value found at the step S208 of the flowchart shown in FIG. 20 as the absolute value of the denominator of the weighted addition equation expressed by Eq. (12) as a weighted addition equation for the blue color at an observed position (I', J') is equal to or greater than a predetermined threshold value, that is, whether or not the value found at the step S208 as the absolute value of expression (16) is at least equal to the predetermined threshold value. The predetermined threshold value is the value of a criterion as to whether or not an exception process is to be carried out due to the fact that the absolute value of expression (16) is regarded as a value equivalent to 0. Typically, the predetermined threshold value is a value set in advance in the processing circuit 24. However, the predetermined threshold value can also be set by the user by carrying out an operation. This threshold value can be the same as the threshold value used at the step S251 of the flowchart shown in FIG. 22 or the step S271 of the flowchart shown in FIG. 23, or can be different from the threshold value used at the step S251 or the step S271.

If the determination result produced at the step S291 indicates that the absolute value of expression (16) for the observed position (I', J') is equal to or greater than the predetermined threshold value or the absolute value of expression (16) for the observed position (I', J') is not such small that the value can be regarded as a value equivalent to 0, the flow of the image generation processing goes on to a step S292 at which the processing circuit 24 carries out a normal process to compute the light quantity Lb (I', J') of the blue color in accordance with the weighted addition equation expressed by Eq. (12). In the normal process, for the observed position (I', J'), the processing circuit 24 divides the value found at the step S208 as the numerator of the weighted addition equation expressed by Eq. (12) for the blue color by the value found at the step S208 as the denominator of the weighted addition equation. As described earlier, the numerator of the weighted addition equation expressed by Eq. (12) for the blue color is the value of expression (15) and the denominator of the weighted addition equation is the value of expression (16). Thus, at the step S292, the processing circuit 24 computes the light quantity Lb (I', J') of the blue color at the observed position (I', J').

If the determination result produced at the step S291 indicates that the absolute value of expression (16) for the observed position (I', J') is smaller than the predetermined threshold value or the absolute value of expression (16) for the observed position (I', J') is 0 or close to 0, on the other hand, the flow of the image generation processing goes on to a step S293 at which the processing circuit 24 carries out an exception process to compute the light quantity Lb (I', J') of the blue color in accordance with the weighted addition equation expressed by Eq. (19). In the exception process, the processing circuit 24 computes the light quantity Lb (I', J') of the blue color at the observed position (I', J') by dividing a sum of values found for the observed position (I', J') and positions in the vicinity of the observed position (I', J') as the numerators of Eq. (12) by a sum of values found for the observed position (I', J') and the vicinity positions as the denominators of Eq. (12).

As described above, the light quantity Lg (I', J') of the green color, the light quantity Lr (I', J') of the red color and the light quantity Lb (I', J') of the blue color can be found by carrying out the image generation processing represented by the flowchart shown in FIGS. 20 and 21. In the image generation processing, each of the light quantities is computed by carrying out a weighted addition operation on pixel values at an observed position (I', J') and pixel values at positions each included in a target image as positions transformed into post-transformation positions (x, y). Weights of the weighted addition operation are values dependent on the distances between the observed position (I', J') and the post-transformation positions (x, y) in the vicinity of the observed position (I', J'). As the weights of the weighted addition operation, a Cubic function having the characteristic of a low-pass filter is used.

To be more specific, in a normal process, the light quantity Lg (I', J') of the green color is found in accordance with Eq. (8), which represents a weighted addition process applied to pixel values Gobs (k, ig, jg) at an observed position (I', J') and pre-transformation positions (ig−1, jg−1). To put it in detail, the light quantity Lg (I', J') of the green color is found by carrying out a weighted addition operation on the pixel values Gobs (k, ig, jg) corresponding to all sets of integers (k, ig and jg) in which the integer k is a sequence number assigned to a taken image associated with transformation parameters ($a_k$, $b_k$, $c_k$, $d_k$, $s_k$ and $t_k$) used in an affine transformation process to transform a pre-transformation position (ig−1, jg−1) in the coordinate system of the kth taken image into the position (x, y) located in the reference coordinate system as a post-transformation position with the coordinates (x, y) thereof satisfying the relations I'−2≦x<I'+q and J'−2≦y<J'+2 expressing relations with the coordinates (I', J').

If the absolute value of expression (10) expressing the denominator of Eq. (8) representing weight addition of light quantities for the green color at an observed position (I', J') is smaller than a predetermined threshold value so that the absolute value of expression (10) may be regarded as 0, that is, if the value found in accordance with Eq. (8) representing the weight addition of light quantities for the green color at an observed position (I', J') is unstable, however, the processing circuit 24 carries out an exception process to find the light quantity Lg (I', J') of the green color in accordance with Eq. (17) representing the weight addition of pixel values Gobs (k, ig, jg) at positions each having coordinates (ig−1, jg−1) transformed into coordinates (x, y) of a post-transformation position in close proximity to the observed position (I', J') and pixel values Gobs (k, ig, jg) at positions each having coordinates (ig−1, jg−1) transformed into coordinates (x, y) of a post-transformation position in close proximity to a vicinity pixel in the vicinity of the observed position (I', J').

The light quantity Lr (I', J') of the red color and the light quantity Lb (I', J') of the blue color are found in the same way as the light quantity Lg (I', J') of the green color.

Thus, it is possible to obtain a sharp output image with no striking noise components.

The normal and exception processes can bee seen from a different point of view as follows.

Let us pay attention to the green color taken as an example. In the case described above, the processing circuit 24 carries out a normal process to find the light quantity Lg (I', J') of the green color by carrying out a weight addition operation on pixel values Gobs (k, ig, jg) of pixels at positions included in kth taken images as positions each having coordinates (ig−1, jg−1) transformed into coordinates (x, y) of a post-transformation position in close proximity to the observed position (I', J') of an observed pixel. In the exception process, on the other hand, the processing circuit 24 finds the light quantity Lg (I', J') of the green color by carrying out a weight addition operation on pixel values Gobs (k, ig, jg) at positions each having coordinates (ig−1, jg−1) transformed into coordinates (x, y) of a post-transformation position in close proximity to the observed position (I', J') and pixel values Gobs (k, ig, jg) at positions each having coordinates (ig−1, jg−1) transformed into coordinates (x, y) of a post-transformation position in close proximity to a vicinity pixel in the vicinity of the observed position (I', J') of the observed pixel.

Thus, in the exception process, the processing circuit 24 finds the light quantity Lg (I', J') of the green color by carrying out a weight addition operation on pixel values Gobs (k, ig, jg) at positions each having coordinates (ig−1, jg−1) transformed into coordinates (x, y) of a post-transformation position in close proximity to a vicinity pixel in the vicinity of the observed position (I', J') of the observed pixel in addition to pixel values Gobs (k, ig, jg) at positions each having coordinates (ig−1, jg−1) transformed into coordinates (x, y) of a post-transformation position in close proximity to the observed position (I', J').

As described above, in the normal process, the processing circuit 24 finds the light quantity Lg (I', J') of the green color by carrying out a weight addition operation on pixel values Gobs (k, ig, jg) of pixels at positions each having coordinates (ig−1, jg−1) transformed into coordinates (x, y) of a post-transformation position in a normal-process area in close proximity to the observed position (I', J') of an observed pixel. Precisely speaking, the coordinates (x, y) satisfy the relations I'−2≦x<I'+2 and J'−2≦y<J'+2 where notations I' and J' denote the coordinates of the observed position. In the exception process, on the other hand, the processing circuit 24 finds the light quantity Lg (I', J') of the green color by carrying out a weight addition operation on pixel values Gobs (k, ig, jg) of pixels at positions each having coordinates (ig−1, jg−1) transformed into coordinates (x, y) of a post-transformation position in an exception-process area located in close proximity to a vicinity pixel in the vicinity of the observed position (I', J') of the observed pixel as an area broader than the aforementioned area for the normal process. Precisely speaking, coordinates (x, y) satisfy the relations I'−3≦x<I'+3 and J'−3≦y<J'+3 where notations I' and J' denote the coordinates of the observed position.

In other words, the exception-process area represented by the relations I'−3≦x<I'+3 and J'−3≦y<J'+3 is set in advance as an area in close proximity to the observed position (I', J') in a process to find the light quantity Lg (I', J') of the green color. In the normal process, the processing circuit 24 can be said to find the light quantity Lg (I', J') of the green color by carrying out a weight addition operation represented by Eq. (8), which assumes that the weights of the pixel values Gobs (k, ig, jg) observed as pixel values of pixels in a portion included in the exception-process area as a portion outside the normal-process area represented by the relations I'−2≦x<I'+2 and J'−2<y<J'+2 are 0. In the case of the exception process, on the other hand, the weights of the pixel values Gobs (k, ig, jg) observed as pixel values of pixels in a portion included in the exception-process area as a portion outside the normal-process area represented by the relations I'−2≦x<I'+2 and J'−2≦y<J'+2 are not 0. That is to say, the weights of pixel values Gobs (k, ig, jg) at positions each having coordinates (ig−1, jg−1) transformed into coordinates (x, y) of a post-transformation position in close proximity to a vicinity pixel in the vicinity of the observed position (I', J') of the observed pixel are not 0. In this case, the processing circuit 24 can be said to find the light quantity Lg (I', J') of the green color by carrying out a weight addition operation represented by Eq. (17). In the case of Eq. (17), each weight is expressed by the value of a Cubic function referred to as Cubic (z) taking the position of a vicinity pixel as an origin.

That is to say, in exception normal, the light quantity Lg (I', J') of the green color can be found by carrying out a weight addition operation using weights different from the weights used in the normal process.

It is to be noted that, as a function having the characteristic of a low-pass filter with respect to the distance z between the observed position (I', J') and the post-transformation position (x, y) located in close proximity to the observed position (I', J') as the post-transformation position (x, y) resulting from transformation of a position (ig−1, jg−1) of a pixel having the pixel value Gobs (k, ig, jg), for example, the function sin (z)/z can also be adopted in addition to Cubic (z) expressed by Eq. (7) as a Cubic function.

By the way, in the embodiment described above, the first taken image is used as the reference image whereas the second to Nth taken images are each used as a target image. However, a taken image selected from the second to Nth taken images as a taken image other than the first image can also be used as a reference image.

Figure 25:
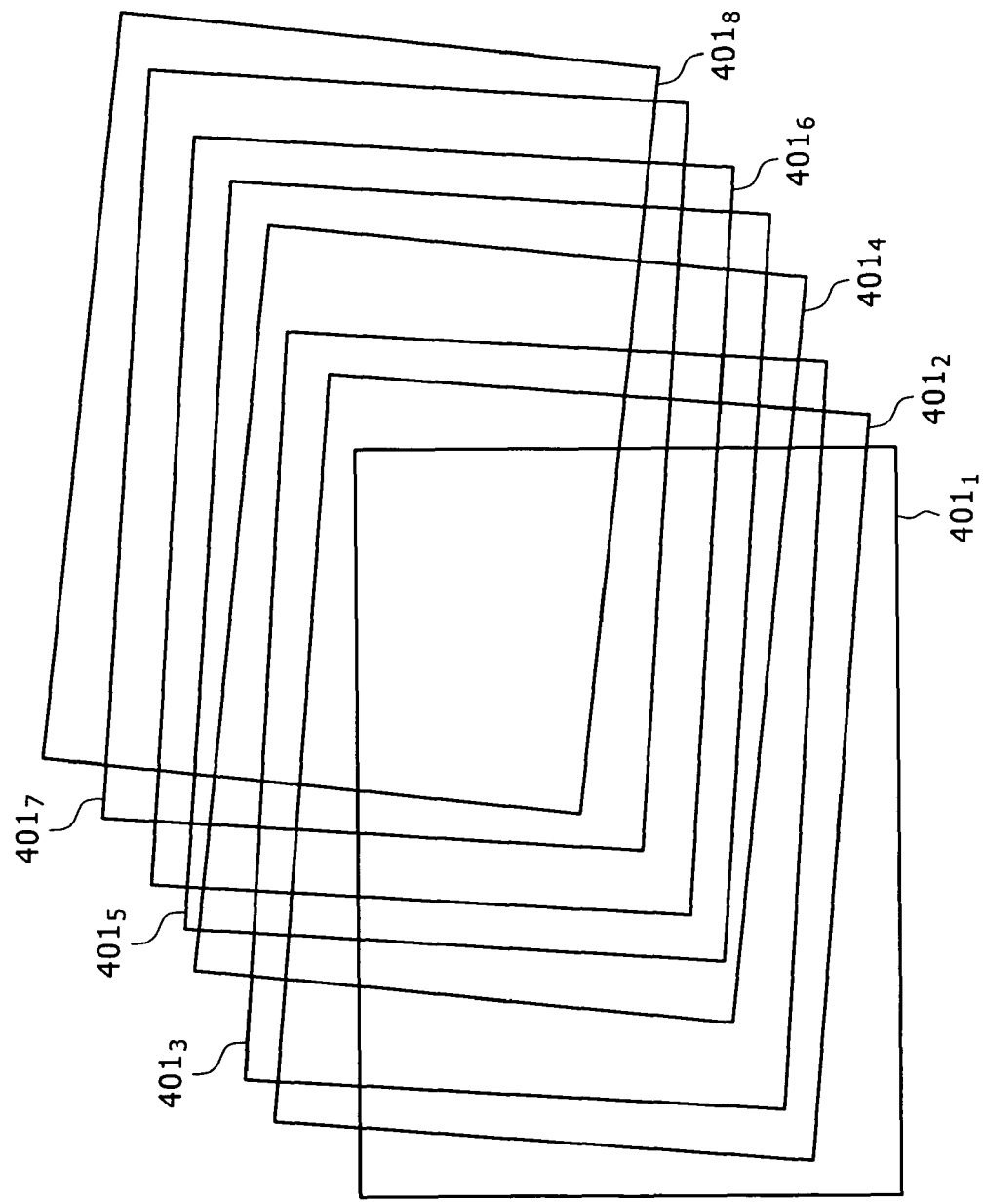
FIG. 25 is a diagram showing taken images $401_1$ to $401_8$.

FIG. 25 is a diagram showing N taken images produced by N consecutive image-pickup operations carried out successively at a high speed. It is to be noted that FIG. 25 is a diagram showing a case in which N=8.

In the figure, reference numeral $401_k$ denotes the kth taken image. The first taken image $401_1$ to the eighth taken image $401_8$ are eight taken images produced by eight consecutive image-pickup operations successively carried out at a high speed as images shifted by hand trembling with the lapse of time in a direction toward the right upper corner of the figure.

To put it in detail, FIG. 25 shows the first taken image $401_1$ to the eighth taken image $401_8$ by adjusting the positions of the first taken image $401_1$ to the eighth taken image $401_8$ in such a way that common portions projected on the first taken image $401_1$ to the eighth taken image $401_8$ overlap each other. Taken images are also shown in FIGS. 26 and 27 to be described later in the same way as FIG. 25.

It is to be noted that, in order to make the occurrence of hand trembling easy to understand, FIG. 25 shows the first taken image $401_1$ to the eighth taken image $401_8$ by exaggerating the quantities of shifts caused by the hand trembling. FIGS. 26 and 27 are each a diagram showing taken images in the same way as FIG. 25.

Figure 26:
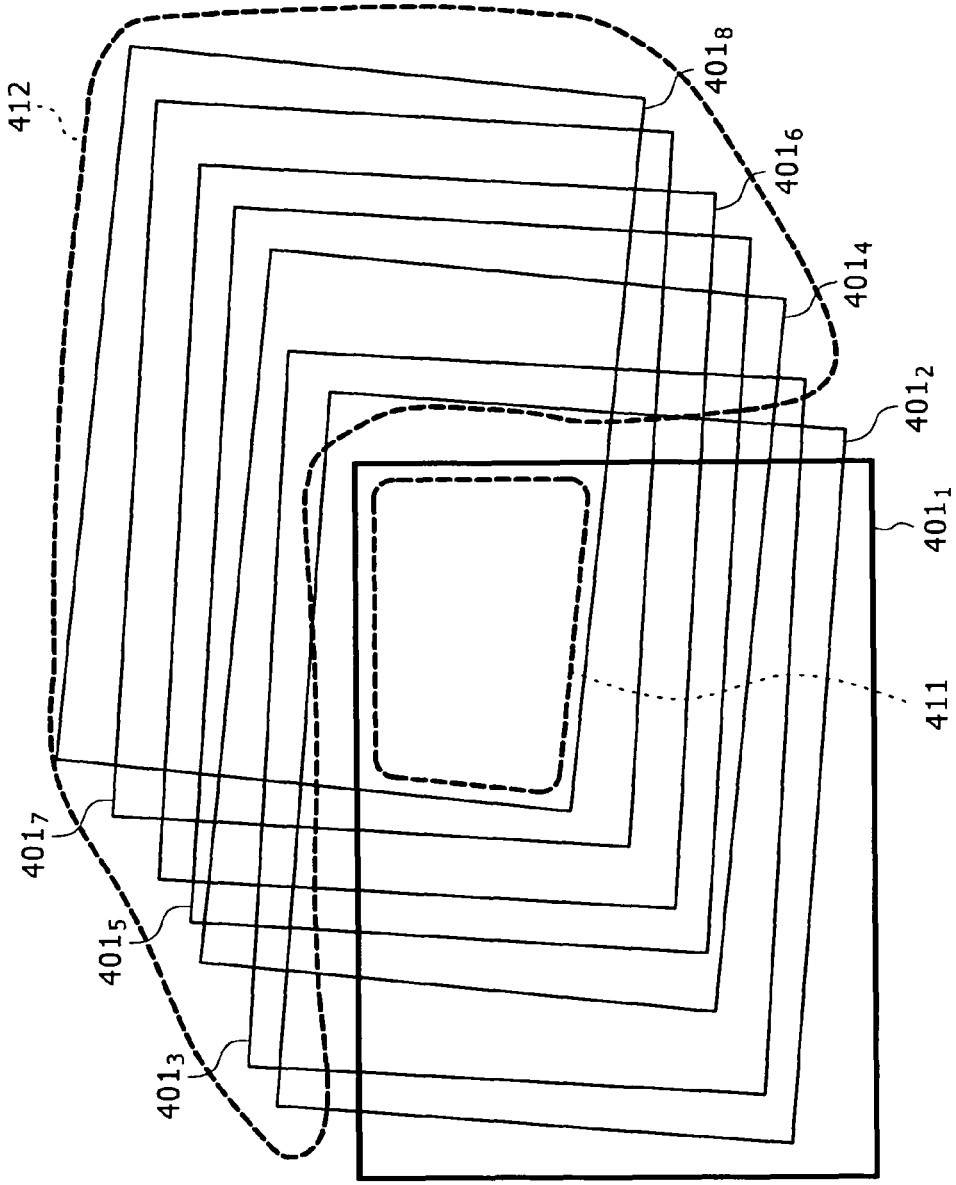
FIG. 26 is an explanatory diagram showing an output image for a case in which the first taken image is used as a reference image.
Figure 27:
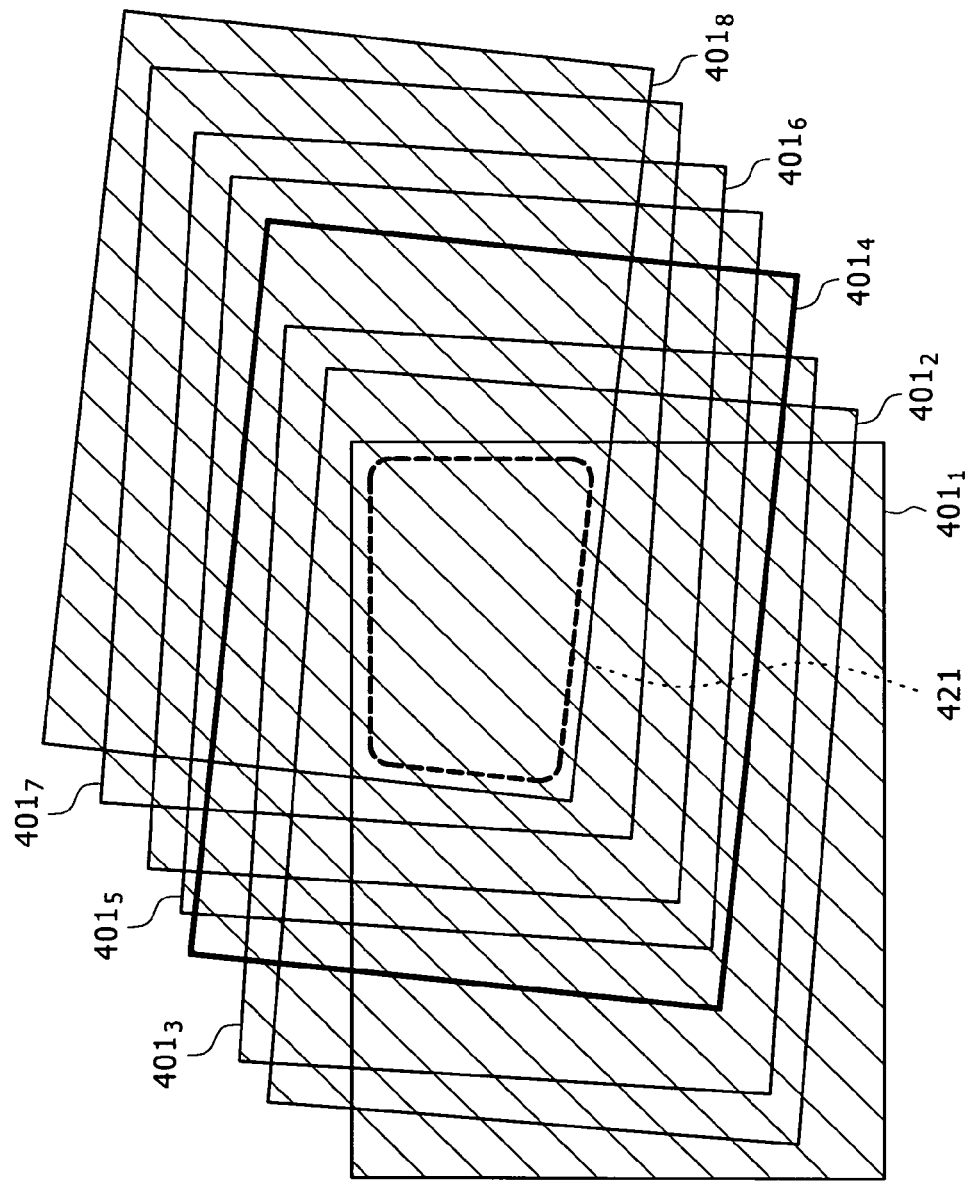
FIG. 27 is an explanatory diagram showing an output image for a case in which a middle taken image is used as a reference image.

FIG. 26 is a diagram showing eight taken images, i.e., the first taken image $401_1$ to the eighth taken image $401_8$ which are shown in FIG. 25.

In a process carried out by the signal processing circuit 7 to generate an output image by using the first one selected among the first taken image $401_1$ to the eighth taken image $401_8$ as the reference image and using each of the second to the eighth taken images as a target image, the output image is produced as an image in the coordinate system of the first taken image serving as the reference image. In FIG. 26, the first taken image $401_1$, that is, the output image, is enclosed by a thick line.

An area enclosed by a thick line in FIG. 26 as the area of the output image includes an area 411 enclosed by a dashed line at the upper right corner. The area 411 is an area in which pixel values each representing the quantity of light are inferred by using data of pixel values of all the first taken image $401_1$ to the eighth taken image $401_8$. Since pixel values of the area 411 are inferred by using data of pixel values of all the first taken image $401_1$ to the eighth taken image $401_8$, the resulting output image has a picture quality showing better sharpness.

In the process to generate the output image, however, pixel values of portions included in the area enclosed by the thick line in FIG. 26 as portions outside the area 411 are inferred by using data of pixel values of only some of the first taken image $401_1$ to the eighth taken image $401_8$. That is to say, the pixel values of the portions outside the area 411 are inferred not by using data of pixel values of all the first taken image $401_1$ to the eighth taken image $401_8$. Thus, the image part on the portions outside the area 411 has a picture quality showing sharpness deteriorated by an amount corresponding to the exclusion of pixel values of some of the first taken image $401_1$ to the eighth taken image $401_8$ in comparison with the image part in the area 411. In the case of hand trembling occurring in a direction toward the right upper corner as described above, the farther the portion of the output image is separated away from the area 411 in the opposite direction toward the left lower corner, the smaller the amount of data usable in the process to generate the output image so that the image part on the portions outside the area 411 has a picture quality showing deteriorated sharpness in comparison with the image part in the area 411.

The data of a portion 412 outside the area enclosed by the thick line in FIG. 26 is the so-called discarded data, which cannot be used in the process to generate the output image. The portion 412 covers portions included in the second to eighth taken images $401_2$ to $401_8$ each serving as a target image as portions, the pixels values of which are not usable.

If an output image is generated by taking the first taken image as the reference image and hand trembling occurs in a certain direction as described above, an area separated away from the center point of the output image in the same direction has a picture quality of good sharpness but an area separated away from the center point of the output image in the opposite direction has a picture quality of poor sharpness. An example of the area separated away from the center point of the output image in the same direction as the direction of hand trembling is the area 411 shown in FIG. 26.

By the way, in general, when the user looks at an image, the user pays attention to the center portion of the image in many cases. In addition, when a photographing operation is carried out by using the digital camera 1, the digital camera 1 is oriented in such a direction that the photographing object attracting attention is positioned at the center portion of the image or the center portion of the image frame. It is thus desirable to produce an output picture of the digital camera 1 as a picture especially having a picture quality of good sharpness at the center thereof.

In order to meet the above requirement of a desirable output image, the signal processing circuit 7 is capable of generating an output image by adopting a taken image produced at the middle time of a period, in which the N consecutive taken images are generated successively or a taken image produced at a time close to the middle time as a reference image and adopting each of the remaining taken images as a target image. In the following description, the taken image produced at the middle time of the period or a taken image produced at a time close to the middle time is referred to as a middle image.

For example, the signal processing circuit 7 is capable of generating an output image by selecting the fourth taken image enclosed by a thick line as shown in FIG. 27 among the eight taken images $401_1$ to $401_8$ and adopting the selected fourth taken image as the reference image. In this case, in a process to generate the output image, data of pixel values in an area 421 at the center of each of all the eight taken images $401_1$ to $401_8$ (i.e., the first to eighth taken images) is used.

That is to say, a middle image is selected among a plurality of taken images produced along the time axis, being used as the reference image, and the remaining taken images are each used as a target image in the process to generate an output image. Thus, it is possible to generate an output image with the center portion thereof exhibiting a picture quality of good sharpness.

As described above, in a photographing operation carried out by using the digital camera 1, the user orients the digital camera 1 in such a direction that the photographing object attracting attention is positioned at the center portion of the image or the center portion of the image frame. This is because, in general, when the user looks at an image, the user pays attention to the center portion of the image in many cases. For this reason, an image with a center portion having a better sharpness picture quality than the remaining portions of the image is rather said to be a good image.

Thus, by adopting a middle image as the reference image and each of the remaining image as a target image as shown in FIG. 27, data of pixel values in an area at the center of each of all the eight taken images $401_1$ to $401_8$ (i.e., the first to eighth taken images) is used in a process to infer the pixel values of the center of the output image. It is therefore possible to generate an output image better than an output image generated by adopting the first taken image as the reference image.

It is to be noted that the frequency of hand trembling has a typical value in the range 10 to 15 Hz. Thus, at a shutter speed capable of producing the eight taken images $401_1$ to $401_8$ within a typical period of 1/50 seconds, for example, the hand-trembling quantity representing the quantity of shaking caused by hand trembling can be approximated as a linear movement. That is to say, the hand trembling can be regarded as a movement made in a constant direction at a constant speed. Thus, in a process to produce the eight taken images $401_1$ to $401_8$ along the time axis, the hand trembling during the image-pickup period can be approximated as a linear movement and a middle image such as the fourth taken image $401_4$ or the fifth taken image $401_5$ can be adopted as the reference image to generate an output image with the center portion thereof exhibiting a picture quality of good sharpness as explained earlier by referring to FIG. 27.

Let us assume for example that the fourth taken image $401_4$ selected from the 8 taken images $401_1$ to $401_8$ is adopted as the reference image in the signal processing circuit 7 shown in FIG. 4. In this case, the fourth taken image $401_4$ serving as the reference image is supplied to the frame memory $22_1$ to be stored in the frame memory $22_1$. On the other hand, the first to third taken images $401_1$ to $401_3$ are supplied to the second to fourth frame memories $22_2$ to $22_4$ respectively whereas the fifth to eighth taken images $401_5$ to $401_8$ are supplied to the fifth to eighth frame memories $22_5$ to $22_8$ respectively.

By adopting a middle image as the reference image as described above, it is possible to generate an output image with the center portion thereof exhibiting a picture quality of good sharpness and, in addition, the signal processing circuit 7 can be designed with ease.

That is to say, when the eight taken images $401_1$ to $401_8$ are produced along the time axis on the assumption that the hand trembling can be approximated as a linear movement as described above, let us assume for example that the quantity of the hand trembling between two adjacent taken images is a distance equivalent to 10 pixels. In this case, if the first taken image is adopted as the reference image, a hand-trembling quantity of up to 70 pixels is resulted in even if an image can be taken in a very short period of time. Thus, it is necessary to design the signal processing circuit 7 into a configuration capable of keeping up with a hand-trembling quantity of up to 70 pixels.

With a middle image adopted as the reference image, on the other hand, the maximum quantity of hand trembling is 40 pixels. An example of the middle image is the fourth image $401_4$ selected among the first taken image $401_1$ to the eighth taken image $401_8$. In this case, it is necessary to design the signal processing circuit 7 into a configuration capable of keeping up with a hand-trembling quantity of up to only 40 pixels. As a result, the hardware of the signal processing circuit 7 can be designed with ease.

It is to be noted that, when a middle image such as the fourth image $401_4$ is selected among the first taken image $401_1$ to the eighth taken image $401_8$ and adopted as the reference image in order to generate an output image as described above, an image projected on the fourth image $401_4$ serving as the reference image as an image in the range of the photographing object becomes the output image.

By the way, by adopting a middle image such as the fourth image $401_4$ selected among the first taken image $401_1$ to the eighth taken image $401_8$ as the reference image in order to generate an output image as described above, the data of all the eight taken images ranging from the first taken image $401_1$ to the eighth taken image $401_8$ is used in a process to generate the center portion of the output image. In a process to generate peripheral portions of the output image, however, the data of only some of the eight taken images ranging from the first taken image $401_1$ to the eighth taken image $401_8$ can be used. Thus, even though the center portion of the output image has a picture quality of good sharpness, the peripheral portions have a picture quality of poor sharpness in comparison with the center portion. By the peripheral portions of the output image, portions close to the frames of the image are meant.

Such a deteriorated picture quality is generated in an output image because an image in the entire range of the photographing object projected on the fourth image $401_4$ serving as the reference image is generated as the output image. Even if an image other than the fourth image $401_4$ is selected among the eight taken images ranging from the first taken image $401_1$ to the eighth taken image $401_8$ to be adopted as the reference image, hand trembling causes the output image to include a specific portion with a deteriorated picture quality as long as an image in a range projected on the reference image as the entire range of the photographing object is generated as the output image. This is because, in a process to generate the specific portion of the output image, the data of only some of the eight taken images ranging from the first taken image $401_1$ to the eighth taken image $401_8$ can be used.

In order to solve the above problem, the processing circuit 24 is designed as a circuit capable of generating an output image with all the portions thereof having a picture quality of good sharpness and with a pixel interval smaller than the interval between pixels of each of the N taken images on the basis of image portions located at the centers of the N taken images. The centers of the N taken images do not include peripheral portions of a range projected on each of the N taken images as the range of the photographing object.

That is to say, in a photographing operation triggered by an operation carried out once by the user to press the release button employed in the digital camera 1, N image-pickup processes are carried out to produce N taken images. Since hand trembling occurring during the N image-pickup processes can be assumed to be a linear movement, the center portion of the range of the photographing object almost coincides with the center portion of a middle image selected among the N taken images. As described above, the center portion does not include peripheral portions of a range projected on the N taken images as the range of the photographing object.

To put it concretely, for example, the center portion of a range projected on the N taken images ranging from the first taken image $401_1$ to the eighth taken image $401_8$ as the range of the photographing object almost coincides with an area 421 at the center of a middle image, which is the fourth taken image $401_4$ in this case, as shown in FIG. 27. The range projected on the N taken images ranging from the first taken image $401_1$ to the eighth taken image $401_8$ as the range of the photographing object is a hatched area shown in FIG. 27.

Thus, by generating only the image of the center portion of the range of the photographing object as an output image and excluding images of the peripheral portions of a range projected on the N taken images as the range of the photographing object from the output image, it is possible to obtain an output image having a picture quality of good sharpness in its entire area. The center portion of the range of the photographing object (all but) coincides with the area 421.

By the way, the digital camera 1 shown in FIG. 1 is capable of adopting the ordinary photographing mode or the hand-trembling correction photographing mode as its photographing mode as described before. The hand-trembling correction photographing mode is a photographing mode suitable for example for a situation in which a dark scene is photographed. In the hand-trembling correction photographing mode, N taken images are produced and an output image is generated from the N produced taken images. On the other hand, the ordinary photographing mode is a photographing mode suitable for example for a situation in which a bright scene is photographed. In the ordinary photographing mode, a taken image is produced and generated as an output image as it is. By properly selecting either the ordinary photographing mode or the hand-trembling correction photographing mode, it is possible to obtain a sufficiently bright output image without an effect caused by hand trembling for example regardless of whether the photographed scene is a dark or bright scene.

With either the ordinary photographing mode or the hand-trembling correction photographing mode selectable as a photographing mode as described above, in the hand-trembling correction photographing mode, only the image of the center portion of the range of the photographing object can be generated as an output image excluding images of the peripheral portions of a range projected on the N taken images as the range of the photographing object. In this case, the output image is the image of only the center portion excluding the peripheral portions of a range projected on the N taken images as the range of the photographing object or the image of only the center portion of a middle image. Thus, the number of pixels included in the output image is smaller than the number of pixels included in the middle image, which is one of the taken images. Accordingly, the number of pixels included in the output image is smaller than the number of pixels on the image-pickup device 4 employed in the digital camera 1 as shown in FIG. 1.

Therefore, the number of pixels included in an output image generated in the hand-trembling correction photographing mode is smaller than the number of pixels included in an output image generated in the ordinary photographing mode. The difference in pixel count (or the difference in number of pixels) between an output image generated in the hand-trembling correction photographing mode and an output image generated in the ordinary photographing mode causes the user to feel incompatibility. That is to say, the difference in pixel count between output images generated by the digital camera 1 is a sort of inconvenience to the user.

In addition, the number of pixels in the image-pickup device employed in a digital camera is sometimes used as an indicator representing the performance of the camera. Thus, in some cases, the user may make a decision to purchase a digital camera by considering the number of pixels in the image-pickup device. Also from the pixel-count point of view, an output image generated in the hand-trembling correction photographing mode as an image having a pixel count smaller than the number of pixels on the image-pickup device is not desirable. As described above, the number of pixels on the image-pickup device is also the number of pixels on each taken image.

In order to solve the problem described above, the digital camera 1 generates an output image in the hand-trembling correction photographing mode as an image having a pixel interval smaller than the interval between pixels on each taken image.

That is to say, in the embodiment described above, an output image is generated as an image having a pixel interval equal to the interval between pixels on each of the N taken images. Let us assume that the interval between pixels on each of the N taken images is 1. Thus, if an image in a range projected on the reference image as the entire range of the photographing object is generated as an output image, the number of pixels on the output image will be equal to the number of pixels on the reference image. If an image of only the center portion of the range of a photographing object projected on a middle image serving as the reference image is generated as an image, on the other hand, the number of pixels on the output image will be equal to the number of pixels on the center portion of a range projected on the reference image as the range of the photographing object. As a result, the number of pixels on the output image will be smaller than the number of pixels on the reference image. The above center portion is the center portion of the photographing object projected on N taken images.

If an output image is generated as an image having a pixel interval smaller than the interval between pixels on each of the N taken images, that is, if an output image is generated as an image having a pixel interval smaller than 1, the number of pixels on the output image can be made equal to the number of pixels on the reference image.

What is described above is summarized as follows. In the hand-trembling correction photographing mode, a middle image is adopted as the reference image and an image in a range projected on the reference image as the entire range of the photographing object is generated as an output image. In this case, even though the center portion of the output image has a picture quality of good sharpness, the peripheral portions have a picture quality of poor sharpness in comparison with the center portion.

That is to say, let us assume for example that the number of pixels (effective pixels) on the image-pickup device 4 employed in the digital camera 1 shown in FIG. 1 is W×H as described earlier. In this case, in the reference coordinate system, which is the coordinate system of the reference image, the picture quality exhibited at points (or pixels) (x, y) as the picture quality of the output image, where $x \approx 0$, $x \approx W-1$, $y \approx 0$ and $y \approx H-1$, is poor in comparison with the picture quality of the center portion. In other words, the picture quality of the peripheral portions is poor in comparison with the picture quality of the center portion other than the peripheral portions.

In order to solve the above problem, the image of the center portion of a range projected on the reference image as the range of the photographing object is used as the output image to obtain an output image having a picture quality of good sharpness in its entire range. That is to say, the image of the center portion of a range projected on the N taken images as the range of the photographing object is used as the output image to provide a picture quality of good sharpness in the entire range of the output image. An example of the center portion is the area 421 shown in FIG. 27.

If the image of the center portion of a range projected on the reference image as the range of the photographing object is used as the output image, however, a range (or a field of vision) projected on the reference image as the range of the photographing object becomes narrower. Thus, if an output image is generated as an image having a pixel interval equal to the interval between pixels on the reference image or each of the taken images, the number of pixels on the output image becomes smaller than the number of pixels on the reference image or the number of pixels on each of the taken images. That is to say, the number of pixels on the output image becomes smaller than the number of pixels on the image-pickup device 4.

Thus, if an output image is generated as an image having a pixel interval smaller than the interval between pixels on each taken image, it is possible to obtain an output image, which has a picture quality of good sharpness in its entire range and has a pixel count equal to the number of pixels on every taken image.

Next, by referring to a flowchart shown in FIG. 28, the following description explains a photographing process carried out by the digital camera 1 at a step S507 of a flowchart, which will be described later by referring to FIG. 44, in order to obtain an output image having a picture quality of good sharpness in its entire range and having a pixel count equal to the number of pixels on every taken image in the hand-trembling correction photographing mode.

Figure 28:
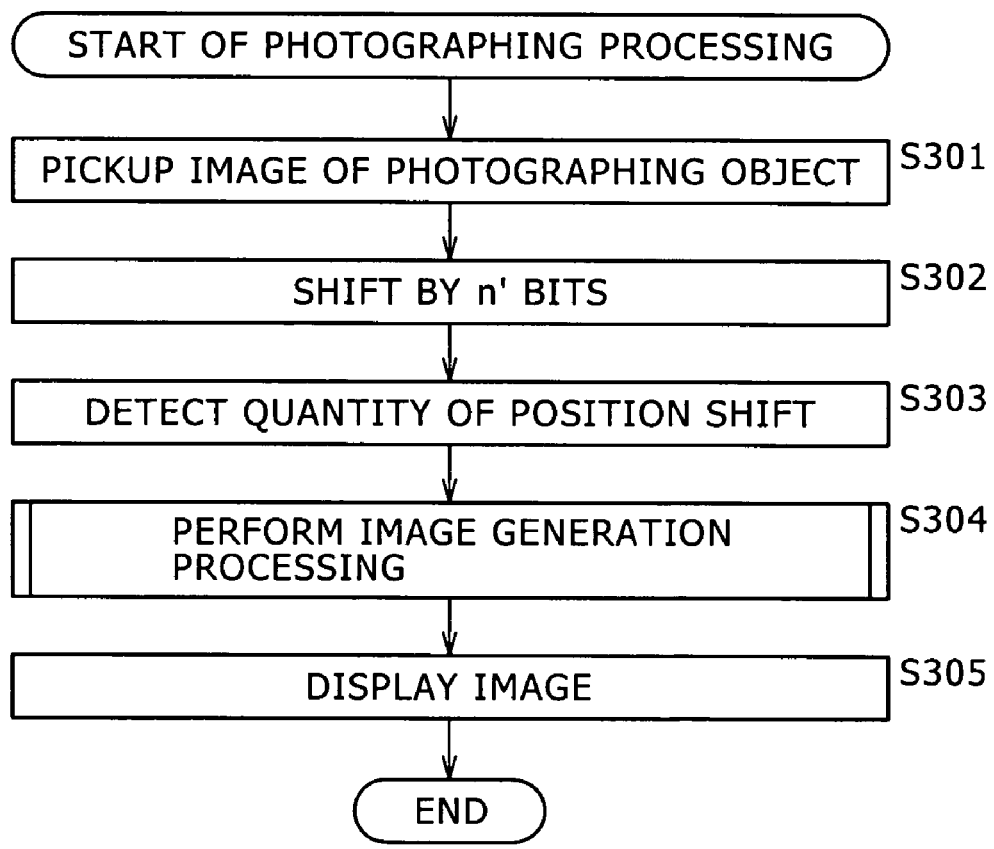
FIG. 28 shows a flowchart referred to in explanation of processing carried out by the digital camera 1 shown in FIG. 1.

At steps S301 to S305 of the flowchart shown in FIG. 28, the digital camera 1 carries out basically the same processes as respectively the steps S1 to S5 of the flowchart shown in FIG. 2.

At the step S303, however, instead of taking the first taken image, the digital camera 1 adopts a middle image selected among the first to Nth taken images as the reference image and each of the other taken images as a target image. Then, the digital camera 1 detects the quantity of a shift experienced by each of the target images as a shift from the reference image.

Subsequently, at the next step S304, the digital camera 1 carries out image generation processing to generate the image of the center portion of the range of the photographing object, which is projected on the reference image, as an output image instead of generating the image of the entire range of the photographing object. As described earlier, the center portion does not include peripheral portions of a range projected on the N taken images as the entire range of the photographing object. The image generated as the output image has a pixel interval smaller than the interval between pixels on each taken image.

The flowchart shown in FIG. 28 starts with a step S301 at which the image-pickup device 4 takes an image of a photographing object. To put it in detail, in a photographing operation triggered by an operation carried out by the user to press the release button (or the shutter button) once, the image-pickup device 4 carries out N image-pickup processes at a high speed by receiving incoming light of the photographing object consecutively N times at predetermined intervals in accordance with an exposure timing signal supplied by the timing generator 8 and converting the light into electrical signals in an opto-electrical conversion process.

Thus, by carrying out an operation to press the release button only once, N taken images are each obtained as a dark image of an exposure equal to or smaller than (not satisfying the condition for) the proper exposure. Assume for example that, in a photographing operation carried out at a time, eight image-pickup processes are performed at a high speed. In this case, each of the eight taken images produced in one high-speed image-pickup process is a dark image having a brightness of ⅛ of an image taken at the proper exposure. In this case, N=8 and $M_k$=8.

Image signals each produced as the electrical signal resulting from the opto-electrical conversion process carried out by the image-pickup device 4 are supplied to the correlation double sampling circuit 5 for removing noise components from the signals. Then, the correlation double sampling circuit 5 supplies the image signals with noise components removed from the signals to the A/D converter 6. Subsequently, the flow of the photographing processing goes from the step S301 on to the next step S302.

At the step S302, the A/D converter 6 converts each of the image signals received from the correlation double sampling circuit 5 as the image signals each representing one of the taken images into a digital signal. Then, the shift circuit 21 employed in the A/D converter 6 shifts the dark taken image of an exposure equal to or smaller than the proper exposure by n' bits in order to convert the taken image into an image signal having a brightness (or a value) equivalent to the brightness resulting from the proper exposure in a gain-up process and supplies the image signal obtained as a result of the gain-up process to the signal processing circuit 7. Then, the flow of the photographing processing goes on to the next step S303.

If eight image-pickup processes are performed at a high speed in a photographing operation carried out at a time as described above, the shift circuit 21 shifts the dark taken image of an exposure equal to or smaller than the proper exposure by typically three bits in order to convert the taken image into an image signal having a brightness (or a value) equivalent to the brightness resulting from the proper exposure in a 8 (=$2^3$)-time gain-up process.

At the step S303, the motion-vector detection circuits $23_1$ to $23_{N-1}$ employed in the signal processing circuit 7 as shown in FIG. 4 take for example a middle image of the N taken images received from the shift circuit 21 employed in the A/D converter 6 as a reference image and each of the remaining ones as a target image. Then, the signal processing circuit 7 determines how much each of the target images has been shifted from the reference image. That is to say, the signal processing circuit 7 detects the quantity of a shift between the reference image and each of the target images. Then, the flow of the photographing processing goes on to the next step S304.

That is to say, in eight image-pickup processes carried out at a high speed in one photographing operation in order to obtain eight taken images as described above, the fourth taken image is adopted as the reference image and the remaining taken images other than the fourth taken image are each taken as a target image. In other words, the first to the third taken images and the fifth to eighth taken images are each adopted as a target image. Then, the signal processing circuit 7 determines how much each of the target images (that is, the first to the third taken images and the fifth to eighth taken images) has been shifted from the fourth image serving as the reference image. That is to say, the signal processing circuit 7 detects the quantity of a shift between the reference image and each of the target images.

At the step S304, on the basis of the N taken images as well as the shift quantities detected at the step S303 as the quantities of shifts between the position of the reference image and the position of each of the target images, the processing circuit 24 employed in the signal processing circuit 7 as shown in FIG. 4 carries out processing to generate an image before going on to the next step S305. By carrying out the image generation processing of the step S304, the signal processing circuit 7 is capable of generating an output image having hand trembling corrected, having sharpness uniform throughout the entire range, having a pixel count equal to the number of pixels on each of the taken images and having all G, R and B signals for every pixel. Subsequently, the signal processing circuit 7 supplies an image signal representing the output image produced by the processing to generate an image to the D/A converter 9 or the codec 12.

Then, the flow of the photographing processing goes on from the step S304 to the next step S305 at which the monitor 11 displays the output image, which is also stored in the memory 13 implemented typically as a flash memory. Finally, the photographing processing is ended. To put it in detail, at the step S305, the D/A converter 9 carries out a D/A conversion process to convert an image signal received from the signal processing circuit 7 at the step S304 as an image signal representing an output picture into an analog signal and supplies the analog signal to the video encoder 10. Then, at the same step S305, the video encoder 10 converts the analog signal received from the D/A converter 9 as an analog signal, which has resulted from the D/A conversion process to convert an image signal, into a video signal that can be displayed on the monitor 11, and supplies the video signal to the monitor 11. Subsequently, also at the same step S305, the monitor 11 displays an output image based on the video signal received from the video encoder 10. Finally, the photographing processing is ended. In the mean time, also at the same step S305, the codec 12 codes the image signal, which has been received from the signal processing circuit 7 as an image signal of an output picture, in accordance with a predetermined coding method such as the JPEG method or the MPEG method, and supplies a signal obtained as a result of the coding process to the memory 13, which is typically a flash memory. Finally, the photographing processing is ended.

If eight image-pickup processes are carried out at a high speed in one photographing operation in order to obtain eight taken images as described above, at the step S303, transformation parameters are found for each of the first to eighth taken images as parameters to be used in an affine transformation process to express the position of a taken image associated with the parameters in terms of coordinates in the coordinate system of a middle image serving as the reference image, which is the fourth taken image in this example.

Let notation $(X_k, Y_k)$ denote the coordinates of a point located in the coordinate system of the kth taken image where k=1, 2, . . . or 8. That is to say, notation $(X_k, Y_k)$ denotes the coordinates of a point located in the coordinate system of any one of the first to eight taken images. Let notation $(X_{4k}, Y_{4k})$ denote the coordinates of a post-transformation point located in the coordinate system of the reference image as the projection point of the same photographing-object portion as the portion projected at the point $(X_k, Y_k)$. That is to say, notation $(X_{4k}, Y_{4k})$ denotes the coordinates of a post-transformation point located in the coordinate system of the fourth taken image as the projection point of the same photographing-object portion as the portion projected at the point $(X_k, Y_k)$. In the following description, the coordinate system of the reference image is also referred to as the reference coordinate system. Let notation $(a_{4k}, b_{4k}, c_{4k}, d_{4k}, s_{4k}, t_{4k})$ denote transformation parameters used in an affine transformation process to transform the coordinates $(X_k, Y_k)$ into the coordinates $(X_{4k}, Y_{4k})$.

At the step S303, the transformation parameters $(a_{4k}, b_{4k}, c_{4k}, d_{4k}, s_{4k}, t_{4k})$ are found for each of the first to eighth taken images, that is, for k=1, 2, . . . , 8.

The affine transformation process is a process to transform the coordinates $(X_k, Y_k)$ of a position on any one of the first to eighth taken images into the coordinates $(X_{4k}, Y_{4k})$ in the reference coordinate system, which is the coordinate system of the fourth taken image. The affine transformation process is represented by a relation between the coordinates of a point $(X_k, Y_k)$ on any one of the first to eighth taken images and the coordinates $(X_{4k}, Y_{4k})$ of the post-transformation point in the reference coordinate system. The relation between the coordinates of a point $(X_k, Y_k)$ on the kth taken images and the coordinates $(X_{4k}, Y_{4k})$ of the post-transformation point in the reference coordinate system for k=1, 2, . . . , 8 is expressed by Eqs. (20) to (27) respectively as follows:

[Eq. (20)]
$$\begin{pmatrix} X_{41} \\ Y_{41} \end{pmatrix} = \begin{pmatrix} a_{41} & b_{41} \\ c_{41} & d_{41} \end{pmatrix} \begin{pmatrix} X_1 \\ Y_1 \end{pmatrix} + \begin{pmatrix} s_{41} \\ t_{41} \end{pmatrix} \quad (20)$$

[Eq. (21)]
$$\begin{pmatrix} X_{42} \\ Y_{42} \end{pmatrix} = \begin{pmatrix} a_{42} & b_{42} \\ c_{42} & d_{42} \end{pmatrix} \begin{pmatrix} X_1 \\ Y_1 \end{pmatrix} + \begin{pmatrix} s_{42} \\ t_{42} \end{pmatrix} \quad (21)$$

-continued

[Eq. (22)]
$$\begin{pmatrix} X_{43} \\ Y_{43} \end{pmatrix} = \begin{pmatrix} a_{43} & b_{43} \\ c_{43} & d_{43} \end{pmatrix} \begin{pmatrix} X_3 \\ Y_3 \end{pmatrix} + \begin{pmatrix} s_{43} \\ t_{43} \end{pmatrix} \quad (22)$$

[Eq. (23)]
$$\begin{pmatrix} X_{44} \\ Y_{44} \end{pmatrix} = \begin{pmatrix} a_{44} & b_{44} \\ c_{44} & d_{44} \end{pmatrix} \begin{pmatrix} X_4 \\ Y_4 \end{pmatrix} + \begin{pmatrix} s_{44} \\ t_{44} \end{pmatrix} \quad (23)$$

[Eq. (24)]
$$\begin{pmatrix} X_{45} \\ Y_{45} \end{pmatrix} = \begin{pmatrix} a_{45} & b_{45} \\ c_{45} & d_{45} \end{pmatrix} \begin{pmatrix} X_5 \\ Y_5 \end{pmatrix} + \begin{pmatrix} s_{45} \\ t_{45} \end{pmatrix} \quad (24)$$

[Eq. (25)]
$$\begin{pmatrix} X_{46} \\ Y_{46} \end{pmatrix} = \begin{pmatrix} a_{46} & b_{46} \\ c_{46} & d_{46} \end{pmatrix} \begin{pmatrix} X_6 \\ Y_6 \end{pmatrix} + \begin{pmatrix} s_{46} \\ t_{46} \end{pmatrix} \quad (25)$$

[Eq. (26)]
$$\begin{pmatrix} X_{47} \\ Y_{47} \end{pmatrix} = \begin{pmatrix} a_{47} & b_{47} \\ c_{47} & d_{47} \end{pmatrix} \begin{pmatrix} X_7 \\ Y_7 \end{pmatrix} + \begin{pmatrix} s_{47} \\ t_{47} \end{pmatrix} \quad (26)$$

[Eq. (27)]
$$\begin{pmatrix} X_{48} \\ Y_{48} \end{pmatrix} = \begin{pmatrix} a_{48} & b_{48} \\ c_{48} & d_{48} \end{pmatrix} \begin{pmatrix} X_8 \\ Y_8 \end{pmatrix} + \begin{pmatrix} s_{48} \\ t_{48} \end{pmatrix} \quad (27)$$

It is to be noted that the affine transformation process to transform the coordinates of a point $(X_4, Y_4)$ on the fourth taken image into the coordinates $(X_{44}, Y_{44})$ of the post-transformation point in the reference coordinate system of the same fourth taken image is expressed by Eq. (23). In this case, the values of the transformation parameters $(a_{44}, b_{44}, c_{44}, d_{44}, s_{44}, t_{44})$ are (1, 0, 0, 1, 0, 0).

Next, the image generation processing carried out at the step S304 of the flowchart FIG. 28 is explained more as follows.

It is to be noted that, in the following description, notation W' denotes the number of pixel columns arranged in the horizontal direction as the columns of a taken image output by the image-pickup device 4 and notation H' denotes the number of pixel rows arranged in the vertical direction as the rows of the taken image. On the other hand, notation W denotes the number of pixel columns arranged in the horizontal direction as the columns of the image-pickup device 4 and notation H denotes the number of pixel rows arranged in the vertical direction as the rows of the image-pickup device 4. The value of W' is equal to the value of W and the value of H' is equal to the value of H.

As described earlier, however, the image-pickup device 4 has a binning function for outputting pixel values of a plurality of pixels as a single pixel value. For example, the image-pickup device 4 has the 2×2 binning function for outputting pixel values of 2×2 pixels as a single pixel value. In this case, the relations H'=H/2 and W'=W/2. Image generation processing carried out by the image-pickup device 4 applying a binning function will be described later.

The horizontally-arranged-column count W and vertically-arranged row count H of the image-pickup device 4 are each typically a value in the range several hundreds to several thousands. For example, H=2,000 and W=3,000.

Also in the following description, much like the coordinate systems described so far, the coordinate system of a taken image is an XY coordinate system set as a coordinate system having an origin located at the center (or the gravitational center) of the pixel at the left upper corner of the taken image, the horizontal (right) direction taken as the X direction and the vertical (downward) direction taken as the Y direction. In addition, in the reference coordinate system, which is the coordinate system of the reference image, the distance between any two pixels adjacent to each other in the horizontal and vertical directions of the reference image is assumed to be 1.

In this case, the coordinates (x, y) of the center position of a pixel located at the intersection of the ith column from the left end of the reference image and the jth row from the top of the reference image are referred to as coordinates (i−1, j−1). Thus, for example, the coordinates (x, y) of the center position of a pixel located at the intersection of the first column on the left end of the reference image and the first row on the top of the reference image are referred to as coordinates (0, 0). The coordinates (x, y) of the center position of a pixel located at the intersection of the second column from the left end of the reference image and the first row on the top of the reference image are referred to as coordinates (1, 0). The coordinates (x, y) of the center position of a pixel located at the intersection of the first column on the left end of the reference image and the second row from the top of the reference image are referred to as coordinates (0, 1). The coordinates (x, y) of the center position of a pixel located at the right lower corner of the reference image are referred to as coordinates (W−1, H−1) or (W'−1, H'−1)

It is to be noted that, on each taken image and the output image, a pixel located at the intersection of the ith column from the left end of the image and the jth row from the top of the image is referred to as a pixel (i, j), which is a pixel at a position having coordinates (i−1, j−1), in the following description.

In the image generation processing represented by the flowchart shown in FIG. 12 or the flowchart shown in FIGS. 20 and 21, the pixel value of a pixel (i, j) on the output image is computed (or inferred) as a pixel value at a position (or point) (x, y) in the reference coordinate system where x=i−1 and y=j−1. That is to say, the pixel pitch of the output image is assumed to have a value of 1 as is the case with the pixel pitch of each taken image in the processing to compute the pixel value of the output image. The pixel pitch is defined as the distance between any two pixels adjacent to each other.

Thus, as described earlier by referring to FIGS. 25 to 27, with a middle image adopted as the reference image, the amount of data (or the number of taken images) usable in a process to infer a pixel value for the center portion of the output image is sufficient. As a result, it is possible to obtain an output image having a picture quality of good sharpness and few noise components. However, the amount of data usable in a process to infer a pixel value for a peripheral portion of the output image is small. A peripheral portion is a portion represented by coordinates (x, y) satisfying the relations x≈0, x≈W−1, y≈0 and y≈H−1. Thus, in comparison with the center portion, in peripheral portions of the output image (or at pixels (i, j) satisfying the relations i≈1, x≈W, j≈1 and j≈H, image portions each inevitably having a large number of noise components appear.

In order to solve the problem described above, in the image generation processing carried out at the step S304 of the flowchart shown in FIG. 28, an output image is generated as a special image by adopting a middle image as a reference image. The special image has a small angle of vision at the center portion of a range projected on the reference image as the range of the photographing object. The range projected on the reference image as the range of the photographing object is a range projected on the N taken images as the range of the photographing object. The special image has a pixel interval smaller than the pixel interval of each of the taken images including the reference image.

That is to say, in the image generation processing carried out at the step S304 of the flowchart shown in FIG. 28, the pixel value of a pixel (i, j) of the output image is computed as the pixel at the position (x, y) where:

$$(x, y) = (\alpha(i-1)+\beta, \alpha(j-1)+\gamma)$$

Figure 29:
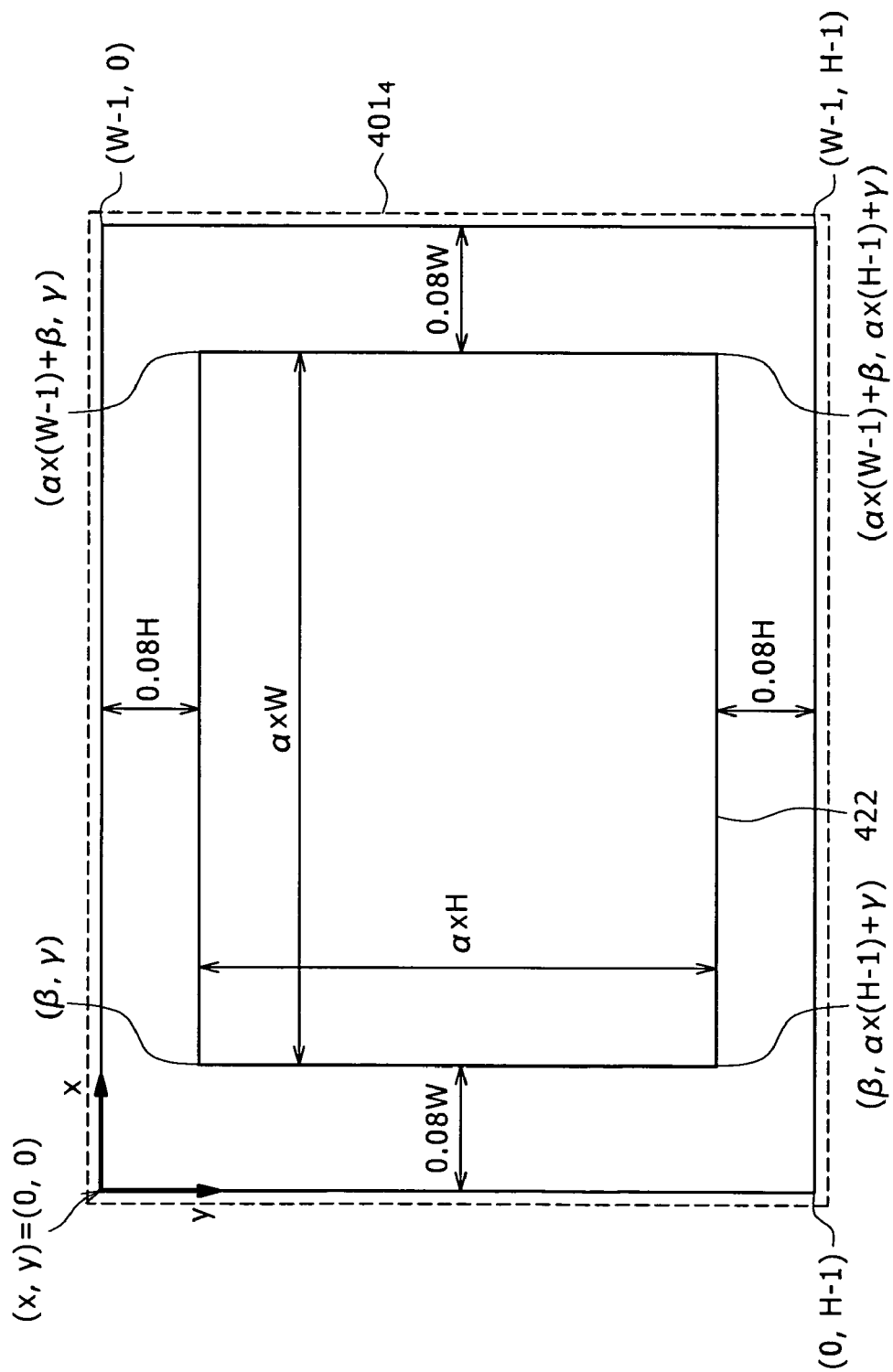
FIG. 29 is a diagram showing the plan view of a reference picture.

FIG. 29 is an explanatory diagram referred to in description of α, β and γ with reference to the fourth taken image $401_4$ serving as the reference image.

Symbol i in notation pixel (i, j) on the output image is an integer in the range 1 to W and symbol j in notation pixel (i, j) on the output image is an integer in the range 1 to H. Thus, positions (α×(i−1)+β, α×(J−1)+γ) are in a high-picture-quality square area 422 having a left upper corner point (β, γ), a right upper corner point (α×(W−1)+β, γ), a right lower corner point (α×(W−1)+β, α×(H−1)+γ) and a left lower corner point (β, α×(H−1)+γ). The high-picture-quality square area 422 has horizontal and vertical dimensions of α×W and α×H respectively.

It is to be noted that the high-picture-quality square area 422 is a rectangular similar to the fourth taken image $401_4$, which is used as the W×H reference image, at a similitude ratio of α. Accurately speaking, the high-picture-quality square area 422 is a rectangular similar to a rectangular, which has its vertexes coinciding with the centers of the pixels at the corners of the fourth taken image $401_4$, at a similitude ratio of α.

Let us assume that a is a real number greater than 0 but smaller than 1 and the pixel value of a pixel (i, j) on the output image is the pixel value at the position (x, y) where:

$$(x, y) = (\alpha \times (i-1)+\beta, \alpha \times (j-1)+\gamma)$$

In this case, the pixel pitch of the reference image is 1 while the pixel pitch of the output image is α. However, the number of pixels on the output image is W×H, which is equal to the number of pixels on the reference image.

In addition, by computing the pixel value of a pixel (i, j) on the output image as the pixel value at the position (x, y) where x=α×(i−1)+β and y=α×(j−1)+γ, the image of the high-picture-quality square area 422 becomes the output image. As described earlier, the image of the high-picture-quality square area 422 shown in FIG. 29 is an image appearing on the center portion of the range of the photographing object projected on the reference image as an image having a narrow vision-field angle. To put it concretely, a range projected on the reference image as the range of the photographing object is a range projected on the N taken images $401_1$ to $401_8$ as the range of the photographing object. Accurately speaking, the image of an area wider than the high-picture-quality square area 422 by 0.5α on the upper, lower, left and right sides becomes the output image.

Thus, the values of α, β and γ are set so that the high-picture-quality square area 422 is included in the area 421 shown in FIG. 27 as an area, output-image pixel values in which are inferred by using data of all eight taken images ranging from the first taken image $401_1$ to the eighth taken image $401_8$, and the size of the high-picture-quality square area 422 is ideally maximized. By setting the values of α, β and γ in this way, it is possible to generate an output image having a picture quality of good sharpness throughout its entire area and the pixel count W×H of the image-pickup device 4. In this case, the pixel count W×H of the image-pickup device 4 is also the pixel count W'×H' of each taken image.

Next, actual values of α, β and γ are described as follow.

Let us assume for example that the maximum values of the quantities of hand trembling occurring in the vertical and horizontal directions as hand trembling causing a shift between any specific taken image and an immediately following taken image (that is, a taken image obtained immediately after the specific taken image) among the eight taken images ranging from the first taken image $401_1$ to the eighth taken image $401_8$, which are produced in one photographing operation, are 2% of the pixel count of the image-pickup device 4. It is to be noted that the maximum values each expressed in terms of % of the pixel count of the image-pickup device 4 as the maximum value of the quantity of hand trembling can be found by typically simulation on the basis of gaps between any specific taken image and an immediately following taken image and set in advance in the digital camera 1. As an alternative, the maximum values of quantities of hand trembling can also be found for example from motion vectors detected by the motion-vector detection circuits $23_1$ to $23_{N-1}$ employed in the signal processing circuit 7 as shown in FIG. 4. As another alternative, the maximum values of the quantities of hand trembling can also be found for example from transformation parameters used in an affine transformation process.

It is assumed that the maximum values of the quantities of hand trembling occurring in the vertical and horizontal directions as hand trembling causing a shift between any specific taken image and an immediately following taken image are 2% of the pixel count of the image-pickup device 4 as described above. Thus, in this case, the maximum value of the quantity of hand trembling occurring in the horizontal direction as hand trembling causing a shift between any specific taken image $401_k$ and the immediately following taken image $401_{k+1}$ is 0.02×W pixels where notation W denotes the horizontal dimension of the taken image $401_k$. By the same token, the maximum value of the quantity of hand trembling occurring in the vertical direction as hand trembling causing a shift between any specific taken image $401_k$ and the immediately following taken image $401_{k+1}$ is 0.02×H pixels where notation H denotes the number of rows in the taken image $401_k$. Conversely speaking, the quantity of a shift never exceeds the maximum value.

Thus, if the fourth taken image $401_4$ is adopted as the reference image, a taken image shifted by a longest distance from the reference image is the eighth taken image $401_8$. The maximum value of the quantity of hand trembling occurring in the horizontal direction as hand trembling causing a shift of the eighth taken image $401_8$ from the reference image is 0.02×W×4 pixels=0.08×W pixels at the most where notation W denotes the horizontal dimension of the reference image. By the same token, the maximum value of the quantity of hand trembling occurring in the vertical direction as hand trembling causing a shift of the eighth taken image $401_8$ from the reference image is 0.02×H×4 pixels=0.08×H pixels at the most where notation H denotes the vertical dimension of the reference image.

Thus, if an inner area obtained by shifting the left and right vertical sides of the fourth taken image $401_4$ shown in FIG. 29 as the reference image in the inward direction by a distance equivalent to 0.08×W, and shifting the top side of and bottom side of the fourth taken image $401_4$ in the inward direction by a distance equivalent to 0.08×H is used as the high-picture-quality square area 422, the high-picture-quality square area 422 is always included in the area 421 shown in FIG. 27 as an area, output-image pixel values in which are inferred by using data of all eight taken images ranging from the first taken image $401_1$ to the eighth taken image $401_8$.

In this case, the high-picture-quality square area 422 obtained as described above is a rectangle having its left upper vertex located at a point (0.08×W, 0.08×H), a horizontal dimension shorter than the horizontal dimension W of the reference image by a length equivalent to 0.08×W×2 and a vertical dimension shorter than the vertical dimension H of the reference image by a length equivalent to 0.08×H×2. That is to say, the high-picture-quality square area 422 is a rectangle (or an oblong) having its left upper vertex located at a point (0.08×W, 0.08×H), a horizontal dimension of (1−0.16)×W and a vertical dimension of (1−0.16)×H.

Since the high-picture-quality square area 422 is a rectangle having its left upper vertex located at a point (β, γ), a horizontal dimension of α×W and a vertical dimension of α×H as described above, α, β and γ satisfy the following equations: α=(1−0.16), β=0.08×W and γ=0.08×H.

In the image generation processing carried out at the step S304 of the flowchart shown in FIG. 28, the processing circuit 24 employed in the signal processing circuit 7 shown in FIG. 4 sets the values of α, β and γ in accordance with a % count representing the ratio of the maximum value of the hand-trembling quantity to the number of pixels on the image-pickup device 4 as described above. Then, for all integers i and j in the ranges 1≦i≦W and 1≦j≦H, the processing circuit 24 computes (or infers) the pixel value of a pixel (i, j) on the output image as the pixel value at the position (x, y) where x=α×(i−1)+β and y=α×(j−1)+γ.

That is to say, the values of α, β and γ are set in accordance with the maximum value of the amount of the hand trembling and, then, an image projected on the area high-picture-quality square area 422 within a range projected on the reference image as the range of the photographing object is generated as the output image. The image projected on the area high-picture-quality square area 422 is an image in an area of a range projected on the reference image as a range of the photographing object. The range projected on the reference image is a range obtained by reducing the range of the photographing object by a reduction rate α. Thus, the range projected on the reference image is a range with dimensions of αW×αH. The image projected on the area high-picture-quality square area 422 is an image having a pixel pitch of each taken image equal to α.

In the case described above, the values of α, β and γ are set in accordance with the maximum value of the amount of the hand trembling. It is to be noted, however, that the values of α, β and γ can also be set in accordance with a value slightly smaller than the maximum value of the amount of the hand trembling without generating a problem in practical use.

Next, by referring to a flowchart shown in FIGS. 30 to 40, the image generation processing carried out at the step S304 of the flowchart shown in FIG. 28 is further explained.

As the weight ((x, y), (I', J')) of Eqs. (4) to (6), Cubic (I'−1)×Cubic (J'−1) expressed in terms of Cubic functions is used in the same way as the image generation processing explained earlier by referring to the flowchart shown in FIGS. 20 and 21.

In addition, in the image generation processing, the first taken image $401_1$ to the eighth taken image $401_8$ are obtained in one photographing operation. On top of that, the fourth taken image $401_4$ selected among the first to eighth is used as the reference image.

The flowchart shown in FIGS. 30 to 40 begins with a step S311, at which the processing circuit 24 sets a variable j for counting the number of pixel rows arranged in the vertical direction on the output image at an initial value of 1. Then, the flow of the image generation processing goes on to the next step S312. At the step S312, the processing circuit 24 sets a variable for counting the number of pixel columns arranged in the horizontal direction on the output image at an initial value of 1. Then, the flow of the image generation processing goes on to the next step S313.

At the step S313, the processing circuit 24 identifies all G-signal pixels (or pixels of the green color) on the first taken image 401₁ as specific pixels. The position of each of the selected G-signal pixels on the first taken image 401₁ has coordinates (X1, Y1) transformable by an affine transformation process according to Eq. (20) into post-transformation coordinates (X41, Y41) included in the reference coordinate system as coordinates (X41, Y41) that must satisfy the relations $\alpha \times (i-1)+\beta-2 \square X41 \square \alpha \times (i-1)+\beta+2$ and $\alpha \times (j-1)+\gamma-2 \square Y41 \square \alpha \times (j-1)+\gamma+2$, where $(\alpha \times (i-1)+\beta, \alpha \times (j-1)+\gamma)$ are coordinates of the position of a pixel on the output image. That is to say, the post-transformation position (X41, Y41) must be in a 4×4 area (that is, an area having vertical and horizontal dimensions of 2×2) centered at a position having coordinates $(\alpha \times (i-1)+\beta, \alpha \times (j-1)+\gamma)$ on the output image. The pixel at the center of the area is a pixel, the pixel value of which is to be inferred. The area corresponds to the ranges (I'−2) $\square$ x<(I'+2) and (J'−2) $\square$ y<(J'+2) centered at the position (I', J') as explained earlier by referring to FIG. 14. Then, the flow of the image generation processing goes on to the next step S314.

Let notation $N_1$ denote the number of aforementioned specific pixels identified at the step S313 from the first taken image 401₁, notation $G_1(p)$ denote the G signal (or the pixel value) of a specific pixel having a pixel number p where p is an integer in the range 1, 2, . . . , $N_1$, notation $(X_1(p), Y_1(p))$ denote coordinates included in the coordinate system of the first taken image 401₁ as the coordinates of the specific pixel and notation $(X_{41}(p), Y_{41}(p))$ denote post-transformation position coordinates obtained as a result of the affine transformation process carried out on the coordinates $(X_1(p), Y_1(p))$ of the specific pixel in accordance with Eq. (20). That is to say, the coordinates $(X_1(p), Y_1(p))$ and $(X_{41}(p), Y_{41}(p))$ correspond to respectively the coordinates $(X_1, Y_1)$ and $(X_{41}, Y_{41})$ used in Eq. (20).

Thus, for any pixel number p, notation $G_1(p)$ denotes the pixel value (or the G signal) of a specific pixel located at the coordinates $(X_1(p), Y_1(p))$ in the coordinate system of the first taken image 401₁ as a pixel having the pixel number p. In addition, the coordinates $(X_{41}(p), Y_{41}(p))$ produced in the affine transformation process as the coordinates of the post-transformation position in the reference coordinate system satisfy the relations $\alpha \times (i-1)+\beta-2 \leq X_{41}(p) \leq \alpha \times (i-1)+\beta+2$ and $\alpha \times (j-1)+\gamma-2 \leq Y_{41}(p) \leq \alpha \times (j-1)+\gamma+2$ expressing relations with the coordinates $(\alpha \times (i-1)+\beta, \alpha \times (j-1)+\gamma)$.

At the step S314, the processing circuit 24 identifies all G-signal pixels (or pixels of the green color) on the second taken image 401₂ as specific pixels. The position of each of the selected G-signal pixels on the second taken image 401₂ has coordinates $(X_2, Y_2)$ transformable by an affine transformation process according to Eq. (21) into post-transformation coordinates $(X_{42}, Y_{42})$ included in the reference coordinate system as coordinates $(X_{42}, Y_{42})$ that must satisfy the relations $\alpha \times (i-1)+\beta-2 \leq X_{42} \leq \alpha \times (i-1)+\beta+2$ and $\alpha \times (j-1)+\gamma-2 \leq Y_{42} \leq \alpha \times (j-1)+\gamma+2$, where $(\alpha \times (i-1)+\beta, \alpha \times (j-1)+\gamma)$ are coordinates of the position of a pixel on the output image. That is to say, the post-transformation position $(X_{42}, Y_{42})$ must be in a 2×2 area (that is, an area having vertical and horizontal dimensions of 2×2) centered at a position having coordinates $(\alpha \times (i-1)+\beta, \alpha \times (j-1)+\gamma)$ on the output image. The pixel at the center of the area is a pixel, the pixel value of which is to be inferred. Then, the flow of the image generation processing goes on to the next step S315 shown in FIG. 31.

Let notation $N_2$ denote the number of aforementioned specific pixels identified at the step S314 from the second taken image 401₂, notation $G_2(p)$ denote the G signal (or the pixel value) of a specific pixel having a pixel number p where p is an integer in the range 1, 2, . . . , $N_2$, notation $(X_2(p), Y_2(p))$ denote coordinates included in the coordinate system of the second taken image 401₂ as the coordinates of the specific pixel and notation $(X_{42}(p), Y_{42}(p))$ denote post-transformation position coordinates obtained as a result of the affine transformation process carried out on the coordinates $(X_2(p), Y_2(p))$ of the specific pixel in accordance with Eq. (21). That is to say, the coordinates $(X_2(p), Y_2(p))$ and $(X_{42}(p), Y_{42}(p))$ correspond to respectively the coordinates $(X_2, Y_2)$ and $(X_{42}, Y_{42})$ used in Eq. (21).

Thus, for any pixel number p, notation $G2(p)$ denotes the pixel value (or the G signal) of a specific pixel located at the coordinates $(X_2(p), Y_2(p))$ in the coordinate system of the second taken image 401₂ as a pixel having the pixel number p. In addition, the coordinates $(X_{42}(p), Y_{42}(p))$ produced in the affine transformation process as the coordinates of the post-transformation position in the reference coordinate system satisfy the relations $\alpha \times (i-1)+\beta-2 \leq X_{42}(p) \leq \alpha \times (i-1)+\beta+2$ and $\alpha \times (j-1)+\gamma-2 \leq Y_{42}(p) \leq \alpha \times (j-1)+\gamma+2$.

At the step S315, the processing circuit 24 identifies all G-signal pixels (or pixels of the green color) on the third taken image 401₃ as specific pixels. The position of each of the selected G-signal pixels on the third taken image 401₃ has coordinates $(X_3, Y_3)$ transformable by an affine transformation process according to Eq. (22) into post-transformation coordinates $(X_{43}, Y_{43})$ included in the reference coordinate system as coordinates $(X_{43}, Y_{43})$ that must satisfy the relations $\alpha \times (i-1)+\beta-2 \leq X_{43} \leq \alpha \times (i-1)+\beta+2$ and $\alpha \times (j-1)+\gamma-2 \leq Y_{43} \leq \alpha \times (j-1)+\gamma+2$, where $(\alpha \times (i-1)+\beta, \alpha \times (j-1)+\gamma)$ are coordinates of the position of a pixel on the output image. That is to say, the post-transformation position $(X_{43}, Y_{43})$ must be in a 2×2 area (that is, an area having vertical and horizontal dimensions of 2×2) centered at a position having coordinates $(\alpha \times (i-1)+\beta, \alpha \times (j-1)+\gamma)$ on the output image. The pixel at the center of the area is a pixel, the pixel value of which is to be inferred. Then, the flow of the image generation processing goes on to the next step S316.

Let notation $N_3$ denote the number of aforementioned specific pixels identified at the step S315 from the third taken image 401₃, notation $G_3(p)$ denote the G signal (or the pixel value) of a specific pixel having a pixel number p where p is an integer in the range 1, 2, . . . , $N_3$, notation $(X_3(p), Y_3(p))$ denote coordinates included in the coordinate system of the third taken image 401₃ as the coordinates of the specific pixel and notation $(X_{43}(p), Y_{43}(p))$ denote post-transformation position coordinates obtained as a result of the affine transformation process carried out on the coordinates $(X_3(p), Y_3(p))$ of the specific pixel in accordance with Eq. (22). That is to say, the coordinates $(X_3(p), Y_3(p))$ and $(X_{43}(p), Y_{43}(p))$ correspond to respectively the coordinates $(X_3, Y_3)$ and $(X_{43}, Y_{43})$ used in Eq. (22).

Thus, for any pixel number p, notation $G_3(p)$ denotes the pixel value (or the G signal) of a specific pixel located at the coordinates $(X_3(p), Y_3(p))$ in the coordinate system of the third taken image 401₃ as a pixel having the pixel number p. In addition, the coordinates $(X_{43}(p), Y_{43}(p))$ produced in the affine transformation process as the coordinates of the post-transformation position in the reference coordinate system satisfy the relations $\alpha \times (i-1)+\beta-2 \leq X_{43}(p) \leq \alpha \times (i-1)+\beta+2$ and $\alpha \times (j-1)+\gamma-2 \leq Y_{43}(p) \leq \alpha \times (j-1)+\gamma+2$.

At the step S316, the processing circuit 24 identifies all G-signal pixels (or pixels of the green color) on the fourth taken image 401₄ as specific pixels. The position of each of the selected G-signal pixels on the fourth taken image $401_4$ has coordinates $(X_4, Y_4)$ transformable by an affine transformation process according to Eq. (23) into post-transformation coordinates $(X_{44}, Y_{44})$ included in the reference coordinate system as coordinates $(X_{44}, Y_{44})$ that must satisfy the relations $\alpha\times(i-1)+\beta-2 \leq X_{44} \leq \alpha\times(i-1)+\beta+2$ and $\alpha\times(j-1)+\gamma-2 \leq Y_{44} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{44}, Y_{44})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S317.

Let notation $N_4$ denote the number of aforementioned specific pixels identified at the step S316 from the fourth taken image $401_4$, notation $G_4(p)$ denote the G signal (or the pixel value) of a specific pixel having a pixel number p where p is an integer in the range 1, 2, $N_4$, notation $(X_4(p), Y_4(p))$ denote coordinates included in the coordinate system of the fourth taken image $401_4$ as the coordinates of the specific pixel and notation $(X_{44}(p), Y_{44}(p))$ denote post-transformation position coordinates obtained as a result of the affine transformation process carried out on the coordinates $(X_4(p), Y_4(p))$ of the specific pixel in accordance with Eq. (23). That is to say, the coordinates $(X_4(p), Y_4(p))$ and $(X_{44}(p), Y_{44}(p))$ correspond to respectively the coordinates $(X_4, Y_4)$ and $(X_{44}, Y_{44})$ used in Eq. (23).

Thus, for any pixel number p, notation $G_4(p)$ denotes the pixel value (or the G signal) of a specific pixel located at the coordinates $(X_4(p), Y_4(p))$ in the coordinate system of the fourth taken image $401_4$ as a pixel having the pixel number p. In addition, the coordinates $(X_{44}(p), Y_{44}(p))$ produced in the affine transformation process as the coordinates of the post-transformation position in the reference coordinate system satisfy the relations $\alpha\times(i-1)+\beta-2 \leq X_{44}(p) \leq \alpha\times(i-1)+\beta+2$ and $\alpha\times(j-1)+\gamma-2 \leq Y_{44}(p) \leq \alpha\times(j-1)+\gamma+2$ expressing relations with the coordinates $(\alpha\times(i-1)+\beta, \alpha\times(j-1)+\gamma)$.

At the step S317, the processing circuit 24 identifies all G-signal pixels (or pixels of the green color) on the fifth taken image $401_5$ as specific pixels. The position of each of the selected G-signal pixels on the fifth taken image $401_5$ has coordinates $(X_5, Y_5)$ transformable by an affine transformation process according to Eq. (24) into post-transformation coordinates $(X_{45}, Y_{45})$ included in the reference coordinate system as coordinates $(X_{45}, Y_{45})$ that must satisfy the relations $\alpha\times(i-1)+\beta-2 \leq X_{45} \leq \alpha\times(i-1)+\beta+2$ and $\alpha\times(j-1)+\gamma-2 \leq Y_{45} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{45}, Y_{45})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S318 shown in FIG. 32.

Let notation $N_5$ denote the number of aforementioned specific pixels identified at the step S317 from the fifth taken image $401_5$, notation $G_5(p)$ denote the G signal (or the pixel value) of a specific pixel having a pixel number p where p is an integer in the range 1, 2, . . . , $N_5$, notation $(X_5(p), Y_5(p))$ denote coordinates included in the coordinate system of the fifth taken image $401_5$ as the coordinates of the specific pixel and notation $(X_{45}(p), Y_{45}(p))$ denote post-transformation position coordinates obtained as a result of the affine transformation process carried out on the coordinates $(X_5(p), Y_5(p))$ of the specific pixel in accordance with Eq. (24). That is to say, the coordinates $(X_5(p), Y_5(p))$ and $(X_{45}(p), Y_{45}(p))$ correspond to respectively the coordinates $(X_5, Y_5)$ and $(X_{45}, Y_{45})$ used in Eq. (24).

Thus, for any pixel number p, notation $G_5(p)$ denotes the pixel value (or the G signal) of a specific pixel located at the coordinates $(X_5(p), Y_5(p))$ in the coordinate system of the fifth taken image $401_5$ as a pixel having the pixel number p. In addition, the coordinates $(X_{45}(p), Y_{45}(p))$ produced in the affine transformation process as the coordinates of the post-transformation position in the reference coordinate system satisfy the relations $\alpha\times(i-1)+\beta-2 \leq X_{45}(p) \leq \alpha\times(i-1)+\beta+2$ and $\alpha\times(j-1)+\gamma-2 \leq Y_{45}(p) \leq \alpha\times(j-1)+\gamma+2$.

At the step S318, the processing circuit 24 identifies all G-signal pixels (or pixels of the green color) on the sixth taken image $401_6$ as specific pixels. The position of each of the selected G-signal pixels on the sixth taken image $401_6$ has coordinates $(X_6, Y_6)$ transformable by an affine transformation process according to Eq. (25) into post-transformation coordinates $(X_{46}, Y_{46})$ included in the reference coordinate system as coordinates $(X_{46}, Y_{46})$ that must satisfy the relations $\alpha\times(i-1)+\beta-2 \leq X_{46} \leq \alpha\times(i-1)+\beta+2$ and $\alpha\times(j-1)+\gamma-2 \leq Y_{46} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{46}, Y_{46})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S319.

Let notation $N_6$ denote the number of aforementioned specific pixels identified at the step S318 from the sixth taken image $401_6$, notation $G_6(p)$ denote the G signal (or the pixel value) of a specific pixel having a pixel number p where p is an integer in the range 1, 2, . . . , $N_6$, notation $(X_6(p), Y_6(p))$ denote coordinates included in the coordinate system of the sixth taken image $401_6$ as the coordinates of the specific pixel and notation $(X_{46}(p), Y_{46}(p))$ denote post-transformation position coordinates obtained as a result of the affine transformation process carried out on the coordinates $(X_6(p), Y_6(p))$ of the specific pixel in accordance with Eq. (25). That is to say, the coordinates $(X_6(p), Y_6(p))$ and $(X_{46}(p), Y_{46}(p))$ correspond to respectively the coordinates $(X_6, Y_6)$ and $(X_{46}, Y_{46})$ used in Eq. (25).

Thus, for any pixel number p, notation $G_6(p)$ denotes the pixel value (or the G signal) of a specific pixel located at the coordinates $(X_6(p), Y_6(p))$ in the coordinate system of the sixth taken image $401_6$ as a pixel having the pixel number p. In addition, the coordinates $(X_{46}(p), Y_{46}(p))$ produced in the affine transformation process as the coordinates of the post-transformation position in the reference coordinate system satisfy the relations $\alpha\times(i-1)+\beta-2 \leq X_{46}(p) \leq \alpha\times(i-1)+\beta+2$ and $\alpha\times(j-1)+\gamma-2 \leq Y_{46}(p) \leq \alpha\times(j-1)+\gamma+2$.

At the step S319, the processing circuit 24 identifies all G-signal pixels (or pixels of the green color) on the seventh taken image $401_7$ as specific pixels. The position of each of the selected G-signal pixels on the seventh taken image $401_7$ has coordinates $(X_7, Y_7)$ transformable by an affine transformation process according to Eq. (26) into post-transformation coordinates $(X_{47}, Y_{47})$ included in the reference coordinate system as coordinates $(X_{47}, Y_{47})$ that must satisfy the relations $\alpha\times(i-1)+\beta-2 \leq X_{47} \leq \alpha\times(i-1)+\beta+2$ and $\alpha\times(j-1)+\gamma-2$ $Y_{47} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{47}, Y_{47})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S320.

Let notation $N_7$ denote the number of aforementioned specific pixels identified at the step S319 from the seventh taken image $401_7$, notation $G_7(p)$ denote the G signal (or the pixel value) of a specific pixel having a pixel number p where p is an integer in the range 1, 2, $N_7$, notation $(X_7(p), Y_7(p))$ denote coordinates included in the coordinate system of the seventh taken image $401_7$ as the coordinates of the specific pixel and notation $(X_{47}(p), Y_{47}(p))$ denote post-transformation position coordinates obtained as a result of the affine transformation process carried out on the coordinates $(X_7(p), Y_7(p))$ of the specific pixel in accordance with Eq. (26). That is to say, the coordinates $(X_7(p), Y_7(p))$ and $(X_{47}(p), Y_{47}(p))$ correspond to respectively the coordinates $(X_7, Y_7)$ and $(X_{47}, Y_{47})$ used in Eq. (26).

Thus, for any pixel number p, notation $G_7(p)$ denotes the pixel value (or the G signal) of a specific pixel located at the coordinates $(X_7(p), Y_7(p))$ in the coordinate system of the seventh taken image $401_7$ as a pixel having the pixel number p. In addition, the coordinates $(X_{47}(p), Y_{47}(p))$ produced in the affine transformation process as the coordinates of the post-transformation position in the reference coordinate system satisfy the relations $\alpha \times (i-1) + \beta - 2 \leq X_{47}(p) \leq \alpha \times (i-1) + \beta + 2$ and $\alpha \times (j-1) + \gamma - 2 \leq Y_{47}(p) \leq \alpha \times (j-1) + \gamma + 2$.

At the step S320, the processing circuit 24 identifies all G-signal pixels (or pixels of the green color) on the eighth taken image $401_8$ as specific pixels. The position of each of the selected G-signal pixels on the eighth taken image $401_8$ has coordinates $(X_8, Y_8)$ transformable by an affine transformation process according to Eq. (27) into post-transformation coordinates $(X_{48}, Y_{48})$ included in the reference coordinate system as coordinates $(X_{48}, Y_{48})$ that must satisfy the relations $\alpha \times (i-1) + \beta - 2 \leq X_{48} \leq \alpha \times (i-1) + \beta + 2$ and $\alpha \times (j-1) + \gamma - 2 \leq Y_{48} \leq \alpha \times (j-1) + \gamma + 2$, where $(\alpha \times (i-1) + \beta, \alpha \times (j-1) + \gamma)$ are coordinates of the position of a pixel on the output image. That is to say, the post-transformation position $(X_{48}, Y_{48})$ must be in a 2×2 area (that is, an area having vertical and horizontal dimensions of 2×2) centered at a position having coordinates $(\alpha \times (i-1) + \beta, \alpha \times (j-1) + \gamma)$ on the output image. The pixel at the center of the area is a pixel, the pixel value of which is to be inferred. Then, the flow of the image generation processing goes on to the next step S321 shown in FIG. 33.

Let notation $N_8$ denote the number of aforementioned specific pixels identified at the step S320 from the eighth taken image $401_8$, notation $G_8(p)$ denote the G signal (or the pixel value) of a specific pixel having a pixel number p where p is an integer in the range 1, 2, $N_8$, notation $(X_8(p), Y_8(p))$ denote coordinates included in the coordinate system of the eighth taken image $401_8$ as the coordinates of the specific pixel and notation $(X_{48}(p), Y_{48}(p))$ denote post-transformation position coordinates obtained as a result of the affine transformation process carried out on the coordinates $(X_8(p), Y_8(p))$ of the specific pixel in accordance with Eq. (27). That is to say, the coordinates $(X_8(p), Y_8(p))$ and $(X_{48}(p), Y_{48}(p))$ correspond to respectively the coordinates $(X_8, Y_8)$ and $(X_{48}, Y_{48})$ used in Eq. (27).

Thus, for any pixel number p, notation $G_8(p)$ denotes the pixel value (or the G signal) of a specific pixel located at the coordinates $(X_8(p), Y_8(p))$ in the coordinate system of the eighth taken image $401_8$ as a pixel having the pixel number p. In addition, the coordinates $(X_{48}(p), Y_{48}(p))$ produced in the affine transformation process as the coordinates of the post-transformation position in the reference coordinate system satisfy the relations $\alpha \times (i-1) + \beta - 2 \leq X_{48}(p) \leq \alpha \times (i-1) + \beta + 2$ and $\alpha \times (j-1) + \gamma - 2 \leq Y_{48}(p) \leq \alpha \times (j-1) + \gamma + 2$.

At the step S321, the processing circuit 24 finds the numerator of Eq. (8) representing the weighted addition equation used for finding the green-color light quantity of a pixel (i, j) located on the output image on the basis of all the specific pixels identified at the steps S313 to S320. At the same step, the processing circuit 24 also finds the denominator of Eq. (8). As described before, the numerator of Eq. (8) is expressed by expression (9) and the denominator of Eq. (8) is expressed by expression (10).

To put it concretely, the value of expression (10) expressing the denominator of Eq. (8) expressing a weighted addition equation used to find the light quantity of the green color is found by computing the value of expression (28) and the value of expression (9) expressing the numerator of Eq. (8) is found by computing the value of expression (29). Expressions (28) and (29) are given as follows.

[Expression (28)]

$$\sum_{P=1}^{N_1} \{\text{Cubic}(X_0 - X_{41}(p)) \times \text{Cubic}(Y_0 - Y_{41}(p))\} + \quad (28)$$

$$\sum_{P=1}^{N_2} \{\text{Cubic}(X_0 - X_{42}(p)) \times \text{Cubic}(Y_0 - Y_{42}(p))\} +$$

$$\sum_{P=1}^{N_3} \{\text{Cubic}(X_0 - X_{43}(p)) \times \text{Cubic}(Y_0 - Y_{43}(p))\} +$$

$$\sum_{P=1}^{N_4} \{\text{Cubic}(X_0 - X_{44}(p)) \times \text{Cubic}(Y_0 - Y_{44}(p))\} +$$

$$\sum_{P=1}^{N_5} \{\text{Cubic}(X_0 - X_{45}(p)) \times \text{Cubic}(Y_0 - Y_{45}(p))\} +$$

$$\sum_{P=1}^{N_6} \{\text{Cubic}(X_0 - X_{46}(p)) \times \text{Cubic}(Y_0 - Y_{46}(p))\} +$$

$$\sum_{P=1}^{N_7} \{\text{Cubic}(X_0 - X_{47}(p)) \times \text{Cubic}(Y_0 - Y_{47}(p))\} +$$

$$\sum_{P=1}^{N_8} \{\text{Cubic}(X_0 - X_{48}(p)) \times \text{Cubic}(Y_0 - Y_{48}(p))\}$$

[Expression (29)]

$$\sum_{P=1}^{N_1} \{\text{Cubic}(X_0 - X_{41}(p)) \times \text{Cubic}(Y_0 - Y_{41}(p)) \times G_1(p)\} + \quad (29)$$

$$\sum_{P=1}^{N_2} \{\text{Cubic}(X_0 - X_{42}(p)) \times \text{Cubic}(Y_0 - Y_{42}(p)) \times G_2(p)\} +$$

$$\sum_{P=1}^{N_3} \{\text{Cubic}(X_0 - X_{43}(p)) \times \text{Cubic}(Y_0 - Y_{43}(p)) \times G_3(p)\} +$$

$$\sum_{P=1}^{N_4} \{\text{Cubic}(X_0 - X_{44}(p)) \times \text{Cubic}(Y_0 - Y_{44}(p)) \times G_4(p)\} +$$

$$\sum_{P=1}^{N_5} \{\text{Cubic}(X_0 - X_{45}(p)) \times \text{Cubic}(Y_0 - Y_{45}(p)) \times G_5(p)\} +$$

$$\sum_{P=1}^{N_6} \{\text{Cubic}(X_0 - X_{46}(p)) \times \text{Cubic}(Y_0 - Y_{46}(p)) \times G_6(p)\} +$$

$$\sum_{P=1}^{N_7} \{\text{Cubic}(X_0 - X_{47}(p)) \times \text{Cubic}(Y_0 - Y_{47}(p)) \times G_7(p)\} +$$

$$\sum_{P=1}^{N_8} \{\text{Cubic}(X_0 - X_{48}(p)) \times \text{Cubic}(Y_0 - Y_{48}(p)) \times G_8(p)\}$$

It is to be noted that notation $(X_0, Y_0)$ in expressions (28) and (29) denotes the coordinates of the aforementioned pixel (i, j), the pixel value of which is to be found. The coordinates $(X_0, Y_0)$ are coordinates of the pixel (i, j) on the output image where $X_0 = \alpha \times (i-1)$ and $Y_0 = \alpha \times (j-1) + \gamma$.

Expression (29) is a weighted addition expression used for finding the total of eight sums corresponding to k=1 to 8 respectively. Notation k is an integer assigned to each of the eight taken images ranging from the first taken image $401_1$ to the eighth taken image $401_8$, which are each subjected to a process to transform the coordinates of positions of specific pixels on the taken images into coordinates of positions on the reference image. Each of the eight sums is an expression used for finding the sum of weighted pixel values for p=1 to $N_k$. Each of the weighted pixel values is a product obtained by multiplying the pixel value $G_k(p)$ by a weight Cubic $(X_0-X_{4k}(p)) \times \text{cubic}(Y_0-Y_{4k}(p))$. The pixel value $G_k(p)$ is a G signal observed for an aforementioned specific pixel at a position with its coordinates transformable into coordinates $(X_{4k}(p), Y_{4k}(p))$ in close proximity to the coordinates $(\alpha \times (i-1)+\beta, \alpha \times (j-1)+\gamma)$ of the position of a pixel (i, j), the pixel value of which is being inferred. As described above, the pixel (i, j) is a pixel on the output image. On the other hand, expression (28) is an expression used for finding the total of eight other sums corresponding to k=1 to 8 respectively. In this case, each of the eight other sums is an expression used for finding the sum of weights each expressed by Cubic $(X_0-X_{4k}(p)) \times \text{Cubic}(Y_0-Y_{4k}(p))$ for p=1 to $N_k$. A process to divide the value of expression (29) by the value of expression (28) is equivalent to the process to compute the expression on the right side of Eq. (8). The result of the process is a weighted average value of all the pixel values $G_k(p)$ each multiplied by a weight according to the distance between the position $(X_0, Y_0)$ of the pixel (i, j), the pixel value of which is being found, and a position with its into coordinates $(X_{4k}(p), Y_{4k}(p))$ obtained as a result of an affine transformation process carried out on the coordinates of a specific pixel as described above. The pixel (i, j) is a pixel on the output image. Each of the pixel values $G_k(p)$ is the pixel value of a specific pixel identified at any of the steps S313 to S320 as a pixel on any of the taken images.

After the processing circuit 24 computes the values of expressions (28) and (29) for the pixel (i, j) and stores the values obtained as a result of the computation in a memory shown in none of the figures, the flow of the image generation processing goes on to the next step S322.

Processes of the steps S322 to S330 are to the R signal what the processes of the steps S313 to S321 respectively are to the G signal. By the same token, processes of the steps S331 to S339 are to the B signal what the processes of the steps S313 to S321 respectively are to the G signal.

To put it in detail, at the step S322, the processing circuit 24 identifies all R-signal pixels (or pixels of the red color) on the first taken image $401_1$ as specific pixels. The position of each of the selected R-signal pixels on the first taken image $401_1$ has coordinates $(X_1, Y_1)$ transformable by an affine transformation process according to Eq. (20) into post-transformation coordinates $(X_{41}, Y_{41})$ included in the reference coordinate system as coordinates $(X_{41}, Y_{41})$ that must satisfy the relations $\alpha \times (i-1)+\beta-2 \leq X_{41} \leq \alpha \times (i-1)+\beta+2$ and $\alpha \times (j-1)+\gamma-2 \leq Y_{41} \leq \alpha \times (j-1)+\gamma+2$, where $(\alpha \times (i-1)+\beta, \alpha \times (j-1)+\gamma)$ are coordinates of the position of a pixel on the output image. That is to say, the post-transformation position $(X_{41}, Y_{41})$ must be in a 2×2 area (that is, an area having vertical and horizontal dimensions of 2×2) centered at a position having coordinates $(\alpha \times (i-1)+\beta, \alpha \times (j-1)+\gamma)$ on the output image. The pixel at the center of the area is a pixel, the pixel value of which is to be inferred. Then, the flow of the image generation processing goes on to the next step S323.

Let notation $N_1$ denote the number of aforementioned specific pixels identified at the step S322 from the first taken image $401_1$, notation $R_1(p)$ denote the R signal (or the pixel value) of a specific pixel having a pixel number p where p is an integer in the range 1, 2, . . . , $N_1$, notation $(X_1(p), Y_1(p))$ denote coordinates included in the coordinate system of the first taken image $401_1$ as the coordinates of the specific pixel and notation $(X_{41}(p), Y_{41}(p))$ denote post-transformation position coordinates obtained as a result of the affine transformation process carried out on the coordinates $(X_1(p), Y_1(p))$ of the specific pixel in accordance with Eq. (20). That is to say, the coordinates $(X_1(p), Y_1(p))$ and $(X_{41}(p), Y_{41}(p))$ correspond to respectively the coordinates $(X_1, Y_1)$ and $(X_{41}, Y_{41})$ used in Eq. (20).

Thus, for any pixel number p, notation $R_1(p)$ denotes the pixel value (or the R signal) of a specific pixel located at the coordinates $(X_1(p), Y_1(p))$ in the coordinate system of the first taken image $401_1$ as a pixel having the pixel number p. In addition, the coordinates $(X_{41}(p), Y_{41}(p))$ produced in the affine transformation process as the coordinates of the post-transformation position in the reference coordinate system satisfy the relations $\alpha \times (i-1)+\beta-2 \leq X_{41}(p) \leq \alpha \times (i-1)+\beta+2$ and $\alpha \times (j-1)+\gamma-2 \leq Y_{41}(p) \leq \alpha \times (j-1)+\gamma+2$.

At the step S323, the processing circuit 24 identifies all R-signal pixels (or pixels of the red color) on the second taken image $401_2$ as specific pixels. The position of each of the selected R-signal pixels on the second taken image $401_2$ has coordinates $(X_2, Y_2)$ transformable by an affine transformation process according to Eq. (21) into post-transformation coordinates $(X_{42}, Y_{42})$ included in the reference coordinate system as coordinates $(X_{42}, Y_{42})$ that must satisfy the relations $\alpha \times (i-1)+\beta-2 \leq X_{42} \leq \alpha \times (i-1)+\beta+2$ and $\alpha \times (j-1)+\gamma-2 \leq Y_{42} \leq \alpha \times (j-1)+\gamma+2$, where $(\alpha \times (i-1)+\beta, \alpha \times (j-1)+\gamma)$ are coordinates of the position of a pixel on the output image. That is to say, the post-transformation position $(X_{42}, Y_{42})$ must be in a 2×2 area (that is, an area having vertical and horizontal dimensions of 2×2) centered at a position having coordinates $(\alpha \times (i-1)+\beta, \alpha \times (j-1)+\gamma)$ on the output image. The pixel at the center of the area is a pixel, the pixel value of which is to be inferred. Then, the flow of the image generation processing goes on to the next step S324 shown in FIG. 34.

Let notation $N_2$ denote the number of aforementioned specific pixels identified at the step S323 from the second taken image $401_2$, notation $R_2(p)$ denote the R signal (or the pixel value) of a specific pixel having a pixel number p where p is an integer in the range 1, 2, $N_2$, notation $(X_2(p), Y_2(p))$ denote coordinates included in the coordinate system of the second taken image $401_2$ as the coordinates of the specific pixel and notation $(X_{42}(p), Y_{42}(p))$ denote post-transformation position coordinates obtained as a result of the affine transformation process carried out on the coordinates $(X_2(p), Y_2(p))$ of the specific pixel in accordance with Eq. (21). That is to say, the coordinates $(X_2(p), Y_2(p))$ and $(X_{42}(p), Y_{42}(p))$ correspond to respectively the coordinates $(X_2, Y_2)$ and $(X_{42}, Y_{42})$ used in Eq. (21).

Thus, for any pixel number p, notation $R_2(p)$ denotes the pixel value (or the R signal) of a specific pixel located at the coordinates $(X_2(p), Y_2(p))$ in the coordinate system of the second taken image $401_2$ as a pixel having the pixel number p. In addition, the coordinates $(X_{42}(p), Y_{42}(p))$ produced in the affine transformation process as the coordinates of the post-transformation position in the reference coordinate system satisfy the relations $\alpha \times (i-1)+\beta-2 \leq X_{42}(p) \leq \alpha \times (i-1)+\beta+2$ and $\alpha \times (j-1)+\gamma-2 \leq Y_{42}(p) \leq \alpha \times (j-1)+\gamma+2$.

At the step S324, the processing circuit 24 identifies all R-signal pixels (or pixels of the red color) on the third taken image $401_3$ as specific pixels. The position of each of the selected R-signal pixels on the third taken image $401_3$ has coordinates $(X_3, Y_3)$ transformable by an affine transformation process according to Eq. (22) into post-transformation coordinates $(X_{43}, Y_{43})$ included in the reference coordinate system as coordinates $(X_{43}, Y_{43})$ that must satisfy the relations $\alpha \times (i-1) + \beta - 2 \leq X_{43} \leq \alpha \times (i-1) + \beta + 2$ and $\alpha \times (j-1) + \gamma - 2 \leq Y_{43} \leq \alpha \times (j-1) + \gamma + 2$, where $(\alpha \times (i-1) + \beta, \alpha \times (j-1) + \gamma)$ are coordinates of the position of a pixel on the output image. That is to say, the post-transformation position $(X_{43}, Y_{43})$ must be in a 2×2 area (that is, an area having vertical and horizontal dimensions of 2×2) centered at a position having coordinates $(\alpha \times (i-1) + \beta, \alpha \times (j-1) + \gamma)$ on the output image. The pixel at the center of the area is a pixel, the pixel value of which is to be inferred. Then, the flow of the image generation processing goes on to the next step S325.

Let notation $N_3$ denote the number of aforementioned specific pixels identified at the step S324 from the third taken image $401_3$, notation $R_3(p)$ denote the R signal (or the pixel value) of a specific pixel having a pixel number p where p is an integer in the range 1, 2, ..., $N_3$, notation $(X_3(p), Y_3(p))$ denote coordinates included in the coordinate system of the third taken image $401_3$ as the coordinates of the specific pixel and notation $(X_{43}(p), Y_{43}(p))$ denote post-transformation position coordinates obtained as a result of the affine transformation process carried out on the coordinates $(X_3(p), Y_3(p))$ of the specific pixel in accordance with Eq. (22). That is to say, the coordinates $(X_3(p), Y_3(p))$ and $(X_{43}(p), Y_{43}(p))$ correspond to respectively the coordinates $(X_3, Y_3)$ and $(X_{43}, Y_{43})$ used in Eq. (22).

Thus, for any pixel number p, notation $R_3(p)$ denotes the pixel value (or the R signal) of a specific pixel located at the coordinates $(X_3(p), Y_3(p))$ in the coordinate system of the third taken image $401_3$ as a pixel having the pixel number p. In addition, the coordinates $(X_{43}(p), Y_{43}(p))$ produced in the affine transformation process as the coordinates of the post-transformation position in the reference coordinate system satisfy the relations $\alpha \times (i-1) + \beta - 2 \leq X_{43}(p) \leq \alpha \times (i-1) + \beta + 2$ and $\alpha \times (j-1) + \gamma - 2 \leq Y_{43}(p) \leq \alpha \times (j-1) + \gamma + 2$ expressing relations with the coordinates $(\alpha \times (i-1) + \beta, \alpha \times (j-1) + \gamma)$.

At the step S325, the processing circuit 24 identifies all R-signal pixels (or pixels of the red color) on the fourth taken image $401_4$ as specific pixels. The position of each of the selected R-signal pixels on the fourth taken image $401_4$ has coordinates $(X_4, Y_4)$ transformable by an affine transformation process according to Eq. (23) into post-transformation coordinates $(X_{44}, Y_{44})$ included in the reference coordinate system as coordinates $(X_{44}, Y_{44})$ that must satisfy the relations $\alpha \times (i-1) + \beta - 2 \leq X_{44} \leq \alpha \times (i-1) + \beta + 2$ and $\alpha \times (j-1) + \gamma - 2 \leq Y_{44} \leq \alpha \times (j-1) + \gamma + 2$, where $\alpha \times (i-1) + \beta, \alpha \times (j-1) + \gamma)$ are coordinates of the position of a pixel on the output image. That is to say, the post-transformation position $(X_{44}, Y_{44})$ must be in a 2×2 area (that is, an area having vertical and horizontal dimensions of 2×2) centered at a position having coordinates $(\alpha \times (i-1) + \beta, \alpha \times (j-1) + \gamma)$ on the output image. The pixel at the center of the area is a pixel, the pixel value of which is to be inferred. Then, the flow of the image generation processing goes on to the next step S326.

Let notation $N_4$ denote the number of aforementioned specific pixels identified at the step S325 from the fourth taken image $401_4$, notation $R_4(p)$ denote the R signal (or the pixel value) of a specific pixel having a pixel number p where p is an integer in the range 1, 2, $N_4$, notation $(X_4(p), Y_4(p))$ denote coordinates included in the coordinate system of the fourth taken image $401_4$ as the coordinates of the specific pixel and notation $(X_{44}(p), Y_{44}(p))$ denote post-transformation position coordinates obtained as a result of the affine transformation process carried out on the coordinates $(X_4(p), Y_4(p))$ of the specific pixel in accordance with Eq. (23). That is to say, the coordinates $(X_4(p), Y_4(p))$ and $(X_{44}(p), Y_{44}(p))$ correspond to respectively the coordinates $(X_4, Y_4)$ and $(X_{44}, Y_{44})$ used in Eq. (23).

Thus, for any pixel number p, notation $R_4(p)$ denotes the pixel value (or the R signal) of a specific pixel located at the coordinates $(X_4(p), Y_4(p))$ in the coordinate system of the fourth taken image $401_4$ as a pixel having the pixel number p. In addition, the coordinates $(X_{44}(p), Y_{44}(p))$ produced in the affine transformation process as the coordinates of the post-transformation position in the reference coordinate system satisfy the relations $\alpha \times (i-1) + \beta - 2 \leq X_{44}(p) \leq \alpha \times (i-1) + \beta + 2$ and $\alpha \times (j-1) + \gamma - 2 \leq Y_{44}(p) \leq \alpha \times (j-1) + \gamma + 2$ expressing relations with the coordinates $(\alpha \times (i-1) + \beta, \alpha \times (j-1) + \gamma)$.

At the step S326, the processing circuit 24 identifies all R-signal pixels (or pixels of the red color) on the fifth taken image $401_5$ as specific pixels. The position of each of the selected R-signal pixels on the fifth taken image $401_5$ has coordinates $(X_5, Y_5)$ transformable by an affine transformation process according to Eq. (24) into post-transformation coordinates $(X_{45}, Y_{45})$ included in the reference coordinate system as coordinates $(X_{45}, Y_{45})$ that must satisfy the relations $\alpha \times (i-1) + \beta - 2 \leq X_{45} \leq \alpha \times (i-1) + \beta + 2$ and $\alpha \times (j-1) + \gamma - 2 \leq Y_{45} \leq \alpha \times (j-1) + \gamma + 2$, where $(\alpha \times (i-1) + \beta, \alpha \times (j-1) + \gamma)$ are coordinates of the position of a pixel on the output image. That is to say, the post-transformation position $(X_{45}, Y_{45})$ must be in a 2×2 area (that is, an area having vertical and horizontal dimensions of 2×2) centered at a position having coordinates $(\alpha \times (i-1) + \beta, \alpha \times (j-1) + \gamma)$ on the output image. The pixel at the center of the area is a pixel, the pixel value of which is to be inferred. Then, the flow of the image generation processing goes on to the next step S327 shown in FIG. 35.

Let notation $N_5$ denote the number of aforementioned specific pixels identified at the step S326 from the fifth taken image $401_5$, notation $R_5(p)$ denote the R signal (or the pixel value) of a specific pixel having a pixel number p where p is an integer in the range 1, 2, ..., $N_5$, notation $(X_5(p), Y_5(p))$ denote coordinates included in the coordinate system of the fifth taken image $401_5$ as the coordinates of the specific pixel and notation $(X_{45}(p), Y_{45}(p))$ denote post-transformation position coordinates obtained as a result of the affine transformation process carried out on the coordinates $(X_5(p), Y_5(p))$ of the specific pixel in accordance with Eq. (24). That is to say, the coordinates $(X_5(p), Y_5(p))$ and $(X_{45}(p), Y_{45}(p))$ correspond to respectively the coordinates $(X_5, Y_5)$ and $(X_{45}, Y_{45})$ used in Eq. (24).

Thus, for any pixel number p, notation $R_5(p)$ denotes the pixel value (or the R signal) of a specific pixel located at the coordinates $(X_5(p), Y_5(p))$ in the coordinate system of the fifth taken image $401_5$ as a pixel having the pixel number p. In addition, the coordinates $(X_{45}(p), Y_{45}(p))$ produced in the affine transformation process as the coordinates of the post-transformation position in the reference coordinate system satisfy the relations $\alpha \times (i-1) + \beta - 2 \leq X_{45}(p) \leq \alpha \times (i-1) + \beta + 2$ and $\alpha \times (j-1) + \gamma - 2 \leq Y_{45}(p) \leq \alpha \times (j-1) + \gamma + 2$.

At the step S327, the processing circuit 24 identifies all R-signal pixels (or pixels of the red color) on the sixth taken image $401_6$ as specific pixels. The position of each of the selected R-signal pixels on the sixth taken image $401_6$ has coordinates $(X_6, Y_6)$ transformable by an affine transformation process according to Eq. (25) into post-transformation coordinates $(X_{46}, Y_{46})$ included in the reference coordinate system as coordinates $(X_{46}, Y_{46})$ that must satisfy the relations $\alpha \times (i-1)+\beta-2 \leq X_{46} \leq \alpha \times (i-1)+\beta+2$ and $\alpha \times (j-1)+\gamma-2 \leq Y_{46} \leq \alpha \times (j-1)+\gamma+2$, where $(\alpha \times (i-1)+\beta, \alpha \times (j-1)+\gamma)$ are coordinates of the position of a pixel on the output image. That is to say, the post-transformation position $(X_{46}, Y_{46})$ must be in a 2×2 area (that is, an area having vertical and horizontal dimensions of 2×2) centered at a position having coordinates $(\alpha \times (i-1)+\beta, \alpha \times (j-1)+\gamma)$ on the output image. The pixel at the center of the area is a pixel, the pixel value of which is to be inferred. Then, the flow of the image generation processing goes on to the next step S328.

Let notation $N_6$ denote the number of aforementioned specific pixels identified at the step S327 from the sixth taken image $401_6$, notation $R_6(p)$ denote the R signal (or the pixel value) of a specific pixel having a pixel number p where p is an integer in the range 1, 2, . . . , $N_6$, notation $(X_6(p), Y_6(p))$ denote coordinates included in the coordinate system of the sixth taken image $401_6$ as the coordinates of the specific pixel and notation $(X_{46}(p), Y_{46}(p))$ denote post-transformation position coordinates obtained as a result of the affine transformation process carried out on the coordinates $(X_6(p), Y_6(p))$ of the specific pixel in accordance with Eq. (25). That is to say, the coordinates $(X_6(p), Y_6(p))$ and $(X_{46}(p), Y_{46}(p))$ correspond to respectively the coordinates $(X_6, Y_6)$ and $(X_{46}, Y_{46})$ used in Eq. (25).

Thus, for any pixel number p, notation $R_6(p)$ denotes the pixel value (or the R signal) of a specific pixel located at the coordinates $(X_6(p), Y_6(p))$ in the coordinate system of the sixth taken image $401_6$ as a pixel having the pixel number p. In addition, the coordinates $(X_{46}(p), Y_{46}(p))$ produced in the affine transformation process as the coordinates of the post-transformation position in the reference coordinate system satisfy the relations $\alpha \times (i-1)+\beta-2 \leq X_{46}(p) \leq \alpha \times (i-1)+\beta+2$ and $\alpha \times (j-1)+\gamma-2 \leq Y_{46}(p) \leq \alpha \times (j-1)+\gamma+2$.

At the step S328, the processing circuit 24 identifies all R-signal pixels (or pixels of the red color) on the seventh taken image $401_7$ as specific pixels. The position of each of the selected R-signal pixels on the seventh taken image $401_7$ has coordinates $(X_7, Y_7)$ transformable by an affine transformation process according to Eq. (26) into post-transformation coordinates $(X_{47}, Y_{47})$ included in the reference coordinate system as coordinates $(X_{47}, Y_{47})$ that must satisfy the relations $\alpha \times (i-1)+\beta-2 \leq X_{47} \leq \alpha \times (i-1)+\beta+2$ and $\alpha \times (j-1)+\gamma-2 \leq Y_{47} \leq \alpha \times (j-1)+\gamma+2$, where $(\alpha \times (i-1)+\beta, \alpha \times (j-1)+\gamma)$ are coordinates of the position of a pixel on the output image. That is to say, the post-transformation position $(X_{47}, Y_{47})$ must be in a 2×2 area (that is, an area having vertical and horizontal dimensions of 2×2) centered at a position having coordinates $(\alpha \times (i-1)+\beta, \alpha \times (j-1)+\gamma)$ on the output image. The pixel at the center of the area is a pixel, the pixel value of which is to be inferred. Then, the flow of the image generation processing goes on to the next step S329.

Let notation $N_7$ denote the number of aforementioned specific pixels identified at the step S328 from the seventh taken image $401_7$, notation $R_7(p)$ denote the R signal (or the pixel value) of a specific pixel having a pixel number p where p is an integer in the range 1, 2, . . . , $N_7$, notation $(X_7(p), Y_7(p))$ denote coordinates included in the coordinate system of the seventh taken image $401_7$ as the coordinates of the specific pixel and notation $(X_{47}(p), Y_{47}(p))$ denote post-transformation position coordinates obtained as a result of the affine transformation process carried out on the coordinates $(X_7(p), Y_7(p))$ of the specific pixel in accordance with Eq. (26). That is to say, the coordinates $(X_7(p), Y_7(p))$ and $(X_{47}(p), Y_{47}(p))$ correspond to respectively the coordinates $(X_7, Y_7)$ and $(X_{47}, Y_{47})$ used in Eq. (26).

Thus, for any pixel number p, notation $R_7(p)$ denotes the pixel value (or the R signal) of a specific pixel located at the coordinates $(X_7(p), Y_7(p))$ in the coordinate system of the seventh taken image $401_7$ as a pixel having the pixel number p. In addition, the coordinates $(X_{47}(p), Y_{47}(p))$ produced in the affine transformation process as the coordinates of the post-transformation position in the reference coordinate system satisfy the relations $\alpha \times (i-1)+\beta-2 \leq X_{47}(p) \leq \alpha \times (i-1)+\beta+2$ and $\alpha \times (j-1)+\gamma-2 \leq Y_{47}(p) \leq \alpha \times (j-1)+\gamma+2$.

At the step S329, the processing circuit 24 identifies all R-signal pixels (or pixels of the red color) on the eighth taken image 4018 as specific pixels. The position of each of the selected R-signal pixels on the eighth taken image 4018 has coordinates (X8, Y8) transformable by an affine transformation process according to Eq. (27) into post-transformation coordinates (X48, Y48) included in the reference coordinate system as coordinates (X48, Y48) that must satisfy the relations $\alpha \times (i-1)+\beta-2 \square X48 \square \alpha \times (i-1)+\beta+2$ and $\alpha \times (j-1)+\gamma-2 \square Y48 \square \alpha \times (j-1)+\gamma+2$, where $(\alpha \times (i-1)+\beta, \alpha \times (j-1)+\gamma)$ are coordinates of the position of a pixel on the output image. That is to say, the post-transformation position (X48, Y48) must be in a 2×2 area (that is, an area having vertical and horizontal dimensions of 2×2) centered at a position having coordinates $(\alpha \times (i-1)+\beta, \alpha \times (j-1)+\gamma)$ on the output image. The pixel at the center of the area is a pixel, the pixel value of which is to be inferred. Then, the flow of the image generation processing goes on to the next step S330 shown in FIG. 36.

Let notation $N_8$ denote the number of aforementioned specific pixels identified at the step S329 from the eighth taken image $401_8$, notation $R_8(p)$ denote the R signal (or the pixel value) of a specific pixel having a pixel number p where p is an integer in the range 1, 2, . . . , $N_8$, notation $(X_8(p), Y_8(p))$ denote coordinates included in the coordinate system of the eighth taken image $401_8$ as the coordinates of the specific pixel and notation $(X_{48}(p), Y_{48}(p))$ denote post-transformation position coordinates obtained as a result of the affine transformation process carried out on the coordinates $(X_8(p), Y_8(p))$ of the specific pixel in accordance with Eq. (27). That is to say, the coordinates $(X_8(p), Y_8(p))$ and $(X_{48}(p), Y_{48}(p))$ correspond to respectively the coordinates $(X_8, Y_8)$ and $(X_{48}, Y_{48})$ used in Eq. (27).

Thus, for any pixel number p, notation $R_8(p)$ denotes the pixel value (or the R signal) of a specific pixel located at the coordinates $(X_8(p), Y_8(p))$ in the coordinate system of the eighth taken image $401_8$ as a pixel having the pixel number p. In addition, the coordinates $(X_{48}(p), Y_{48}(p))$ produced in the affine transformation process as the coordinates of the post-transformation position in the reference coordinate system satisfy the relations $\alpha \times (i-1)+\beta-2 \leq X_{48}(p) \leq \alpha \times (i-1)+\beta+2$ and $\alpha \times (j-1)+\gamma-2 \leq Y_{48}(p) \leq \alpha \times (j-1)+\gamma+2$.

At the step S330, the processing circuit 24 finds the numerator of Eq. (11) representing the weighted addition equation used for finding the red-color light quantity of a pixel (i, j) located on the output image on the basis of all specific pixels identified at the steps S322 to S329. At the same step, the processing circuit 24 also finds the denominator of Eq. (11). As described before, the numerator of Eq. (11) is expressed by expression (13) and the denominator of Eq. (11) is expressed by expression (14).

To put it concretely, the value of expression (14) expressing the denominator of Eq. (11) expressing a weighted addition equation used to find the light quantity of the red color is found by computing the value of expression (30) and the value of expression (13) expressing the numerator of Eq. (11) is found by computing the value of expression (31). Expressions (30) and (31) are given as follows.

[Expression (30)]

$$\sum_{P=1}^{N_1} \{\text{Cubic}(X_0 - X_{41}(p)) \times \text{Cubic}(Y_0 - Y_{41}(p))\} + \quad (30)$$

$$\sum_{P=1}^{N_2} \{\text{Cubic}(X_0 - X_{42}(p)) \times \text{Cubic}(Y_0 - Y_{42}(p))\} +$$

$$\sum_{P=1}^{N_3} \{\text{Cubic}(X_0 - X_{43}(p)) \times \text{Cubic}(Y_0 - Y_{43}(p))\} +$$

$$\sum_{P=1}^{N_4} \{\text{Cubic}(X_0 - X_{44}(p)) \times \text{Cubic}(Y_0 - Y_{44}(p))\} +$$

$$\sum_{P=1}^{N_5} \{\text{Cubic}(X_0 - X_{45}(p)) \times \text{Cubic}(Y_0 - Y_{45}(p))\} +$$

$$\sum_{P=1}^{N_6} \{\text{Cubic}(X_0 - X_{46}(p)) \times \text{Cubic}(Y_0 - Y_{46}(p))\} +$$

$$\sum_{P=1}^{N_7} \{\text{Cubic}(X_0 - X_{47}(p)) \times \text{Cubic}(Y_0 - Y_{47}(p))\} +$$

$$\sum_{P=1}^{N_8} \{\text{Cubic}(X_0 - X_{48}(p)) \times \text{Cubic}(Y_0 - Y_{48}(p))\}$$

[Expression (31)]

$$\sum_{P=1}^{N_1} \{\text{Cubic}(X_0 - X_{41}(p)) \times \text{Cubic}(Y_0 - Y_{41}(p)) \times R_1(p)\} + \quad (31)$$

$$\sum_{P=1}^{N_2} \{\text{Cubic}(X_0 - X_{42}(p)) \times \text{Cubic}(Y_0 - Y_{42}(p)) \times R_2(p)\} +$$

$$\sum_{P=1}^{N_3} \{\text{Cubic}(X_0 - X_{43}(p)) \times \text{Cubic}(Y_0 - Y_{43}(p)) \times R_3(p)\} +$$

$$\sum_{P=1}^{N_4} \{\text{Cubic}(X_0 - X_{44}(p)) \times \text{Cubic}(Y_0 - Y_{44}(p)) \times R_4(p)\} +$$

$$\sum_{P=1}^{N_5} \{\text{Cubic}(X_0 - X_{45}(p)) \times \text{Cubic}(Y_0 - Y_{45}(p)) \times R_5(p)\} +$$

$$\sum_{P=1}^{N_6} \{\text{Cubic}(X_0 - X_{46}(p)) \times \text{Cubic}(Y_0 - Y_{46}(p)) \times R_6(p)\} +$$

$$\sum_{P=1}^{N_7} \{\text{Cubic}(X_0 - X_{47}(p)) \times \text{Cubic}(Y_0 - Y_{47}(p)) \times R_7(p)\} +$$

$$\sum_{P=1}^{N_8} \{\text{Cubic}(X_0 - X_{48}(p)) \times \text{Cubic}(Y_0 - Y_{48}(p)) \times R_8(p)\}$$

It is to be noted that notation $(X_0, Y_0)$ in expressions (30) and (31) denotes the coordinates of the aforementioned pixel (i, j), the pixel value of which is to be found. The coordinates $(X_0, Y_0)$ are coordinates of the pixel (i, j) on the output image where $X_0 = \alpha \times (i-1) + \beta$ and $Y_0 = \alpha \times (j-1) + \gamma$.

Expression (31) is a weighted addition expression used for finding the total of eight sums corresponding to k=1 to 8 respectively. Notation k is an integer assigned to each of the eight taken images ranging from the first taken image $401_1$ to the eighth taken image $401_8$, which are each subjected to a process to transform the coordinates of positions of specific pixels on the taken images into coordinates of positions on the reference image. Each of the eight sums is an expression used for finding the sum of weighted pixel values for p=1 to $N_k$. Each of the weighted pixel values is a product obtained by multiplying the pixel value $R_k(p)$ by a weight Cubic $(X_0-X_{4k}(p)) \times \text{Cubic }(Y_0-Y_{4k}(p))$. The pixel value $R_k(p)$ is an R signal observed for an aforementioned specific pixel at a position with its coordinates transformable into coordinates $(X_{4k}(p), Y_{4k}(p))$ in close proximity to the coordinates $(\alpha \times (i-1)+\beta, \alpha \times (j-1)+\gamma)$ of the position of a pixel (i, j), the pixel value of which is being inferred. As described above, the pixel (i, j) is a pixel on the output image. On the other hand, expression (30) is an expression used for finding the total of eight other sums corresponding to k=1 to 8 respectively. In this case, each of the eight other sums is an expression used for finding the sum of weights each expressed by Cubic $(X_0-X_{4k}(p)) \times \text{Cubic }(Y_0-Y_{4k}(p))$ for p=1 to $N_k$. A process to divide the value of expression (31) by the value of expression (30) is equivalent to the process to compute the expression on the right side of Eq. (11). The result of the process is a weighted average value of all the pixel values $R_k(p)$ each multiplied by a weight according to the distance between the position $(X_0, Y_0)$ for the pixel (i, j), the pixel value of which is being found, and a position with its into coordinates $(X_{4k}(p), Y_{4k}(p))$ obtained as a result of an affine transformation process carried out on the coordinates of a specific pixel as described above. The pixel (i, j) is a pixel on the output image. Each of the pixel values $R_k(p)$ is the pixel value of a specific pixel identified at any of the steps S322 to S329 as a pixel on any of the taken images.

After the processing circuit 24 computes the values of expressions (30) and (31) for the pixel (i, j) and stores the values obtained as a result of the computation in the memory shown in none of the figures, the flow of the image generation processing goes on to the next step S331.

At the step S331, the processing circuit 24 identifies all B-signal pixels (or pixels of the blue color) on the first taken image $401_1$ as specific pixels. The position of each of the selected B-signal pixels on the first taken image $401_1$ has coordinates $(X_1, Y_1)$ transformable by an affine transformation process according to Eq. (20) into post-transformation coordinates $(X_{41}, Y_{41})$ included in the reference coordinate system as coordinates $(X_{41}, Y_{41})$ that must satisfy the relations $\alpha \times (i-1)+\beta-2 \leq X_{41} \leq \alpha \times (i-1)+\beta+2$ and $\alpha \times (j-1)+\gamma-2 \leq Y_{41} \leq \alpha \times (j-1)+\gamma+2$, where $(\alpha \times (i-1)+\beta, \alpha \times (j-1)+\gamma)$ are coordinates of the position of a pixel on the output image. That is to say, the post-transformation position $(X_{41}, Y_{41})$ must be in a 2×2 area (that is, an area having vertical and horizontal dimensions of 2×2) centered at a position having coordinates $(\alpha \times (i-1)+\beta, \alpha \times (j-1)+\gamma)$ on the output image. The pixel at the center of the area is a pixel, the pixel value of which is to be inferred. Then, the flow of the image generation processing goes on to the next step S332.

Let notation $N_1$ denote the number of aforementioned specific pixels identified at the step S331 from the first taken image $401_1$, notation $B_1(p)$ denote the B signal (or the pixel value) of a specific pixel having a pixel number p where p is an integer in the range 1, 2, . . . , $N_1$, notation $(X_1(p), Y_1(p))$ denote coordinates included in the coordinate system of the first taken image $401_1$ as the coordinates of the specific pixel and notation $(X_{41}(p), Y_{41}(p))$ denote post-transformation position coordinates obtained as a result of the affine transformation process carried out on the coordinates $(X_1(p), Y_1(p))$ of the specific pixel in accordance with Eq. (20). That is to say, the coordinates $(X_1(p), Y_1(p))$ and $(X_{41}(p), Y_{41}(p))$ correspond to respectively the coordinates $(X_1, Y_1)$ and $(X_{41}, Y_{41})$ used in Eq. (20).

Thus, for any pixel number p, notation $B_1(p)$ denotes the pixel value (or the B signal) of a specific pixel located at the coordinates $(X_1(p), Y_1(p))$ in the coordinate system of the first taken image $401_1$ as a pixel having the pixel number p. In addition, the coordinates $(X_{41}(p), Y_{41}(p))$ produced in the affine transformation process as the coordinates of the post-transformation position in the reference coordinate system satisfy the relations $\alpha\times(i-1)+\beta-2 \leq X_{41}(p) \leq \alpha\times(i-1)+\beta+2$ and $\alpha\times(j-1)+\gamma-2 \leq Y_{41}(p) \leq \alpha\times(j-1)+\gamma+2$.

At the step S332, the processing circuit 24 identifies all B-signal pixels (or pixels of the blue color) on the second taken image $401_2$ as specific pixels. The position of each of the selected B-signal pixels on the second taken image $401_2$ has coordinates $(X_2, Y_2)$ transformable by an affine transformation process according to Eq. (21) into post-transformation coordinates $(X_{42}, Y_{42})$ included in the reference coordinate system as coordinates $(X_{42}, Y_{42})$ that must satisfy the relations $\alpha\times(i-1)+\beta-2 \leq X_{42} \leq \alpha\times(i-1)+\beta+2$ and $\alpha\times(j-1)+\gamma-2 \leq Y_{42} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{42}, Y_{42})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S333 shown in FIG. 37.

Let notation $N_2$ denote the number of aforementioned specific pixels identified at the step S332 from the second taken image $401_2$, notation $B2(p)$ denote the B signal (or the pixel value) of a specific pixel having a pixel number p where p is an integer in the range 1, 2, $N_2$, notation $(X_2(p), Y_2(p))$ denote coordinates included in the coordinate system of the second taken image $401_2$ as the coordinates of the specific pixel and notation $(X_{42}(p), Y_{42}(p))$ denote post-transformation position coordinates obtained as a result of the affine transformation process carried out on the coordinates $(X_2(p), Y_2(p))$ of the specific pixel in accordance with Eq. (21). That is to say, the coordinates $(X_2(p), Y_2(p))$ and $(X_{42}(p), Y_{42}(p))$ correspond to respectively the coordinates $(X_2, Y_2)$ and $(X_{42}, Y_{42})$ used in Eq. (21).

Thus, for any pixel number p, notation $B_2(p)$ denotes the pixel value (or the B signal) of a specific pixel located at the coordinates $(X_2(p), Y_2(p))$ in the coordinate system of the second taken image $401_2$ as a pixel having the pixel number p. In addition, the coordinates $(X_{42}(p), Y_{42}(p))$ produced in the affine transformation process as the coordinates of the post-transformation position in the reference coordinate system satisfy the relations $\alpha\times(i-1)+\beta-2 \leq X_{42}(p) \leq \alpha\times(i-1)+\beta+2$ and $\alpha\times(j-1)+\gamma-2 \leq Y_{42}(p) \leq \alpha\times(j-1)+\gamma+2$.

At the step S333, the processing circuit 24 identifies all B-signal pixels (or pixels of the blue color) on the third taken image $401_3$ as specific pixels. The position of each of the selected B-signal pixels on the third taken image $401_3$ has coordinates $(X_3, Y_3)$ transformable by an affine transformation process according to Eq. (22) into post-transformation coordinates $(X_{43}, Y_{43})$ included in the reference coordinate system as coordinates $(X_{43}, Y_{43})$ that must satisfy the relations $\alpha\times(i-1)+\beta-2 \leq X_{43} \leq \alpha\times(i-1)+\beta+2$ and $\alpha\times(j-1)+\gamma-2 \leq Y_{43} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{43}, Y_{43})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S334.

Let notation $N_3$ denote the number of aforementioned specific pixels identified at the step S333 from the third taken image $401_3$, notation $B_3(p)$ denote the B signal (or the pixel value) of a specific pixel having a pixel number p where p is an integer in the range 1, 2, . . . , $N_3$, notation $(X_3(p), Y_3(p))$ denote coordinates included in the coordinate system of the third taken image $401_3$ as the coordinates of the specific pixel and notation $(X_{43}(p), Y_{43}(p))$ denote post-transformation position coordinates obtained as a result of the affine transformation process carried out on the coordinates $(X_3(p), Y_3(p))$ of the specific pixel in accordance with Eq. (22). That is to say, the coordinates $(X_3(p), Y_3(p))$ and $(X_{43}(p), Y_{43}(p))$ correspond to respectively the coordinates $(X_3, Y_3)$ and $(X_{43}, Y_{43})$ used in Eq. (22).

Thus, for any pixel number p, notation $B_3(p)$ denotes the pixel value (or the B signal) of a specific pixel located at the coordinates $(X_3(p), Y_3(p))$ in the coordinate system of the third taken image $401_3$ as a pixel having the pixel number p. In addition, the coordinates $(X_{43}(p), Y_{43}(p))$ produced in the affine transformation process as the coordinates of the post-transformation position in the reference coordinate system satisfy the relations $\alpha\times(i-1)+\beta-2 \leq X_{43}(p) \leq \alpha\times(i-1)+\beta+2$ and $\alpha\times(j-1)+\gamma-2 \leq Y_{43}(p) \leq \alpha\times(j-1)+\gamma+2$.

At the step S334, the processing circuit 24 identifies all B-signal pixels (or pixels of the blue color) on the fourth taken image $401_4$ as specific pixels. The position of each of the selected B-signal pixels on the fourth taken image $401_4$ has coordinates $(X_4, Y_4)$ transformable by an affine transformation process according to Eq. (23) into post-transformation coordinates $(X_{44}, Y_{44})$ included in the reference coordinate system as coordinates $(X_{44}, Y_{44})$ that must satisfy the relations $\alpha\times(i-1)+\beta-2 \leq X_{44} \leq \alpha\times(i-1)+\beta+2$ and $\alpha\times(j-1)+\gamma-2 \leq Y_{44} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{44}, Y_{44})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S335.

Let notation $N_4$ denote the number of aforementioned specific pixels identified at the step S334 from the fourth taken image $401_4$, notation $B_4(p)$ denote the B signal (or the pixel value) of a specific pixel having a pixel number p where p is an integer in the range 1, 2, $N_4$, notation $(X_4(p), Y_4(p))$ denote coordinates included in the coordinate system of the fourth taken image $401_4$ as the coordinates of the specific pixel and notation $(X_{44}(p), Y_{44}(p))$ denote post-transformation position coordinates obtained as a result of the affine transformation process carried out on the coordinates $(X_4(p), Y_4(p))$ of the specific pixel in accordance with Eq. (23). That is to say, the coordinates $(X_4(p), Y_4(p))$ and $(X_{44}(p), Y_{44}(p))$ correspond to respectively the coordinates $(X_4, Y_4)$ and $(X_{44}, Y_{44})$ used in Eq. (23).

Thus, for any pixel number p, notation $B_4(p)$ denotes the pixel value (or the B signal) of a specific pixel located at the coordinates $(X_4(p), Y_4(p))$ in the coordinate system of the fourth taken image $401_4$ as a pixel having the pixel number p. In addition, the coordinates $(X_{44}(p), Y_{44}(p))$ produced in the affine transformation process as the coordinates of the post-transformation position in the reference coordinate system satisfy the relations $\alpha\times(i-1)+\beta-2 \leq X_{44}(p) \leq \alpha\times(i-1)+\beta+2$ and $\alpha\times(j-1)+\gamma-2 \leq Y_{44}(p) \leq \alpha\times(j-1)+\gamma+2$.

At the step S335, the processing circuit 24 identifies all B-signal pixels (or pixels of the blue color) on the fifth taken image $401_5$ as specific pixels. The position of each of the selected B-signal pixels on the fifth taken image $401_5$ has coordinates $(X_5, Y_5)$ transformable by an affine transformation process according to Eq. (24) into post-transformation coordinates $(X_{45}, Y_{45})$ included in the reference coordinate system as coordinates $(X_{45}, Y_{45})$ that must satisfy the relations $\alpha\times(i-1)+\beta-2 \leq X_{45} \leq \alpha\times(i-1)+\beta+2$ and $\alpha\times(j-1)+\gamma-2 \leq Y_{45} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{45}, Y_{45})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S336 shown in FIG. 38.

Let notation $N_5$ denote the number of aforementioned specific pixels identified at the step S335 from the fifth taken image $401_5$, notation $B_5(p)$ denote the B signal (or the pixel value) of a specific pixel having a pixel number p where p is an integer in the range 1, 2, ..., $N_5$, notation $(X_5(p), Y_5(p))$ denote coordinates included in the coordinate system of the fifth taken image $401_5$ as the coordinates of the specific pixel and notation $(X_{45}(p), Y_{45}(p))$ denote post-transformation position coordinates obtained as a result of the affine transformation process carried out on the coordinates $(X_5(p), Y_5(p))$ of the specific pixel in accordance with Eq. (24). That is to say, the coordinates $(X_5(p), Y_5(p))$ and $(X_{45}(p), Y_{45}(p))$ correspond to respectively the coordinates $(X_5, Y_5)$ and $(X_{45}, Y_{45})$ used in Eq. (24).

Thus, for any pixel number p, notation $B_5(p)$ denotes the pixel value (or the B signal) of a specific pixel located at the coordinates $(X_5(p), Y_5(p))$ in the coordinate system of the fifth taken image $401_5$ as a pixel having the pixel number p. In addition, the coordinates $(X_{45}(p), Y_{45}(p))$ produced in the affine transformation process as the coordinates of the post-transformation position in the reference coordinate system satisfy the relations $\alpha\times(i-1)+\beta-2 \leq X_{45}(p) \leq \alpha\times(i-1)+\beta+2$ and $\alpha\times(j-1)+\gamma-2 \leq Y_{45}(p) \leq \alpha\times(j-1)+\gamma+2$.

At the step S336, the processing circuit 24 identifies all B-signal pixels (or pixels of the blue color) on the sixth taken image $401_6$ as specific pixels. The position of each of the selected B-signal pixels on the sixth taken image $401_6$ has coordinates $(X_6, Y_6)$ transformable by an affine transformation process according to Eq. (25) into post-transformation coordinates $(X_{46}, Y_{46})$ included in the reference coordinate system as coordinates $(X_{46}, Y_{46})$ that must satisfy the relations $\alpha\times(i-1)+\beta-2 \leq X_{46} \leq \alpha\times(i-1)+\beta+2$ and $\alpha\times(j-1)+\gamma-2 \leq Y_{46} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{46}, Y_{46})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S337.

Let notation $N_6$ denote the number of aforementioned specific pixels identified at the step S336 from the sixth taken image $401_6$, notation $B_6(p)$ denote the B signal (or the pixel value) of a specific pixel having a pixel number p where p is an integer in the range 1, 2, ..., $N_6$, notation $(X_6(p), Y_6(p))$ denote coordinates included in the coordinate system of the sixth taken image $401_6$ as the coordinates of the specific pixel and notation $(X_{46}(p), Y_{46}(p))$ denote post-transformation position coordinates obtained as a result of the affine transformation process carried out on the coordinates $(X_6(p), Y_6(p))$ of the specific pixel in accordance with Eq. (25). That is to say, the coordinates $(X_6(p), Y_6(p))$ and $(X_{46}(p), Y_{46}(p))$ correspond to respectively the coordinates $(X_6, Y_6)$ and $(X_{46}, Y_{46})$ used in Eq. (25).

Thus, for any pixel number p, notation $B_6(p)$ denotes the pixel value (or the B signal) of a specific pixel located at the coordinates $(X_6(p), Y_6(p))$ in the coordinate system of the sixth taken image $401_6$ as a pixel having the pixel number p. In addition, the coordinates $(X_{46}(p), Y_{46}(p))$ produced in the affine transformation process as the coordinates of the post-transformation position in the reference coordinate system satisfy the relations $\alpha\times(i-1)+\beta-2 \leq X_{46}(p) \leq \alpha\times(i-1)+\beta+2$ and $\alpha\times(j-1)+\gamma-2 \leq Y_{46}(p) \leq \alpha\times(j-1)+\gamma+2$.

At the step S337, the processing circuit 24 identifies all B-signal pixels (or pixels of the blue color) on the seventh taken image $401_7$ as specific pixels. The position of each of the selected B-signal pixels on the seventh taken image $401_7$ has coordinates $(X_7, Y_7)$ transformable by an affine transformation process according to Eq. (26) into post-transformation coordinates $(X_{47}, Y_{47})$ included in the reference coordinate system as coordinates $(X_{47}, Y_{47})$ that must satisfy the relations $\alpha\times(i-1)+\beta-2 \leq X_{47} \leq \alpha\times(i-1)+\beta+2$ and $\alpha\times(j-1)+\gamma-2 \leq Y_{47} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{47}, Y_{47})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S338.

Let notation $N_7$ denote the number of aforementioned specific pixels identified at the step S337 from the seventh taken image $401_7$, notation $B7(p)$ denote the B signal (or the pixel value) of a specific pixel having a pixel number p where p is an integer in the range 1, 2, $N_7$, notation $(X_7(p), Y_7(p))$ denote coordinates included in the coordinate system of the seventh taken image $401_7$ as the coordinates of the specific pixel and notation $(X_{47}(p), Y_{47}(p))$ denote post-transformation position coordinates obtained as a result of the affine transformation process carried out on the coordinates $(X_7(p), Y_7(p))$ of the specific pixel in accordance with Eq. (26). That is to say, the coordinates $(X_7(p), Y_7(p))$ and $(X_{47}(p), Y_{47}(p))$ correspond to respectively the coordinates $(X_7, Y_7)$ and $(X_{47}, Y_{47})$ used in Eq. (26).

Thus, for any pixel number p, notation $B_7(p)$ denotes the pixel value (or the B signal) of a specific pixel located at the coordinates $(X_7(p), Y_7(p))$ in the coordinate system of the seventh taken image $401_7$ as a pixel having the pixel number p. In addition, the coordinates $(X_{47}(p), Y_{47}(p))$ produced in the affine transformation process as the coordinates of the post-transformation position in the reference coordinate system satisfy the relations $\alpha\times(i-1)+\beta-2 \leq X_{47}(p) \leq \alpha\times(i-1)+\beta+2$ and $\alpha\times(j-1)+\gamma-2 \leq Y_{47}(p) \leq \alpha\times(j-1)+\gamma+2$.

At the step S338, the processing circuit 24 identifies all B-signal pixels (or pixels of the blue color) on the eighth taken image $401_8$ as specific pixels. The position of each of the selected B-signal pixels on the eighth taken image $401_8$ has coordinates $(X_8, Y_8)$ transformable by an affine transformation process according to Eq. (27) into post-transformation coordinates $(X_{48}, Y_{48})$ included in the reference coordinate system as coordinates $(X_{48}, Y_{48})$ that must satisfy the relations $\alpha\times(i-1)+\beta-2 \leq X_{48} \leq \alpha\times(i-1)+\beta+2$ and $\alpha\times(j-1)+\gamma-2 \leq Y_{48} \leq \alpha\times(j-1)+\gamma+2$, where $(\alpha\times(i-1)+\beta, \alpha\times(j-1)+\gamma)$ are coordinates of the position of a pixel on the output image. That is to say, the post-transformation position $(X_{48}, Y_{48})$ must be in a 2×2 area (that is, an area having vertical and horizontal dimensions of 2×2) centered at a position having coordinates $(\alpha\times(i-1)+\beta, \alpha\times(j-1)+\gamma)$ on the output image. The pixel at the center of the area is a pixel, the pixel value of which is to be inferred. Then, the flow of the image generation processing goes on to the next step S339 shown in FIG. 39.

Let notation $N_8$ denote the number of aforementioned specific pixels identified at the step S338 from the eighth taken image $401_8$, notation $B_8(p)$ denote the B signal (or the pixel value) of a specific pixel having a pixel number p where p is an integer in the range 1, 2, $N_8$, notation $(X_8(p), Y_8(p))$ denote coordinates included in the coordinate system of the eighth taken image $401_8$ as the coordinates of the specific pixel and notation $(X_{48}(p), Y_{48}(p))$ denote post-transformation position coordinates obtained as a result of the affine transformation process carried out on the coordinates $(X_8(p), Y_8(p))$ of the specific pixel in accordance with Eq. (27). That is to say, the coordinates $(X_8(p), Y_8(p))$ and $(X_{48}(p), Y_{48}(p))$ correspond to respectively the coordinates $(X_8, Y_8)$ and $(X_{48}, Y_{48})$ used in Eq. (27).

Thus, for any pixel number p, notation $B_8(p)$ denotes the pixel value (or the B signal) of a specific pixel located at the coordinates $(X_8(p), Y_8(p))$ in the coordinate system of the eighth taken image $401_8$ as a pixel having the pixel number p. In addition, the coordinates $(X_{48}(p), Y_{48}(p))$ produced in the affine transformation process as the coordinates of the post-transformation position in the reference coordinate system satisfy the relations $\alpha \times (i-1) + \beta - 2 \leq X_{48}(p) \leq \alpha \times (i-1) + \beta + 2$ and $\alpha \times (j-1) + \gamma - 2 \leq Y_{48}(p) \leq \alpha \times (j-1) + \gamma + 2$.

At the step S339, the processing circuit 24 finds the numerator of Eq. (12) representing the weighted addition equation used for finding the blue-color light quantity of a pixel (i, j) located on the output image on the basis of all specific pixels identified at the steps S331 to S338. At the same step, the processing circuit 24 also finds the denominator of Eq. (12). As described before, the numerator of Eq. (12) is expressed by expression (15) and the denominator of Eq. (12) is expressed by expression (16).

To put it concretely, the value of expression (16) expressing the denominator of Eq. (12) expressing a weighted addition equation used to find the light quantity of the blue color is found by computing the value of expression (32) and the value of expression (15) expressing the numerator of Eq. (12) is found by computing the value of expression (33). Expressions (32) and (33) are given as follows.

[Expression (32)]

$$\sum_{P=1}^{N_1} \{\text{Cubic}(X_0 - X_{41}(p)) \times \text{Cubic}(Y_0 - Y_{41}(p))\} + \\ \sum_{P=1}^{N_2} \{\text{Cubic}(X_0 - X_{42}(p)) \times \text{Cubic}(Y_0 - Y_{42}(p))\} + \\ \sum_{P=1}^{N_3} \{\text{Cubic}(X_0 - X_{43}(p)) \times \text{Cubic}(Y_0 - Y_{43}(p))\} + \\ \sum_{P=1}^{N_4} \{\text{Cubic}(X_0 - X_{44}(p)) \times \text{Cubic}(Y_0 - Y_{44}(p))\} + \\ \sum_{P=1}^{N_5} \{\text{Cubic}(X_0 - X_{45}(p)) \times \text{Cubic}(Y_0 - Y_{45}(p))\} + \\ \sum_{P=1}^{N_6} \{\text{Cubic}(X_0 - X_{46}(p)) \times \text{Cubic}(Y_0 - Y_{46}(p))\} + \\ \sum_{P=1}^{N_7} \{\text{Cubic}(X_0 - X_{47}(p)) \times \text{Cubic}(Y_0 - Y_{47}(p))\} + \\ \sum_{P=1}^{N_8} \{\text{Cubic}(X_0 - X_{48}(p)) \times \text{Cubic}(Y_0 - Y_{48}(p))\} \quad (32)$$

[Expression (33)]

$$\sum_{P=1}^{N_1} \{\text{Cubic}(X_0 - X_{41}(p)) \times \text{Cubic}(Y_0 - Y_{41}(p)) \times B_1(p)\} + \\ \sum_{P=1}^{N_2} \{\text{Cubic}(X_0 - X_{42}(p)) \times \text{Cubic}(Y_0 - Y_{42}(p)) \times B_2(p)\} + \\ \sum_{P=1}^{N_3} \{\text{Cubic}(X_0 - X_{43}(p)) \times \text{Cubic}(Y_0 - Y_{43}(p)) \times B_3(p)\} + \\ \sum_{P=1}^{N_4} \{\text{Cubic}(X_0 - X_{44}(p)) \times \text{Cubic}(Y_0 - Y_{44}(p)) \times B_4(p)\} + \\ \sum_{P=1}^{N_5} \{\text{Cubic}(X_0 - X_{45}(p)) \times \text{Cubic}(Y_0 - Y_{45}(p)) \times B_5(p)\} + \\ \sum_{P=1}^{N_6} \{\text{Cubic}(X_0 - X_{46}(p)) \times \text{Cubic}(Y_0 - Y_{46}(p)) \times B_6(p)\} + \\ \sum_{P=1}^{N_7} \{\text{Cubic}(X_0 - X_{47}(p)) \times \text{Cubic}(Y_0 - Y_{47}(p)) \times B_7(p)\} + \\ \sum_{P=1}^{N_8} \{\text{Cubic}(X_0 - X_{48}(p)) \times \text{Cubic}(Y_0 - Y_{48}(p)) \times B_8(p)\} \quad (33)$$

It is to be noted that notation $(X_0, Y_0)$ in expressions (32) and (33) denotes the coordinates of the aforementioned pixel (i, j), the pixel value of which is to be found. The coordinates $(X_0, Y_0)$ are coordinates of the pixel (i, j) on the output image where $X_0 = \alpha \times (i-1) + \beta$ and $Y_0 = \alpha \times (j-1) + \gamma$.

Expression (33) is a weighted addition expression used for finding the total of eight sums corresponding to k=1 to 8 respectively. Notation k is an integer assigned to each of the eight taken images ranging from the first taken image $401_1$ to the eighth taken image $401_8$, which are each subjected to a process to transform the coordinates of positions of specific pixels on the taken images into coordinates of positions on the reference image. Each of the eight sums is an expression used for finding the sum of weighted pixel values for p=1 to $N_k$. Each of the weighted pixel values is a product obtained by multiplying the pixel value $B_k(p)$ by a weight Cubic $(X_0 - X_{4k}(p)) \times \text{Cubic}(Y_0 - Y_{4k}(p))$. The pixel value $B_k(p)$ is an B signal observed for an aforementioned specific pixel at a position with its coordinates transformable into coordinates $(X_{4k}(p), Y_{4k}(p))$ in close proximity to the coordinates $(\alpha \times (i-1) + \beta, \alpha \times (j-1) + \gamma)$ of the position of a pixel (i, j), the pixel value of which is being inferred. As described above, the pixel (i, j) is a pixel on the output image. On the other hand, expression (32) is an expression used for finding the total of eight other sums corresponding to k=1 to 8 respectively. In this case, each of the eight other sums is an expression used for finding the sum of weights each expressed by Cubic $(X_0 - X_{4k}(p)) \times \text{Cubic}(Y_0 - Y_{4k}(p))$ for p=1 to $N_k$. A process to divide the value of expression (33) by the value of expression (32) is equivalent to the process to compute the expression on the right side of Eq. (12). The result of the process is a weighted average value of all the pixel values $B_k(p)$ each multiplied by a weight according to the distance between the position $(X_0, Y_0)$ for the pixel (i, j), the pixel value of which is being found, and a position with its into coordinates $(X_{4k}(p), Y_{4k}(p))$ obtained as a result of an affine transformation process carried out on the coordinates of a specific pixel as described above. The pixel (i, j) is a pixel on the output image. Each of the pixel values $B_k(p)$ is the pixel value of a specific pixel identified at any of the steps S331 to S338 as a pixel on any of the taken images.

After the processing circuit 24 computes the values of expressions (32) and (33) for the pixel (i, j) and stores the values obtained as a result of the computation in the memory shown in none of the figures, the flow of the image generation processing goes on to the next step S340.

At the step S340, the processing circuit 24 produces a result of determination as to whether or not the value of the variable i has become equal to the pixel-column count W representing the number of columns arranged in the horizontal direction. If the determination result produced at the step S340 indicates that the value of the variable i has not become equal to the pixel-column count W, that is, if the result of the determination indicates that a pixel exists among all pixels located on a horizontal row indicated by the present value of the variable j as a pixel not subjected yet to the processing carried out at the steps S313 to S339, the flow of the image generation processing goes on to a step S341 at which the processing circuit 24 increments the variable i by 1. Then, the flow of the image generation processing goes back to the step S313 shown in FIG. 30 to repeat the same processing of the step and the subsequent steps.

If the determination result produced at the step S340 indicates that the value of the variable i has become equal to the pixel count W, that is, if the result of the determination indicates that no pixel exists among all pixels located on a horizontal row indicated by the present value of the variable j as a pixel not subjected yet to the processing carried out at the steps S313 to S339, on the other hand, the flow of the image generation processing goes on to a step S342 at which the processing circuit 24 produces a result of determination as to whether or not the value of the variable j has become equal to the pixel-row count H representing the number of rows arranged in the vertical direction. If the determination result produced at the step S342 indicates that the value of the variable j has not become equal to the pixel-row count H, that is, if the result of the determination indicates that a row of pixels exists among all pixel rows as a row of pixels not subjected yet to the repeated processing of the steps S313 to S339, the flow of the image generation processing goes on to a step S343 at which the processing circuit 24 increments the variable j by 1. Then, the flow of the image generation processing goes back to the step S312 shown in FIG. 30 to repeat the same processing of the step and the subsequent steps.

Figure 30:
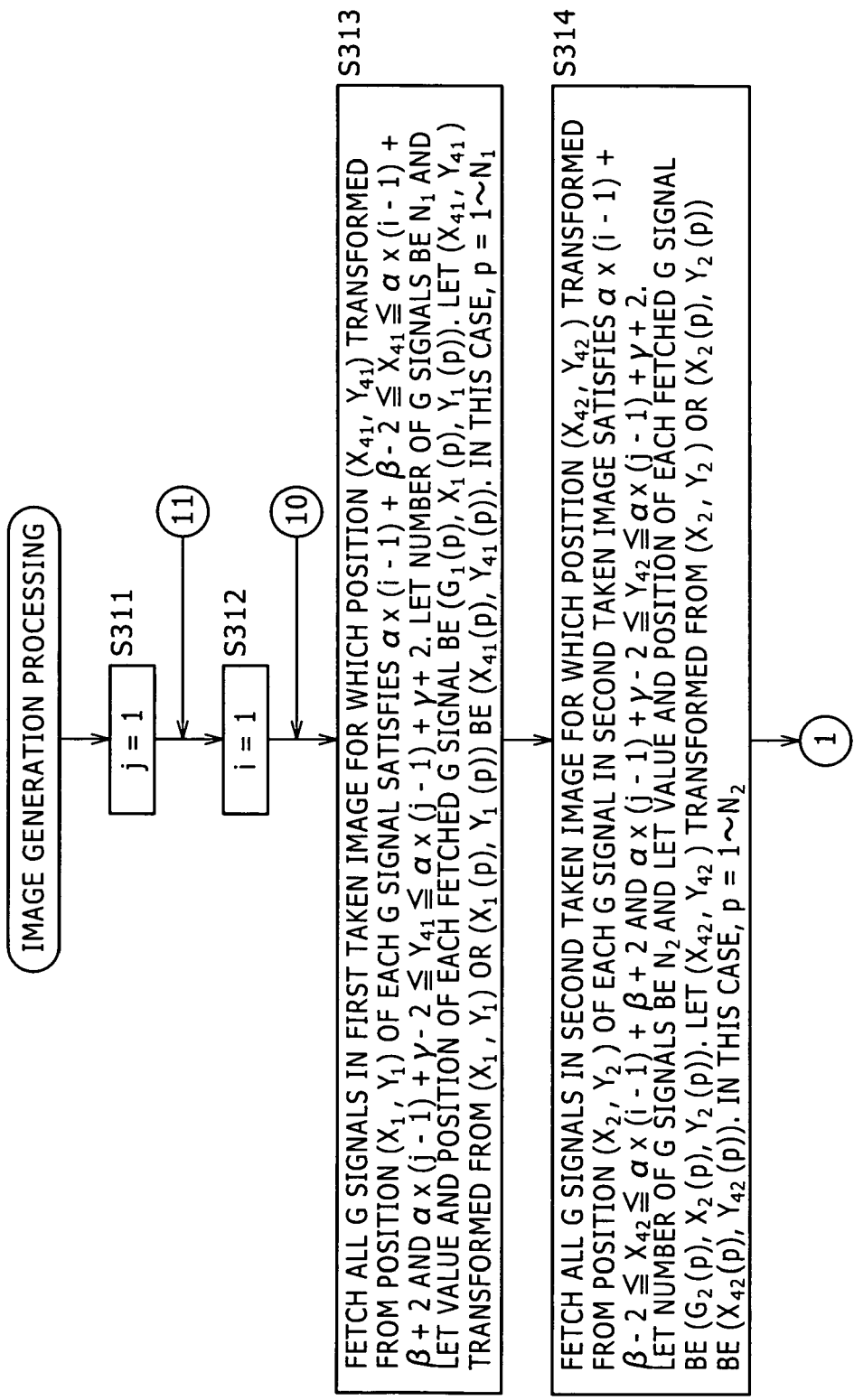
FIG. 30 shows a flowchart referred to in explanation of processing to generate an image.
Figure 31:
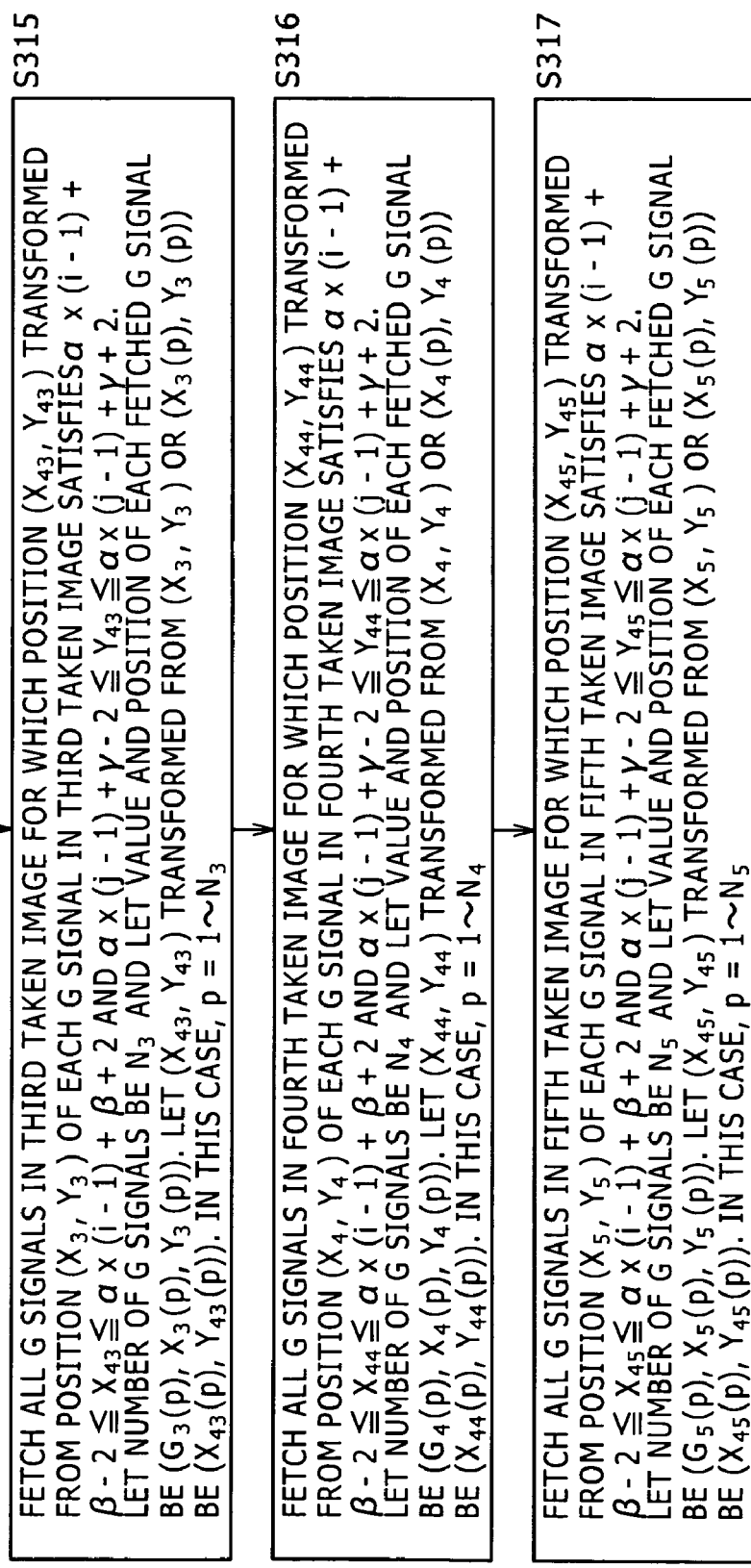
FIG. 31 shows a flowchart referred to in explanation of processing to generate an image.
Figure 34:
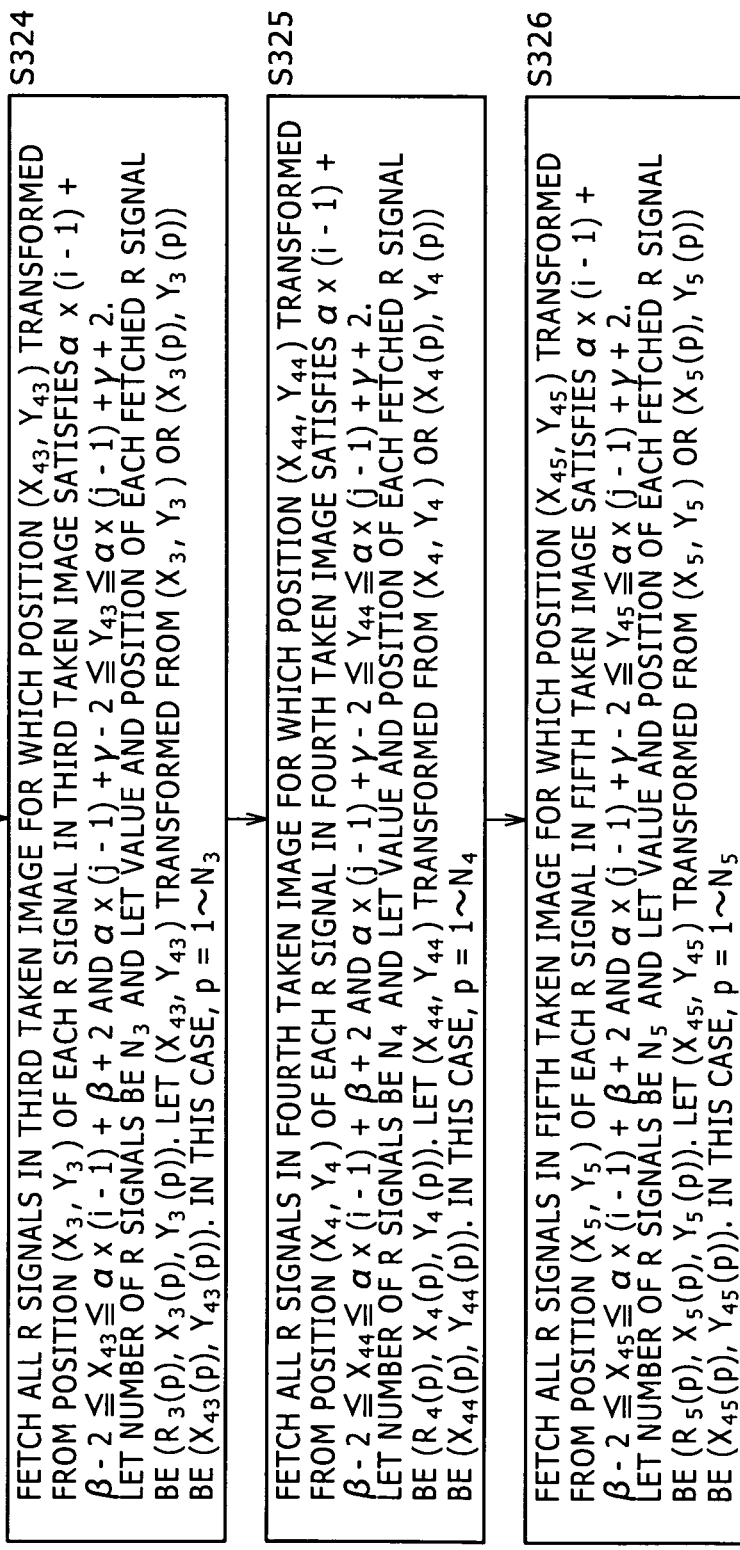
FIG. 34 shows a flowchart referred to in explanation of processing to generate an image.
Figure 35:
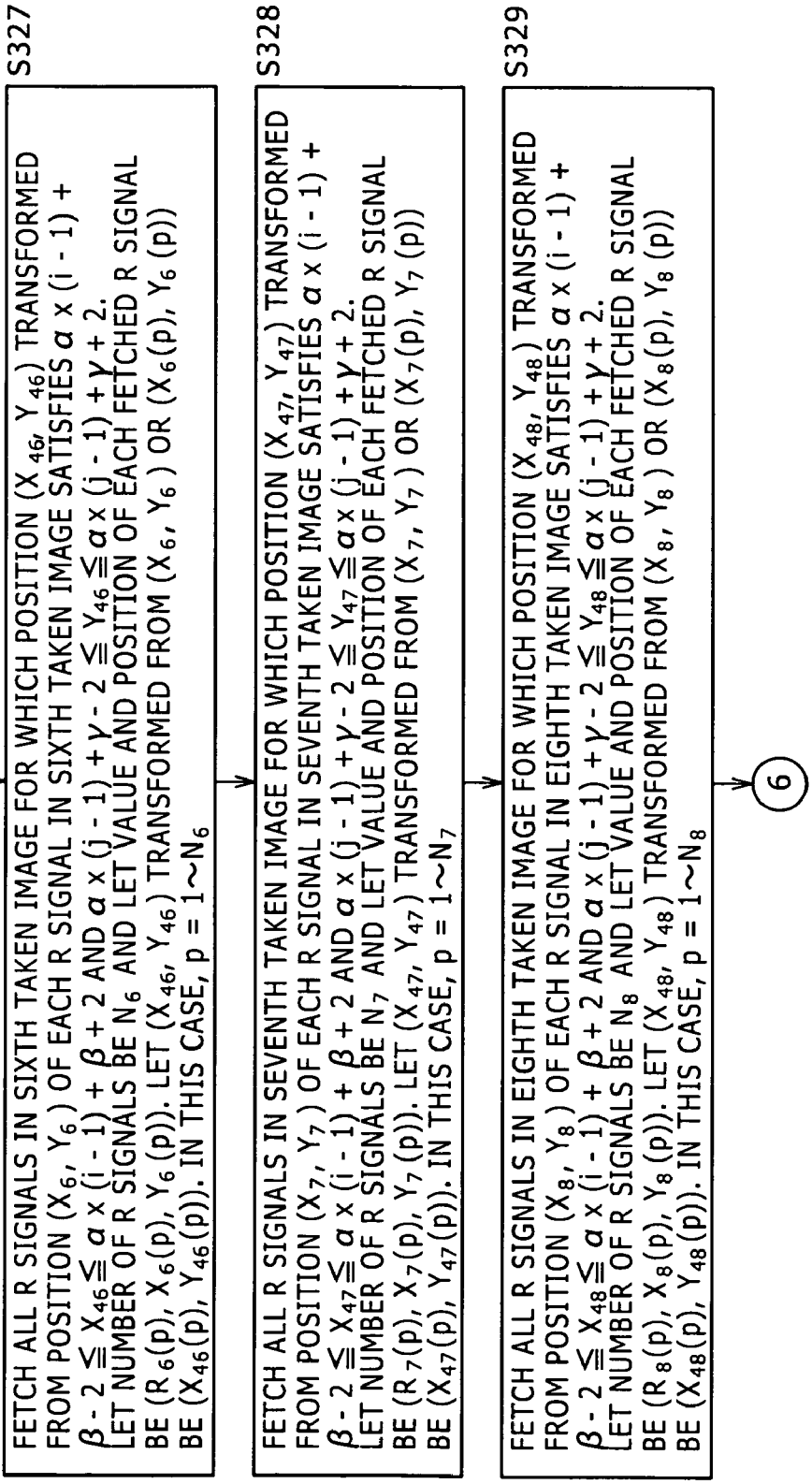
FIG. 35 shows a flowchart referred to in explanation of processing to generate an image.

If the determination result produced at the step S342 indicates that the value of the variable j has become equal to the pixel-row count H, that is, if the result of the determination indicates that no row of pixels exists among all pixel rows as a row of pixels not subjected yet to the repeated processing of the steps S313 to S339, on the other hand, the flow of the image generation processing goes on to a step S344 at which the processing circuit 24 sets the variable j at 1 in the same way as the process carried out at the step S311 shown in FIG. 30. Then, the flow of the image generation processing goes on to the step S345 at which the processing circuit 24 sets the variable i at 1 in the same way as the process carried out at the step S312 shown in FIG. 30. Subsequently, the flow of the image generation processing goes on to the next step S346 shown in FIG. 40.

At the step S346, the processing circuit 24 carries out processing to find a pixel value of the G signal of a pixel (i, j) on the output image as a light quantity of the green color. Then, the flow of the image generation processing goes on to the next step S347. To put it in detail, at the step S346, the processing circuit 24 carries out a normal process of computing the value of expression (34) given below or an exception process of computing the value of expression (35) also given below in order to find (or infer) a pixel value of the G signal of a pixel (i, j) on the output image as will be described more later. Expression (34) corresponds to the expression of Eq. (8) expressing a weighted addition equation for light quantities of the green color for a normal process. On the other hand, expression (35) corresponds to the expression of Eq. (17) expressing a weighted addition equation for light quantities of the green color for an exception process. Expression (34) is an expression used for finding a quotient obtained by dividing the value of expression (29) by the value of expression (28). On the other hand, expression (35) is an expression used for finding a quotient obtained by dividing a sum of values each found in accordance with expression (29) by a sum of values each found in accordance with expression (28). Found as a result of the process carried out at the step S321 shown in FIG. 33, the value of expression (28) is the denominator of the weighted addition equation for light quantities of the green color and the value of expression (29) is the numerator of the same weighted addition equation.

[Expression (34)]

$$\frac{\text{value of expression (29) at } (i, j)}{\text{value of expression (28) at } (i, j)} \quad (34)$$

[Expression (35)]

$$\frac{\left\{\begin{array}{l}\text{value of expression (29) at } (i, j) + \\ \text{value of expression (29) at } (i-1, j) + \\ \text{value of expression (29) at } (i+1, j) + \\ \text{value of expression (29) at } (i, j-1) + \\ \text{value of expression (29) at } (i, j+1)\end{array}\right\}}{\left\{\begin{array}{l}\text{value of expression (28) at } (i, j) + \\ \text{value of expression (28) at } (i-1, j) + \\ \text{value of expression (28) at } (i+1, j) + \\ \text{value of expression (28) at } (i, j-1) + \\ \text{value of expression (28) at } (i, j+1)\end{array}\right\}} \quad (35)$$

At the step S347, the processing circuit 24 carries out processing to find a pixel value of the R signal of a pixel (i, j) on the output image as a light quantity of the red color. Then, the flow of the image generation processing goes on to the next step S348. To put it in detail, at the step S347, the processing circuit 24 carries out a normal process of computing the value of expression (36) given below or an exception process of computing the value of expression (37) also given below in order to find (or infer) a pixel value of the R signal of a pixel (i, j) on the output image as will be described more later. Expression (36) corresponds to the expression of Eq. (11) expressing a weighted addition equation for light quantities of the red color for a normal process. On the other hand, expression (37) corresponds to the expression of Eq. (18) expressing a weighted addition equation for light quantities of the red color for an exception process. Expression (36) is an expression used for finding a quotient obtained by dividing the value of expression (31) by the value of expression (30). On the other hand, expression (37) is an expression used for finding a quotient obtained by dividing a sum of values each found in accordance with expression (31) by a sum of values each found in accordance with expression (30). Found as a result of the process carried out at the step S330 shown in FIG. 36, the value of expression (30) is the denominator of the weighted addition equation for light quantities of the red color and the value of expression (31) is the numerator of the same weighted addition equation.

[Expression (36)]

$$\frac{\text{value of expression (31) at }(i, j)}{\text{value of expression (30) at }(i, j)} \quad (36)$$

[Expression (37)]

$$\frac{\left(\begin{array}{l}\text{value of expression (31) at }(i, j) + \\ \text{value of expression (31) at }(i-1, j-1) + \\ \text{value of expression (31) at }(i, j-1) + \\ \text{value of expression (31) at }(i+1, j-1) + \\ \text{value of expression (31) at }(i-1, j) + \\ \text{value of expression (31) at }(i+1, j) + \\ \text{value of expression (31) at }(i-1, j+1) + \\ \text{value of expression (31) at }(i, j+1) + \\ \text{value of expression (31) at }(i+1, j+1)\end{array}\right)}{\left(\begin{array}{l}\text{value of expression (30) at }(i, j) + \\ \text{value of expression (30) at }(i-1, j-1) + \\ \text{value of expression (30) at }(i, j-1) + \\ \text{value of expression (30) at }(i+1, j-1) + \\ \text{value of expression (30) at }(i-1, j) + \\ \text{value of expression (30) at }(i+1, j) + \\ \text{value of expression (30) at }(i-1, j+1) + \\ \text{value of expression (30) at }(i, j+1) + \\ \text{value of expression (30) at }(i+1, j+1)\end{array}\right)} \quad (37)$$

At the step S348, the processing circuit 24 carries out processing to find a pixel value of the B signal of a pixel (i, j) on the output image as a light quantity of the blue color. Then, the flow of the image generation processing goes on to the next step S349. To put it in detail, at the step S348, the processing circuit 24 carries out a normal process of computing the value of expression (38) given below or an exception process of computing the value of expression (39) also given below in order to find (or infer) a pixel value of the B signal of a pixel (i, j) on the output image as will be described more later. Expression (38) corresponds to the expression of Eq. (12) expressing a weighted addition equation for light quantities of the blue color for a normal process. On the other hand, expression (39) corresponds to the expression of Eq. (19) expressing a weighted addition equation for light quantities of the blue color for an exception process. Expression (38) is an expression used for finding a quotient obtained by dividing the value of expression (33) by the value of expression (32). On the other hand, expression (39) is an expression used for finding a quotient obtained by dividing a sum of values each found in accordance with expression (33) by a sum of values each found in accordance with expression (32). Found as a result of the process carried out at the step S339 shown in FIG. 39, the value of expression (32) is the denominator of the weighted addition equation for light quantities of the blue color and the value of expression (33) is the numerator of the same weighted addition equation.

[Expression (38)]

$$\frac{\text{value of expression (33) at }(i, j)}{\text{value of expression (32) at }(i, j)} \quad (38)$$

[Expression (39)]

$$\frac{\left(\begin{array}{l}\text{value of expression (33) at }(i, j) + \\ \text{value of expression (33) at }(i-1, j-1) + \\ \text{value of expression (33) at }(i, j-1) + \\ \text{value of expression (33) at }(i+1, j-1) + \\ \text{value of expression (33) at }(i-1, j) + \\ \text{value of expression (33) at }(i+1, j) + \\ \text{value of expression (33) at }(i-1, j+1) + \\ \text{value of expression (33) at }(i, j+1) + \\ \text{value of expression (33) at }(i+1, j+1)\end{array}\right)}{\left(\begin{array}{l}\text{value of expression (32) at }(i, j) + \\ \text{value of expression (32) at }(i-1, j-1) + \\ \text{value of expression (32) at }(i, j-1) + \\ \text{value of expression (32) at }(i+1, j-1) + \\ \text{value of expression (32) at }(i-1, j) + \\ \text{value of expression (32) at }(i+1, j) + \\ \text{value of expression (32) at }(i-1, j+1) + \\ \text{value of expression (32) at }(i, j+1) + \\ \text{value of expression (32) at }(i+1, j+1)\end{array}\right)} \quad (39)$$

At the step S349, the processing circuit 24 produces a result of determination as to whether or not the value of the variable i has become equal to the pixel-column count W representing the number of columns arranged in the horizontal direction. If the determination result produced at the step S349 indicates that the value of the variable i has not become equal to the pixel-column count W, that is, if the result of the determination indicates that a pixel exists among all pixels located on a horizontal row indicated by the present value of the variable j as a pixel not subjected yet to the processing carried out at the steps S346 to S348, the flow of the image generation processing goes on to a step S350 at which the processing circuit 24 increments the variable i by 1. Then, the flow of the image generation processing goes back to the step S346 to repeat the same processing of the step and the subsequent steps.

If the determination result produced at the step S349 indicates that the value of the variable i has become equal to the pixel count W, that is, if the result of the determination indicates that no pixel exists among all pixels located on a horizontal row indicated by the present value of the variable j as a pixel not subjected yet to the processing carried out at the steps S346 to S348, on the other hand, the flow of the image generation processing goes on to a step S351 at which the processing circuit 24 produces a result of determination as to whether or not the value of the variable j has become equal to the pixel-row count H representing the number of rows arranged in the vertical direction. If the determination result produced at the step S351 indicates that the value of the variable j has not become equal to the pixel-row count H, that is, if the result of the determination indicates that a row of pixels exists among all pixel rows as a row of pixels not subjected yet to the repeated processing of the steps S346 to S348, the flow of the image generation processing goes on to a step S352 at which the processing circuit 24 increments the variable j by 1. Then, the flow of the image generation processing goes back to the step S345 shown in FIG. 39 to repeat the same processing of the step and the subsequent steps.

If the determination result produced at the step S351 indicates that the value of the variable j has become equal to the pixel-row count H, that is, if the steps of S346 to S348 have processed for all rows, that is, if the pixel values of the G, R and B signals have been found for all pixels on the output image having dimensions of W×H pixels, on the other hand, the flow of the image generation processing goes on to a step S353 at which the processing circuit 24 supplies the image signal of the output image to the D/A converter 9 or the codec 12, as shown in FIG. 1. Then, control of the processing is returned to the calling program.

Figure 40:
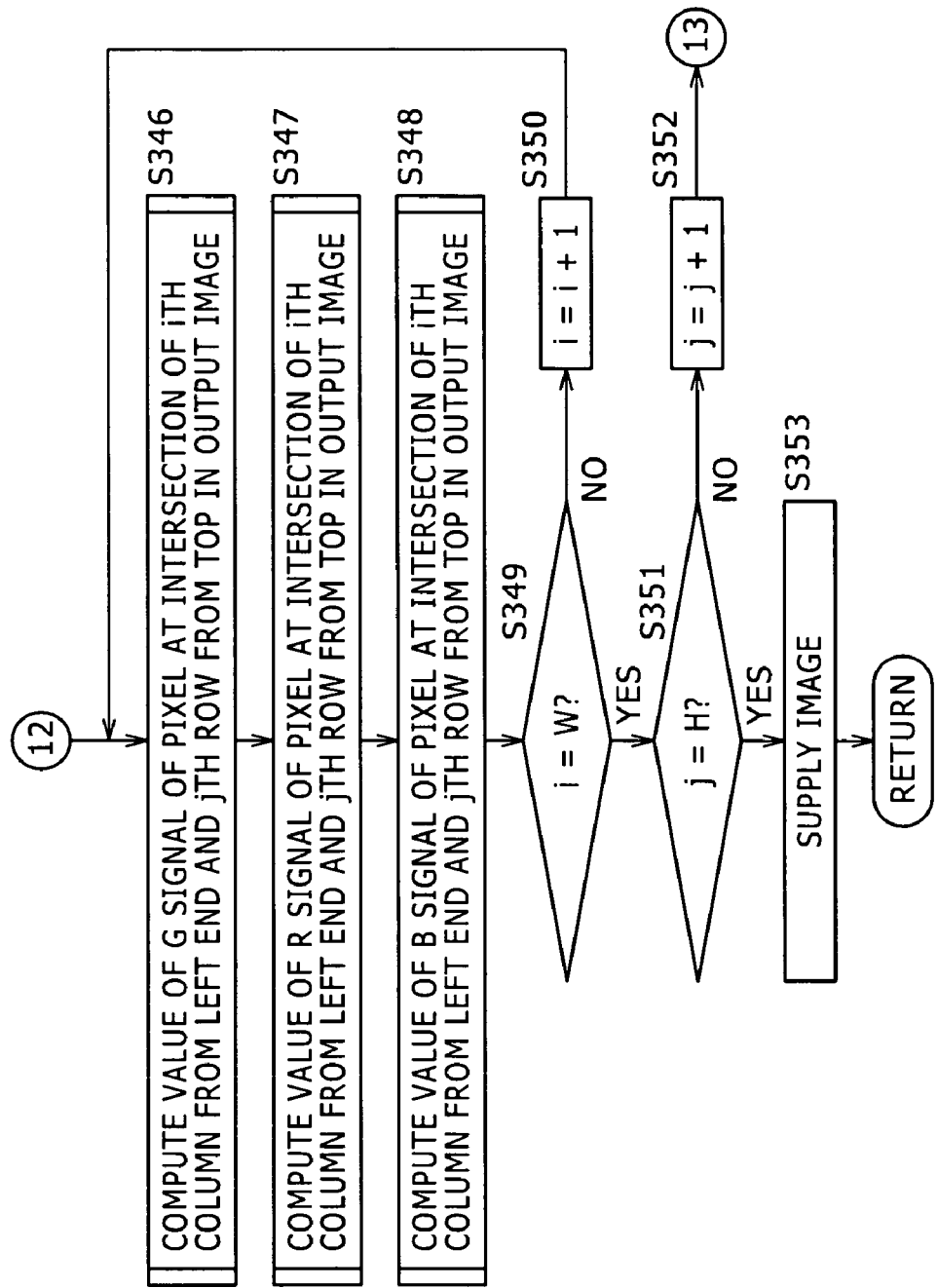
FIG. 40 shows a flowchart referred to in explanation of processing to generate an image.
Figure 41:
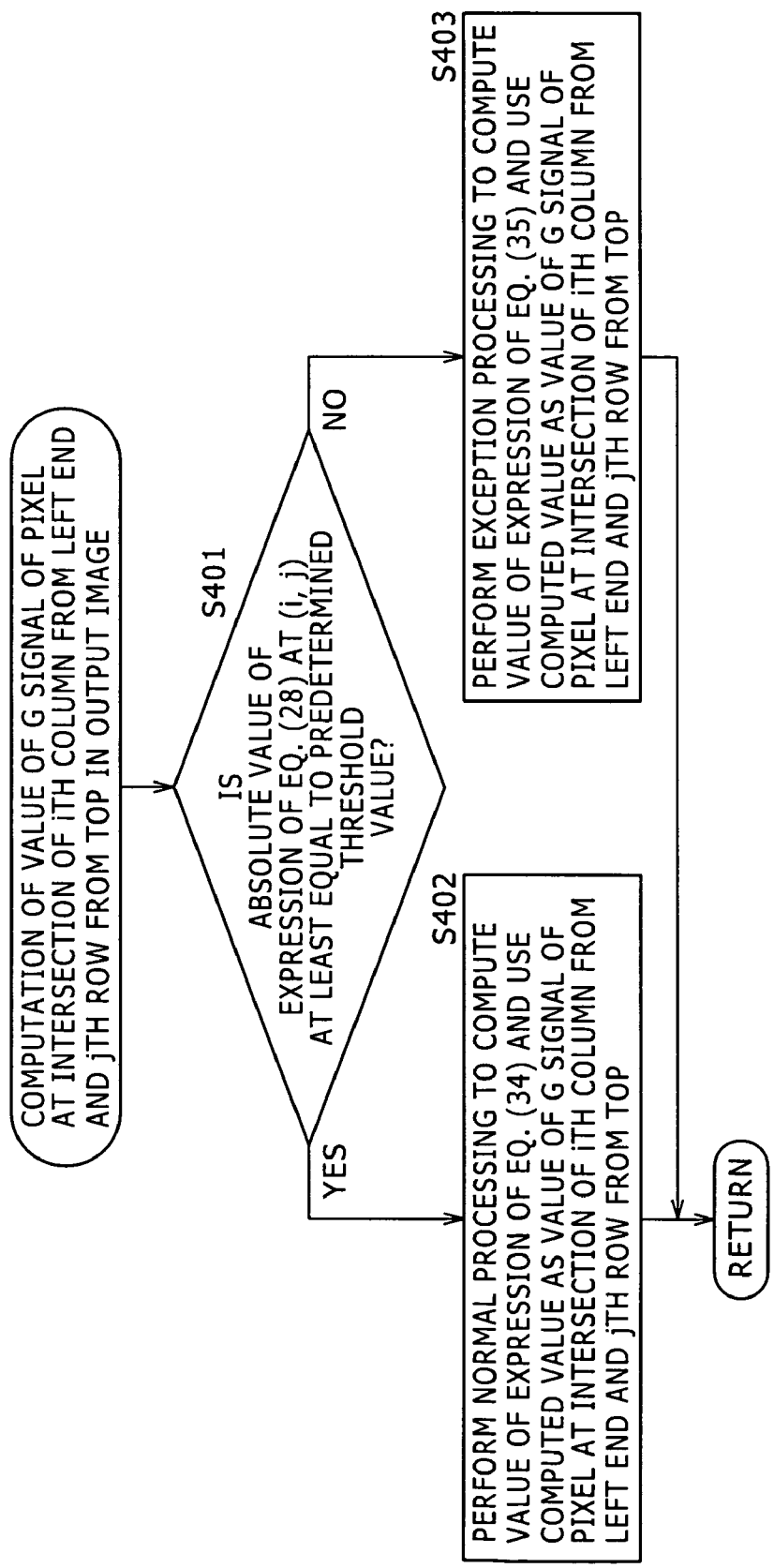
FIG. 41 shows a flowchart referred to in explanation of processing to infer a pixel value of a G signal (or a light quantity of the green color).

Next, by referring a flowchart shown in FIG. 41, the following description explains the processing carried out at the step S346 of the flowchart shown in FIG. 40 to find (or infer) a pixel value of the G signal (that is, the light quantity for the green color) of a pixel (i, j) on the output image.

The flowchart shown in FIG. 41 begins with a step S401 at which the processing circuit 24 produces a result of determination as to whether or not the value found at the step S321 of the flowchart shown in FIG. 33 as the absolute value of expression (28) expressing the denominator of a weighted addition expression for the light quantity of the green color of the pixel (i, j) is equal to or greater than a predetermined threshold value. The predetermined threshold value is the value of a criterion as to whether or not an exception process is to be carried out due to the fact that the absolute value of expression (28) is regarded as a value equivalent to 0. Typically, a predetermined threshold value of 0.25 is set in advance in the processing circuit 24. However, the predetermined threshold value can also be set by the user by carrying out an operation.

If the determination result produced at the step S401 indicates that the absolute value of expression (28) for the pixel (i, j) is equal to or greater than the predetermined threshold value or the absolute value of expression (28) for the pixel (i, j) is not such small that the value can be regarded as a value equivalent to 0, the flow of the image generation processing goes on to a step S402 at which the processing circuit 24 carries out a normal process to compute the pixel value of the G signal for the pixel (i, j) in accordance with weighted addition expression (34). Expression (34) is an expression used for finding a quotient obtained by dividing the value of expression (29) by the value of expression (28). Found as a result of the process carried out at the step S321 of the flowchart shown in FIG. 33, the value of expression (28) is the denominator of the weighted addition equation for light quantities of the green color and the value of expression (29) is the numerator of the same weighted addition equation.

If the determination result produced at the step S401 indicates that the absolute value of expression (28) for the pixel (i, j) is smaller than the predetermined threshold value or the absolute value of expression (28) for the pixel (i, j) is equal to 0 or close to 0, on the other hand, the flow of the image generation processing goes on to a step S403 at which the processing circuit 24 carries out an exception process to compute the pixel value of the G signal for the pixel (i, j) in accordance with weighted addition expression (35) corresponding to Eq. (17). This is because, if the normal process is carried out by dividing the value of expression (29) by the value of expression (28) having a value of 0 or close to 0, the quotient obtained as a result of the division will have an unstable value. That is to say, even if the value of expression (29) includes only small noises, the noises will be divided by the value of expression (28) having a value of 0 or close to 0 to result in large amplified noises.

To put it in detail, at the step S403, the processing circuit 24 computes the pixel value of the G signal for the pixel (i, j) in accordance with weighted addition expression (35) which is an expression used for finding a quotient obtained by dividing a sum of 5 values each found in accordance with expression (29) by a sum of five other values each found in accordance with expression (28). The five values are values found for respectively the pixel (i, j) on the output image as well as four vicinity pixels (i−1, j), (i+1, j), (i, j−1) and (i, j+1) in close proximity to the pixel (i, j) in accordance with expression (29) expressing the numerator of a weighted addition expression for light quantities of the green color in a normal process. On the other hand, the five other values are values found for respectively the pixel (i, j) on the output image as well as the four vicinity pixels (i−1, j), (i+1, j), (i, j−1) and (i, j+1) in close proximity to the pixel (i, j) in accordance with expression (28) expressing the denominator of the weighted addition expression for light quantities of the green color in a normal process.

Since the sum of the values found for the pixel (i, j) on the output image as well as the four vicinity pixels (i−1, j), (i+1, j), (i, j−1) and (i, j+1) in close proximity to the pixel (i, j) in accordance with expression (28) has a large value to a certain degree as described earlier by referring to FIGS. 16 and 17, the use of the sum having such a large value as the denominator in the division operation does not cause the noises to be amplified. Thus, it is possible to compute the pixel value of the G signal for the pixel (i, j) without increasing the noises.

Figure 42:
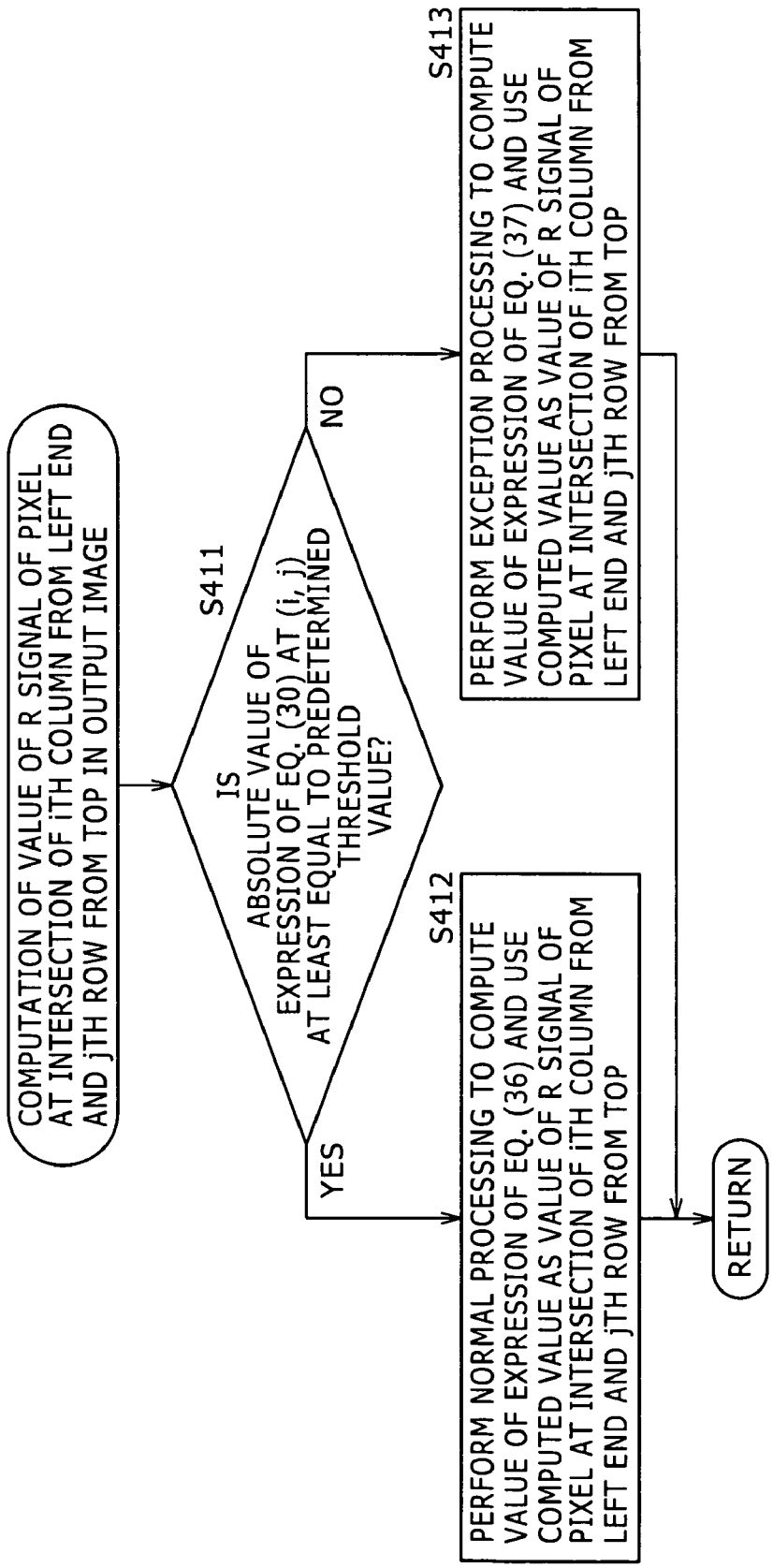
FIG. 42 shows a flowchart referred to in explanation of processing to infer a pixel value of an R signal (or a light quantity of the red color).

Next, by referring a flowchart shown in FIG. 42, the following description explains the processing carried out at the step S347 of the flowchart shown in FIG. 40 to find (or infer) a pixel value of the R signal (that is, the light quantity for the red color) of a pixel (i, j) on the output image.

Figure 36:
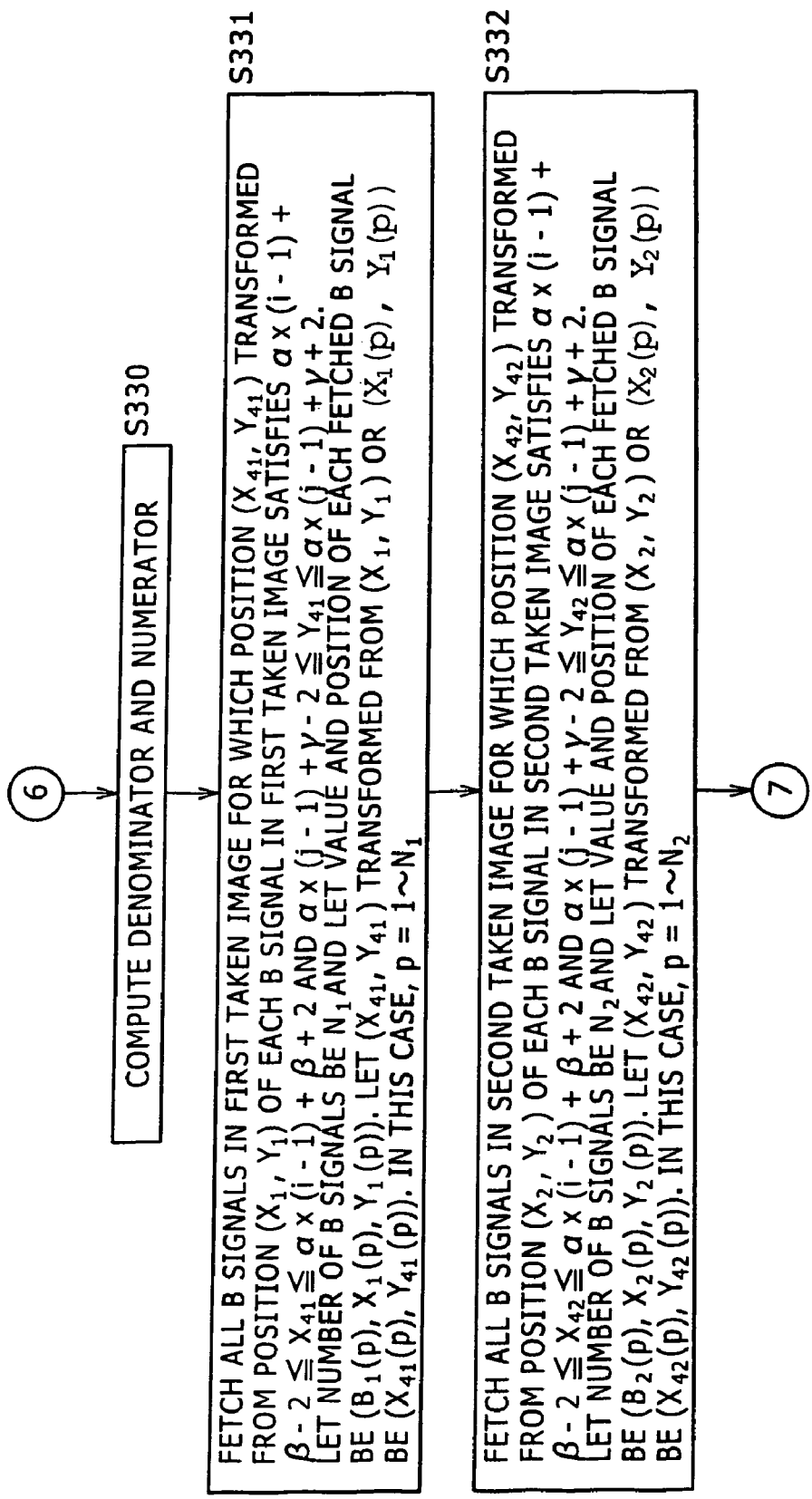
FIG. 36 shows a flowchart referred to in explanation of processing to generate an image.

The flowchart shown in FIG. 42 begins with a step S411 at which the processing circuit 24 produces a result of determination as to whether or not the value found at the step S330 of the flowchart shown in FIG. 36 as the absolute value of expression (30) expressing the denominator of a weighted addition expression for the light quantity of the red color of the pixel (i, j) is equal to or greater than a predetermined threshold value. The predetermined threshold value is the value of a criterion as to whether or not an exception process is to be carried out due to the fact that the absolute value of expression (30) is regarded as a value equivalent to 0. Typically, a predetermined threshold value of 0.25 is set in advance in the processing circuit 24. However, the predetermined threshold value can also be set by the user by carrying out an operation.

If the determination result produced at the step S411 indicates that the absolute value of expression (30) for the pixel (i, j) is equal to or greater than the predetermined threshold value or the absolute value of expression (30) for the pixel (i, j) is not such small that the value can be regarded as a value equivalent to 0, the flow of the image generation processing goes on to a step S412 at which the processing circuit 24 carries out a normal process to compute the pixel value of the R signal for the pixel (i, j) in accordance with weighted addition expression (36). Expression (36) is an expression used for finding a quotient obtained by dividing the value of expression (31) by the value of expression (30). Found as a result of the process carried out at the step S330 of the flowchart shown in FIG. 36, the value of expression (30) is the denominator of the weighted addition equation for light quantities of the red color and the value of expression (31) is the numerator of the same weighted addition equation.

If the determination result produced at the step S411 indicates that the absolute value of expression (30) for the pixel (i, j) is smaller than the predetermined threshold value or the absolute value of expression (30) for the pixel (i, j) is equal to 0 or close to 0, on the other hand, the flow of the image generation processing goes on to a step S413 at which the processing circuit 24 carries out an exception process to compute the pixel value of the R signal for the pixel (i, j) in accordance with weighted addition expression (37) corresponding to Eq. (18). This is because, if the normal process is carried out by dividing the value of expression (31) by the value of expression (30) having a value of 0 or close to 0, the quotient obtained as a result of the division will have an unstable value. That is to say, even if the value of expression (31) includes only small noises, the noises will be divided by the value of expression (30) having a value of 0 or close to 0 to result in large amplified noises.

To put it in detail, at the step S413, the processing circuit 24 computes the pixel value of the R signal for the pixel (i, j) in accordance with weighted addition expression (37) which is an expression used for finding a quotient obtained by dividing a sum of nine values each found in accordance with expression (31) by a sum of nine other values each found in accordance with expression (30). The nine values are values found for respectively the pixel (i, j) on the output image as well as eight vicinity pixels (i−1, j−1), (i, j−1), (i+1, j−1), (i−1, j), (i+1, j), (i−1, j+1), (i, j+1) and (i+1, j+1) in close proximity to the pixel (i, j) in accordance with expression (31) expressing the numerator of a weighted addition expression for light quantities of the red color in a normal process. On the other hand, the nine other values are values found for respectively the pixel (i, j) on the output image as well as the eight vicinity pixels (i−1, j−1), (i, j−1), (i+1, j−1), (i−1, j), (i+1, j), (i−1, j+1), (i, j+1) and (i+1, j+1) in close proximity to the pixel (i, j) in accordance with expression (30) expressing the denominator of the weighted addition expression for light quantities of the red color in a normal process.

Since the sum of the values found for the pixel (i, j) on the output image as well as the vicinity pixels (i−1, j−1), (i, j−1), (i+1, j−1), (i−1, j), (i+1, j), (i−1, j+1), (i, j+1) and (i+1, j+1) in close proximity to the pixel (i, j) in accordance with expression (30) has a large value to a certain degree as described earlier by referring to FIGS. 18 and 19, the use of the sum having such a large value as the denominator in the division operation does not cause the noises to be amplified. Thus, it is possible to compute the pixel value of the R signal for the pixel (i, j) without increasing the noises.

Figure 43:
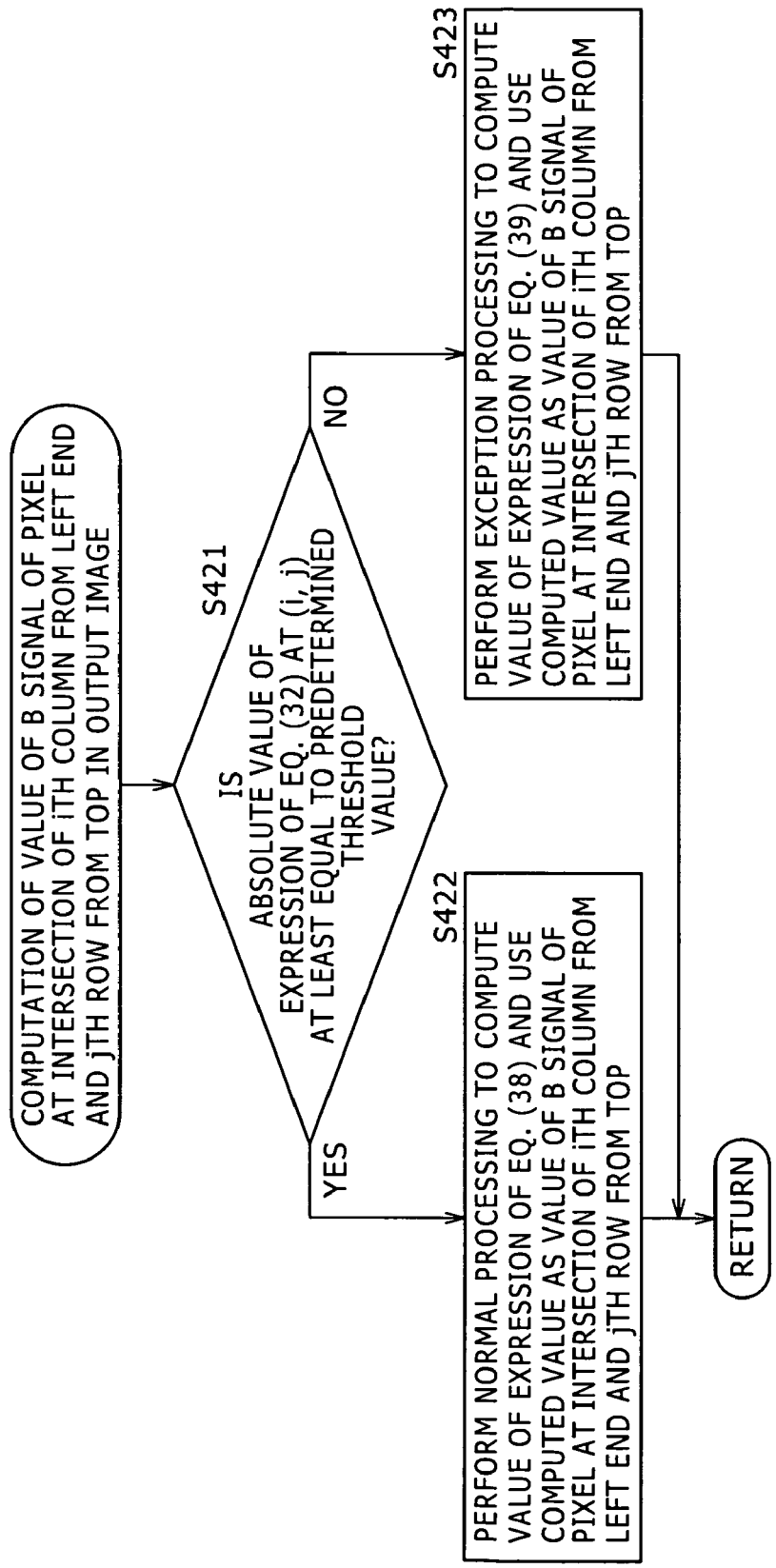
FIG. 43 shows a flowchart referred to in explanation of processing to infer a pixel value of a B signal (or a light quantity of the blue color).

Next, by referring a flowchart shown in FIG. 43, the following description explains the processing carried out at the step S348 of the flowchart shown in FIG. 40 to find (or infer) a pixel value of the B signal (that is, the light quantity for the blue color) of a pixel (i, j) on the output image.

Figure 39:
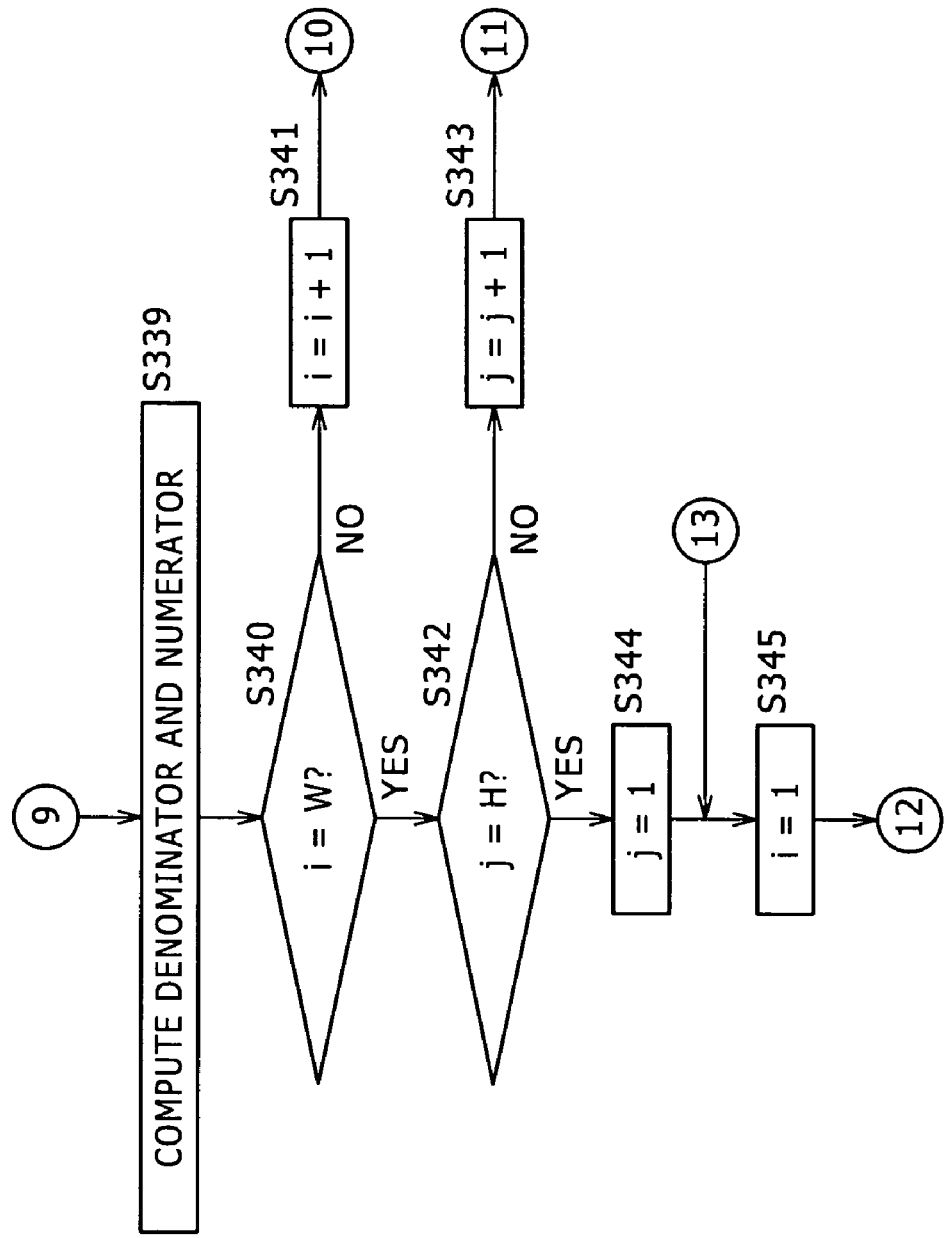
FIG. 39 shows a flowchart referred to in explanation of processing to generate an image.

The flowchart shown in FIG. 43 begins with a step S421 at which the processing circuit 24 produces a result of determination as to whether or not the value found at the step S339 of the flowchart shown in FIG. 39 as the absolute value of expression (32) expressing the denominator of a weighted addition expression for the light quantity of the blue color of the pixel (i, j) is equal to or greater than a predetermined threshold value. The predetermined threshold value is the value of a criterion as to whether or not an exception process is to be carried out due to the fact that the absolute value of expression (32) is regarded as a value equivalent to 0. Typically, a predetermined threshold value of 0.25 is set in advance in the processing circuit 24. However, the predetermined threshold value can also be set by the user by carrying out an operation.

If the determination result produced at the step S421 indicates that the absolute value of expression (32) for the pixel (i, j) is equal to or greater than the predetermined threshold value or the absolute value of expression (32) for the pixel (i, j) is not such small that the value can be regarded as a value equivalent to 0, the flow of the image generation processing goes on to a step S422 at which the processing circuit 24 carries out a normal process to compute the pixel value of the B signal for the pixel (i, j) in accordance with weighted addition expression (38). Expression (38) is an expression used for finding a quotient obtained by dividing the value of expression (33) by the value of expression (32). Found as a result of the process carried out at the step S339 of the flowchart shown in FIG. 39, the value of expression (32) is the denominator of the weighted addition equation for light quantities of the blue color and the value of expression (33) is the numerator of the same weighted addition equation.

If the determination result produced at the step S421 indicates that the absolute value of expression (32) for the pixel (i, j) is smaller than the predetermined threshold value or the absolute value of expression (32) for the pixel (i, j) is equal to 0 or close to 0, on the other hand, the flow of the image generation processing goes on to a step S423 at which the processing circuit 24 carries out an exception process to compute the pixel value of the B signal for the pixel (i, j) in accordance with weighted addition expression (39) corresponding to Eq. (19). This is because, if the normal process is carried out by dividing the value of expression (33) by the value of expression (32) having a value of 0 or close to 0, the quotient obtained as a result of the division will have an unstable value. That is to say, even if the value of expression (33) includes only small noises, the noises will be divided by the value of expression (32) having a value of 0 or close to 0 to result in large amplified noises.

To put it in detail, at the step S423, the processing circuit 24 computes the pixel value of the B signal for the pixel (i, j) in accordance with weighted addition expression (39) which is an expression used for finding a quotient obtained by dividing a sum of nine values each found in accordance with expression (33) by a sum of nine other values each found in accordance with expression (32). The nine values are values found for respectively the pixel (i, j) on the output image as well as the eight vicinity pixels (i−1, j−1), (i, j−1), (i+1, j−1), (i−1, j), (i+1, j), (i−1, j+1), (i, j+1) and (i+1, j+1) in close proximity to the pixel (i, j) in accordance with expression (33) expressing the numerator of a weighted addition expression for light quantities of the blue color in a normal process. On the other hand, the nine other values are values found for respectively the pixel (i, j) on the output image as well as the eight vicinity pixels (i−1, j−1), (i, j−1), (i+1, j−1), (i−1, j), (i+1, j), (i−1, j+1), (i, j+1) and (i+1, j+1) in close proximity to the pixel (i, j) in accordance with expression (32) expressing the denominator of the weighted addition expression for light quantities of the blue color in a normal process.

Since the sum of the values found for the pixel (i, j) on the output image as well as the vicinity pixels (i−1, j−1), (i, j−1), (i+1, j−1), (i−1, j), (i+1, j), (i−1, j+1), (i, j+1) and (i+1, j+1) in close proximity to the pixel (i, j) in accordance with expression (32) has a large value to a certain degree as described earlier by referring to FIGS. 18 and 19, the use of the sum having such a large value as the denominator in the division operation does not cause the noises to be amplified. Thus, it is possible to compute the pixel value of the B signal for the pixel (i, j) without increasing the noises.

As described above, in the image generation processing carried out at the step S304 of the flowchart shown in FIG. 28, by mapping N taken images of the same photographing-object portion on the reference image, that is, by considering only the image of the center portion of the reference image and excluding vicinity portions of the range projected on the N taken images as a range of the photographing object, an image in the high-picture-quality square area 422 shown in FIG. 29 as an area in which pixels of all the N taken images exist is generated as the output image.

In addition, the number of pieces of taken-image data (or the number of pixels) used in computing the values of expressions (34) to (39) is sufficiently large. That is to say, the values of $N_1$, $N_2$, $N_3$, $N_4$, $N_5$, $N_6$, $N_7$ and $N_8$ used in the summation in each of expressions (28) to (33) is sufficiently large. It is thus possible to prevent the output image from including a portion with a picture quality of poor sharpness due to a small number of pieces of data usable in generation of the output image as explained earlier by referring to FIGS. 25 to 27. In addition, it is also possible to obtain an output image with no noise existing in all pixels of the image or an output image having an extremely reduced number of noises.

On top of that, the pixel pitch of the output image is reduced to a value smaller than the pixel pitch of each taken image or smaller than the pixel pitch of the image-pickup device 4 employed in the digital camera 1 as shown in FIG. 1 in the case described above. To put it concretely, the ratio of the pixel pitch of the output image to the pixel pitch of each taken image is made equal to the similitude ratio $\alpha$. The similitude ratio $\alpha$ is a ratio of the size of the high-picture-quality square area 422 shown in FIG. 29 to the size of the reference image. It is thus possible to obtain an image having the same dimensions of W×H pixels as the image-pickup device 4 as an output image.

In the case described above, an effort is made to exhibit effects of an image-pickup device for outputting a taken image having the same pixel count W'×H' as the pixel count W×H of the image-pickup device 4 without using the binning function of the image-pickup device 4. Note, however, that it is also possible to carry out an image generation process to obtain a taken image having a pixel count W'×H' smaller than the pixel count W×H of the image-pickup device 4 by using the binning function of the image-pickup device 4.

As a binning method, it is possible to adopt a method to sum up pixel values in a sensor employed in the image-pickup device 4 as a sensor for receiving light. In addition, as another binning method, it is possible to adopt a technique of employing a digital adder for summing up pieces of digital data representing a pixel value output from the sensor.

With the binning function of the image-pickup device 4 executed, pixel values of a plurality of pixels are summed up to produce a sum, which is then output as the pixel value of one pixel. Thus, the number of pixels on a taken image composed of output pixel values is smaller than the number of pixels composing the image-pickup device 4. To be more specific, the number of pixels on a taken image composed of output pixel values is a fraction of the number of pixels composing the image-pickup device 4. To put it concretely, let us assume for example that the image-pickup device 4 executes the 2×2 binning function for summing up pixel values of every 2×2 pixels to produce an output pixel value. In this case, the number of pixels composing a taken image is (W/2)×(H/2). As another example, let us assume that the image-pickup device 4 executes the 3×3 binning function for summing up pixel values of every 3×3 pixels to produce an output pixel value. In this case, the number of pixels composing a taken image is (W/3)×(H/3).

It is to be noted that the binning function of the image-pickup device 4 may also be a function for summing up pixel values of another number of pixels. In addition, since pixels of the image-pickup device 4 are laid out to form a Bayer two-dimensional array, a taken image is produced without execution of the binning function as a taken image with its pixels laid out of course to form a Bayer two-dimensional array. As a matter of fact, even if the binning function is executed, a taken image is produced as a taken image with its pixels laid out also to form a Bayer two-dimensional array.

In the case that the binning function of the image-pickup device 4 is executed, the image-pickup device 4 sums up the pixel values so that the sensitivity of the pixel is increased. Therefor, for example, it is effective for photographing in gloomy view because the pixel value (summed pixel value) outputted from the image-pickup device 4 is data which has few noises.

By the way, let us assume for example that the 2×2 binning function of the image-pickup device 4 is executed in the hand-trembling correction photographing mode to sum up pixel values of 2×2 pixels adjacent to each other in the image-pickup device 4. In this case, the number of pixels composing a taken image supplied to the processing circuit 24 employed in the signal processing circuit 7 as shown in FIG. 4 is W'×H' which is (W/2)×(H/2).

With the 2×2 binning function executed, in order to obtain an output image having the same pixel count of W×H (=2W'× 2H'), the values of $\alpha$, $\beta$ and $\gamma$ explained earlier by referring to FIG. 29 are set as follows.

Let us assume for example that the maximum values of the quantities of hand trembling occurring in the vertical and horizontal directions as hand trembling causing a shift between any specific taken image and an immediately following taken image (that is, a taken image obtained immediately after the specific taken image) among the eight taken images ranging from the first taken image $401_1$ to the eighth taken image $401_8$, which are produced in one photographing operation, are 2% of the pixel count of the image-pickup device 4 as described before.

In this case, if the fourth taken image $401_4$ is adopted as the reference image as shown in FIG. 29, a taken image shifted by a longest distance from the reference image is the eighth taken image $401_8$. The maximum value of the quantity of hand trembling occurring in the horizontal direction as hand trembling causing a shift of the eighth taken image $401_8$ from the reference image is 0.08×W/2 pixels at the most where notation W/2 denotes the horizontal dimension of the reference image. By the same token, the maximum value of the quantity of hand trembling occurring in the vertical direction as hand trembling causing a shift of the eighth taken image $401_8$ from the reference image is 0.08×H/2 pixels at the most where notation H/2 denotes the vertical dimension of the reference image.

Thus, if an inner area obtained by shifting the left vertical side of the fourth taken image $401_4$ shown in FIG. 29 as the reference image in the inward direction by a distance equivalent to 0.08×W/2, shifting the right vertical side of the fourth taken image $401_4$ in the inward direction by a distance equivalent to 0.08×W/2, shifting the top side of the fourth taken image $401_4$ in the inward direction by a distance equivalent to 0.08×H/2 and shifting the bottom side of the fourth taken image $401_4$ in the inward direction by a distance equivalent to 0.08×H/2 is used as the high-picture-quality square area 422, the high-picture-quality square area 422 is always included in the area 421 shown in FIG. 27 as an area, output-image pixel values in which are inferred by using data of all eight taken images ranging from the first taken image $401_1$ to the eighth taken image $401_8$.

In this case, the high-picture-quality square area 422 obtained as described above is a rectangle having its left upper vertex located at a point (0.08×W/2, 0.08×H/2), a horizontal dimension shorter than the horizontal dimension W/2 of the reference image by a length equivalent to 0.08×W/2×2 and a vertical dimension shorter than the vertical dimension H/2 of the reference image by a length equivalent to 0.08×H/2×2. That is to say, the high-picture-quality square area 422 is a rectangle having its left upper vertex located at a point (0.08× W/2, 0.08×H/2), a horizontal dimension of (1−0.16)×W/2 and a vertical dimension of (1−0.16)×H/2. In this case, the pixel pitch of each taken image having a pixel count of (W/2)×(H/2) has been assumed to be 1.

If the output image having a pixel count of W×H is taken as a reference, on the other hand, the high-picture-quality square area 422 is a rectangle having its left upper vertex located at a point (β, γ), a horizontal dimension of α×W and a vertical dimension of α×H as described above by referring to FIG. 29.

Thus, α, β and γ satisfy the following equations: α=(1−0.16)/2, β=0.08×W/2 and γ=0.08×H/2.

In the image generation processing carried out at the step S304 of the flowchart shown in FIG. 28, the processing circuit 24 employed in the signal processing circuit 7 shown in FIG. 4 sets the values of α, β and γ at (1−0.16)/2, 0.08×W/2 and 0.08×H/2 respectively as described above. Then, for all integers i and j in the ranges 1≦i≦W and 1≦j≦H, the processing circuit 24 computes (or infers) the pixel value of a pixel (i, j) on the output image as the pixel value at the position (x, y)=(α×(i−1)+β, α×(j−1)+γ). In this way, even if the image-pickup device 4 executes the binning function, it is possible to obtain an output image that has the same pixel count of W×H as the pixel count of the image-pickup device 4 and is sharp throughout the entire area.

As described above, even if the image-pickup device 4 executes the binning function, it is possible to obtain an output image having the same pixel count of W×H as the pixel count of the image-pickup device 4. On top of that, the pixel count of every taken image processed at the steps S301 to S303 of the flowchart shown in FIG. 28 is (W/2)×(H/2). Thus, the amount of processing can be made small in comparison with a case in which the binning function is not executed.

As described above, the digital camera 1 shown in FIG. 1 has an ordinary photographing mode and a hand-trembling correction photographing mode as photographing modes. In the hand-trembling correction photographing mode, the photographing processing represented by the flowchart shown in FIG. 2 or 28 is carried out. In this photographing processing, a plurality of images, say, N images, are taken consecutively and an output image is produced from the N taken images. In the ordinary photographing mode, on the other hand, the photographing processing is carried out to take only one image and output (or generate) the taken image as an output image.

The digital camera 1 shown in FIG. 1 determines which photographing mode is to be adopted in carrying out the photographing processing. The following description explains processing carried out by the digital camera 1 as processing including a photographing-mode determination process to make a decision as to which photographing mode is to be adopted.

It is to be noted that, in the following description, the digital camera 1 is assumed to be capable of carrying out four kinds of photographing processing, i.e., first photographing processing, second photographing processing, third photographing processing and fourth photographing processing. The first photographing processing is processing in which the ordinary photographing mode is adopted as the photographing mode. On the other hand, the second photographing processing, the third photographing processing and the fourth photographing processing are each photographing processing in which the hand-trembling correction photographing mode is adopted as the photographing mode. To put it concretely, the second photographing processing, the third photographing processing and the fourth photographing processing are each the photographing processing represented by the flowchart shown in FIG. 2 or 28. In this case, however, the second photographing processing, the third photographing processing and the fourth photographing processing are different from each other in that the second photographing processing is photographing processing carried out by execution of no binning function of the image-pickup device 4, the third photographing processing is photographing processing carried out by execution of the 2×2 binning function of the image-pickup device 4 and the fourth photographing processing is photographing processing carried out by execution of the 3×3 binning function of the image-pickup device 4.

The first photographing processing is carried out to take only one image. On the other hand, the second photographing processing, the third photographing processing and the fourth photographing processing are each carried out to take a plurality of images. Let notation $N_a$ denote the number of images taken consecutively at a high speed in the second photographing processing, notation $N_b$ denote the number of images taken consecutively at a high speed in the third photographing processing and notation $N_c$ denote the number of images taken consecutively at a high speed in the fourth photographing processing.

The photographing-mode determination processing described below is carried out to determine whether the first photographing processing, the second photographing processing, the third photographing processing or the fourth photographing processing is to be carried out as photographing processing. In addition, if the second photographing processing is determined in the photographing-mode determination processing, the value of $N_a$ is also determined as the number of images taken consecutively at a high speed in the second photographing processing. By the same token, if the third photographing processing is determined in the photographing-mode determination processing, the value of $N_b$ is also determined as the number of images taken consecutively at a high speed in the third photographing processing. In the same way, if the fourth photographing processing is determined in the photographing-mode determination processing, the value of $N_c$ is also determined as the number of images taken consecutively at a high speed in the fourth photographing processing.

It is to be noted that the photographing-mode determination processing is carried out by the control circuit 18 employed in the digital camera 1 as shown in FIG. 1.

In addition, it is assumed that the control circuit 18 receives information on a focal distance for a condition in which the photographing operation is to be carried out and an exposure correction value prior to execution of the photographing-mode determination processing. The exposure correction value is a value representing no correction, 1-stage under brightness, two-stage under brightness, three-stage under brightness, 1-stage over brightness, two-stage over brightness or three-stage over brightness, and so on.

Figure 44:
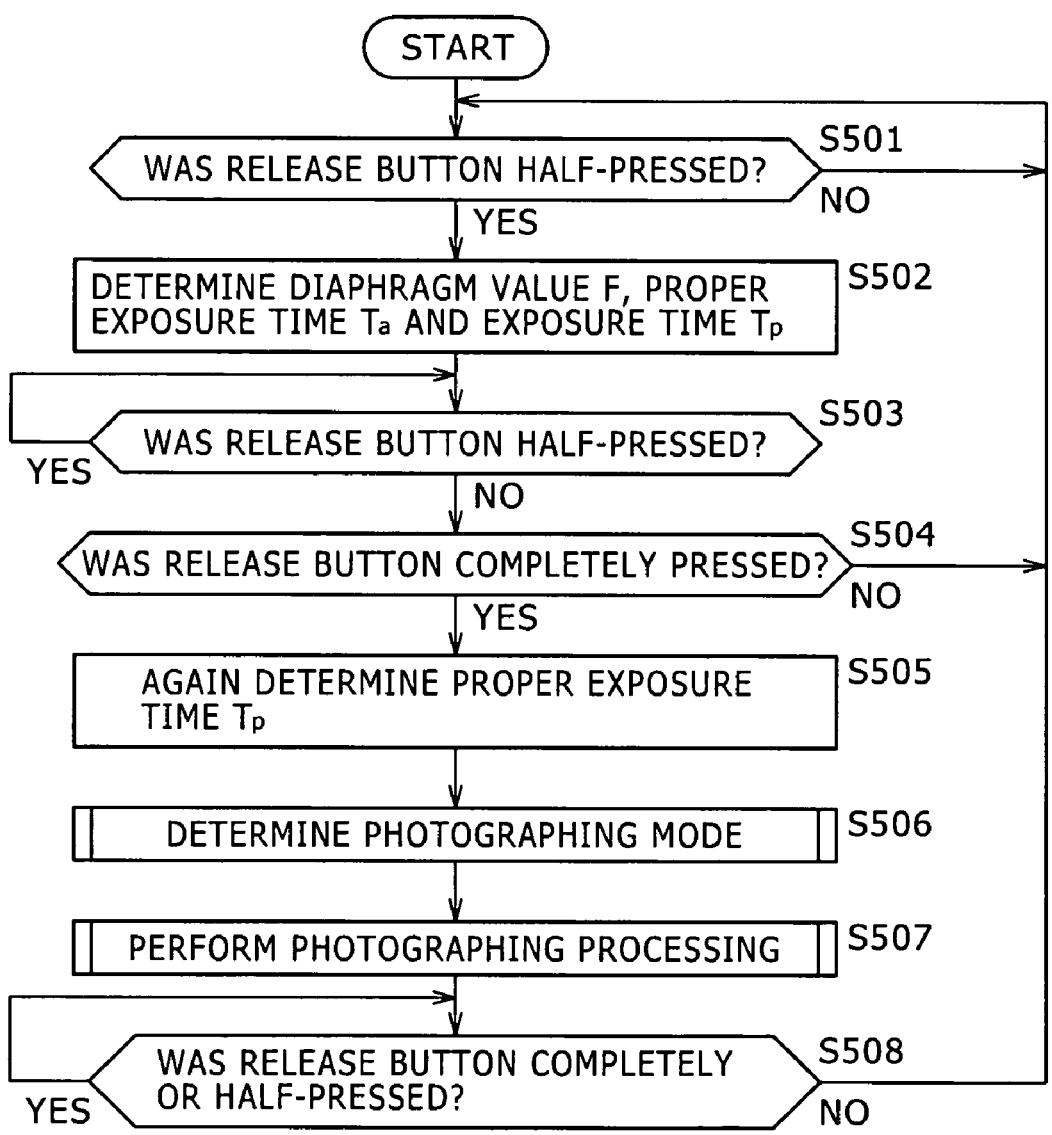
FIG. 44 shows a flowchart referred to in explanation of photographing processing carried out by the digital camera 1 shown in FIG. 1.

Next, by referring to a flowchart shown in FIG. 44, the following description explains processing carried out by the digital camera 1 shown in FIG. 1 as processing including a photographing-mode determination process.

The flowchart begins with a step S501 at which the control circuit 18 carries out a process to produce a result of determination as to whether or not the state of the release button (also referred to as a shutter button) employed in the input device 16 is a half-pressed state. If the determination result produced at the step S501 indicates that the state of the release button is not a half-pressed state, the flow of the processing goes back to the step S501. The process of the step S501 is carried out repeatedly till the determination result produced at the step S501 indicates that the state of the release button is a half-pressed state. As the determination result produced at the step S501 indicates that the state of the release button is a half-pressed state, the flow of the processing goes on to a step S502.

At the step S502, the control circuit 18 carries out a process to determine a diaphragm value F, a proper exposure time $T_p$ and an exposure time $T_a$, which is an actual exposure time taken for actually producing a taken image. To put it in detail, the control circuit 18 receives a value measured by the exposure meter 19 from the exposure meter 19 as the measured value of the brightness of the photographing object and an exposure correction value set by the exposure correction dial employed in the input device 16. At the step S502, first of all, the control circuit 18 determines a diaphragm value F by using the measured value received from the exposure meter 19 as the measured value of the brightness of the photographing object in accordance with the same value-value determination technique as the ordinary automatic exposure control. Then, the control circuit 18 also determines a proper exposure time $T_p$ by using the diaphragm value F and the measured value of the brightness of the photographing object. The proper exposure time $T_p$ is defined as an exposure time taken in a photographing operation at a proper exposure without execution of an exposure correction function. Then, the control circuit 18 determines an actual exposure time $T_a$ by using the proper exposure time $T_p$ and the exposure correction value set by the exposure correction dial.

A concrete method of determining the actual exposure time $T_a$ from the exposure correction dial is described as follows. Let us assume for example that the exposure correction value employed in the input device 16 represents the 1-stage under brightness. In this case, the control circuit 18 determines an actual exposure time $T_a$ at $T_p/2$ (or $T_a=T_p/2$). As another example, let us assume that the exposure correction value set by the exposure correction dial employed in the input device 16 represents the two-stage under brightness. In this case, the control circuit 18 determines an actual exposure time $T_a$ at $T_p/4$ (or $T_a=T_p/4$). As a further example, let us assume that the exposure correction value employed in the input device 16 represents the 1-stage over brightness. In this case, the control circuit 18 determines an actual exposure time $T_a$ at $T_p \times 2$ (or $T_a=T_p \times 2$). As a still further example, let us assume that the exposure correction value set by the exposure correction dial employed in the input device 16 represents the two-stage over brightness. In this case, the control circuit 18 determines an actual exposure time $T_a$ at $T_p \times 4$ (or $T_a=T_p \times 4$). The reciprocal $1/T_a$ of the actual exposure time represents a shutter speed. It is to be noted that the method for determining the diaphragm value F, the proper exposure time $T_p$ and the actual exposure time $T_a$ as described above is the same technique as the method adopted by the ordinary digital camera as a method with the diaphragm value F taking precedence. Thus, the method for determining the diaphragm value F, the proper exposure time $T_p$ and the actual exposure time $T_a$ as described above is a method provided by a known technology. For this reason, detailed description of the method is omitted. After the process of the step S502 is completed, the flow of the processing goes on to the next step S503.

At the step S503, the control circuit 18 carries out a process to produce a result of determination as to whether or not the state of the release button employed in the input device 16 is still a half-pressed state as it is. If the determination result produced at the step S503 indicates that the state of the release button is still a half-pressed state as it is as indicated by the determination result produced at the step S501, the flow of the processing goes back to the step S503 in order to sustain the present state. The process of the step S503 is carried out repeatedly till the determination result produced at the step S503 indicates that the state of the release button is no longer a half-pressed state. As the determination result produced at the step S503 indicates that the state of the release button is not a half-pressed state anymore, the flow of the processing goes on to a step S504 at which the control circuit 18 carries out a process to produce a result of determination as to whether or not the state of the release button is a completely pressed state. If the determination result produced at the step S504 indicates that the state of the release button is not a completely pressed state, that is, if the determination result produced at the step S504 indicates that the state of the release button has been released, the flow of the processing goes back to the step S501. That is to say, if the photographer releases its finger from the release button so that, as a result, the state of the release button is neither a half-pressed state nor a completely pressed state, the flow of the processing goes back to the step S501 to repeat the same processing.

If the determination result produced at the step S504 indicates that the state of the release button is a completely pressed state, on the other hand, the flow of the processing goes on to a step S505 at which the control circuit 18 carries out a process to determine a proper exposure time $T_p$ once more. That is to say, the control circuit 18 again determines a proper exposure time $T_p$ in the same way as the step S502 by using the measured value received from the exposure meter 19 as the measured value of the brightness of the photographing object and the diaphragm value F determined at the step S502. The control circuit 18 again determines a proper exposure time $T_p$ because, by using a proper exposure time $T_p$ obtained with a timing closer to a timing to actually carry out a photographing operation, a more proper image can be generated. It is to be noted that the reciprocal $1/T_p$ is a shutter speed at the proper exposure.

After the process of the step S505 is completed, the flow of the processing goes on to the next step S506 at which the control circuit 18 carries out the photographing-mode determination processing to make a decision of which of the first photographing processing, the second photographing processing, the third photographing processing and the fourth photographing processing is to be performed as photographing processing on the basis of the actual exposure time $T_a$ determined at the step S502 and the proper exposure time $T_p$ determined at the step S505. That is to say, the control circuit 18 selects either the first photographing processing, the second photographing processing, the third photographing processing or the fourth photographing processing as photographing processing. As will be described later in detail, the photographing-mode determination processing is carried out as processing to determine a photographing mode in which the photographing processing is performed to generate a sharp output image (almost) without effects of hand trembling.

In addition, if the control circuit 18 makes a decision to carry out the second photographing processing as photographing processing at the step S506, the control circuit 18 also determines the taken image count $N_a$ for the second photographing processing. By the same token, if the control circuit 18 makes a decision to carry out the third photographing processing as photographing processing at the step S506, the control circuit 18 also determines the taken image count $N_b$ for the third photographing processing. In the same way, if the control circuit 18 makes a decision to carry out the fourth photographing processing as photographing processing at the step S506, the control circuit 18 also determines the taken image count $N_c$ for the third photographing processing. After the process of the step S506 is completed, the flow of the processing goes on to the next step S507.

At the step S507, the digital camera 1 carries out the photographing processing selected at the step S506.

That is to say, if the control circuit 18 makes a decision to carry out the first photographing processing as photographing processing at the step S506, the digital camera 1 carries out the first photographing processing to take an image at the diaphragm value F and the actual exposure time $T_a$, which have been determined at the step S502, and output the taken image as an output image.

If the control circuit 18 makes a decision to carry out the second photographing processing as photographing processing at the step S506, the digital camera 1 carries out the second photographing processing to carry out an image-pickup process without executing the binning function of the image-pickup device 4 to produce $N_a$ taken images at a high speed corresponding to an exposure time of $T_a/N_a$ per taken image and at the diaphragm value F determined at the step S502 along with the actual exposure time $T_a$. Then, the digital camera 1 carries out the image generation processing by using the $N_a$ taken images to generate an output image.

If the control circuit 18 makes a decision to carry out the third photographing processing as photographing processing at the step S506, the digital camera 1 carries out the third photographing processing to carry out an image-pickup process by executing the 2×2 binning function of the image-pickup device 4 to produce $N_b$ taken images at a high speed corresponding to an exposure time of $T_a/N_b$ per taken image and at the diaphragm value F determined at the step S502 along with the actual exposure time $T_a$. Then, the digital camera 1 carries out the image generation processing by using the $N_b$ taken images to generate an output image.

If the control circuit 18 makes a decision to carry out the fourth photographing processing as photographing processing at the step S506, the digital camera 1 carries out the fourth photographing processing to carry out an image-pickup process by executing the 3×3 binning function of the image-pickup device 4 to produce $N_c$ taken images at a high speed corresponding to an exposure time of $T_a/N_c$ per taken image and at the diaphragm value F determined at the step S502 along with the actual exposure time $T_a$. Then, the digital camera 1 carries out the image generation processing by using the $N_c$ taken images to generate an output image.

It is to be noted that the output image generated in the first photographing processing of course has the same number of pixels as the pixel count W×H of the image-pickup device 4. As a matter of fact, the output image generated in the second, third, or fourth photographing processing also has the same number of pixels as the pixel count W×H of the image-pickup device 4 as well.

After the process of the step S507 is completed, the flow of the processing goes on to the next step S508 at which the control circuit 18 carries out a process to produce a result of determination as to whether or not the state of the release button employed in the input device 16 is a half-pressed state or a completely pressed state. If the determination result produced at the step S508 indicates that the state of the release button is a half-pressed state or a completely pressed state, the process of the step S508 is carried out repeatedly till the determination result indicates that the state of the release button is neither a half-pressed state nor a completely pressed state. As the determination result produced at the step S508 indicates that the state of the release button is neither a half-pressed state nor a completely pressed state, that is, as the photographer releases its finger from the release button to release the release button, the flow of the processing goes back to the first step S501 to prepare for the next photographing operation.

The processing of the steps S501 to S508 described above is carried out on the assumption that the power supply of the digital camera 1 has been turned on. If the power supply is turned off, the processing is suspended. In addition, the operation carried out by the photographer on the exposure correction dial is effective only while the release button is being in a released state. Thus, the process carried out at the step S502 to determine the actual exposure time $T_a$ uses the exposure correction value, which is set by the exposure correction dial after the determination result produced at the step S501 immediately preceding the step S502 indicates that the release button is in a half-pressed state.

Next, the following description explains the photographing-mode determination processing carried out at the step S506 of the flowchart shown in FIG. 44. Before the photographing-mode determination processing is explained, however, the first to fourth photographing processings are described more as follows.

In the first photographing processing, the image-pickup device 4 obtains one taken image at a diaphragm value F and an actual exposure time of $T_a$ seconds, supplying the taken image to the image processing circuit 17. The image processing circuit 17 generates an output image from the taken image. That is to say, the image processing circuit 17 outputs the taken image as the output image. In other words, in the first photographing processing, the image-pickup device 4 obtains a taken image without executing a binning function to sum up pixel values and provides the image processing circuit 17 with the taken image having a pixel count equal to the number of pixels composing the image-pickup device 4. Then, the image processing circuit 17 generates an output image having a pixel count equal to the number of pixels composing the image-pickup device 4. It is to be noted that the control circuit 18 controls the first photographing processing. In addition, the first photographing processing to generate an output image from a taken image is virtually the same as the photographing processing carried out by an ordinary digital camera.

In the second photographing processing, the image-pickup device 4 consecutively produces a plurality of taken images, say, $N_a$ taken images at a high speed corresponding to an exposure time of $T_a/N_a$ per taken image and at a diaphragm value F, supplying each of the taken images to the image processing circuit 17. Then, the image processing circuit 17 carries out the image generation processing described above in order to generate an output image from the $N_a$ taken images.

To put it in detail, in the second photographing processing, the image-pickup device 4 produces the taken images without execution of the binning function to sum up pixel values and supplies each of the taken images each having a pixel count equal to the number of pixels composing the image-pickup device 4 to the image processing circuit 17. The image processing circuit 17 adjusts the positions of the $N_a$ taken images received from the image-pickup device 4 and carries out the image generation processing applying a weighted addition process to the $N_a$ taken images with their positions adjusted in order to generate a sharp output image having a pixel count equal to the number of pixels composing the image-pickup device 4. It is to be noted that, since the image-pickup device 4 consecutively produces $N_a$ taken images at a high speed corresponding to an exposure time of $T_a/N_a$ per taken image in the second photographing processing, the exposure time it takes to obtain all the $N_a$ taken images is $(T_a/N_a) \times N_a$ $(=T_a)$. The control circuit 18 also controls the second photographing processing.

In the third photographing processing, the image-pickup device 4 consecutively produces a plurality of taken images, say, $N_b$ taken images at a high speed corresponding to an exposure time of $T_a/N_b$ per taken image and at a diaphragm value F by execution of the 2×2 binning function, supplying each of the taken images to the image processing circuit 17. Then, the image processing circuit 17 carries out the image generation processing described above in order to generate an output image from the $N_b$ taken images.

To put it in detail, in the third photographing processing, the image-pickup device 4 produces the taken images by execution of the 2×2 binning function as described above to sum up pixel values and supplies each of the taken images each having a pixel count equal to one-fourth of the number of pixels composing the image-pickup device 4 to the image processing circuit 17. The image processing circuit 17 adjusts the positions of the $N_b$ taken images received from the image-pickup device 4 and carries out the image generation processing applying a weighted addition process to the $N_b$ taken images with their positions adjusted in order to generate a sharp output image having a pixel count equal to the number of pixels composing the image-pickup device 4. It is to be noted that, since the image-pickup device 4 consecutively produces $N_b$ taken images at a high speed corresponding to an exposure time of $T_a/N_b$ per taken image in the third photographing processing, the exposure time it takes to obtain all the $N_b$ taken images is $(T_a/N_b) \times N_b (=T_a)$. The control circuit 18 also controls the third photographing processing.

In the fourth photographing processing, the image-pickup device 4 consecutively produces a plurality of taken images, say, $N_c$ taken images at a high speed corresponding to an exposure time of $T_a/N_c$ per taken image and at a diaphragm value F by execution of the 3×3 binning function, supplying each of the taken images to the image processing circuit 17. Then, the image processing circuit 17 carries out the image generation processing described above in order to generate an output image from the $N_c$ taken images.

To put it in detail, in the fourth photographing processing, the image-pickup device 4 produces the taken images by execution of the 3×3 binning function as described above to sum up pixel values and supplies each of the taken images each having a pixel count equal to one-ninth of the number of pixels composing the image-pickup device 4 to the image processing circuit 17. The image processing circuit 17 adjusts the positions of the $N_c$ taken images received from the image-pickup device 4 and carries out the image generation processing applying a weighted addition process to the $N_c$ taken images with their positions adjusted in order to generate a sharp output image having a pixel count equal to the number of pixels composing the image-pickup device 4. It is to be noted that, since the image-pickup device 4 consecutively produces $N_c$ taken images at a high speed corresponding to an exposure time of $T_a/N_c$ per taken image in the fourth photographing processing, the exposure time it takes to obtain all the $N_c$ taken images is $(T_a/N_c) \times N_c (=T_a)$. The control circuit 18 also controls the fourth photographing processing.

Figure 45:
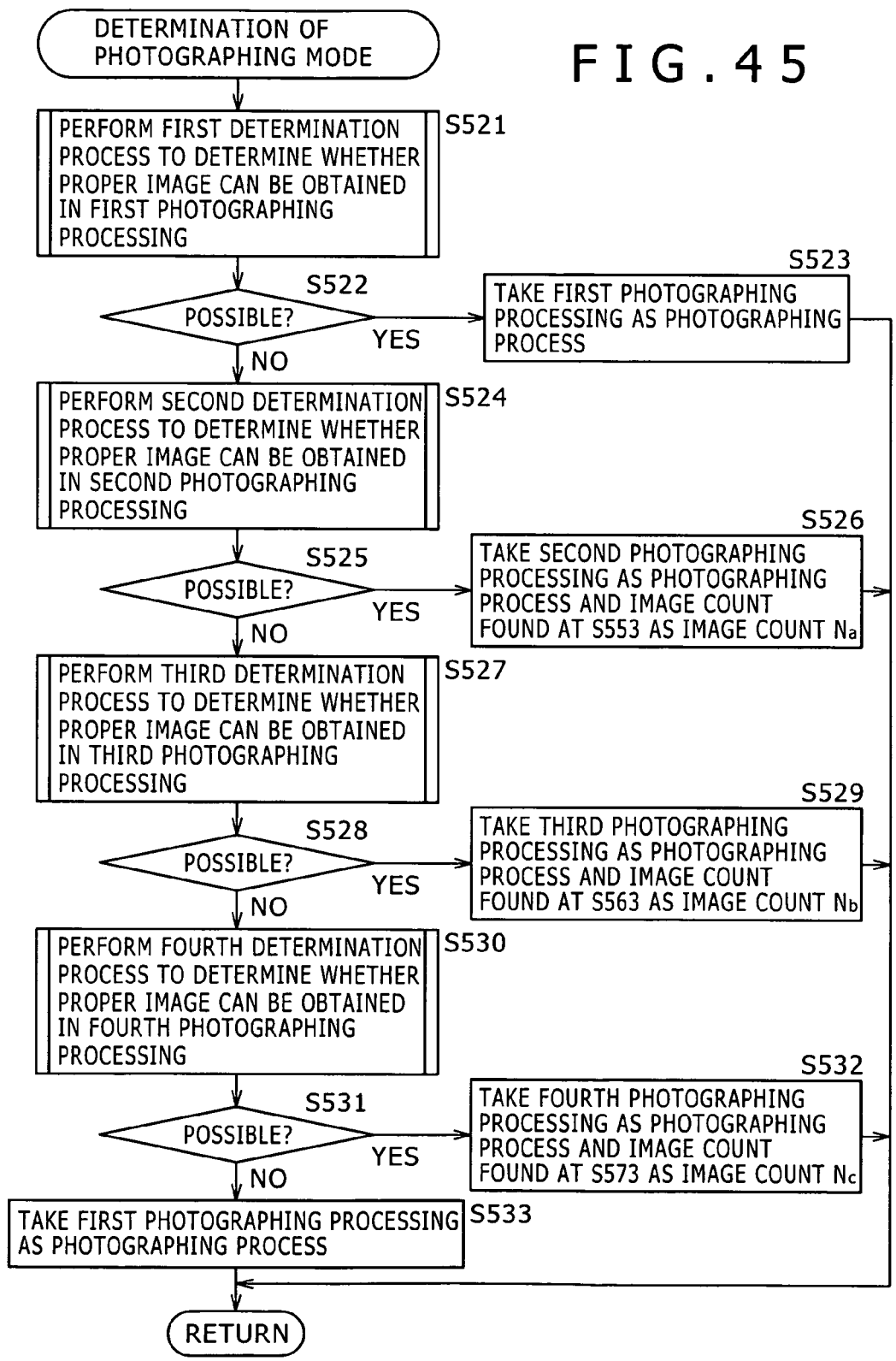
FIG. 45 shows a flowchart referred to in explanation of processing to determine a photographing mode.

Next, by referring to a flowchart shown in FIG. 45, the following description explains the photographing-mode determination processing carried out at the step S506 of the flowchart shown in FIG. 44. It is to be noted that the control circuit 18 is assumed to have recognized information on a focal distance of the lens 2, the darkness limit $1/M_{max}$ and a continuous image-pickup interval limit to of the image-pickup device 4. If a zoom lens is employed, the information on a focal distance of the lens 2 is information on a focal distance in a state in which an attempt is made to carry out a photographing operation.

The flowchart shown in FIG. 45 begins with a step S521 at which the control circuit 18 carries out first determination processing to produce a result of determination as to whether or not a proper output image can be obtained on the basis of a condition for obtaining a proper output image by execution of the first photographing processing on the assumption that a decision has been made to perform the first photographing processing as the photographing processing. Then, the flow of the photographing-mode determination processing goes on to the next step S522. Details of the first determination processing will be described later by referring to a flowchart shown in FIG. 46.

At the step S522, the control circuit 18 examines the result of the first determination processing carried out at the step S521. If the examination carried out at the step S522 reveals the fact that the result of the first determination processing indicates that a proper output image can be obtained by carrying out the first photographing processing, the flow of the photographing-mode determination processing goes on to a step S523 at which the control circuit 18 makes a decision to carry out the first photographing processing. Then, control of execution is returned to the calling program.

If the examination carried out at the step S522 reveals the fact that the result of the first determination processing indicates that a proper output image cannot be obtained by carrying out the first photographing processing, on the other hand, the flow of the photographing-mode determination processing goes on to a step S524 at which the control circuit 18 carries out second determination processing to produce a result of determination as to whether or not a proper output image can be obtained on the basis of a condition for obtaining a proper output image by execution of the second photographing processing on the assumption that a decision has been made to perform the second photographing processing as the photographing processing. Then, the flow of the photographing-mode determination processing goes on to the next step S525. Details of the second determination processing will be described later by referring to a flowchart shown in FIG. 47. If the second determination processing carried out at the step S524 produces a result indicating that a proper output image can be obtained by carrying out the second photographing processing, the second determination processing also sets the taken-image count $N_a$ at the same step.

At the step S525, the control circuit 18 examines the result of the second determination processing carried out at the step S524. If the examination carried out at the step S525 reveals the fact that the result of the second determination processing indicates that a proper output image can be obtained by carrying out the second photographing processing, the flow of the photographing-mode determination processing goes on to a step S526 at which the control circuit 18 makes a decision to carry out the second photographing processing. Then, control of execution is returned to the calling program.

If the examination carried out at the step S525 reveals the fact that the result of the second determination processing indicates that a proper output image cannot be obtained by carrying out the second photographing processing, on the other hand, the flow of the photographing-mode determination processing goes on to a step S527 at which the control circuit 18 carries out third determination processing to produce a result of determination as to whether or not a proper output image can be obtained on the basis of a condition for obtaining a proper output image by execution of the third photographing processing on the assumption that a decision has been made to perform the third photographing processing as the photographing processing. Then, the flow of the photographing-mode determination processing goes on to the next step S528. Details of the third determination processing will be described later by referring to a flowchart shown in FIG. 48. If the third determination processing carried out at the step S527 produces a result indicating that a proper output image can be obtained by carrying out the third photographing processing, the third determination processing also sets the taken-image count $N_b$ at the same step.

At the step S528, the control circuit 18 examines the result of the third determination processing carried out at the step S527. If the examination carried out at the step S528 reveals the fact that the result of the third determination processing indicates that a proper output image can be obtained by carrying out the third photographing processing, the flow of the photographing-mode determination processing goes on to a step S529 at which the control circuit 18 makes a decision to carry out the third photographing processing. Then, control of execution is returned to the calling program.

If the examination carried out at the step S528 reveals the fact that the result of the third determination processing indicates that a proper output image cannot be obtained by carrying out the third photographing processing, on the other hand, the flow of the photographing-mode determination processing goes on to a step S530 at which the control circuit 18 carries out fourth determination processing to produce a result of determination as to whether or not a proper output image can be obtained on the basis of a condition for obtaining a proper output image by execution of the fourth photographing processing on the assumption that a decision has been made to perform the fourth photographing processing as the photographing processing. Then, the flow of the photographing-mode determination processing goes on to the next step S531. Details of the fourth determination processing will be described later by referring to a flowchart shown in FIG. 49. If the fourth determination processing carried out at the step S530 produces a result indicating that a proper output image can be obtained by carrying out the fourth photographing processing, the fourth determination processing also sets the taken-image count $N_c$ at the same step.

At the step S531, the control circuit 18 examines the result of the fourth determination processing carried out at the step S530. If the examination carried out at the step S531 reveals the fact that the result of the fourth determination processing indicates that a proper output image can be obtained by carrying out the fourth photographing processing, the flow of the photographing-mode determination processing goes on to a step S532 at which the control circuit 18 makes a decision to carry out the fourth photographing processing. Then, control of execution is returned to the calling program.

If the examination carried out at the step S531 reveals the fact that the result of the fourth determination processing indicates that a proper output image cannot be obtained by carrying out the fourth photographing processing, on the other hand, the flow of the photographing-mode determination processing goes on to a step S533 at which the control circuit 18 makes a decision to carry out the first photographing processing. Then, control of execution is returned to the calling program. This is because, in this case, it is difficult to generate a proper output image without regard to whether the first photographing processing, the second photographing processing, the third photographing processing or the fourth photographing processing is carried out. For this reason, while recognizing the existence of hand trembling, the control circuit 18 makes a decision to carry out the first photographing processing in the same way as the photographing processing carried out by an ordinary digital camera. It is to be noted that, when the control circuit 18 makes a decision to carry out the first photographing processing at the step S533, a warning message stating: "There is a risk of hand-trembling occurrence" may be displayed on the monitor 11 or the like.

The photographing-mode determination processing represented by the flowchart shown in FIG. 45 is carried out to determine whether or not a proper output image can be obtained in the first, second, third, or fourth determination processing in an order starting with the first determination processing followed by the second determination processing followed by the third determination processing followed by the fourth determination processing. This is because an output image with a good picture quality can be obtained in an order starting with the first photographing processing followed by the second followed by the third followed by the fourth. That is to say, an output image generated in the ordinary photographing mode has a picture quality better than an output image generated in the hand-trembling correction photographing mode. In addition, an output image generated in the hand-trembling correction photographing mode without execution of a binning function has a picture quality better than an output image generated in the hand-trembling correction photographing mode by execution of a binning function. Furthermore, an output image generated in the hand-trembling correction photographing mode by execution of a binning function of a small scale has a picture quality better than an output image generated in the hand-trembling correction photographing mode by execution of a binning function of a large scale. The scale of the binning function is defined as the number of pixel values summed up by the function.

It is to be noted that the input device 16 can be provided with a button for forcibly excluding the photographing processing to be carried out in the hand-trembling correction photographing mode. As described above, the photographing processing to be carried out in the hand-trembling correction photographing mode can be the second, third, or fourth photographing processing. Thus, when this button is pressed, the photographing-mode determination processing represented by the flowchart shown in FIG. 45 is not carried out at the step S506 of the flowchart shown in FIG. 44. Instead, the first photographing processing is carried out by force.

In addition, the input device 16 can be provided with a button for forcibly excluding the binning function. That is to say, this button is pressed in order to forcibly exclude the third and the fourth photographing processing so that, as photographing processing, only either the first or the second photographing processing is selected.

This is because, when the binning function is executed, a taken image output by the image-pickup device 4 has a pixel count smaller than the number of pixels on the image-pickup device 4. Thus, in some cases, an output image generated from such taken images has poor brightness to a certain degree in comparison with an output image generated without execution of a binning function. For this reason, by allowing the photographer to determine whether or not the third and the fourth photographing processing are to be excluded by force, the convenience offered by the digital camera 1 can be enhanced. It is to be noted that, when the button for excluding the third and the fourth photographing processing by force is pressed, in the photographing-mode determination processing represented by the flowchart shown in FIG. 45, the flow of the processing goes on from the step S525 to the step S533 instead of going on from the step S525 to the step S527.

As described above, at the step S521 of the flowchart shown in FIG. 45, the first determination processing is carried out to determine as to whether or not a proper output image can be obtained on the basis of a condition for obtaining a proper output image by execution of the first photographing processing. By the same token, at the step S524, the second determination processing is carried out by execution of the second photographing processing, at the step S527, the third determination processing is carried out by execution of the third photographing processing, and at the step S530, the fourth determination processing is carried out by execution of the fourth photographing processing. The following description explains each of the conditions for obtaining a proper output image.

In order for an output image to be regarded as a proper output image, first of all, the output image is required to have no blurring portion caused by hand trembling.

In order to prevent a blurring portion from being generated by hand trembling on an output image, in the case of the first photographing processing, it is necessary to prevent a blurring portion from being generated by hand trembling on the one taken image obtained in one photographing operation. In the case of the second, third, and fourth photographing processings, on the other hand, it is necessary to prevent a blurring portion from being generated by hand trembling on each of N taken images each obtained at a high speed in the photographing operation.

That is to say, if any of the taken images includes a blurring portion resulting from hand trembling, for example, an output image generated from the taken images including a taken image with a blurring portion will also include a blurring portion. Thus, a taken image obtained by the image-pickup device 4 must not be an image including a blurring portion without regard to whether the taken image is obtained by carrying out the first, second, third or fourth photographing processing as the photographing processing.

In order to prevent a blurring portion from being generated by hand trembling on a taken image (or, strictly speaking, one taken image) obtained by the image-pickup device 4, the exposure time for obtaining the one taken image must be short in comparison with the time it takes to move the digital camera 1 by a certain distance due to hand trembling.

In general, in a photographing operation carried out by using a hand-held camera, if a 35 mm camera is taken as a model in the computation of the exposure time, an exposure time (expressed in terms of seconds) shorter than 1/focal distance (expressed in terms of mm) is said to be an exposure time resulting in a taken image including no blurring portion caused by hand trembling. Thus, let us assume for example that the focal distance of a lens employed in the 35 mm camera taken as a model in the computation of the exposure time is 30 mm. In this case, a taken image obtained at an exposure time not exceeding 1/30 seconds does not include a blurring portion caused by hand trembling.

Now, let us transform the focal distance of the lens 2 employed in the digital camera 1 into the focal distance of a lens employed in the 35 mm camera taken as a model in the computation of the exposure time. In this case, the expression 1/(focal distance) expressing the reciprocal of the focal distance is referred to as a threshold value $T_{blur}$ serving as the upper limit of exposure times that do not result in a blurring portion caused by hand trembling on taken images. Thus, since an output image generated from such taken images also does not include a blurring portion caused by hand trembling, a proper output image can be obtained. In the following description, a condition requiring that the exposure time for obtaining a single taken image be equal to or shorter than the threshold value $T_{blur}$ is appropriately referred to as a first condition for obtaining a proper output image.

By setting the threshold value $T_{blur}$ at the reciprocal of the focal distance of a lens employed in the 35 mm camera taken as a model in the computation of the exposure time as described above, in an actual photographing operation, it is possible to determine whether or not an image without an effect of hand trembling can be obtained without checking whether or not hand trembling actually occurs (or whether or not actually occurring hand trembling is within a range of tolerance). To put it concretely, if a single taken image is obtained at an exposure time longer than the threshold value $T_{blur}$ set as described above, that is, if a single taken image is obtained at a relatively low shutter speed, it is possible to determine that an output image generated from the taken image will include a blurring portion caused by hand trembling. If a single taken image is obtained at an exposure time shorter than the threshold value $T_{blur}$ set as described above, that is, if a single taken image is obtained at a relatively high shutter speed, on the other hand, it is possible to determine that an output image generated from the taken image will include no blurring portion caused by hand trembling.

It is to be noted that, since the degree of hand trembling varies from person to person, the input device 16 may be provided with a button for changing the magnitude of the threshold value $T_{blur}$. Thus, the photographer may operate this button to change the magnitude of the threshold value $T_{blur}$ to a value according to the operation carried out by the photographer. In addition, as described earlier, the input device 16 also provides the control circuit 18 with information on a focal distance set by an operation carried out on a zoom button employed in the input device 16. By using the information on a focal distance, the control circuit 18 carries out processes such conversion into a 35 mm camera used as a model in computation of an exposure time and calculation of the reciprocal of the focal distance.

If each of taken images obtained consecutively in the second, third, or fourth photographing processing carried out in the hand-trembling correction photographing mode is extremely too dark so that the photographing object on the taken images is unavoidably buried under noises, an output image generated from such taken images in image generation processing will also be inevitably dark and buried under noises. Thus, it is not possible to obtain a proper output image or a sharp output image including no blurring portion caused by hand trembling.

Thus, in order to obtain a proper output image, each of a plurality of taken images obtained consecutively must not be such too dark that the photographing object is buried under noises.

In order to obtain taken images that are not such too dark, as described earlier, $1/M_{max}$ of the brightness of a single taken image obtained at the proper exposure time $T_p$ is used as the upper limit of darkness levels causing such a too dark image that the photographing object on the image is unavoidably buried under noises. By setting the upper limit of darkness levels at $1/M_{max}$ of the brightness of a single taken image in this way, if the exposure time of a taken image is at least equal to the $1/M_{max}$ of the proper exposure time $T_p$, a taken image obtained at the exposure time will never become such too dark that the photographing object on the taken image is unavoidably buried under noises.

As described above, if the exposure time of a taken image is at least equal to the value of $T_p/M_{max}$ computed as a product resulting from multiplication of the proper exposure time $T_p$ by $1/M_{max}$ representing the upper limit of darkness levels, a taken image obtained at the exposure time will never become such too dark that the photographing object on the taken image is unavoidably buried under noises. In the following description, a condition requiring that the exposure time for obtaining a taken image be equal to or longer than the value of $T_p/M_{max}$ computed as a product resulting from multiplication of the proper exposure time $T_p$ by $1/M_{max}$ representing the upper limit of darkness levels is appropriately referred to as a second condition for obtaining a proper output image.

Next, a shortest period of time from the start of a process carried out by the image-pickup device 4 to output a taken image to the end of the operation is referred to as an output minimum time. That is to say, the image-pickup interval of the highest-speed continuous image-pickup time of the image-pickup device 4 is referred to as an output minimum time. In this case, if the exposure time of each of taken images obtained consecutively in the second, third, or fourth photographing processing carried out in the hand-trembling correction photographing mode at a high speed is shorter than the output minimum time, that is, if the exposure time of a taken image is shorter than the output minimum time, a blanking period is generated in the high-speed image-pickup process to obtain a plurality of taken images. A blanking period is a period between the end of an exposure for obtaining a specific taken image and the beginning of an exposure for obtaining a taken image immediately following the specific taken image. During a blanking period, there is no image-pickup (or exposure) process.

Details of an effect of a blanking period on an output image will be explained later. In a few words, if a blanking period is generated and the object of photographing moves, the movement of the photographing object during the blanking period is not reflected on the output image. Thus, an output image is generated as an unnatural image showing a discontinuous movement of the photographing object. As a result, a proper output image or a sharp image including no blurring portion caused by hand trembling cannot be generated.

Thus, in order to obtain a proper output image, the exposure time for obtaining a taken image in a high-speed image-pickup process must be at least equal to the output minimum time. In the following description, a condition requiring that the exposure time for obtaining a taken image be at least equal to the output minimum time is appropriately referred to as a third condition for obtaining a proper output image.

It is to be noted that, if the binning function is not executed, the output minimum time is equal to the aforementioned continuous image-pickup interval limit to of the image-pickup device 4. If the 2×2 binning function is executed in the image-pickup device 4, the output minimum time is equal $t_0/4$ and, if the 3×3 binning function is executed in the image-pickup device 4, the output minimum time is equal $t_0/9$.

Figure 46:
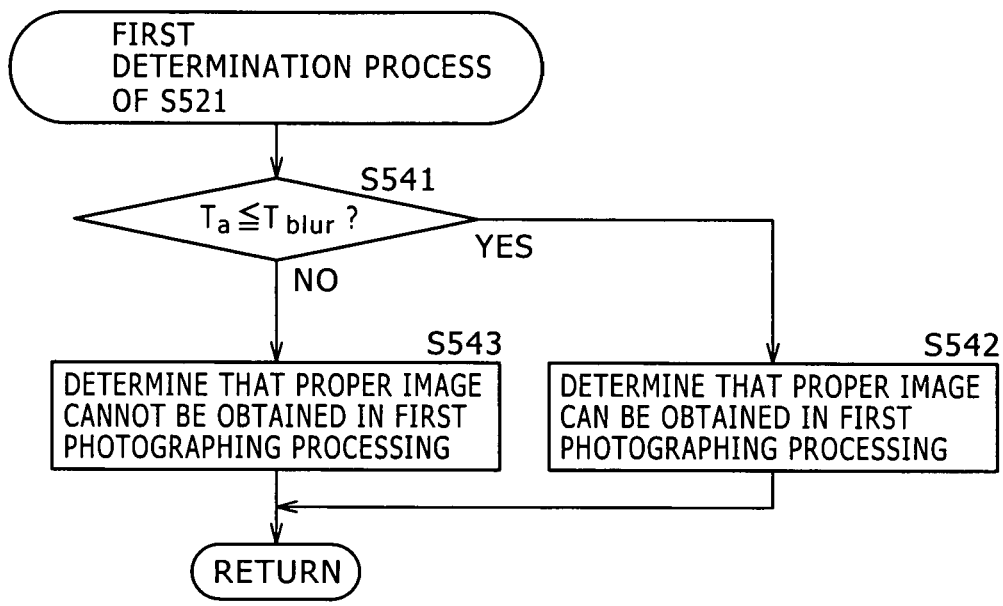
FIG. 46 shows a flowchart referred to in explanation of first determination processing.

Next, by referring to a flowchart shown in FIG. 46, the following description explains the first determination processing carried out at the step S521 of the flowchart shown in FIG. 45 to produce a result of determination as to whether or not a proper output image can be obtained by execution of the first photographing processing. It is to be noted that the control circuit 18 controls the execution of the first photographing processing.

The flowchart shown in FIG. 46 begins with a step S541 at which the control circuit 18 produces a result of determination as to whether or not the first condition is satisfied, that is, whether or not the actual exposure time $T_a$ is equal to or shorter than the threshold value $T_{blur}$. In this case, the actual exposure time $T_a$ has been determined at the step S502 of the flowchart shown in FIG. 44. On the other hand, the threshold value $T_{blur}$ is a quantity found by the control circuit 18 from information on a focal distance as described earlier.

If the determination result produced at the step S541 indicates that the actual exposure time $T_a$ is equal to or shorter than the threshold value $T_{blur}$, the flow of the first determination processing goes on to a step S542 at which the control circuit 18 produces a determination result of the first determination photographing as a result indicating that a proper output image can be obtained by execution of the first photographing processing. Finally, control of the processing execution is returned to the calling program.

If the determination result produced at the step S541 indicates that the actual exposure time $T_a$ is longer than the threshold value $T_{blur}$, on the other hand, the flow of the first determination processing goes on to a step S543 at which the control circuit 18 produces a determination result of the first determination photographing as a result indicating that a proper output image cannot be obtained by execution of the first photographing processing. Finally, control of the processing execution is returned to the calling program.

If the actual exposure time $T_a$ is equal to or shorter than the threshold value $T_{blur}$, an image-pickup process carried out at the actual exposure time $T_a$ seconds will result in a taken image including no blurring portion caused by hand trembling and, thus, a sharp output image can be generated from such a taken image. Conversely speaking, if the actual exposure time $T_a$ is longer than the threshold value $T_{blur}$, on the other hand, a taken image obtained at such a long exposure time may include blurring portions each caused by hand trembling. Thus, it is quite within the bounds of possibility that a sharp output image cannot be generated from such a taken image.

Figure 47:
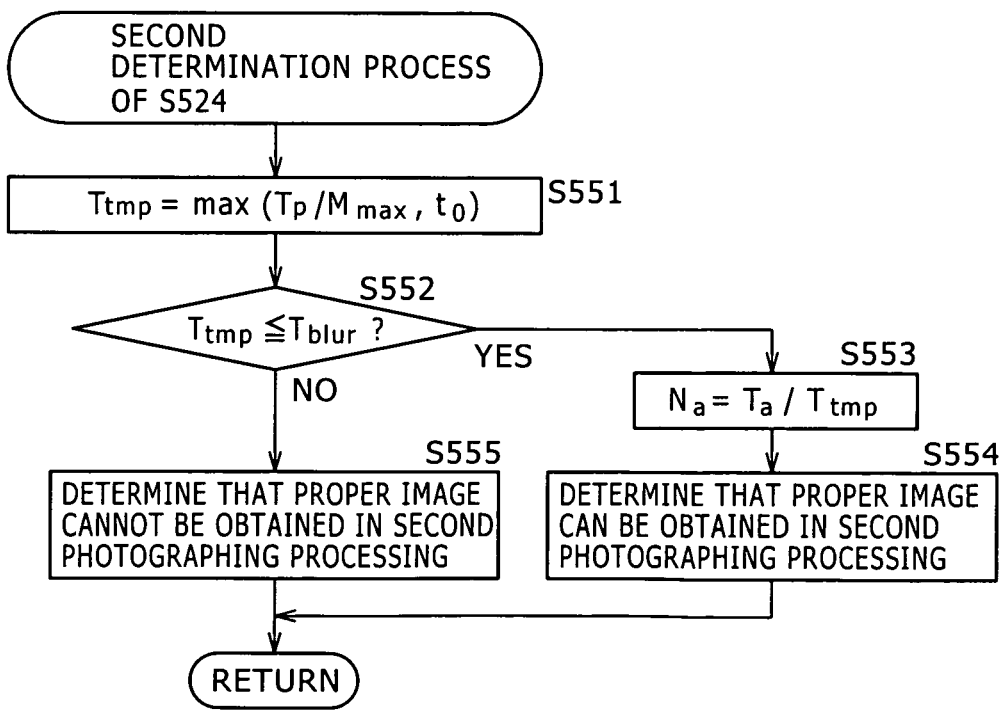
FIG. 47 shows a flowchart referred to in explanation of second determination processing.

Next, by referring to a flowchart shown in FIG. 47, the following description explains the second determination processing carried out at the step S524 of the flowchart shown in FIG. 45 to produce a result of determination as to whether or not a proper output image can be obtained from a plurality of taken images obtained by carrying out the second photographing processing without execution of a binning function. It is to be noted that the control circuit 18 controls the execution of the second photographing processing.

The flowchart shown in FIG. 47 begins with a step S551 at which the control circuit 18 uses the larger one of two threshold values, i.e., the threshold value $T_p/M_{max}$ and the threshold value $t_0$, as an exposure time $T_{tmp}$ for obtaining a taken image in an image-pickup process carried out at a high speed. The threshold value $T_p/M_{max}$ is a value computed as a product resulting from multiplication of the proper exposure time $T_p$ by $1/M_{max}$ representing the upper limit of darkness levels. On the other hand, the threshold value $t_0$ is equal to the output minimum time for a case in which no binning function is executed. The threshold value $t_0$ is a threshold value of image-pickup intervals of a continuous image-pickup process carried out at a highest speed. It is to be noted that, as described earlier, the value of $1/M_{max}$ representing the upper limit of darkness levels is a value determined in accordance with the performance of the digital camera 1 as a value for finding the threshold value $T_p/M_{max}$. By the same token, the threshold value $t_0$ representing the limit of image-pickup intervals of a continuous image-pickup process carried out at a highest speed is also a value determined in accordance with the performance of the digital camera 1. It is assumed that the control circuit 18 has recognized the value of $1/M_{max}$ and the threshold value $t_0$. The proper exposure time $T_p$ for finding the threshold value $T_p/M_{max}$ has been found at the step S505 of the flowchart shown in FIG. 44.

By setting the exposure time $T_{tmp}$ for obtaining a taken image in an image-pickup process carried out at a high speed at the larger one of the two threshold values, i.e., the threshold value $T_p/M_{max}$ and the threshold value to, the exposure time $T_{tmp}$ satisfies the second and third conditions simultaneously. As described above, the second condition is a condition requiring that the exposure time $T_{tmp}$ for obtaining a taken image be equal to or longer than the value of $T_p/M_{max}$. On the other hand, the third condition is a condition requiring that the exposure time $T_{tmp}$ for obtaining a taken image be at least equal to the output minimum time $t_0$. That is to say, in this case, the second condition is expressed by the relation $T_{tmp} \geq T_p/M_{max}$ whereas the third condition is expressed by the relation $T_{tmp} \geq t_0$.

Let us assume for example that the relation $t_0 < T_p/M_{max}$ holds true. In this case, at the step S551, the exposure time $T_{tmp}$ is set at the value of $T_p/M_{max}$ or $T_{tmp} T_p/M_{max}$. Thus, the exposure time $T_{tmp}$ simultaneously satisfies the relation $T_{tmp} \leq T_p/M_{max}$ expressing the second condition and the relation $T_{tmp} \geq t_0$ expressing the third condition. If the relation $T_p/M_{max} < t_0$ holds true, on the other hand, at the step S551, the exposure time $T_{tmp}$ is set at the value of $T_0$ or $T_{tmp} = T_0$. Thus, the exposure time $T_{tmp}$ also simultaneously satisfies the relation $T_{tmp} \geq T_p/M_{max}$ expressing the second condition and the relation $T_{tmp} \geq t_0$ expressing the third condition.

After the process of the step S551 is completed, the flow of the second determination processing goes on to the next step S552 at which the control circuit 18 produces a result of determination as to whether or not the exposure time $T_{tmp}$ is equal to or shorter than the threshold value $T_{blur}$. The fact that the exposure time $T_{tmp}$ is equal to or shorter than the threshold value $T_{blur}$ indicates that, for the exposure time $T_{tmp}$, the first condition is satisfied. The fact that the exposure time $T_{tmp}$ is neither equal to nor shorter than the threshold value $T_{blur}$ indicates that, for the exposure time $T_{tmp}$, the first condition is not satisfied.

It is to be noted that, in this case, at the step S551, the exposure time $T_{tmp}$ has been set at the larger one of two threshold values, i.e., the threshold value $T_p/M_{max}$ and the threshold value $t_0$. That is to say, the exposure time $T_{tmp}$ has been set at a minimum value satisfying both the second and third conditions. Then, at the step S552, the exposure time $T_{tmp}$ is examined to produce a result of determination as to whether or not the exposure time $T_{tmp}$ is equal to or shorter than the threshold value $T_{blur}$, that is, whether or not the exposure time $T_{tmp}$ satisfies the relation $T_{tmp} \leq T_{blur}$ expressing the first condition. The fact that the exposure time $T_{tmp}$ set at the step S551 does not satisfy the first condition indicates that, if a smaller exposure time $T_{tmp}$ is used as a value satisfying the first condition, the smaller exposure time $T_{tmp}$ will definitely not satisfy the second or third condition. Thus, with the exposure time $T_{tmp}$ set at the step S551 at the larger one of two threshold values, i.e., the threshold value $T_p/M_{max}$ and the threshold value $t_0$, the process carried out at the step S552 following the step S551 to produce a result of determination as to whether or not the exposure time $T_{tmp}$ satisfies the relation $T_{tmp} \leq T_{blur}$ expressing the first condition can be seen from another point of view as a process equivalent to a process to produce a result of determination as to whether or not the exposure time $T_{tmp}$ satisfying the first condition also satisfies the second and third conditions as well.

If the determination result produced at the step S552 indicates that the exposure time $T_{tmp}$ is equal to or shorter than the threshold value $T_{blur}$, the flow of the second determination processing goes on to a step S553 at which the control circuit 18 computes a taken-image count $N_a$ of the second photographing processing by dividing the actual exposure time $T_a$ by the exposure time $T_{tmp}$ of one taken image. That is to say, the control circuit 18 computes the value of $N_a$ as a quotient $T_a/T_{tmp}$. The taken-image count $N_a$ represents the number of taken images obtained in a high-speed image-pickup process of the second photographing processing. The actual exposure time $T_a$ is the exposure time of photographing processing carried out in the ordinary photographing mode. In other words, the taken-image count $N_a$ satisfying the relation $N_a = T_a/T_{tmp}$ is determined by using the exposure time $T_{tmp}$ set at the step S551 and found at the step S552 to be an exposure time satisfying the first to third conditions. Thus, the exposure time $T_{tmp}$ of each of the $N_a$ taken images obtained at a high image-pickup speed in the second photographing processing can be expressed by a quotient $T_a/N_a$, which satisfies the first to third conditions.

That is to say, the taken-image count $N_a$ has a value varying in accordance with the exposure time $T_a$ in this way. It is to be noted that the taken-image count $N_a$ is obtained as a result of a division operation by typically truncating the fraction part following the decimal point of the result.

After the process of the step S553 is completed, the flow of the second determination processing goes on to a step S554 at which the control circuit 18 produces a determination result of the second determination photographing as a result indicating that a proper output image can be obtained by execution of the second photographing processing. Finally, control of the processing execution is returned to the calling program.

If the determination result produced at the step S552 indicates that the exposure time $T_{tmp}$ is longer than the threshold value $T_{blur}$, on the other hand, the flow of the second determination processing goes on to a step S555 at which the control circuit 18 produces a determination result of the second determination photographing as a result indicating that a proper output image cannot be obtained by execution of the second photographing processing. Finally, control of the processing execution is returned to the calling program.

Figure 48:
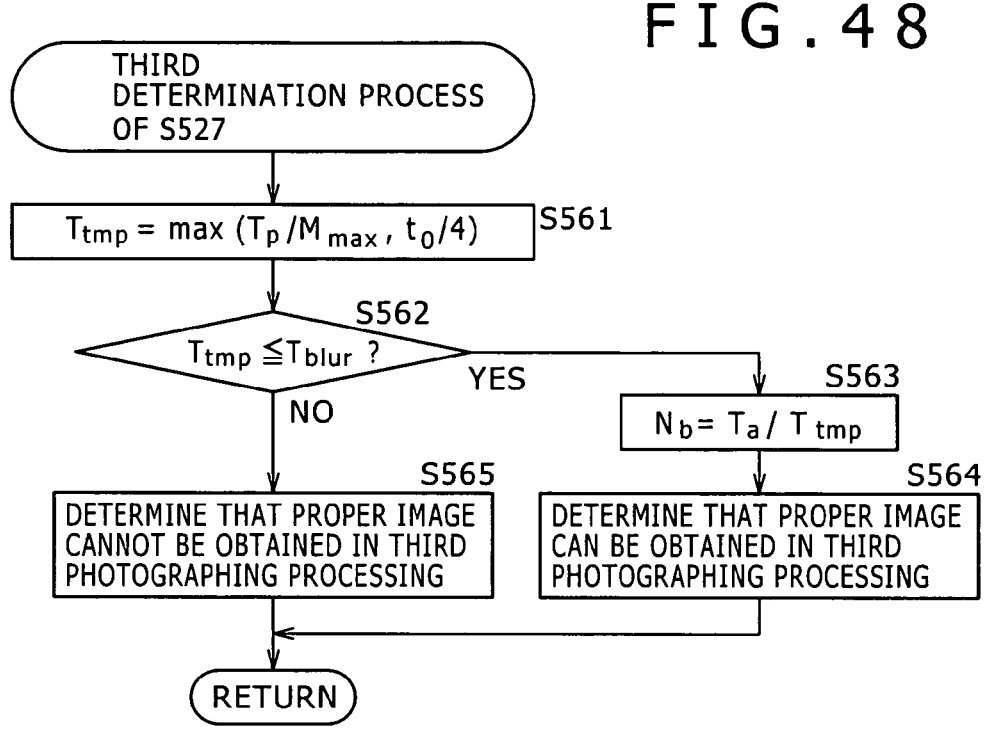
FIG. 48 shows a flowchart referred to in explanation of third determination processing.

Next, by referring to a flowchart shown in FIG. 48, the following description explains the third determination processing carried out at the step S527 of the flowchart shown in FIG. 45 to produce a result of determination as to whether or not a proper output image can be obtained from a plurality of taken images obtained by carrying out the third photographing processing with execution of the 2×2 binning function. It is to be noted that the control circuit 18 controls the execution of the third photographing processing.

The flowchart shown in FIG. 48 begins with a step S561 at which the control circuit 18 uses the larger one of 2 threshold values, i.e., the threshold value $T_p/M_{max}$ and the threshold value $t_0/4$, as an exposure time $T_{tmp}$ for obtaining a taken image in an image-pickup process carried out at a high speed. The threshold value $T_p/M_{max}$ is a value computed as a product resulting from multiplication of the proper exposure time $T_p$ by $1/M_{max}$ representing the upper limit of darkness levels. On the other hand, the threshold value $t_0/4$ is equal to the output minimum time for a case in which the 2×2 binning function is executed. It is to be noted that, as described earlier, the value of $1/M_{max}$ representing the upper limit of darkness levels is a value determined in accordance with the performance of the digital camera 1 as a value for finding the threshold value $T_p/M_{max}$. By the same token, the threshold value $t_0$ representing the limit of image-pickup intervals of a continuous image-pickup process carried out at a highest speed is also a value determined in accordance with the performance of the digital camera 1. It is assumed that the control circuit 18 has recognized the value of $1/M_{max}$ and the threshold value $t_0$. The proper exposure time $T_p$ for finding the threshold value $T_p/M_{max}$ has been found at the step S505 of the flowchart shown in FIG. 44.

After the process of the step S561 is completed, the flow of the second determination processing goes on to the next step S562 at which the control circuit 18 produces a result of determination as to whether or not the exposure time $T_{tmp}$ is equal to or shorter than the threshold value $T_{blur}$.

An exposure time $T_{tmp}$ not exceeding the threshold value $T_{blur}$ satisfies the first condition applied to the exposure time $T_{tmp}$. On the other hand, an exposure time $T_{tmp}$ exceeding the threshold value $T_{blur}$ does not satisfy the first condition applied to the exposure time $T_{tmp}$.

With the exposure time $T_{tmp}$ set at the step S561 at the larger one of two threshold values, i.e., the threshold value $T_p/M_{max}$ and the threshold value $t_0/4$, the process carried out at the step S562 following the step S561 to produce a result of determination as to whether or not the exposure time $T_{tmp}$ satisfies the relation $T_{tmp} \leq T_{blur}$ expressing the first condition can be regarded as a process said to be equivalent to a process to produce a result of determination as to whether or not the exposure time $T_{tmp}$ satisfying the first condition also satisfies the second and third conditions as well, as is the case with the second determination processing represented by the flowchart shown in FIG. 47.

If the determination result produced at the step S562 indicates that the exposure time $T_{tmp}$ is equal to or shorter than the threshold value $T_{blur}$, the flow of the third determination processing goes on to a step S563 at which the control circuit 18 computes a taken-image count $N_b$ of the third photographing processing by dividing the actual exposure time $T_a$ by the exposure time $T_{tmp}$ of one taken image. That is to say, the control circuit 18 computes the value of $N_b$ as a quotient $T_a/T_{tmp}$. The taken-image count $N_b$ represents the number of taken images obtained in a high-speed image-pickup process of the third photographing processing. In other words, the taken-image count $N_b$ satisfying the relation $N_b = T_a/T_{tmp}$ is determined by using the exposure time $T_{tmp}$ set at the step S561 and found at the step S562 to be an exposure time satisfying the first to third conditions. Thus, the exposure time $T_{tmp}$ of each of the $N_b$ taken images obtained at a high image-pickup speed in the third photographing processing can be expressed by a quotient $T_a/N_b$, which satisfies the first to third conditions. That is to say, the taken-image count $N_b$ has a value varying in accordance with the exposure time $T_a$ in this way. It is to be noted that the taken-image count $N_b$ is obtained as a result of a division operation by typically truncating the fraction part following the decimal point of the result.

After the process of the step S563 is completed, the flow of the second determination processing goes on to a step S564 at which the control circuit 18 produces a determination result of the third determination photographing as a result indicating that a proper output image can be obtained by execution of the third photographing processing. Finally, control of the processing execution is returned to the calling program.

If the determination result produced at the step S562 indicates that the exposure time $T_{tmp}$ is longer than the threshold value $T_{blur}$, on the other hand, the flow of the third determination processing goes on to a step S565 at which the control circuit 18 produces a determination result of the third determination photographing as a result indicating that a proper output image cannot be obtained by execution of the third photographing processing. Finally, control of the processing execution is returned to the calling program.

Figure 49:
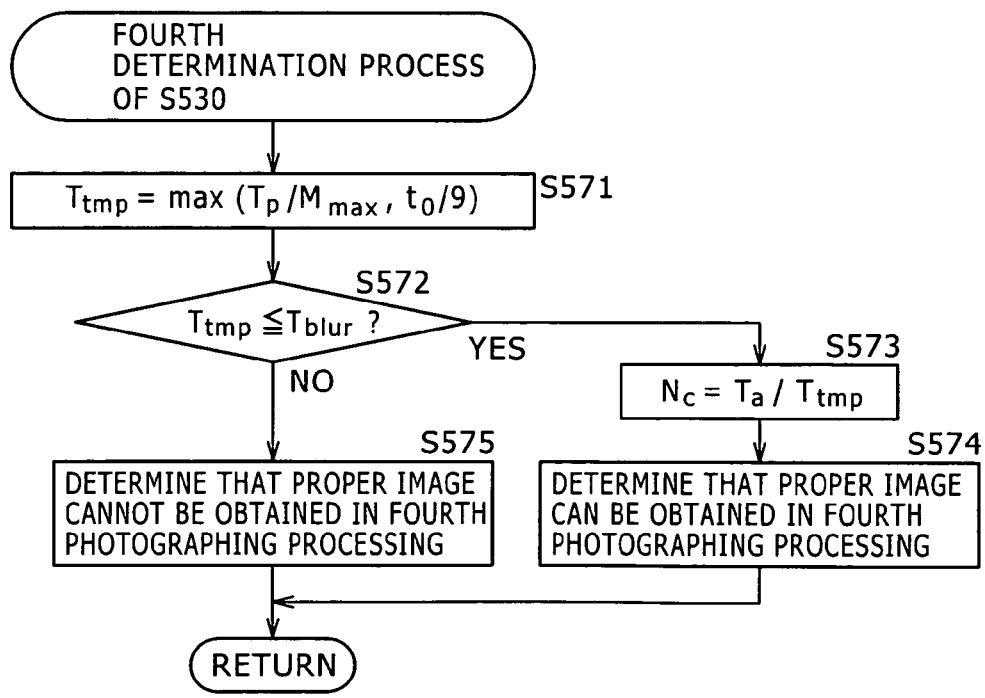
FIG. 49 shows a flowchart referred to in explanation of fourth determination processing.

Next, by referring to a flowchart shown in FIG. 49, the following description explains the fourth determination processing carried out at the step S530 of the flowchart shown in FIG. 45 to produce a result of determination as to whether or not a proper output image can be obtained from a plurality of taken images obtained by carrying out the fourth photographing processing with execution of the 3×3 binning function. It is to be noted that the control circuit 18 controls the execution of the fourth photographing processing.

The flowchart shown in FIG. 49 begins with a step S571 at which the control circuit 18 uses the larger one of two threshold values, i.e., the threshold value $T_p/M_{max}$ and the threshold value $t_0/9$, as an exposure time $T_{tmp}$ for obtaining a taken image in an image-pickup process carried out at a high speed.

The threshold value $T_p/M_{max}$ is a value computed as a product resulting from multiplication of the proper exposure time $T_p$ by $1/M_{max}$ representing the upper limit of darkness levels. On the other hand, the threshold value $t_0/9$ is equal to the output minimum time for a case in which the $3X_3$ binning function is executed. It is to be noted that, as described earlier, the value of $1/M_{max}$ representing the upper limit of darkness levels is a value determined in accordance with the performance of the digital camera 1 as a value for finding the threshold value $T_p/M_{max}$. By the same token, the threshold value $t_0$ representing the limit of image-pickup intervals of a continuous image-pickup process carried out at a highest speed is also a value determined in accordance with the performance of the digital camera 1. It is assumed that the control circuit 18 has recognized the value of $1/M_{max}$ and the threshold value $t_0$. The proper exposure time $T_p$ for finding the threshold value $T_p/M_{max}$ has been found at the step S505 of the flowchart shown in FIG. 44.

After the process of the step S571 is completed, the flow of the second determination processing goes on to the next step S572 at which the control circuit 18 produces a result of determination as to whether or not the exposure time $T_{tmp}$ is equal to or shorter than the threshold value $T_{blur}$.

An exposure time $T_{tmp}$ not exceeding the threshold value $T_{blur}$ satisfies the first condition applied to the exposure time $T_{tmp}$. On the other hand, an exposure time $T_{tmp}$ exceeding the threshold value $T_{blur}$ does not satisfy the first condition applied to the exposure time $T_{tmp}$.

With the exposure time $T_{tmp}$ set at the step S571 at the larger one of two threshold values, i.e., the threshold value $T_p/M_{max}$ and the threshold value $t_0/9$, the process carried out at the step S572 following the step S571 to produce a result of determination as to whether or not the exposure time $T_{tmp}$ satisfies the first condition can be regarded as a process said to be equivalent to a process to produce a result of determination as to whether or not the exposure time $T_{tmp}$ satisfying the first condition also satisfies the second and third conditions as well as is the case with the second determination processing represented by the flowchart shown in FIG. 47.

If the determination result produced at the step S572 indicates that the exposure time $T_{tmp}$ is equal to or shorter than the threshold value $T_{blur}$, the flow of the fourth determination processing goes on to a step S573 at which the control circuit 18 computes a taken-image count $N_c$ of the fourth photographing processing by dividing the actual exposure time $T_a$ by the exposure time $T_{tmp}$ of one taken image. That is to say, the control circuit 18 computes the value of $N_c$ as a quotient $T_a/T_{tmp}$. The taken-image count $N_c$ represents the number of taken images obtained in a high-speed image-pickup process of the fourth photographing processing. In other words, the taken-image count $N_c$ satisfying the relation $N_c = T_a/T_{tmp}$ is determined by using the exposure time $T_{tmp}$ set at the step S571 and found at the step S572 to be an exposure time satisfying the first to third conditions. Thus, the exposure time $T_{tmp}$ of each of the $N_c$ taken images obtained at a high image-pickup speed in the fourth photographing processing can be expressed by a quotient $T_a/N_c$, which satisfies the first to third conditions. That is to say, the taken-image count $N_c$ has a value varying in accordance with the exposure time $T_a$ in this way. It is to be noted that the taken-image count $N_c$ is obtained as a result of a division operation by typically truncating the fraction part following the decimal point of the result.

After the process of the step S573 is completed, the flow of the second determination processing goes on to a step S574 at which the control circuit 18 produces a determination result of the fourth determination photographing as a result indicating that a proper output image can be obtained by execution of the fourth photographing processing. Finally, control of the processing execution is returned to the calling program.

If the determination result produced at the step S572 indicates that the exposure time $T_{tmp}$ is longer than the threshold value $T_{blur}$, on the other hand, the flow of the fourth determination processing goes on to a step S575 at which the control circuit 18 produces a determination result of the fourth determination photographing as a result indicating that a proper output image cannot be obtained by execution of the fourth photographing processing. Finally, control of the processing execution is returned to the calling program.

At the step S506 of the flowchart shown in FIG. 44, on the basis of the result of one of the first, second, third, and the fourth determination processings, which are explained earlier by referring to the flowcharts shown in FIGS. 46 to 49 respectively, the control circuit 18 carries out the photographing-mode determination processing to make a decision as to which of the first, second, third, and the fourth photographing processings are to be carried out as photographing processings that can be performed to generate a sharp output image.

The first to third conditions are explained more as follows.

First of all, if the exposure time $T_{tmp}$ (which can be $T_a$, $T_a/N_a$, $T_a/N_b$ or $T_a/N_c$) of one taken image satisfies the first condition, that is, if the relation $T_{tmp} \leq T_{blur}$ holds true, even though each taken image obtained as a result of an image-pickup process carried out at a high speed becomes a dark image or an image of an under-brightness exposure, it is possible to obtain taken images each having no effects of hand trembling. As a result, a sharp output image can be generated from such taken images.

That is to say, if a taken image includes a blurring portion caused by hand trembling, an output image generated from such a taken image also inevitably includes a blurring portion caused by hand trembling. If the first condition is satisfied, however, a taken image does not include a blurring portion caused by hand trembling. Thus, an output image generated from such a taken image also does not include a blurring portion caused by hand trembling.

In other words, by determining whether or not the exposure time $T_{tmp}$ is equal to or shorter than the threshold value $T_{blur}$ serving as an upper limit of exposure times causing no effects of hand trembling, it is possible to select (or make a decision to carry out) photographing processing capable of obtaining a taken image without an effect of hand trembling. As described above, the exposure time $T_{tmp}$ can be the actual exposure time $T_a$ of a taken image obtained on the assumption that the first photographing processing is carried out, the actual exposure time $T_a/N_a$ of each of $N_a$ taken images obtained on the assumption that the second photographing processing is carried out, the actual exposure time $T_a/N_b$ of each of $N_b$ taken images obtained on the assumption that the third photographing processing is carried out or the actual exposure time $T_a/N_c$ of each of $N_c$ taken images obtained on the assumption that the fourth photographing processing is carried out.

Then, if the exposure time $T_{tmp}$ (which can be $T_a/N_a$, $T_a/N_b$ or $T_a/N_c$) of each taken image satisfies the second condition, that is, if the relation $T_{tmp} \geq T_p/M_{max}$ holds true, even though each taken image obtained as a result of an image-pickup process carried out at a high speed becomes a dark image or an image of an under-brightness exposure, it is possible to obtain taken images, which are each not so dark that the image is buried under noises. As a result, a sharp output image can be generated from such taken images.

That is to say, if each taken image is extremely too dark, the pixel values of the taken image are unavoidably buried under noises so that an output image generated from such taken images also inevitably becomes an image with many noises. If the second condition is satisfied, however, each taken image becomes an image, which is not too dark so that a sharp output image can be generated from such taken images.

In other words, by determining whether or not the exposure time $T_{tmp}$ is equal to or longer than the threshold value $T_p/M_{max}$ computed as a product resulting from multiplication of the proper exposure time $T_p$ by $1/M_{max}$, it is possible to select (or make a decision to carry out) photographing processing capable of obtaining a taken image, which is not too dark. The threshold value $T_p/M_{max}$ is a lower limit of exposure times not causing an image to be buried under noises. By definition, the threshold value $T_p/M_{max}$ is an exposure time generating an image with a brightness level equal to $1/M_{max}$ of the brightness level of an image taken at the proper exposure time $T_p$. As described above, the exposure time $T_{tmp}$ can be the actual exposure time $T_a/N_a$ of each of $N_a$ taken images obtained on the assumption that the second photographing processing is carried out, the actual exposure time $T_a/N_b$ of each of $N_b$ taken images obtained on the assumption that the third photographing processing is carried out or the actual exposure time $T_a/N_c$ of each of $N_c$ taken images obtained on the assumption that the fourth photographing processing is carried out.

If the relation $T_a/N_a \geq t_0$, $T_a/N_b \geq t_0/4$ or $T_a/N_c \geq t_0/9$ used as the third condition holds true, a blanking period can be prevented from resulting during an image-pickup process carried out at a high speed. Thus, a proper (or natural) output image can be generated.

That is to say, if the exposure time $T_{tmp}$ of each taken image obtained in an image-pickup process carried out at a high speed exceeds the output minimum time, a blanking period is generated. As described above, the exposure time $T_{tmp}$ can be $T_a/N_a$, $T_a/N_b$ or $T_a/N_c$. The output minimum time is a shortest period of time during which the image-pickup device 4 is capable of outputting a taken image. A blanking period is a period between the end of an exposure for obtaining a specific taken image and the beginning of an exposure for obtaining a taken image immediately following the specific taken image. During a blanking period, there is no image-pickup process. To put it concretely, if the image-pickup device 4 does not execute a binning function, a blanking period of $\{t_0 - (T_a/N_a)\}$ seconds is generated. If the image-pickup device 4 executes the 2×2 binning function, a blanking period of $\{t_0/4 - (T_a/N_b)\}$ seconds is generated. If the image-pickup device 4 executes the 3×3 binning function, a blanking period of $\{t_0/9 - (T_a/N_c)\}$ seconds is generated. If the object of the photographing is moving, the movement made by the object of the photographing during a blanking period is not reflected on the taken image at all. Thus, if an output image is generated from such a taken image, the output image inevitably becomes an image with discontinuities. By enforcing the third condition, however, a proper output image displaying continuities can be generated.

That is to say, by verifying that the exposure time $T_a/N_a$ is at least equal to, verifying that the exposure time $T_a/N_b$ is at least equal $t_0/4$ or verifying that the exposure time $T_a/N_c$ is at least equal $t_0/9$, it is possible to select (or make a decision to carry out) photographing processing, that generates no blanking period in an image-pickup process carried out at a high speed and is capable of generating a proper output image. As described earlier, the exposure time $T_a/N_a$ is the exposure time of each of $N_a$ taken images obtained on the assumption that the second photographing processing is carried out. Likewise, the actual exposure time $T_a/N_b$ is the exposure time of each of $N_b$ taken images obtained on the assumption that the third photographing processing is carried out. Similarly, the actual exposure time $T_a/N_c$ is the exposure time of each of $N_c$ taken images obtained on the assumption that the fourth photographing processing is carried out. On the other hand, notation to denotes the continuous image-pickup interval limit of the image-pickup device 4.

Effects of a blanking period on an output image are explained by referring to FIG. 50 as follows.

FIG. 50 is a diagram showing a case in which an output image is generated from four taken images each obtained as a result of an image-pickup process carried out at a high speed at an exposure time $T_{tmp}$ ($=T_a/4$) as a process to take a picture of a photographing object moving at a constant velocity V in the vertical direction (or the downward direction). It is to be noted that time denotes the start time of the image-pickup process carried out at a high speed and position 0 denotes the position of the photographing object at time 0. In this case, the position of the photographing object at time t can be expressed by the expression t×V.

Let us assume for example that a picture of the photographing object moving at the constant speed V as described above is taken at an exposure time $T_a$, and one taken image obtained as a result of the image-pickup process is generated as the output image. In this case, the image of the photographing object is taken to produce a taken image and an output image in the form including a blurring portion (or, strictly speaking, a movement-blurring portion) in a range from position 0 to position $T_a×V$. When a picture of the photographing object moving at the constant speed V is taken as described above, the picture of the photographing object becomes an image, which blurs due to the movement, providing the so-called impression of an object pulling a tail in accordance with expectation of the photographer. Such movement-blurring has a property different from that of blurring caused by hand trembling.

In FIG. 50, taken images 500$_A$ to 500$_D$ are four taken images obtained in a state with no blanking period generated or a state of satisfying the third condition and an output image 500$_E$ is an output image generated by carrying out image generation processing using the taken images 500$_A$ to 500$_D$ On the other hand, taken images 501$_A$ to 501$_D$ are four taken images obtained in a state with a generated blanking period 6 or a state of dissatisfying the third condition and an output image 501$_E$ is an output image generated by carrying out image generation processing using the taken images 501$_A$ to 501$_D$.

First of all, a case with no blanking period generated is taken into consideration. The first taken image 500$_A$ is obtained with an exposure time from time $t_0$ to time $T_a/4$ and the second taken image 500$_B$ is obtained with an exposure time from time $T_a/4$ to time $2×T_a/4$. Then, the third taken image 500$_C$ is obtained with an exposure time from time $2×T_a/4$ to time $3×T_a/4$ and the fourth taken image 500$_D$ is obtained with an exposure time from time $3×T_a/4$ to time $T_a$.

On each of the taken images 500$_A$ to 500$_D$ obtained by carrying out such a continuous image-pickup process, a moving photographing object generates a movement-blurring portion providing the impression of an object pulling a tail as indicated by a thick line shown in FIG. 50. To be more specific, on the taken image 500$_A$ shown in FIG. 50, the image of the moving photographing object is taken in the form of a movement-blurring portion in a range from position 0 to position $T_a×V/4$. On the taken image 500$_B$, the image of the moving photographing object is taken in the form of a movement-blurring portion in a range from position $T_a×V/4$ to position $2×T_a×V/4$. On the taken image 500$_C$, the image of the moving photographing object is taken in the form of a movement-blurring portion in a range from position $2×T_a×$ V/4 to position $3×T_a×V/4$. On the taken image 500$_D$, the image of the moving photographing object is taken in the form of a movement-blurring portion in a range from position $3×T_a×V/4$ to position $T_a×V$.

On the output image 500$_E$ generated from these taken images 500$_A$ to 500$_D$, the image of the moving photographing object is taken in the form of a continuous movement-blurring portion in a range from position 0 to position $T_a×V$. An output image including a movement-blurring portion providing the impression of an object pulling a tail as described above is generated in accordance with expectation of the photographer.

Next, a case with a generated blanking period δ is taken into consideration. The first taken image 501$_A$ is obtained with an exposure time from time $t_0$ time $T_a/4$. Subsequently, the second taken image 501$_B$ is obtained with an exposure time from time $T_a/4+δ$ to time $2×T_a/4+δ$ because the blanking period δ is generated between the end of the exposure time of the first taken image 501$_A$ and the beginning of the exposure time of the second taken image 501$_B$. Then, the third taken image 501$_C$ is obtained with an exposure time from time $2×T_a/4+2×δ$ to time $3×T_a/4+2×δ$ because the blanking period δ is generated between the end of the exposure time of the second taken image 501$_B$ and the beginning of the exposure time of the third taken image 501$_C$. Finally, the fourth taken image 501$_D$ is obtained with an exposure time from time $3×T_a/4+3×δ$ to time $T_a+3×δ$ because the blanking period δ is generated between the end of the exposure time of the third taken image 501$_C$ and the beginning of the exposure time of the fourth taken image 501$_D$.

On each of the taken images 501$_A$ to 501$_D$ obtained by carrying out such a continuous image-pickup process, a moving photographing object generates a movement-blurring portion providing the impression of an object pulling a tail as indicated by a thick line shown in FIG. 50. To be more specific, on the taken image 501$_A$ shown in FIG. 50, the image of the moving photographing object is taken in the form of a movement-blurring portion in a range from position 0 to position $T_a×V/4$. On the taken image 501$_B$, the image of the moving photographing object is taken in the form of a movement-blurring portion in a range from position $(T_a/4+δ)×V$ to position $(2×T_a/4+δ)×V$. On the taken image 501$_C$, the image of the moving photographing object is taken in the form of a movement-blurring portion in a range from position $(2×T_a/4+2×δ)×V$ to position $(3×T_a/4+2×δ)×V$. On the taken image 501$_D$, the image of the moving photographing object is taken in the form of a movement-blurring portion in a range from position $(3×T_a/4+3×δ)×V$ to position $(T_a+3×δ)×V$.

On the output image 501$_E$ generated from these taken images 501$_A$ to 501$_D$, the image of the moving photographing object is taken in the form of a discontinuous movement-blurring portion in a range from position 0 to position $(T_a+3×δ)×V$. The output image 501$_E$ generated in the form of an image including a discontinuous movement-blurring portion as described above is unnatural and such an unnatural image arouses a feeling of incompatibility in the photographer.

As described above, if a blanking period is generated, the output image becomes unnatural. In order to solve this problem, this embodiment selects (or makes a decision to carry out) photographing processing that satisfies the third condition so that a blanking period is not generated. In this way, the embodiment is capable of generating a proper (or natural) output image. It is to be noted that, if no moving photographing object exists, no movement-blurring results. Thus, it is not necessary to determine whether or not the third condition is satisfied. It is possible to determine whether or not a moving photographing object exists by for example taking an image of the photographing object by using the image-pickup device 4 and displaying the image on the monitor 11 as a through face, which is then subjected to a movement detection process to recognize any movement on the face.

As describe above, the diaphragm value F is fixed and an actual exposure time $T_a$ is found from the proper exposure time $T_p$ on the basis of an exposure correction value set by the exposure correction dial employed in the input device 16. It is to be noted, however, that the actual exposure $T_a$ can also be fixed at the proper exposure time $T_p$ and it is the diaphragm value F that be adjusted in accordance with an exposure correction value set by the exposure correction dial.

That is to say, in accordance with what is described above, in general, the exposure is corrected by adoption of a method known as a diaphragm prioritizing mode in which the exposure is corrected by keeping the diaphragm value F at a constant value and varying the actual exposure time $T_a$ (or the shutter speed). However, the exposure can also be corrected by for example adoption of a method referred to as a shutter-speed prioritizing mode. In the shutter-speed prioritizing mode, the actual exposure time $T_a$ (or the shutter speed) is fixed at the proper exposure time $T_p$ and not changed and, when the exposure correction dial is operated to set an exposure correction value, the diaphragm value F is adjusted in accordance with the set exposure correction value.

At a glance, the shutter-speed prioritizing mode that keeps the actual exposure time $T_a$ at the proper exposure time $T_p$ as described above is perceived as a mode unsuitable for the digital camera 1 shown in FIG. 1 as a camera in which the actual exposure time $T_a$ is set at a value different from the proper exposure time $T_p$. As described below, however, the shutter-speed prioritizing mode can be applied to the digital camera 1 shown in FIG. 1.

That is to say, in the shutter-speed prioritizing mode, let us assume for example that the diaphragm value found from a value measured by the exposure meter 19 as the value of the brightness of the photographing object is F' and the proper exposure time is $T_p'$.

At the photographing object F' and the proper exposure time is $T_p'$, for a first case in which the exposure correction value set by the exposure correction dial is 0, at the step S505 of the flowchart shown in FIG. 44 as a flowchart representing the photographing-mode determination processing, the diaphragm value F, the proper exposure time $T_p$ and the actual exposure time $T_a$ are determined at F', $T_p'$ and $T_p'$ respectively.

For a second case in which the exposure correction value set by the exposure correction dial is the one-stage under brightness, at the step S505 of the flowchart shown in FIG. 44, the diaphragm value F, the proper exposure time $T_p$ and the actual exposure time $T_a$ are determined at a diaphragm value lower than F' by one stage, $2T_p'$ and $T_p'$ respectively.

That is to say, the amount of light hitting the image-pickup device 4 in an image-pickup process with the diaphragm value F set at F' and the proper exposure time $T_p$ set at $T_p'$ is equal to the amount of light hitting the image-pickup device 4 in an image-pickup process with the diaphragm value F set at a diaphragm value lower than F' by one stage and the proper exposure time $T_p$ set at two times the exposure time $T_p'$. Now, as a one-stage under process of the image-pickup process with the diaphragm value F set at F' and the proper exposure time $T_p$ set at $T_p'$, let us consider a one-stage under process of the image-pickup process with the diaphragm value F set at a diaphragm value lower than F' by one stage and the proper exposure time $T_p$ set at two times the exposure time $T_p'$. In this case, the one-stage under process of the image-pickup process with the diaphragm value F set at a diaphragm value lower than F' by one stage and the proper exposure time $T_p$ set at two times the exposure time $T_p'$ is an image-pickup process with the diaphragm value F set at a diaphragm value lower than F' by one stage and the actual exposure time $T_a$ set at (½) ($T_p$), which is equal to $T_p'$.

The one-stage under process of the image-pickup process with the diaphragm value F set at F' and the proper exposure time $T_p$ set at $T_p'$ is equivalent to the image-pickup process with the diaphragm value F set at a value lower than F' by one stage and the actual exposure time $T_a$ set $T_p'$. That is to say, the one-stage under process of the image-pickup process with the diaphragm value F set at F' and the proper exposure time $T_p$ set at $T_p'$ is equivalent to a one-stage under process of the image-pickup process with the diaphragm value F set at a value lower than F' by one stage and the proper exposure time $T_p$ set at two times the exposure time $T_p'$. The proper exposure time $T_p$ for such a process is $2T_p'$. An image-pickup process with the diaphragm value F set at a diaphragm value lower than F' by one stage and the actual proper exposure time $T_a$ set at the exposure time $T_p'$ is a one-stage under process carried out in the shutter-speed prioritizing mode for an image-pickup process with the diaphragm value F set at F' and the proper exposure time $T_p$ set at $T_p'$.

Thus, when the exposure correction value set by the exposure correction dial represents the one-stage under brightness, in the shutter-speed prioritizing mode, an image-pickup process with the diaphragm value F set at a diaphragm value lower than F' by one stage and the actual proper exposure time $T_a$ set at the exposure time $T_p'$ is carried out. In the photographing-mode determination processing, the processing is carried out by setting the diaphragm value F, the actual exposure time $T_a$ and the proper exposure time $T_p$ at a value lower than F' by one stage, a value fixed at $T_p'$ and $2T_p'$ respectively.

For a second case in which the exposure correction value set by the exposure correction dial is the two-stage under brightness, at the step S505 of the flowchart shown in FIG. 44, the diaphragm value F, the proper exposure time $T_p$ and the actual exposure time $T_a$ are determined at a diaphragm value lower than F' by two stages, $4T_p'$ and a $T_p'$ respectively.

That is to say, the amount of light hitting the image-pickup device 4 in an image-pickup process with the diaphragm value F set at F' and the proper exposure time $T_p$ set at $T_p'$ is equal to the amount of light hitting the image-pickup device 4 in an image-pickup process with the diaphragm value F set at a diaphragm value lower than F' by two stages and the proper exposure time $T_p$ set at four times the exposure time $T_p'$. Now, as a two-stage under process of the image-pickup process with the diaphragm value F set at F' and the proper exposure time $T_p$ set at $T_p'$, let us consider a two-stage under process of the image-pickup process with the diaphragm value F set at a diaphragm value lower than F' by one stage and the proper exposure time $T_p$ set at four times the exposure time $T_p'$. In this case, the two-stage under process of the image-pickup process with the diaphragm value F set at a diaphragm value lower than F' by two stages and the proper exposure time $T_p$ set at four times the exposure time $T_p'$ is an image-pickup process with the diaphragm value F set at a diaphragm value lower than F' by two stages and the actual exposure time $T_a$ set at (¼) ($T_p$), which is equal to $T_p'$.

The two-stage under process of the image-pickup process with the diaphragm value F set at F' and the proper exposure time $T_p$ set at $T_p'$ is equivalent to the image-pickup process with the diaphragm value F set at a value lower than F' by two stages and the actual exposure time $T_a$ set at $T_p'$. That is to say, the two-stage under process of the image-pickup process with the diaphragm value F set at F' and the proper exposure time $T_p$ set at $T_p'$ is equivalent to a two-stage under process of the image-pickup process with the diaphragm value F set at a value lower than F' by two stages and the proper exposure time $T_p$ set at four times the exposure time $T_p'$. The proper exposure time $T_p$ for such a process is $4T_p'$. An image-pickup process with the diaphragm value F set at a diaphragm value lower than F' by two stages and the actual proper exposure time $T_a$ set at the exposure time $T_p'$ is a two-stage under process carried out in the shutter-speed prioritizing mode for an image-pickup process with the diaphragm value F set at F' and the proper exposure time $T_p$ set at $T_p'$.

Thus, when the exposure correction value set by the exposure correction dial represents the two-stage under brightness, in the shutter-speed prioritizing mode, an image-pickup process with the diaphragm value F set at a diaphragm value lower than F' by two stages and the actual proper exposure time $T_a$ set at the exposure time $T_p'$ is carried out. In the photographing-mode determination processing, the processing is carried out by setting the diaphragm value F, the actual exposure time $T_a$ and the proper exposure time $T_p$ at a value lower than F' by two stages, a value fixed at $T_p'$ and $4T_p'$ respectively.

As for the three-stage under brightness or the one-stage over brightness, the two-stage over brightness and the three-stage over brightness, in the shutter-speed prioritizing mode, the photographing-mode determination processing is carried out in the same way as the one-stage under brightness and the two-stage under brightness, which have been described above.

It is to be noted that, when a binning function is executed, a pixel value output by the image-pickup device 4 increases to a value larger than a pixel value output without execution of a binning function due to summation of a plurality of pixel values, and larger pixel values cause a brighter image. Thus, the limit $1/M_{max}$ of darkness levels that do not cause an image to be inevitably buried under noises can be reduced, that is, the value of $M_{max}$ can be increased. That is to say, when a binning function is executed, the threshold value $T_p/M_{max}$ of the second condition can be set at a value smaller than the value for an image-pickup process without execution of a binning function. This is because a taken image is hardly buried under noises even if an image is taken as an image on the side darker than an image taken without execution of the binning function.

In the processing represented by the flowchart shown in FIG. 44, at the step S505, the proper exposure time $T_p$ is determined and, then, the proper exposure time $T_p$ is used in the following processes. However, the process of the step S505 does not have to be carried out. In this case, the proper exposure time $T_p$ determined at the step S502 is used in the processes.

In addition, in accordance with this embodiment, the digital camera 1 shown in FIG. 1 is provided with a release button having a half-press function. However, the digital camera 1 can also be a digital camera without a release button having a half-press function. In this case, first of all, a process is carried out in order to determine whether or not the release button has been completely pressed. Then, the diaphragm value F, the proper exposure time $T_p$ and the actual exposure time $T_a$ are determined in a process similar to the process carried out at the step S502. Subsequently, the photographing-mode determination processing of the step S506 is carried out.

In the example described above, the image-pickup device 4 employed in the image-pickup device 4 is a single-plate sensor. From a chrominance signal output by each pixel of the image-pickup device 4, an output image having three chrominance signals per pixel is generated. It is to be noted, however, that the image-pickup device 4 does not have to be a single-plate sensor. For example, it is also possible to employ a triple-plate image-pickup device for outputting three colors, i.e., the R, G and B colors, per pixel.

In addition, the present invention can be adopted in not only a digital still camera as described above, but also other apparatus such as a digital video camera by increasing the processing speed.

Processes of steps composing each of the flowcharts described above can of course be carried out along the time axis in accordance with an order in which the steps are described. It is to be noted, however, that the processes do not have to be carried out along the time axis. For example, the processes can also be carried out concurrently and individually. In addition, a portion or all of each flowchart can be carried out by execution of a program in a computer (or the CPU 15) or dedicated hardware.

Finally, the range of claims of the present invention is described. The present invention relates to the photographing-mode determination processing carried out at the step S506 of the flowchart shown in FIG. 44. As is obvious from the flowchart shown in FIG. 44, the photographing-mode determination processing of the step S506 can be carried out if the proper exposure time $T_p$, the actual exposure time $T_a$ and the information on a focal distance have been obtained prior to the step S506. As described before, the information on a focal distance is information for finding the threshold value $T_{blur}$ serving as the limit of exposure times causing no effects of hand trembling.

There are many conventional exposure determination methods, which are methods for obtaining the proper exposure time $T_p$ and the actual exposure time $T_a$ as well as obtaining the information on a focal distance as information for finding the threshold value $T_{blur}$ serving as the limit of exposure times causing no effects of hand trembling. Any of these methods can be adopted for obtaining the proper exposure time $T_p$, the actual exposure time $T_a$ and the information on a focal distance. That is to say, a method for obtaining the proper exposure time $T_p$, the actual exposure time $T_a$ and the information on a focal distance is not specified in particular.

As described above, the present invention relates to the photographing-mode determination processing for automatically determining which photographing processing is to be carried out to photograph an object of photographing. The photographing processing can be the first photographing processing carried out in the ordinary photographing mode in the same way as the photographing processing carried out by the ordinary digital camera. The photographing processing can also be the second, third or fourth photographing processing carried out in the hand-trembling correction photographing mode. In the second, third or fourth photographing processing, a continuous image-pickup process is carried out at a high speed to obtain a plurality of taken images successively. Each of the taken images obtained in this way is darker than an image taken at the proper exposure time. Then, a sharp output image is generated by for example superposing or interpolating the taken images.

That is to say, the first processing carried out at the step S521 of the flowchart shown in FIG. 45 is a process of importance to the present invention. To be more specific, the first determination processing is important processing to produce a result of determination as to whether or not it is quite within the bounds of possibility that a burring portion is produced by hand trembling on an output image generated on the assumption that a decision has been made to perform the first photographing processing as the photographing processing in the ordinary photographing mode. This first determination processing leads to selection of (a decision to select) the first photographing processing to be carried out as photographing processing in the ordinary photographing mode or the second, third or fourth photographing processing to be carried out as photographing processing in the hand-trembling correction photographing mode. As described above, in the second, third or fourth photographing processing, a continuous image-pickup process is carried out at a high speed to obtain a plurality of taken images successively. Each of the taken images obtained in this way is darker than an image taken at the proper exposure time. Then, a sharp output image is generated by for example superposing or interpolating the taken images. This point is a point key to the present invention.

Thus, a method (or processing) to generate a sharp output image from a plurality of taken images obtained by carrying out an continuous image-pickup process at a high speed as images each darker than an image taken at the proper exposure time is not limited to the image generation processing described above. Instead, it is possible to adopt any other method including any of the conventional methods.

The invention claimed is:

1. A control method provided for a photographing apparatus having a first mode for generating an output image by taking one input image and a second mode for generating an output image by taking a plurality of input images successively without using a binning function, the control method comprising:
    comparing at least one of a first exposure time, which is an exposure time of a photographing operation to take an input image when said photographing operation is to be carried out in said first mode, and a second exposure time, which is an exposure time of a photographing operation to take a plurality of input images without using said binning function when said photographing operation is to be carried out in said second mode, with a first threshold value;
    determining whether or not said first exposure time is equal to or shorter than said first threshold value;
    making a first decision to take an image in said first mode if said first exposure time is equal to or shorter than said first threshold value;
    selecting a second threshold value different from said first threshold value; and
    making a second decision to take an image in said second mode if said second threshold value is equal to or shorter than said first threshold value.

2. A control method provided for a photographing apparatus in accordance with claim 1, wherein said first threshold value is a limit of exposure time not causing effects of hand trembling on said input image taken in said first mode.

3. A control method provided for a photographing apparatus in accordance with claim 1, wherein said first threshold value is a value based on a focal distance used at an image-pickup time to take said input image.

4. A control method provided for a photographing apparatus in accordance with claim 1, wherein said second threshold value is a value based on a focal distance used at an image-pickup time to take said input image.

5. A control method provided for a photographing apparatus in accordance with claim 1, said control method further including
    a third decision step of making a decision to take an image in said first mode if second threshold value is neither equal to nor shorter than said first threshold value.

6. A control method provided for a photographing apparatus in accordance with claim 1, wherein:
    said second threshold value the larger one of a threshold value based on a proper exposure time found from the brightness of a photographing object and a threshold value based on an image-pickup
interval of successive image-pickup operations carried out by said photographing apparatus at a highest speed.

7. A control method provided for a photographing apparatus in accordance with claim 1 wherein
    said photographing apparatus has an image-pickup means for taking said input image and
    in said second mode:
    positional relations among positions of a plurality of said input images taken by said image-pickup means are detected;
    pixels of said input images are identified on the basis of said detected positional relations as pixels to be used for inference of a pixel value at the position of every pixel on said output image; and
    said output image is generated by inference of a pixel value at the position of every pixel on said output image on the basis of pixel values of said identified pixels on said input images.

8. A control method provided for a photographing apparatus in accordance with claim 7 whereby, in said second mode, said photographing apparatus detects positional relations among positions of a plurality of said input images by using one of said input images as a reference wherein said input image used as a reference is an input image taken at a middle time in the middle of times at which said input images are taken or an input image taken at a time close to said middle time.

9. A control method provided for a photographing apparatus in accordance with claim 7 whereby, in said second mode, as said output image, said photographing apparatus generates an image, which is observed at a central portion included in a range of a photographing object projected on said input images as a portion excluding peripheral portions of said range, and has a pixel pitch smaller than the pixel pitch of each of said input images.

10. A control method provided for a photographing apparatus in accordance with claim 9 whereby, in said second mode, an output image is generated as an image having a pixel count equal to the pixel count of said image-pickup means.

11. A control method provided for a photographing apparatus in accordance with claim 7 whereby,
    in said second mode, said image-pickup means employed in said photographing apparatus treats a plurality of pixels owned by said image-pickup means as a group in order to output an output image having a pixel count smaller than the number of pixels owned by said image-pickup means.

12. A control method provided for a photographing apparatus in accordance with claim 7 whereby, in said second mode, said photographing apparatus infers three pixel values for the position of every pixel on said output image having three pixel values per pixel on the basis of pixel values of pixels on a plurality of input images each having one pixel value per pixel.

13. A control method provided for a photographing apparatus in accordance with claim 1, said control method comprising:
    a determination step of producing a result of determination as to whether or not said second exposure time is equal to or longer than a third threshold value based on a proper exposure time found from the brightness of a photographing object;
    a first decision step of making a decision to take an image in said second mode if said determination result produced at said determination step indicates that said second exposure time is equal to or longer than said third threshold value; and a second decision step of making a decision to take an image in said first mode if said determination result produced at said determination step indicates that said second exposure time is neither equal to nor longer than said third threshold value.

14. A control method provided for a photographing apparatus in accordance with claim 1, said control method comprising:

a determination step of producing a result of determination as to whether or not said second exposure time is equal to or longer than a third threshold value based on an image-pickup interval of successive image-pickup operations carried out by said photographing apparatus at a highest speed;

a first decision step of making a decision to take an image in said second mode if said determination result produced at said determination step indicates that said second exposure time is equal to or longer than said third threshold value; and a second decision step of making a decision to take an image in said first mode if said determination result produced at said determination step indicates that said second exposure time is neither equal to nor longer than said third threshold value.

15. A control apparatus provided for a photographing apparatus having a first mode for generating an output image by taking one input image and a second mode for generating an output image by taking a plurality of input images successively without using a binning function, wherein said control apparatus comprises a control circuit configured to compare at least one of a first exposure time, which is an exposure time of a photographing operation to take an input image when said photographing operation is to be carried out in said first mode, and a second exposure time, which is an exposure time of a photographing operation to take a plurality of input images without using a binning function when said photographing operation is to be carried out in said second mode, with a first threshold value;

determine whether or not said first exposure time is equal to or shorter than said first threshold value;

make a first decision to take an image in said first mode if said first exposure time is equal to or shorter than said first threshold value;

selecting a second threshold value different from said first threshold value; and make a second decision to take an image in said second mode if said second threshold value is equal to or shorter than said first threshold value.

16. A non-transitory computer-readable medium tangibly storing a control program to be executed by a computer for controlling a photographing apparatus having a first mode for generating an output image by taking one input image and a second mode for generating an output image by taking a plurality of input images successively without using a binning function, the control program comprising steps of comparing at least one of a first exposure time, which is an exposure time of a photographing operation to take an input image when said photographing operation is to be carried out in said first mode, and a second exposure time, which is an exposure time of a photographing operation to take a plurality of input images without using said binning function when said photographing operation is to be carried out in said second mode, with a first threshold value;

determining whether or not said first exposure time is equal to or shorter than said first threshold value;

making a first decision to take an image in said first mode if said first exposure time is equal to or shorter than said first threshold value;

selecting a second threshold value different from said first threshold value; and making a second decision to take an image in said second mode if said second threshold value is neither equal to or shorter than said first threshold value.

* * * * *